(12) United States Patent
Burton

(10) Patent No.: US 12,210,839 B1
(45) Date of Patent: Jan. 28, 2025

(54) MULTILEVEL DATA ANALYSIS

(71) Applicant: Pontimyx Corporation, Irvine, CA (US)

(72) Inventor: Andrew John Burton, Irvine, CA (US)

(*) Notice: Subject to any disclaimer, the term of this patent is extended or adjusted under 35 U.S.C. 154(b) by 0 days.

(21) Appl. No.: 18/650,042

(22) Filed: Apr. 29, 2024

Related U.S. Application Data

(60) Provisional application No. 63/499,489, filed on May 1, 2023.

(51) Int. Cl.
*G06F 40/30* (2020.01)
*G06T 11/20* (2006.01)

(52) U.S. Cl.
CPC .......... *G06F 40/30* (2020.01); *G06F 16/3344* (2019.01); *G06T 11/206* (2013.01); *G06T 2200/24* (2013.01)

(58) Field of Classification Search
CPC ...... G06F 40/30; G06F 40/204; G06F 40/295; G06F 16/18; G06F 16/248; G06F 16/288
(Continued)

(56) References Cited

U.S. PATENT DOCUMENTS

2011/0271232 A1* 11/2011 Crochet ................ G06F 40/194
    715/810
2016/0283525 A1* 9/2016 Farenden ................ G06F 16/18
(Continued)

OTHER PUBLICATIONS

Card, et al., "The Media Frames Corpus: Annotations of Frames Across Issues", Proceedings of the 53rd Annual Meeting of the Association for Computational Linguistics and the 7th International Joint Conference on Natural Language Processing (Short Papers), Jul. 26, 2015, pp. 438-444.
(Continued)

*Primary Examiner* — Vijay B Chawan
(74) *Attorney, Agent, or Firm* — Outside GC; Alexander Franco

(57) ABSTRACT

A graphical, hierarchical document stream browser and environment for semantic (e.g. framing) and performance data analysis and interactive visualization integrates three scales: entities (competitive), entity (diachronic), and document (linguistic). The document level includes annotation and computational linguistics facilities; the entity level has calendrical and time-series focus. All levels emphasize deep linkage and network (i.e. connective/relational space) view of objects, with user-configurable connectivity. Large language model (LLM) integrations provide synthetic advisories, public opinions, reports, plot insights, comparisons; traditional natural language processing techniques and neural models are also employed. A smart plot system includes a "plot cart" and interpreter with an analysis snippet library. Graph structure may arise via adjustable blending or perceptual optimization of canned attribute-related distance functions or via link-induction query language with deep "semantic stored procedure" subexpressions, or feed into graph neural network-style inference for predictions. Most non-LLM ongoing computational load is client-side, using precomputed hierarchical summary files.

20 Claims, 104 Drawing Sheets
(53 of 104 Drawing Sheet(s) Filed in Color)

(58) Field of Classification Search
CPC .. G06F 16/3329; G06F 40/211; G06F 40/242; G06F 40/20; G06N 20/00; G06N 5/022; G06N 5/02; G06N 3/08; G06N 5/04
See application file for complete search history.

(56) References Cited

U.S. PATENT DOCUMENTS

| | | | | |
|---|---|---|---|---|
| 2018/0032507 | A1* | 2/2018 | Mikhaylov | G06F 40/30 |
| 2019/0005395 | A1* | 1/2019 | Dutkowski | G06T 11/206 |
| 2019/0340294 | A1* | 11/2019 | Spangler | G06F 16/36 |
| 2020/0218988 | A1* | 7/2020 | Boxwell | G06N 5/02 |
| 2022/0100963 | A1* | 3/2022 | Anubhai | G06F 40/295 |
| 2023/0306203 | A1* | 9/2023 | Hoang | G06N 3/04 |

OTHER PUBLICATIONS

Jurafsky, et al., "Speech and Language Processing", web.stanford.edu/~jurafsky/slp3/, Jan. 1, 2023.
Socher, et al., "Recursive Deep Models for Semantic Compositionality Over a Sentiment Treebank", Empirical Methods in Natural Language Processing 2013, Jan. 1, 2013, pp. 1631-1642.

* cited by examiner

Backtrace algorithm (possible remediation strategy for failed backtraces)

FIG. 7

```
▼{version: '1', channels: {...}, channelSetName: 'DOCTORRPM'} 🔲
  channelSetName: "EQUITIES"
  ▼channels:
    ▼Confidence:
      ▲channelColor: (3) [219, 121, 5]
       channelName: "Confidence"
       ogChannelSet: "EQUITIES"
      ▼tags: Array(28)
        ▲0: {name: 'WeContinueToBoast', val: 'pos'}
        ▲1: {name: 'MajorityMarketCoverageBoast', val: 'pos'}
        ▲2: {name: 'InternationalReachBoast', val: 'pos'}
        ▲3: {name: 'HaloEffectBoast', val: 'pos'}
        ▲4: {name: 'ContinuedDiversificationBoast', val: 'pos'}
```

FIG. 9A

Sentence Record

| text: | Factors that could cause actual results to differ from those discussed in the forward-looking statements include, but are not limited to, those described in Risk Factors in Part I, Item 1A of our Annual Report on Form 10-K for the fiscal year ended April 30, 2021, as updated in our subsequent reports filed with the SEC, including any updates found in Part II, Item 1A of this or other reports on Form 10-Q, if any. |
|---|---|
| sentiment: | (S-expression omitted for readability) |
| namedentities: | (Risk Factors in Part I, ARTICLE) (SEC, ORG) |
| sentenceIdx: 4 | |

HTML Backtrace annotationDate: 2023-04-09T22:21:18.216Z

| string: | Factors that could cause actual results to differ ... | in Part I, Item 1A of our Annual Report |
|---|---|---|
| tag_id: | 14 | 16 |
| subspans: | (78,172) | (0,247) |

FIG. 9B

| Artifact Datum | Machine Annotations (Inferences Pending Application) | Machine Annotations (Applied) | User Annotations | Channel Set Definitions | Data Lineage & Misc (e.g. Readability, original HTML hash) Metadata | Sentence Records (w/ e.g. named entities, backtraces) | text (textContent of html) |

FIG. 11

▸ createDate

| 0: 2023 | 1: 6 | 2: 8 | 3: 5 | 4: 9 | 5: 52 | 6: 1 | 7: 220 | 8: 0 | htmlTagCount: 83    EDGARPrimaryDoc: d740496d10q.htm

EDGARFilingURL:
https://www.sec.gov/Archives/edgar/data/0001525769/000119312521268913.txt EDGARFormType: 10-Q    EDGARCIK: 1525769    EDGARStockExchange: Nasdaq EDGARCompanyName: Dave & Buster's Entertainment, Inc.    EDGARReportDate: 2021-08-01

EDGARSubmissionDate: 2021-09-09    EDGARStockTicker: PLAY totalTokens:

▸ readability

ARI: 22.82377910770336    CLI: 18.996076693652 lastAnnotNum: 244

FIG. 17A

```
<fostertext>...</fostertext>
<span annosac="4" class="EQUITIES-Money ANNOTATIONTAG" pmx-annum="14" pmx-annospannum="1709169045_14" id="pmxanno_1709169045_14" pmx-tator="-1973391536" pmx-valence="neu" pmx-machanno="true" pmx-machanno-id="1579335365-11" >
<fostertext>
<fostertext> == $0
"In the past, we have met these cash requirements through cash, working capital management, proceeds from certain private placements and public offerings of our securities, and sales of products and services. "
</fostertext>
```

FIG. 17B

```
<span annosac="4" class="EQUITIES-Money ANNOTATIONTAG" pmx-annum="14" pmx-annospannum="17091690045_14"
id="pmxanno_17091690045_14" pmx-tator="-1973391536" pmx-valence="neu"
pmx-machanno="true" pmx-machanno-id="1579335365-11"><fostertext><fostertext>
In the past, we have met these cash requirements through cash, working capital management,
proceeds from certain private placements and public offerings of our securities,
and sales of products and services.
</fostertext></fostertext></span> deadenHTMLLambda(htmlStr)

'^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^^
In the past, we have met these cash requirements through cash, working capital management,
proceeds from certain private placements and public offerings of our
securities, and sales of products and services.
^^^^^^^^^^^^^^^^^^^^^^^^^^^^^^^^^^^^^^^^^^^^^^^^^^^^^^^^'
```

FIG. 18A
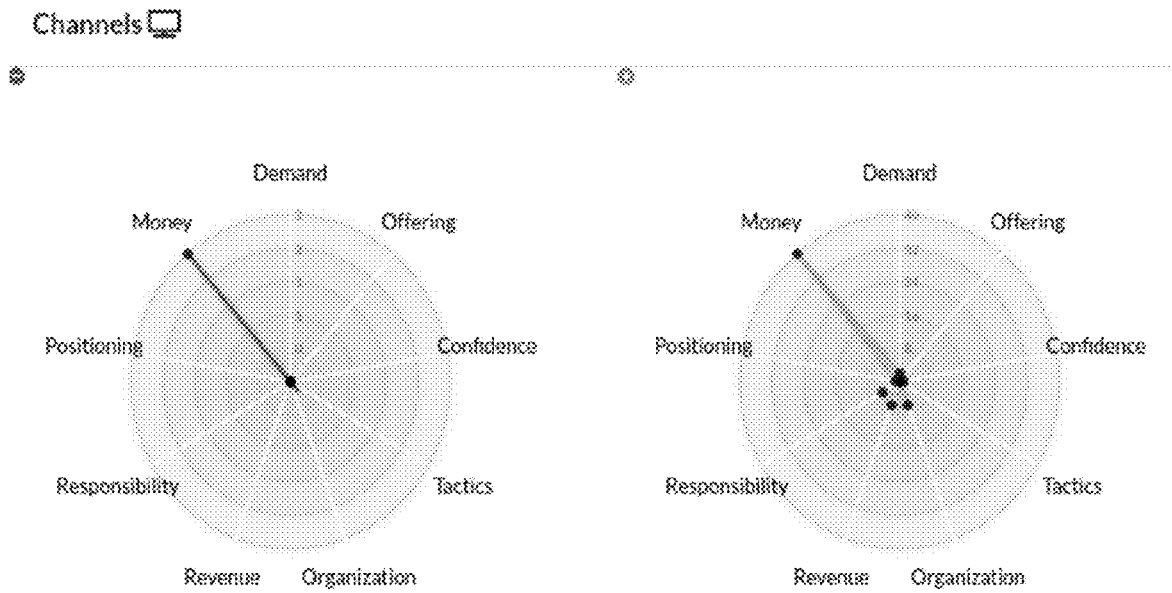
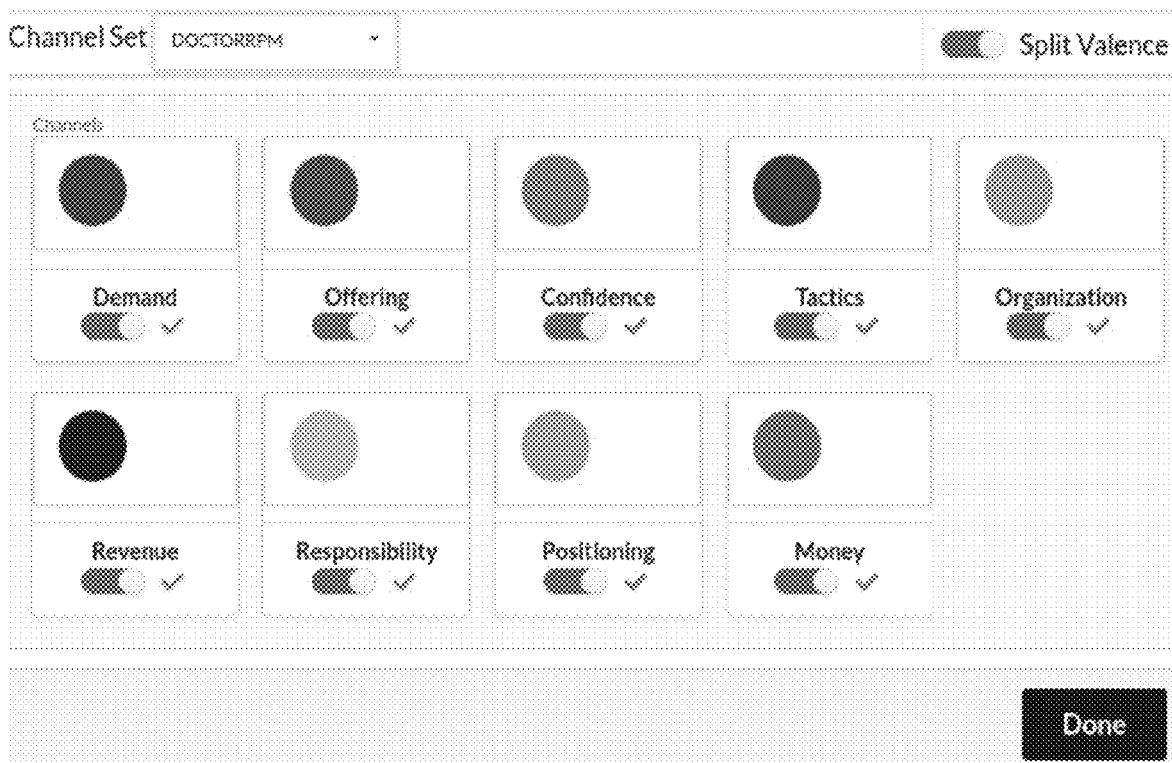

FIG. 20

Sentences •••

127 OF 154

("Eager US"), doing business as "Side Show", in exchange for cash consideration of $835 million (to be adjusted for cash on hand, Eager US transaction expenses, payments pursuant to Eager US's long term incentive plan, certain capital expenditures, and certain agreed upon working capital adjustments) less the indebtedness of Eager US immediately prior to the closing of the transaction.

Market Fundamentals

| | | |
|---|---|---|
| 6.1M OPERATING CASHFLOW | 2.3M EBITDA | 25.5M GROSS PROFITS |
| 8.1M TOTAL CASH | 51.6M TOTAL REVENUE | 13.5M SHARES OUTSTANDING |
| 223.33 TRAILING PE | 90.6M MARKET CAP | 8.9K AVERAGE VOLUME |
| | 102.70 DEBT TO EQUITY | 88.7M ENTERPRISE VALUE |

FIG. 41A
Report Network Viewer
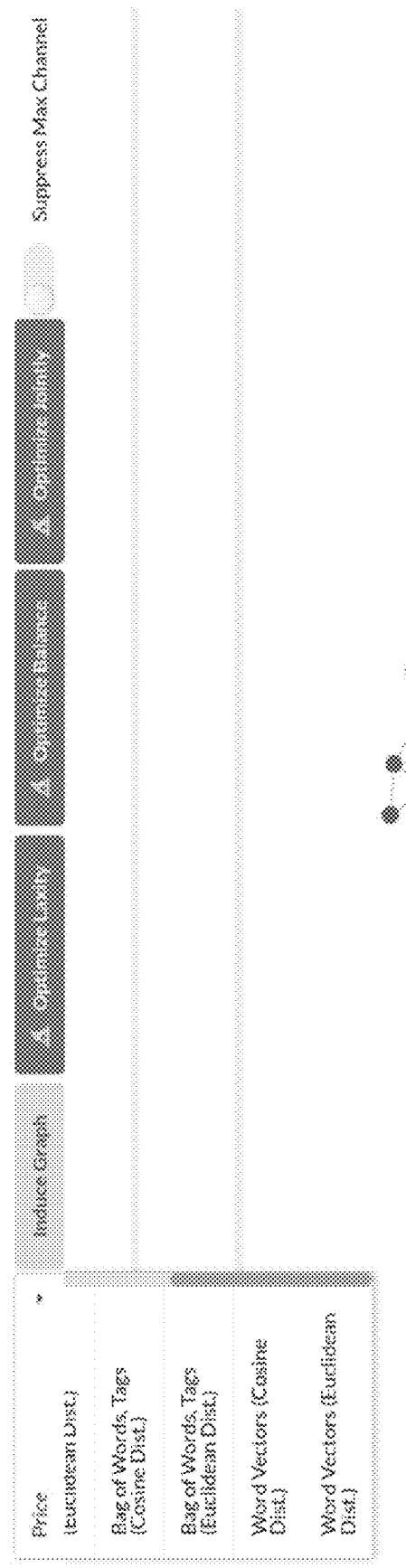
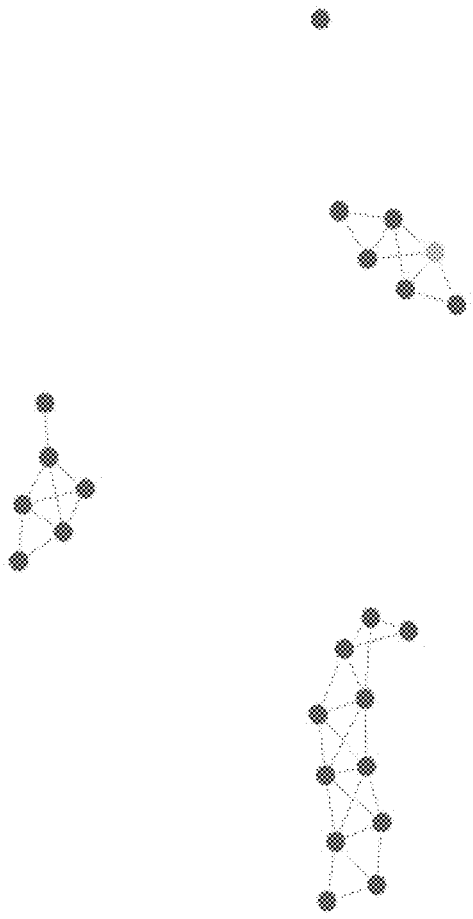

FIG. 45

| Time Series |
|---|
| d: 1440547200000, o: 5, h: 5.19, l: 4.28, c: 5, v: 3300 |
| d: 1440633600000, o: 5, h: 5, l: 5, c: 5, v: 200 |
| d: 1440720000000, o: 9, h: 9, l: 5.1, c: 6.29, v: 4800 |
| ⋮ |

FIG. 46

| Oneirodynapse | |
|---|---|
| | name: Oneirodynapse Inc. |
| | sector: Technology |
| | fullTimeEmployees: 230 |
| | longBusinessSummary: Oneirodynapse Inc. creates programs that synthesize game worlds, models, NPCs, quests, and rulesets for neural headsets and cybernetic interface decks. The company leverages advanced AI algorithms and deep learning techniques to generate immersive virtual experiences that can be accessed through neural interfaces. Oneirodynapse's technology has applications in gaming, simulation, and training industries. |
| | city: White Sands |
| | phone: 123 456 7890 |
| | state: NM |
| | country: United States |
| | website: https://www.oneirodynapse.com |
| | address1: One Virtual Plaza |
| | fineSectorTags: Neural Interfaces, Gaming, Generative Media |
| | address2: Suite 42 |
| | currentPrice: 42.0 |
| | marketCap: 1000000000 |
| | operatingCashflow: 200000000 |
| | ebitdaMargins: 0.25 |
| | profitMargins: 0.15 |
| | grossMargins: 0.65 |
| | revenueGrowth: 0.3 |
| | operatingMargins: 0.2 |
| | ebitda: 300000000 |
| | exchange: NASDAQ |
| | exchangeTimezoneName: America/Denver |
| | symbol: ONAP |
| | market: us_market |

| L1Summary | |
|---|---|
| | DOMAIN_EQUITIES_filingDate: 2019-07-29 |
| | DOMAIN_EQUITIES_reportDate: 2019-04-30 |
| | url: https://www.sec.gov/Archives/edgar/data/ 0000313081/000155837022007611/0001558370-22-007611.txt |
| | dataUrl: https://docufex.pontimyx.com/000155837022007611 |
| | accessionNumber: 000155837022007611 |
| | tags: |
| | [Equities:Demand:ClamoringCustomersBoast, Equities:Revenue:HolidaySeasonBoast] |
| | meanVec: |
| | [0.28, 0.18, -0.93, 0.19, 0.65, 0.03, 0.54, 0.08, -0.486, -0.979, 0.1137, -0.0071, 0.897, -0.13, -0.40, 0.64] |
| | varVec: |
| | [0.03, 0.04, 0.06, 0.02, 0.03, 0.02, 0.05, 0.02, 0.05, 0.08, 0.03, 0.02, 0.05, 0.02, 0.03, 0.05] |
| | DOMAIN_EQUITIES_CIK: 024960 |
| | DOMAIN_EQUITIES_XCHG: Nasdaq |
| | DOMAIN_EQUITIES_SYM: FAUX |
| | DOMAIN_EQUITIES_FRIENDLYNAME: FAUX-PAW CANINE PROSTHETICS CORP. |
| | ents: |
| | LAW: Animal Welfare Act (1) |
| | WORK_OF_ART: Hachiko Statue (1), Isle of Dogs (1) |
| | ORG: PawsTech (2), Association of Canine Prosthetists (1) |
| | DATE: Q3 2023 (1), 2022-04-01 (1), 2021-09-15 (1) |

FIG. 49B

| Channel Sets | EQUITIES | |
|---|---|---|

| |
|---|
| name: EQUITIES |
| channels: |
| name: Demand, value: 1, posValue: 0, negValue: 0, neuValue: 1 |
| name: Responsibility, value: 1, posValue: 0, negValue: 0, neuValue: 1 |
| name: Revenue, value: 1, posValue: 0, negValue: 0, neuValue: 1 |
| name: Money, value: 1, posValue: 0, negValue: 0, neuValue: 1 |
| ... |

FIG. 51B

| | |
|---|---|
| L2 Summary Subrecord | name: He3IM Inc. |
| | website: https://www.he3mining.space |
| | longName: He3 Isotope Mining Inc. |
| | ticker: H3IM |
| | sector: Space Exploration |
| | top10entities: |
| | WORK_OF_ART: Fusion Reactor Blueprint (85) |
| | EVENT: Lunar Christmas (25) |
| | ... |
| | GPE: Lunar Surface (1) , Coalition of the Americas (1) , China (1) , Russo-European Union (1) |
| | top10tags: |
| | EQUITIES:Demand:DireResourceNeedBoast (85) |
| | EQUITIES:Money:InternationalFundingBoast (30) |
| | EQUITIES:Positioning:SoleProviderBoast (65) |
| | QUITIES:Positioning:ForeignCompetitionHedge (45) |
| | description: A company in the Space Exploration sector focused on Helium-3 mining and other rare isotopes |
| | meanOfMeans: |
| | [-0.16, -0.50, 0.65, 0.09, -0.39, 0.24, 0.11, 0.33, 0.24, -0.55, -0.57, -0.56, 0.05, 0.12, 0.44, -0.43] |
| | varOfMeans: |
| | [0.0084, 0.0050, 0.0070, 0.0058, 0.0037, 0.0006, 0.0082, 0.0022, 0.0096, 0.0042, 0.0044, 0.0059, 0.0034, 0.0023, 0.0090, 0.0096] |
| | primaryChannel: Positioning |
| | secondaryChannel: Organization |
| | avgPrice: 299.87 |
| | marketCap: 87496293531 |
| | operatingCashflow: 12418438 |

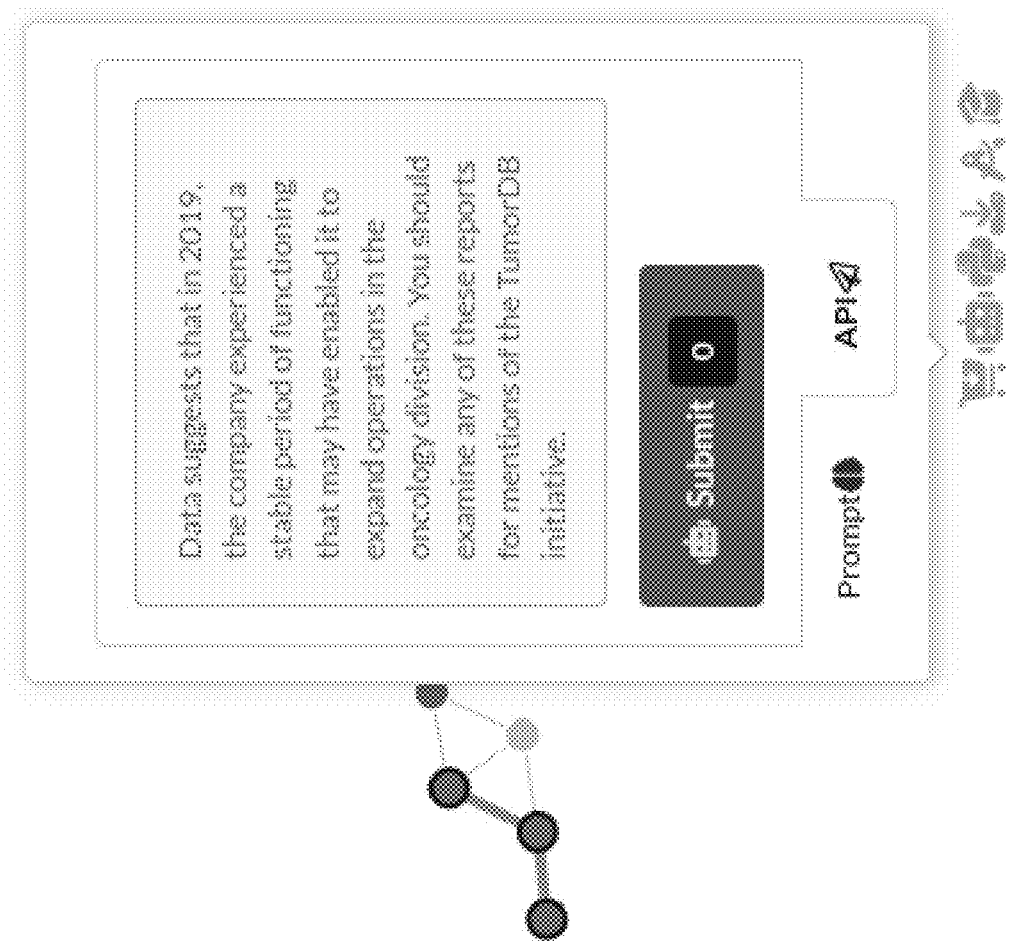
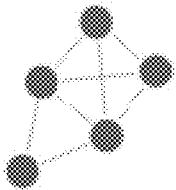
FIG. 53B

FIG. 56C

Generated Report

General Recommendations:
- Maintain a focus on R&D to drive innovation and strengthen the company's competitive advantage in protein synthesis technology and fungal applications.
- Pursue strategic partnerships to expand market presence and leverage the expertise of established corporations.
- Secure additional funding through government grants, private investments, or other financing options to support the company's growth initiatives.
- Prioritize intellectual property protection and patent applications to safeguard the company's technology and discoveries.
- Engage in transparent communication and public relations efforts to address safety and ethical concerns associated with synthetic biology.

Optionality:
- Explore licensing agreements for the company's proprietary protein synthesis technology to generate additional revenue streams.
- Develop new applications for genetically modified fungi, such as carbon capture, biofuels, and biodegradable plastics.
- Consider joint ventures or acquisitions to expand the company's product offerings and market reach.

Key Risks:
- Intense competition from firms A, B, and C, which may lead to price pressure and reduced market share.
- Potential changes in environmental regulations that could impact the industry and the company's operations.
- Negative public perception and ethical concerns surrounding the development and production of novel organisms.
- Dependence on key personnel, such as the CEO with a strong background in molecular biology.

Major Deals:
- Strategic partnership with a leading industrial enzyme producer to collaborate on research and development efforts.- Secured several patents related to the company's proprietary protein synthesis technology.

Elements of Concern:
- A 20% increase in research and development expenses, which could impact profitability in the short term.
- The possibility of competitors developing similar or superior technology, undermining the company's competitive advantage.

Summary Table:
General Recommendations: R&D focus, partnerships, funding, IP protection, public relations
Optionality: Licensing, new applications, joint ventures or acquisitions
Key Risks: Competition, regulations, public perception, key personnel dependence
Major Deals: Partnership with enzyme producer, patents secured
Elements of Concern: Increased R&D expenses, potential technology disruption by competitors

FIG. 58

Python REPL

Interpreter | Tutorials

```
Pontimyx Pyodide Console: an escape hatch for data scientists
Python 3.10.2 (main, Apr  9 2022 20:52:01) on WebAssembly VM Plot import: Data for the plot 'SeasonalFluxPolarGraph' is now available in Python as 'data'
> pmx.
pmx.d3jsToNetworkx(      pmx.downloadMatfile(    pmx.downloadNumpy(     pmx.downloadText(
pmx.getPlotDataByName(   pmx.listPlotDataNames()
> pmx.listPlotDataNames()
['RadarChart', 'CandlestickChart', 'FinancialTimeSeries', 'SeasonalFluxPolarGraph', 'TemporalFlowQuery', 'Fo
rceDirectedGraph', 'TokenTrend', 'SemanticTimeSeries', 'AreaChart']
>
```

[Done]

FIG. 59

Python REPL

Interpreter | Tutorials

Time Series Forecasting with SARIMAX

Time Series Forecasting with Statsmodels | Frequency Analysis of Time Series with FFT
Graph Analysis: Bridges, Label Propagation, Communities, and Isolates Time Series Forecasting with SARIMAX In this tutorial, we'll use the SARIMAX model from the Statsmodels library to forecast a financial time series. We'll fetch the data using pmx.getPlotDataByName('FinancialTimeSeries') and preprocess it to extract the "value" field from each dictionary element in the array.

Copy code

```
import numpy as np
import micropip
await micropip.install('statsmodels')
import statsmodels.api as sm fetch and preprocess the data
data = pmx.getPlotDataByName('FinancialTimeSeries')
values = np.array([d['close'] for d in data])

# fit a SARIMAX model
model = sm.tsa.SARIMAX(values, order=(1, 1, 1), seasonal_order=(0, 1, 1, 12))
results = model.fit()

# forecast and plot the results
forecast = results.get_forecast(steps=36)
plt.plot(values, label='original')
plt.plot(np.arange(len(values), len(values) + 36), forecast.predicted_mean, label='fo
plt.legend()
plt.show()
```

Run

FIG. 62A

Caricatural Mechanical Description

Assume that you have a set of plot items with information about them. The set of plot items generates the following summary.

Plot item Alpha is for the company FruitCo and it was collected 4/12/2023.
Plot item Beta is for the company ElectroCar and it was collected 4/11/2023.
Assume the SVG for Alpha is at plotPack/Alpha.svg
Assume the SVG for Beta is at plotPack/Beta.svg
Plot item Alpha is a stock price time-series that shows the stock price spiked at four dates in the last 10 years: 3/4/2016, 5/12/2018, 8/21/2020, and 11/16/2021.
Plot item Alpha has 3 major stable periods in 2017.
Plot item Beta is a stock price time-series that shows the stock price spiked at 2 dates in the last 10 years: 2/13/2015, and 5/18/2021. The stock price has an extreme 1200% decrease in 2023.
Plot item Beta has no stable points. Plot item Charlie is a document graph from Q1 2018. Well-connected plot elements from the graph are the sentences:
Our launch of the SmartFruitX has seen a much wider audience than anticipated.
We presold 1.3 billion units of the SmartFruitX, Luxury Nickel-Finish Edition.
Research and development costs for the SmartFruitX 2 exceed 5.6 billion USD at present.
We have a great logistics framework in place.
Plot item Denver is a topic modeling bubble map from Q3 2023.
Cluster topic0 in the bubble map includes keywords {meme currency, NextVenture.com, Windows NT parody, CyberQuest: Invisible Conflict II, Oceanfront Monorail, Autonomous Drive 1.0 Complete Edition}

FIG. 62B

Presentation Generation Prompt (truncated)

We are seeking to generate a comprehensive, descriptive, and conjectural presentation using a provided set of plot items, which may include various types of visualizations and information. The output should be in a format compatible with LaTeX beamer. Please use the following general technical instructions to create a presentation that demonstrates your expertise as a highly paid financial advisor, justifying your substantial fees to limited partners by offering in-depth analysis, nuanced insights, and informed speculation on a diverse set of plot types and analysis insights.

Begin with an introductory slide that provides an engaging overview of the presentation. The title should be a concise and informative summary of the topic being analyzed. Include a brief subtitle mentioning the time frame or any other relevant context, and emphasize the importance of the analysis to the financial interests of your audience.

Create a slide with a detailed introduction of the entities or concepts being compared, analyzed, or studied, and their respective industries or fields. Elaborate on their significance in the current market landscape and the potential impact on your clients' portfolios.

Presentation Generation Prompt (truncated)

```
\documentclass{beamer}
\title{In-Depth Financial Analysis of FRUT and ECAR}
\subtitle{Stock Price Trends, Network Analysis, and Topic Modeling}
...
\begin{frame}
\frametitle{FRUT Stock Price Time-Series}
\includegraphics[width=\textwidth]{plotPack/Alpha.svg}
Notable trends:
\begin{itemize}
\item 4 price spikes: 3/4/2016, 5/12/2018, 8/21/2020, 11/16/2021
\item 3 major flat periods in 2017
\end{itemize}
Possible causes and implications:
\begin{itemize}
\item Product launches, earnings reports, market conditions
\item Impact on future stock price and investment opportunities
\end{itemize}
\end{frame}
...
\end{document}
```

FIG. 62C

Report Generation Prompt (truncated)

We are seeking to generate a comprehensive, descriptive, and conjectural report using a provided set of plot items, which may include various types of visualizations and information. The output should be in a format compatible with simple HTML markup. Please use the following general tactical instructions to create a report that demonstrates your expertise as a highly paid financial advisor, justifying your substantial fees to limited partners by offering in-depth analysis, nuanced insights, and informed speculation on a diverse set of plot types and analysis insights.
Begin with an introductory paragraph that provides an engaging overview of the report. The first sentence should be a concise and informative summary of the topic being analyzed. Include a brief mention of the time frame or any other relevant context, and emphasize the importance of the analysis to the financial interests of your audience.
Create a paragraph with a detailed introduction of the entities or concepts being compared, analyzed, or studied, and their respective industries or fields. Elaborate on their significance in the current market landscape and the potential impact on your clients' portfolios.

Report Generation Prompt (truncated)

\<p\>In this comprehensive report, we analyze the stock prices and market developments of Pear Technologies Inc. (PEAR) and Electric Automotive Innovations Inc. (ELAI).
...
\<p\>\<img src='plotAlpha.svg' alt='PEAR Time Series'\>\</p\>
\<img src='For Plot item Alpha, the time-series chart for PEAR stock prices reveals four prominent spikes on 3/4/2016, 5/12/2018, 8/21/2020, and 11/16/2021. These spikes may be attributable to positive financial results, new product launches, or significant corporate events. The chart also shows three major flat periods in 2017, which could be the result of market stagnation or lack of noteworthy developments.
...
\<p\>\<img src='plotBeta.svg' alt='ELAI Time Series'\>\</p\>
\<img src='For Plot item Beta, the time-series chart for ELAI shows two significant spikes on 2/13/2015 and 5/18/2021. The extreme 1200% increase in stock price in 2023 is noteworthy and may be due to innovative strategies or sentiment shifts. Unlike PEAR, ELAI's stock price has been more volatile, which could present both risks and opportunities for investors.'\>\</p\>

LLM with metaprompt translates description into prompt, e.g., 'Your task is to develop a sophisticated and discriminative definition of levels of use of allusion and metaphor within these texts and determine a similarity fraction between 0 and 1, where 0 means no similarity and 1 means maximum similarity. Please analyze the texts carefully, considering various aspects such as the types of allusions and metaphors used, their frequency, the subtlety of their presentation, and the overall complexity of their usage. Keep in mind that the focus should be on the similarity in terms of allusion and metaphor usage, not on other aspects of the texts. Return a floating-point value that reflects the similarity fraction between 'text_a' and 'text_b' based on your analysis.'
Text A: {{text_a}} Text B: {{text_b}}

LLM with 2nd metaprompt critiques and refines prompt, emphasizes incorporating related facts, e.g., prepending 'Simile and metaphor are two powerful literary devices that allow writers to create vivid and imaginative comparisons between different concepts. A simile is a figure of speech that directly compares two unlike things using words like 'as' or 'like', while a metaphor implies a comparison by stating that one thing is another. Both devices enable writers to convey complex ideas or emotions in creative and engaging ways.' and appending: 'Please analyze the texts carefully, considering various aspects such as the types of allusions and metaphors used, their frequency, the subtlety of their presentation, and the overall complexity of their usage. Keep in mind that the focus should be on the similarity in terms of allusion and metaphor usage, not on other aspects of the texts. Return a floating-point value that reflects the similarity fraction between 'text_a' and 'text_b' based on your analysis.'

MULTILEVEL DATA ANALYSIS

BACKGROUND OF THE INVENTION

This disclosure relates to the automated critical-semantic (e.g. rhetorical) assessment of written documents produced by entities subject also to performance analysis, and more particularly, comprises a novel interactive, highly graphical system for exploring the connections between constituents (e.g. words, sentences, annotations, or paragraphs) in documents over calendar time (i.e. a "document stream") based on hierarchical summary representations produced via a pipeline of deterministic, heuristic, and neural network transformations and external indicators of entity performance. The system incorporates disparate methods from at least the scientific fields of natural language processing, text analysis, information visualization, signal processing, and network science, and may be employable in commercial domains and fields of endeavor including, but not limited to: educational assessment, media bias analysis, labor and hiring analysis, equities analysis, and social media analysis.

The success of a persuasive entity (e.g. a corporation, a news organization, an HR department, or a student writing essays) can vary over time, producing lagged rewards or penalties for the entity that affect its summary performance (e.g. the market capitalization, the magnitude of a subscriber base, the number of qualified inbound job leads, the cumulative letter grade). An extreme deflection or a persistent history of failures in performance can precipitate the failure of the entity (e.g. deregistration from a stock exchange, ceasing of the publication, or dismissal of the student from a degree program). In the field of computational sociolinguistics, framing analysis is the practice of undertaking a study of a document or textual artifact's rhetoric at the level of concrete or subjective appeals (as opposed to the specifically enumerated rhetorical devices of English language pedagogy strictly).

A classic example of framing analysis is embodied in the Media Frames Corpus of Card et al. 2015, which illustrates how framing analysis produces a more specific level of end product than a count of the use of rhetorical or persuasive devices and usually yields a collection of sentential, subsentential, or suprasentential spans (i.e. character subsequences corresponding or not exactly corresponding to natural language sentences) across a handful of channels of appeal (e.g. appeal to patriotism, appeal to common sense, appeal to morality, appeal to personal economic interest) when applied to a document such as a political position or opinion piece. These spans are typically lexically disjoint (non-overlapping), but need not necessarily be, for example: for different strictness settings of an actual or modeled rhetorical perceiver, for different social viewpoints, or for different sets of appeal channels. The same span of characters could have multiple annotations, and even within the same phrase and set of closely related channels, multiple spatially simultaneous character spans could prevail.

Framing analysis that makes use of multiple sets of perceivers (e.g. raters, statistical models, neural networks) arranged in parallel or levels of cascade, or which uses multiple expert models to discern the channels of appeal could be said to be multiheaded, or polycephalic, over and above the modern implementational notions of lower-level "multihead" attention (i.e. of weights in the network associating to input units non-contiguously and with variable affinity) in a transformer architecture neural network based language model.

Formally, this brand of framing analysis belongs to the syntactic and pragmatic subfields of linguistics, where it is a form of discourse coherence modeling, and a particularly general instantiation of argumentation mining (see Jurafsky, Speech & Language Processing, 3rd Edition). Unlike conventional argumentation mining that focuses on the connection between logical warrants and claims, this analysis is highly subjective and prone to vary between a subject-matter expert (such as an equities researcher, lead editor, vice president of recruiting, or undergraduate writing program director) and a layperson (e.g. the average newsreader, applicant, or writing student). Specific spans can naturally be associated with a level of confidence by the annotator, but also a valence relating to the force of the argument, felt level of moralization, or the anticipated gravity of the event. An advance upon framing analysis would be bilevel annotation, to associate event-related spans (already coarsely associated with an avenue or "channel" of appeal) with one or more fine-grained tags alleging the existence of an event from a previously compiled taxonomy of event types (e.g. the acquisition of a lease burden for a factory, an allegation of scandal against an entertainer, citation of a childcare benefit, or a claim in a student essay that specifically insists upon the need to sacrifice to prevent global warming).

Sentiment analysis, though it shares coarse labelings of valence and may or may not similarly involve detailed construction of character span representations, is a computationally distinct phenomenon from framing analysis (and particularly polycephalic, bilevel framing analysis). Sentiment analyzers in contemporary commercial use (typically implemented either with decision trees of rewriting rules, or tree-recursive neural networks (see Socher et al. 2013) that result from labeling each node in a constituency parse that produces a phrase structure tree) generally produce positive and negative sentence, span, or word judgments based on weighted count of word-level valence judgments which are unconditioned by domain, e.g. upon general corpora of, e.g. the entire English language. Emerging, more sophisticated, but nonetheless unsatisfactory approaches attempt to use traditional topic modeling (as might occur with Latent Dirichlet Allocation) to use easily-discernible keywords to discern topics of interest (e.g. COVID-19 impacts) and then perform general English language sentiment analysis on the rigidly categorized spans to produce simple listings. This top-down approach involving topics to search for and an unsophisticated general perceiver which may be rating merely emotion (e.g. "terrible", "terrific!" tokens) contrasts with the bottom-up approach intended for the more difficult task of framing analysis (where batteries of expert perceivers might keep to their business of recognizing appeal channels wherever and around whichever tokens appeals exist and directly allege the identification, valence, and impact of an appeal in a manner that practically demands the sophisticated soft computing provided by modern neural networks of the mid 2010s and beyond). Entry-level sentiment analysis requires fewer computational resources and less human intervention than entry-level framing analysis, and framing analysis is grounded in persuasive motivations: rhetorical boasts and hedges, whereas sentiment analysis is applicable to any writing sample, even that which does not attempt to persuade.

Since it is cognitively challenging to conduct rhetorical framing analysis (let alone bilevel, polycephalic framing analysis), or even to interpret and rate the quality of its output, there exists substantial commercial value in an integrated computer system which provides laypersons with the opportunity to view the annotations of real or synthetic domain experts, and further value in a system which eases the burden of the contribution of these experts in an annotation process that closely resembles the viewing process: the combined annotator-viewer system could be comprehensible in common by a subject-matter expert, a data scientist, a chief executive, a retail investor, or a member of the public interested in governmental or corporate transparency.

Tying the deep appeal structure of persuasive discourse artifact-producing entities to their commercial, reputational, or educational fate over time by explicitly or casually correlating low-level appeals to high-level markers of competitiveness or probability of survival is not practical in the main and across a large number of studied entities for an individual analyst, absent a system such as that described herein, which explicitly often verbally, visually, or statistically suggests how channel and tag framing spans may loosely correlate to performance, and which does so across multiple scales of analysis, enabling hierarchical navigation across the scales of examining the performance and the proclamations of the entity and related entities.

SUMMARY OF THE INVENTION

This disclosure relates to an integrated computer system, access to which may be deliverable over a computer network, in e.g. the user-facing form of a SaaS-type web application, which embodies three linked levels of analysis (universal/competitive-relational/spatial, calendrical/temporal/diachronic, artifactual/lexical/structural) and develops high-level visual and statistical summaries and interactive data visualizations of competitive fate (performance indicators) and semantic (e.g. framing) analysis of written productions, combining these two superordinate categories of data particularly in the higher two levels of the system, and streaming in new or updated performance or semantic data periodically, or through the use of one or more control programs in a non-obvious, hierarchical bottom-up fashion to serve the end user while controlling ongoing operating cost in, e.g. a "serverless"-first cloud computing environment.

The interactive portion of the system (as opposed to the backend portion of the system germane to data engineering and natural language inference, not under the control of the end user) functions as a rich and interactive browser of written artifacts and the entities which e.g. directly or indirectly authored them, and is grounded in both a human-computer interaction philosophy of spatial analysis, direct manipulation, and dynamic information visualization (e.g. clicking on deeply-linked visual elements in dynamically-generated plots which emphasize engagement with the document by visual faculties, as opposed to verbal faculties) rather than interaction by alternative means: e.g. single-level library search over freely enterable attributes of keywords using boolean operators, or conversational AI approaches such as freeform entry chatbots. A philosophy of "hypohypermedia" that provides linkage between elements (e.g. days, sentences, surmises, productions, "named entities") usually not linkable, referenceable, or traversable by conventional web browsers employing, e.g. anchor tag links to specific web pages, is pervasive in the design.

The data model used by the system may be well-suited for economic considerations of cost-effective operation, and architecturally sacrifices considerable expressive power of flexible backend query processing (e.g. as might occur through traditional consolidation into a graph or relational database) to provide most analytical functions by expounding upon a relatively small amount of data in simple hierarchical summary and augmented artifact files, computed bottom-up for ascending levels of analysis, and generally deliverable in a static, serverless fashion over a content delivery network while primarily relying on client-side computation, deferring to stateful interactions with running servers at time of consumption by an end user only secondarily, e.g. for advanced ad-hoc analyses and insights which cannot or should not be precomputed. The hierarchical augmented-artifact or summary files may be "departmented" (e.g. as with encoding in JSON, and only rewriting a subset of values under a specific key) so that individual portions of them can potentially be recomputed when more advanced analyses, algorithms, or neural network models emerge in the competitive marketplace (e.g. variously to be characterized as "de rigeur", "newly affordable" or "state-of-the-art"), and users who wish to pay a premium for access to more capable analyses can override the precomputed data in their local view of the application, or potentially for the user community by requesting on a rate-limited, credits, paywall, or subscription entitlement basis, e.g. higher quality sentence-embedding vectors from a supervised model trained on financial or educational data only, or which possesses more neural network parameters in line with the informal expectations observed in the "scaling laws" of neural language models.

Performance data analyzable with the system may tend to originate from external sources of performance information relating to an entity which produces, issues, or becomes associated with written artifacts (e.g. the cumulative grade of a student in an AP English Composition course, the estimated count of software engineers at a technology company, estimated readership numbers of an online newspaper, the number of followers on a social media account, the polling percentage of a career politician, or the current stock price of a publicly-listed stock corporation). The backend, data engineering portion of the interactive system relating to performance data exhibits flexibility and abstraction including the use of pools of specialized ingestion frontends which request data as needed from upstream providers and cache and archive this data for long term storage, which allows new data sources to provide updated performance data (e.g. through change data capture or through mass data request) on a recurring or system administrator-defined basis in an economical fashion to produce intermediate summary representations which the upper two tiers of the application particularly consume to display casually or statistically correlated performance data alongside semantic data.

Semantic data analyzable with the system ultimately originates from statistical, neural, syntactic, hierarchical, geometric, and visual processing of original artifact text, as found in plaintext form, or as commonly embedded in computer markup language (e.g. HTML). A small set of necessarily-conjoined rhetorical framing analysis data such as semantic channel (e.g. avenues of rhetorical appeal), tag annotations (semantic incidents, such as probable identifications of real-world events), and summary polarities (e.g. assessments about whether an annotation portends well or ill, or whether an event or passage represents a rhetorical boast or a rhetorical hedge) may be initially manually made within the system. Thereafter, in the course of the system's regular operation, these manual annotations may be supplemented or replaced with the product of sophisticated synthetic framing analysis carried out in an automated manner by flat or hierarchically-cascaded ensembles of neural network language model synthetic direct framing analysis perceivers, as well as a plurality of tree-based analyses (for, e.g. parsing text, parsing markup, fusing subtrees, categorizing subtrees, inducing tree structures), graph-theoretic analyses (for e.g. detecting communities, detecting connected components, implying causal relationships in sentences, inducing network structures), vector space analyses (e.g. for examining the kinship of sentences and performing fuzzy matching more powerfully than by using edit distances or bag of words models), and LLM prompt engineering enabled analyses (for e.g. generating natural language summaries of potential benefits and risks, highlighting statistical and visual anomalies, and providing the end user with normative conceptual definitions estimated from large amounts of Internet data).

In general, the system combines semantic text analyses from multiple eras of computer-enabled language processing: symbolically-dominated computational linguistics (pre 2010s), tree-recursive neural network or transformer neural network enabled NLP (2010s), and LLM enabled generative language synthesis (c. 2020s) into a user-friendly interactive browsing system for the end user, while also allowing the user to, in the same application, perform traditional signal processing, time series, unsupervised learning, and graph-theoretic spatial analyses, without requiring the advanced technical education necessary to implement them. At the same time, the system is designed with interaction paradigms in mind that can engage and capture the economic attention of highly technically sophisticated end users, such as data scientists, NLP researchers, experienced financial analysts, and algorithmic trading or computational finance practitioners, who generally prefer interactive systems for analysis to exhibit interactive programmability to expand the capabilities of the system at the same time that they prioritize the ability to take the available data or visualizations out of the system, (i.e. to export data, metadata, and generated graphics through a variety of means and in a variety of file formats to analysis, presentation, or reporting suites under their own control) e.g. for offline analysis using proprietary workflows. The system allows the user to download this information through a variety of means, such as direct export buttons associated with each plot producing e.g. CSV, SVG, or JSON format data, semantic or plot-contextual data cart functionality for building reports (e.g. generating presentation slide and analyst report starter stubs) spanning multiple entities and artifacts, or imperative execution of export functions at a command line or within a stored or supplied program from within a captive interpreter environment linked bidirectionally to the plot system. As an alternative to the primary means of creating network link visualizations with rigid distances chosen from a small set of attribute-based distances, a query language specialized to link induction can be integrated, and the query language can with LLM assistance call down into "semantic" stored procedures. In general, generative AI features which summarize (e.g. the sociopolitical response to document text, visual points of interest on plots, or discursive text concerning entities and artifacts) may be woven through the tiers of the application particularly to appease the analytical inclinations of the non-technical user unsuited to self-service analyses.

At the artifact level (the lowest level incorporating the fine structure of textual information and emphasizing semantic data about artifacts most particularly of the three tiers of the application), the system allows creating annotation records of spans directly in a web browser in an annotation mode, either by ad lib selection of textual spans based upon clicking and dragging a computer mouse, or in a fast annotation mode which presents a nAFC (n-way alternative forced choice) task to the annotator for a random sentence or subsentential span (for example, a phrase discovered in a constituency parse). In a viewer mode of that same artifact level, the user may browse a written artifact as augmented through various modes of spatial, syntactic, semantic, relational, statistical and numerical analysis (e.g. PCA of sentence embeddings, force-directed graph simulation of annotation relationships, topic modeling through latent Dirichlet analysis, inspection of sentiment-augmented constituency parse trees). In this portion of the browser system, precomputed hierarchical annotated artifact files combine with remote calls or requests to web service APIs for advanced computational analyses (such as natural language summaries of sentences in discovered graph relationships for a user-induced graph of machine-sequenced format blocks) to enable a plurality of analyses, especially those with one or more spatial components. The user can inspect, interact, and view statistics about annotation records and how they interact with lexical or semantic units discovered or predicted to exist within the text of the artifact. Annotation records and associated metadata embodied in a hierarchical-type annotation document datum file may be visually displayed for interactive consumption by an end user, where, for instance, the annotations have been synthetically generated by a processing topology of neural language models (e.g. transformer type neural networks existing in parallel, serial, or cascade arrangements) and the transformed original markup and text has been subjected to processes including, but not limited to: data extraction, document understanding, and processing familiar to practitioners in the field of computational linguistics, such as named entity recognition, dependency parsing, constituency parsing, sentence boundary detection, word and sentence vector embedding, semantic markup tagging, entity and lexical unit linkage, sentiment analysis, framing analysis, and readability score analysis.

At the calendrical level (the intermediate level summarizing the stream of artifact productions over time and most conspicuously incorporating diachronic performance data, but importantly alongside semantic data), the system allows traditional dashboard-style engagement with information about the entity producing the written artifacts. In an embodiment related to equities analysis, this dashboard resembles standard dashboards used ubiquitously for summarizing stock data. For instance, it may include traditional price time series, candlestick plots, applicable technical indicators, and fundamental analysis statistics of interest which may be computed on one or more periodic bases. However, it also integrates across embodiments a plurality of nonstandard analyses, such as visualizations of seasonal variation, semantic time series, semantic area plots, and semantic radar plots, named entity and semantic event-tag count data as computed over one or more artifact productions by the entity, as well as a non-obvious asymmetrical temporal window flow query system that characterizes transitions between performance and semantic data categorizations across frame-relative prior, central, and posterior periods of time or integral productions.

At the universal level (the highest level summarizing the competitive relationships between entities on the basis of their performance data, but incorporating the ability to use coarse semantic data to adjoin entities in a focal depiction of relational space), the system allows graph-theoretic, direct-manipulation exploration of extemporaneously induced networks by considering a "universe" of discourse or analysis among a group of entities (e.g. a set of American political magazines, a class of students in a upper-division writing course, a set of corporations as participating on a social media platform, the NYSE, or one or more job posting sites).

For convenience, this tier may incorporate, in accordance with one embodiment, a node-hiding, selective presentation mechanism that reduces the display of complete universal graphical data locally consumed by this application tier otherwise in its entirety for, e.g. force-directed graph simulation tractability purposes, and also node locator functionality, which uses a identifier of the node to, e.g. pan the network simulation viewport or change the color or size of a node to one that corresponds with a single user-entered identifier, preserving the philosophical and design emphasis of the system upon direct manipulation and spatial interaction, wherever remotely practicable. Various abstract performance and semantic distances using data which has undergone multilevel summarization from the forms available for consumption by consolidated-entity dashboard and consolidated-artifact viewer tiers may be selectable by the user, contrasting with corresponding visualizations which occur for the graph of artifacts and the graph of constituents in the lower tiers which operate on finer summary data in the bottom-up computed, discrete hierarchically-organized summary data files.

In summary, the system provides to the end user a comprehensive and user-friendly web application (which also may tend to appeal to power-user analysts, or users who prefer interactive programming facilities) for multiparadigm, conjoined analysis of textual structure and semantics and performance analysis of text-producing entities at varying granularities, and, to the system operator, a distributed system that may be adjusted to optimize for delivery cost or the enhanced perception of system capabilities by, e.g. hybrid use of precomputation and lazy, deferred, or premium computation, abstraction of ingestor modules, segregated pipelines for specific domains, container-condensed pipelines (e.g. which run modules in local file mode instead of performing step-transition writes to general-purpose serverless cloud buckets or queues) to perform customer document inference end-to-end, granular requesting of data backed by caching and reconciliation in dealings with upstream data vendors, the use of metadata and departmented files to avoid fruitless recomputation, the use of model data lineage metadata and flexible inference architecture to allow state-of-the-art or cost-effective alternative commodity models to be introduced in a modular fashion, and an annotator (which may also function as a viewer) to simplify the seed annotation of text artifacts for training neural networks and associated NLP models and also to avoid many API calls at the point of document consumption by an end user by enabling a consistent and consolidated data model for human and machine annotation records which allows forward and backward cross-referencing of markup, text, and annotations via the computation of non-obvious linkage data between the three types of data.

Advanced and distinctive features of the system in general leverage computed connectivity (extemporaneous and precomputed) in highly convenient ways which interact, often cumulatively, to enhance the utility of the total application for the user.

Annotations and inferences may be kept in a mutually compatible format and articulate with the markup (which has been mutated through a non-obvious process to inject annotation subspan tags) and sentence records discovered through sentence boundary detection. The non-obvious computation of a backtrace translation data structure facilitates heavily-linked viewer module computations such as intersection tests spanning markup, annotation, inference, and sentence record ownership of the same underlying text content. Intersection tests underlie higher-level computations such as majority channel identification in topic modeling, and discriminant analysis determining channel-specific regions in vector space. The document viewer and the annotator may be a unified program (i.e. they may be the same program in different modes) and there may be two alternative modes of human annotation: one suited for a thoughtful domain-expert annotator who wishes to annotate the document in sequential context and one suited to the rapid annotator who may feel biased or overwhelmed by sequential context. The annotation process and the underlying neural network training and inference process may be shaped by the two-phase annotation procedure suitable for framing analysis, in which one coarsely identifies the channel and the polarity, and then from that context applies channel-appropriate event-related tags.

The units of analysis at each scale (entities, artifacts, text constituents) may be plainly examinable in the form of force-directed graph visualizations that quickly allow transit down to subordinate scales, and involve visually making explicit the linkage between the units. In one variety of interaction, focusing on standardized system-suggested distances compatible with the information available in the intermediate summary files and vector representations the system computes, the user can select one or more distance notions (tending to be segregated as either semantic or non-semantic) from a list of distances generally arising from comparing the attributes (e.g., summary vectors of sentence embedding vectors, bag of words vectors of framing tags, price level) associated with the units. In an alternative variety of interaction, focusing on flexible user-defined distances, the user can interact with natural language or graph link induction query language to induce more arbitrarily-conceived connectivity based on subtle and subjective notions of distance as computed by "semantic stored procedures" implemented by a system of LLM promptchaining which uses prompts to produce and refine and assess the outputs of other prompts.

The system uses a paradigm inspired by analysis-by-synthesis methods of the cognitive sciences to estimate the anticipated sociopolitical response to the documents and their constituents: generative models trained on utterances associated with interest groups aim to produce templated reactions to pieces of the document, and those synthetic reactions may be harvested for named entities, keywords, and sentiment to produce averaged data that estimates an emotionally-tinged, or viewpoint-colored response. Less-sophisticated networks (e.g. GPT-2) may be thought sufficient for estimating emotional or sociopolitical response via averaging, and more sophisticated networks (e.g. GPT-3) instructed to pretend they encompass the viewpoint may be leveraged to produce synthetic user-facing analytical takes on the subject matter.

A synthetic advisory functionality may be included which uses soft knowledge bases of real or synthetic facts, premises, or propositions triggered by domain-specific language in the document, along with channel identification constrained sampling of document extracts, as well as the optional injection of historically time-locked external facts which may reference current event detail contemporaneously available at the time of document preparation, and report-structure informed prompting of LLMs to produce document-adjacent domain-specific advisories in familiar formats.

A captive interpreter system may be made available to the user which allows the user to extend the analyses past those provided with the system. The interpreter has access to plot data and other browser data and may be preloaded with libraries that make bidirectional capabilities for interaction convenient.

A contextually-filtered tutorial snippet system that can immediately run program segments in the interpreter environment may be included for the benefit of users who might desire suggestions of advanced analyses to run which may be appropriate for, e.g. the tier of the application they are working with, a difficulty level, the plots they have interacted with, and the fields from which they are interested in using field-specific methods (e.g. short-term time series projections in computational finance).

The notion of "insight-generating functions" for plot-centric generative AI allows for pseudorandom observations to be made about the data in the majority of the visualizations computed by the system. The visualizations may be dynamically generated throughout the typical use of the system in response to available data, but also tend to produce metadata and vector graphics with correlating information sufficient to draw from a list of statistical anomaly or clustering functions to discover interesting data points, series, objects or other elements, and produce mechanical descriptions using templating that summarize facets related to the discovered plot points of interest. The mechanical descriptions, while not particularly discursive and analytical, may be written so as to produce a prompt that can be dispatched to an LLM to produce a discursive synthetic analysis of the anomaly, point or region of interest, or data cluster in the vicinity of the plot elements themselves. This interaction pattern of simply requesting plot insights allows a user to discover interesting patterns in the data without a goal or strategy for analyzing the data in mind. Since the visualizations, the metadata, the data discovery functions, and the prompt templates may be under the system's control, the system can provide insights less directly tainted by outside information as approaches relying on, e.g. an external visual question answering transformer attempting to describe a rasterized plot image leveraging its knowledge of many unrelated plots.

Finally, the visualizations and plots may be added by a user to a plot-oriented data cart inventory intended to be under their curational control. Users may conveniently add to, and delete plot items from, an inventory which captures the vector graphics, data, and metadata for the dynamically-generated plots they have added. The user may collect plots across tiers of the application, gathering visualization objects and data about specific entities, artifacts, and constituents as they wish. Then, the user may download all of this data as a combined archive (an interaction more familiar to system-stored, dataset-oriented data carts encountered in public records inquiries), or direct that the system should attempt to generate source or binary files useful for compiling presentation slides or textual reports on the data in the plots. The report starter data may be generated via task and domain-specific prompts fed to LLMs furnished with mechanical descriptions of the consolidated plot cart items, which may tend to lead to, e.g. integrated slide decks incorporating observations about the plots and the entities, artifacts, or constituents they reference inline with the included graphics, saving substantial time for users such as business analysts in preparing to compile presentations.

In its totality, via the interplay of these distinctive functionalities, the system may cover a large variety of analytical use cases and levels of user sophistication.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 is an abridged example JSON hierarchical listing of channel set definitions, which include for each channel, e.g., a preferred color (e.g. assigned by default), a name, and a set of tags with individual polarities (e.g. positive for "Boasts", negative for "Hedges") in an embodiment related to equities analysis.

FIG. 9A is a record schematic view of an example sentence record as produced by the amasser and available to the viewer in accordance with one embodiment.

FIG. 9B is a conceptual record schematic view listing the departments of the artifact datum in accordance with one embodiment.

FIG. 11 illustrates data lineage metadata from a metadata viewer attached to the viewer module in an embodiment relating to equities analysis, illustrating data lineage metadata harvested distally from the SEC EDGAR database and numerical figures such as readability statistics and timestamps.

FIG. 17A illustrates a HTML fragment showing <fostertext>HTML text node (c.f. HTML element) management tags injected into the markup, as well as highlighting spans, with metadata in attributes allowing the specific tag to be traced back to an annotation subrecord, annotation record, and annotator.

FIG. 17B illustrates a HTML fragment string and corresponding "deadened" HTML fragment string, to illustrate the result of the subprocess of removing characters not part of extended "text content" described in the suggested compatible best-effort highlight-application algorithm.

FIG. 18A illustrates a channel browsing tool showing split (negative and positive) polarities with all channels in the selected channel set active, meaning that their highlights are visible in the underlying document, and their corresponding axes are operative in the radar charts displayed in accordance with one embodiment.

FIG. 20 illustrates a sentence browsing tool in accordance with one embodiment.

FIG. 30 illustrates an inferences metadata tool which allows navigation through the inferences made by the system analogous to human annotations, for which there may be a visually and logically corresponding tool in accordance with one embodiment.

FIG. 35 illustrates a fundamental analysis indicators display panel which displays performance fact data in accordance with one embodiment relating to equities analysis.

FIG. 41A illustrates a force-directed graph visualization available at the dashboard level, where nodes are artifacts and a dropdown menu selecting the semantic distance is evident in accordance with one embodiment.

FIG. 45 illustrates a truncated record visualization of time series data file as produced by a gleaner module in accordance with an embodiment related to equities analysis.

FIG. 46 illustrates a record visualization of one embodiment of a gleaner file with entity data and performance facts in accordance with an embodiment related to equities analysis.

FIG. 49B illustrates an example record visualization of the L1 summary file produced by the L1Summarizer from a list of artifacts in accordance with one embodiment related to equities analysis.

FIG. 51B illustrates a record visualization of one embodiment of a subrecord in an L2 summary file produced by the L2Summarizer from an L1Summary, and gleaner time series and fact records in an embodiment related to equities analysis.

FIG. 53B illustrates an insight-generating function's LLM response, where the LLM has integrated data from the earlier-sampled and generated prompt in accordance with one embodiment.

FIG. 56C illustrates an example advisor report production using the concatenated generated prompt elements in the prompt construction example in accordance with an embodiment related to equities analysis.

FIG. 58 illustrates an interactive interpreter available at all three tiers of the application in accordance with one embodiment.

FIG. 59 illustrates a contextual and causal tutorial system which provides the user with a library of code snippets they can conveniently run in the interpreter to perform advanced analyses in accordance with one embodiment.

FIG. 62A illustrates a hypothetical and caricatural "mechanical" description as might be produced by emitting excerpts from the data cart item data in a structured form.

FIG. 62B illustrates example results of substituting the untuned, caricatural description generated from a hypothetical plot item cart into a presentation generation prompt in accordance with an embodiment related to equities analysis.

FIG. 62C illustrates example results of substituting the untuned, caricatural description generated from a hypothetical plot item cart into a report generation prompt in accordance with an embodiment related to equities analysis.

FIG. 63 illustrates an alternative user interaction paradigm for link induction, the graph link induction query algebra method, displaying query wish, query source, query parameter slider, and query result viewport in accordance with one embodiment.

FIG. 64D displays example content-template-bearing result prompts generated by a measure-description-to-prompt metaprompt and a second, prompt-to-enriched-prompt metaprompt, as examples of the products of steps that use these templated metaprompts in the de novo semantic stored procedure synthesis branch of the semantic stored procedure evaluation process depicted in FIG. 64C, focusing on an example of computing subjective disparity in node-associated sample text pairs' use of "allusion and metaphor" with partially-depicted enrichment of the prompt to more richly clarify at least the difference between simile and metaphor, in accordance with one embodiment.

DETAILED DESCRIPTION

Figure 1:
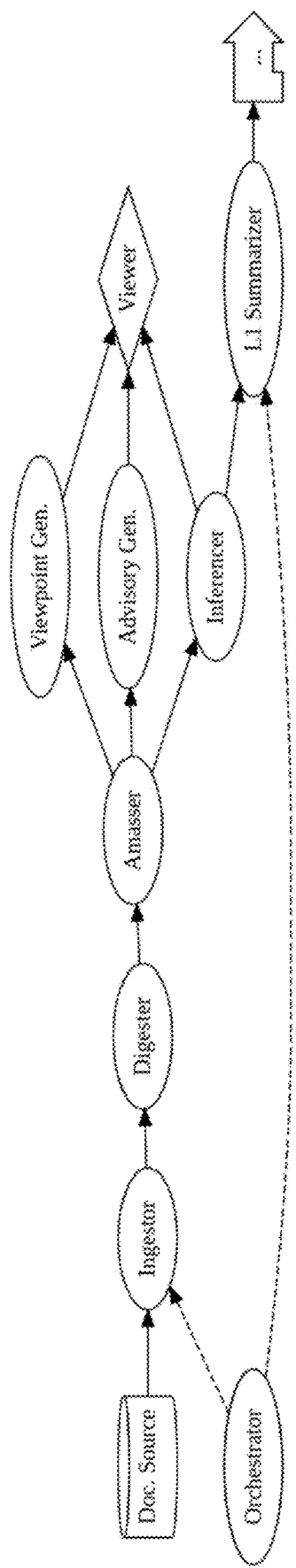
FIG. 1 is a system diagram of a pure-semantic leg of a data pipeline in typical configuration in accordance with one embodiment.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

The system comprises frontend, backend, neural network, and external web service API components which function in concert to create a highly-interactive and multifunctional data analysis environment and browser for examining the constituency of documents and the semantic and performance deflections of entities producing a document stream across historical time. The base system which allows relatively static analysis of documents, document streams, and document stream originators, may be enhanced in, e.g., premium computation modes, by tightly integrated generative AI LLM-powered features such as synthetic advisories, reports, presentations, perspective-taking, subjective semantic distance judgments, and query language formation, and extended analysis features such as intelligent data export and a captive interpreter functionality which allows power user extension of the set of analysis capabilities designed for typical use. Visualizations span the range of those used in computational linguistics, financial analysis, unsupervised machine learning, and dynamic network analysis.

The system's web application frontend, in one embodiment, may encompass three tiers: an entity universe viewer, an entity dashboard viewer, and an artifact viewer and annotator. The system backend may be cost-optimized to produce hierarchical summary files (as opposed to relations in a central database) from change data collected via external systems, e.g. financial historical data systems, and structured document repositories. The data pipeline focused upon the baseline (e.g. not credits-based or API rate limited) functionality may be designed to be controlled by a single program type that dispatches messages to request work or information harvesting by, e.g. the autonomously-polling program types otherwise involved in, e.g. document ingestion, document simplification, computational linguistics processing, generative text AI precomputation, neural network inference, document constituent data summarizing, and performance data harvesting, which ultimately tends to result in the periodic or event-triggered creation of static files which can be affordably served over a content delivery network.

In FIG. 1, the pure-semantic leg of a possible embodiment of a data pipeline is depicted in its typical configuration. Dotted lines denote control messages, solid lines imply queues involving intermediate web requests, cloud object I/O, and metadata DB updates. In advanced use, the orchestrator also maintains (not pictured) ad hoc queues to every other program type, and the program types maintain "dead letter" queues to manage exceptions (e.g. indigestible documents) for triage by a system administrator or data platform engineer.

Figure 2:
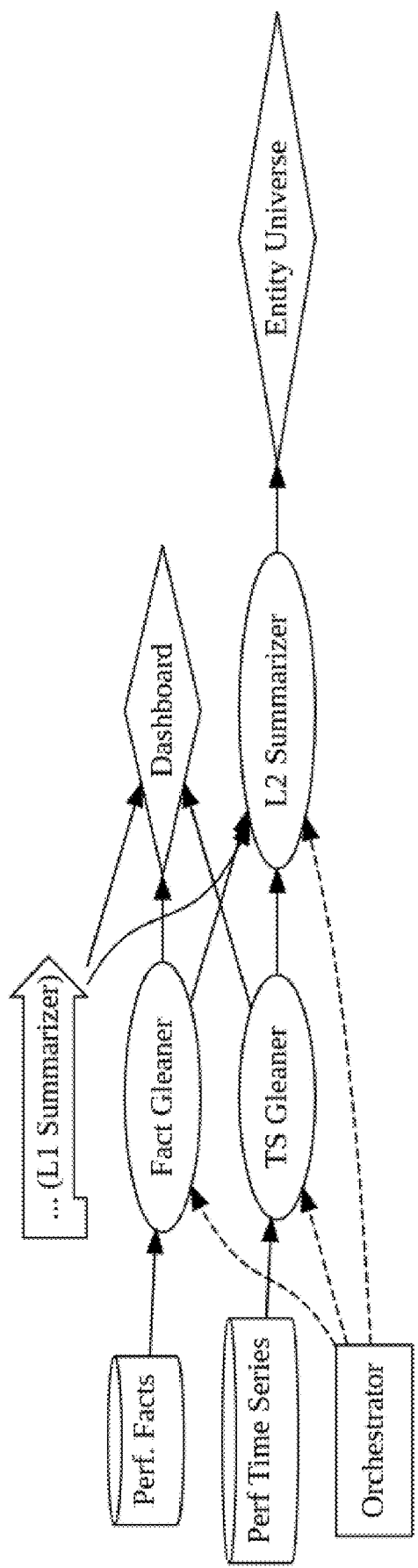
FIG. 2 is a system diagram of a combined semantic-performance terminus of a data pipeline in typical configuration, continuing from the pure-semantic leg of the pipeline of FIG. 1 in accordance with one embodiment.

In FIG. 2, the continuation of the data pipeline depicted in FIG. 1 is shown in its typical configuration. The continuation is focused upon the combination of semantic and performance data.

Figure 3:
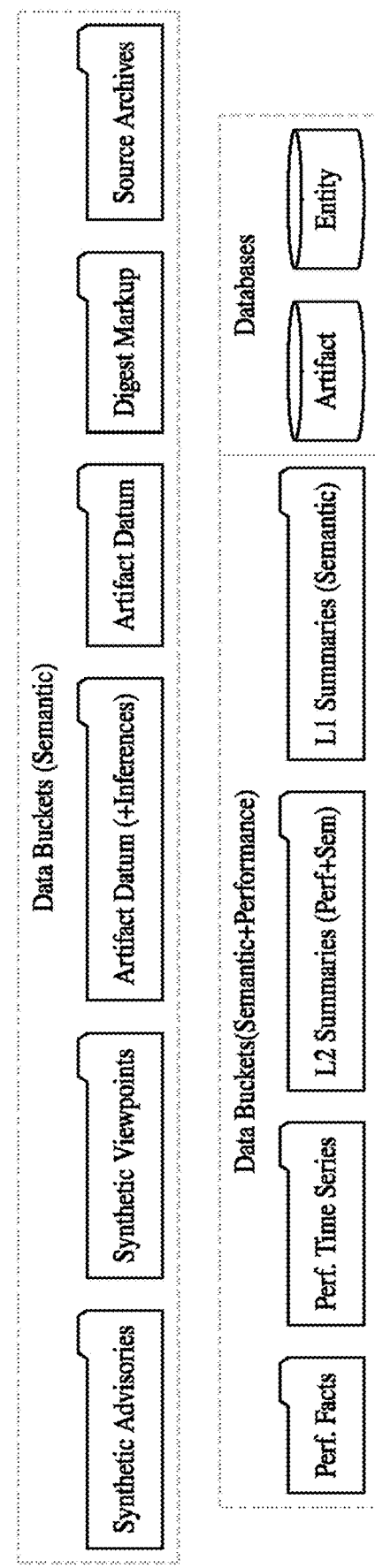
FIG. 3 illustrates the primary object stores and databases used in the typical operation of the static portion of the system in accordance with one embodiment.

In FIG. 3, an overview of the most important object stores and databases which might be used in one embodiment in the course of typical operation of the static portions of the system is displayed. Object stores may be conceptually segregated as primarily artifact related (semantic), or not primarily artifact-related (e.g. incorporating also performance data).

The system is designed to be agnostic to textual domain and not dependent on one ingestion source. In an embodiment related to equities analysis, however, the system allows browsing the MD&A sections of corporate annual and quarterly report filings from the SEC EDGAR database. In this case, an ingestor module specialized for equities analysis receives a message to check for updates to a specific CIK (Central Index Key) code. To attempt to harvest new reports, the ingestor frontend for equities analysis requests the CIK-specific metadata manifest via a web service request (e.g., as over HTTP) from the SEC EDGAR system. The metadata includes a listing of recent filings. Only accession numbers corresponding to filings neither found in the local disk-backed object cache tree of the ingestor nor registered as processed in the system's processing pipeline control metadata database may be considered. Further constraints on report or filing date, or adjusting the type (10-Q or 10-K) of filing requested may be applied. As an alternative to directly using the "primary document" registered in the metadata as comprising the XBRL-compliant submission to the SEC, the system focuses on requesting from the SEC the text-based transmission record and reconstructs a compressed archive by applying regular expressions to recognize and remove file subrecord headers and uudecodes file payloads, if they are found to be so encoded.

While the archive is being written in memory, the ingestor adds the original outer SEC data control header and form metadata (e.g. filing url, primary document filename, filing and submission date, and form type, but also EIN, tickers, exchanges, and the common entity name) to the mix of XML, document, web page, script, and image or graphics files typical to a EDGAR submission. When the ingestor is in a local caching mode, a hierarchical filesystem holds a codex file listing the CIKs held in the cache and each CIK directory holds updated metadata files listing EDGAR's information about the entity and the form metadata for each retrieved filing outside of the archives for inexpensive querying. When the ingestor is in a cloud storage mode, the submission archive files and the entity and manifest metadata may be written to remote object storage (such as Amazon S3), and processing metadata concerning, inter alia, the ingestor node software version, beginning processing time, ending processing time, and any encountered errors may be written to the remote processing metadata control database (e.g. such as might be implemented in a NoSQL database like Amazon DynamoDB). This multiple-cache scheme addresses the design goal of facilitating avoiding ingestor instances making wasteful duplicate queries to the upstream data provider (i.e. in this embodiment, the SEC) while also minimizing expensive reads of metadata from cloud object storage where practical, and allowing object-tree and database metadata to simultaneously exist for redundancy; the archive files themselves (relegated away from nearline storage so as to permit the storage of reconstructive, minimally-altered source data on inexpensive infrequently read backup technologies) can reconstruct the entire filing prior to any substantive processing in the event that the EDGAR system becomes unavailable, is discontinued, or deletes historical data.

The above description of specific design elements related to an embodiment for equities analysis should not be construed as necessary design elements for the system at large; an ingestor module in the system described generically functions to perform the task of deduplicated change data capture and mass historical data requests in conjunction with a backing local object tree cache, remote object storage, and an artifact metadata database with specific retained types or classes of metadata and restrictions as appropriate for the domain and the upstream data source.

Figure 4:
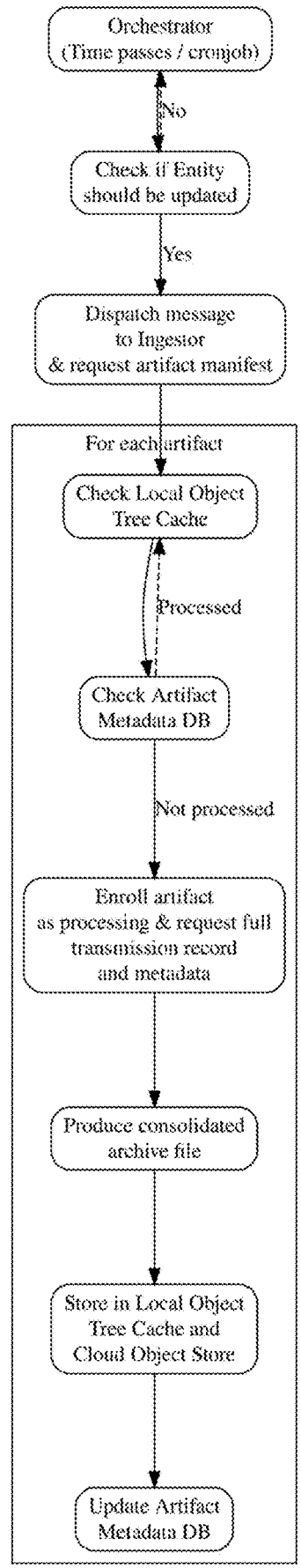
FIG. 4 is a flowchart of high-level document artifact ingestor logic in accordance with one embodiment related to equities analysis.

In FIG. 4, a flowchart of the high-level logic which might be used in one embodiment related to equities analysis of the ingestor module is shown.

In an embodiment involving web markup (e.g. HTML, XML, SVG) such as the equities analysis case, the ingestor module for text may be followed by a digester module which extracts, classifies, and sequences markup from specific sections in the document using a mixture of explicit document structure (where it exists), heuristics, and machine learning. The digester module retrieves metadata from the ingestor module's compressed archive file output and holds it in memory to be inserted in special control markup tags with deterministically assigned names at the beginning or end of the document. The mixture of deterministic, heuristic, and learned preprocessing applied to this step varies with the characteristics of the section being targeted for extraction and the quality of the upstream data generation not within the control of this system. In one embodiment for equities analysis pertaining to the processing of MD&A sections, the digester first assesses one or more fuzzy-logic edit distances (e.g. proportion of character string match, Levenshtein) against a list of cognizable plaintext fragments of standardized section headings in a 10-Q or 10-K filing (e.g. DISCUSSION AND ANALYSIS OF FINANCIAL CONDITION, Quantitative and Qualitative Disclosure, Financial Statement and Supplementary Data, CONTROLS AND PROCEDURES).

An XML parser such as lxml, or a more lenient parser such as html5lib, may be used to attempt to structure the markup. The XML element tree produced by the parser may be traversed and tags subjected to the fuzzy matching procedure on their inner text content to attempt to discover the location of the MD&A's start and end. For example, if a high-confidence match arises with the DISCUSSION AND ANALYSIS fragment in the region of the document typically associated with the Table of Contents of the filing, this may be hypothesized to explicitly be the beginning of the section in the ToC. The system can then attempt to look for an href attribute constituting a suspicious link directly to the potentially unlabeled element which logically commences the section content. In the case of finding suspicious links comprising the beginning of the MD&A and the contextually-appropriate succeeding section, sentinel tags which could survive serializing the tree and reparsing it can be injected into the element tree at the terminating positions. In the case of not being able to identify a valid successor section, a fallback sentinel can be inserted to subject the end of the candidate region to additional scrutiny. In the heuristic or fallback case, mentions of the MD&A and adjoining sections or sentinel markup absent the discovery of a link can be fuzzily matched against and the pairs of matches can be compared, by minimizing one of several heuristic objective functions, e.g. using comparison of the fractional distance through the document to the proportional fractional distance through the document ToC scoring.

Whether an authoritative or approximate match was found, the digester (e.g. for MD&As) can be configured to remove or flag-to-conceal graphics, tables, and XBRL data unsuitable for textual analysis as well as browser-executable script code undesirable to be preserved for browser redisplay, and pure display elements can have their attributes altered to durably mark them as potentially sacrificial. At the end of the digestion process, this markup can be wrapped in a newly-generated envelope, archive metadata tags for ingestion data lineage can be added, and the tags may be assigned internal digestion sequence numbers which also persist in the preserved markup. Where the deterministic and heuristic processes fail to localize MD&A data, an error-handling cascade of progressively more powerful and resource-intensive transformer type neural network language models designed for general language tasks but fine-tuned on markup (e.g. BERT, the GPT family) or specifically for markup (e.g. the MarkupLM architecture, which uses HTML/XML markup, XPath, and text content features simultaneously) can be employed to classify the text to better localize the desired section.

Since the quality of the markup generated by an uncontrollable ecosystem of report and document generators varies wildly by software provider and over history (e.g. for EDGAR filings, spurious fractionation of text spans to communicate numbers, dates and dollar amounts is often employed despite the non-presence of relevant XBRL fact data), the digestor phase of the system also employs these neural networks with an end-segment fine-tuned to discriminate structural remediations to tags (e.g. the trained neural networks with the remediation stages may classify the tag as requiring no remediation, recommending to be lysed and merged with a sibling tag, lysed and merged with a parent tag, reconsidered as visual, reconsidered as content, or reconsidered as front matter). The system may be designed to employ these remediations at the end of digestion, post any localization and subsetting and reapportion sequence numbers following reparsing but could potentially be employed earlier as a last resort if the localization process failed entirely. In general, while the digester can produce raw text output, its design may be intended to preserve as much of the non-visual logical HTML/XML markup as practical, since the interactive system was designed to be compatible in theory with web pages dynamically retrieved by the user via AJAX/XMLHttpRequest/fetch or other related browser APIs.

Figure 5:
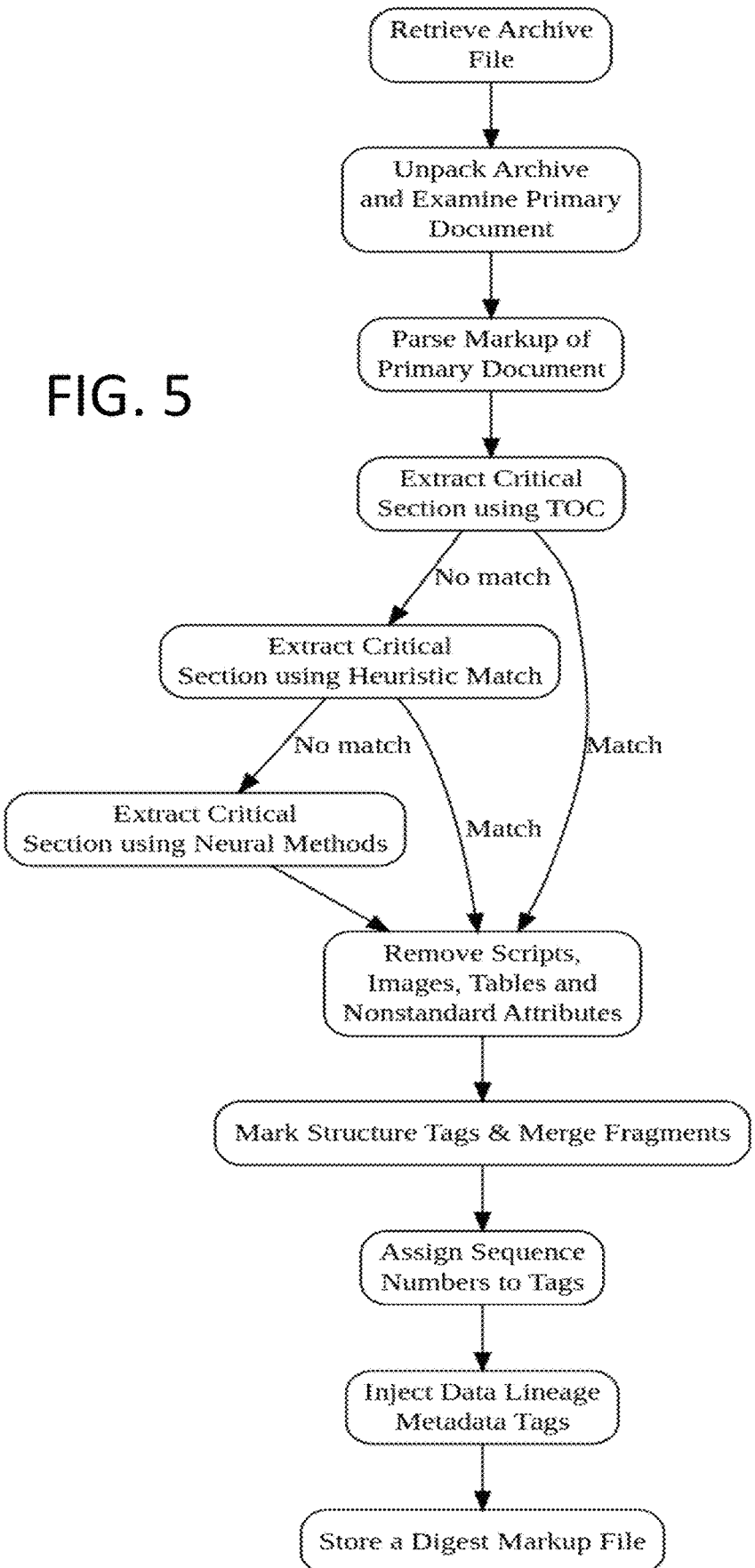
FIG. 5 is a flowchart of high-level document artifact digester logic in accordance with one embodiment related to equities analysis.

In FIG. 5, a flowchart of the high-level logic which might be used in one embodiment related to equities analysis of the digester module is shown.

The interactive system is designed to be maximally agnostic of ingestion frontend and domain of textual analysis; overall it is not itself specialized for, e.g. equities analysis via filings. To optimize for cost of delivery, and thereby attain economic advantage over competitors, the system sacrifices the flexibility of ad hoc queries to reduce the amount of backend computation an end user can trigger through their use of the system; for this reason, the system uses a hierarchical sequence of hierarchical data files (e.g. JSON format data files) which either envelop the data with metadata of data lineage and structure or summarize the salient results gained at finer levels of the application, instead of employing a graph or relational database, which would provide facility for user or administrator queries at sustained cost to the enterprise.

The amasser module builds the departmented (i.e. segmented by class of analysis or facility, and designed for extraction and update following recomputation) textual artifact representation used by the document viewer and annotator module available to the end-user. This non-database, hierarchical, serialized representation (potentially delivered via the JSON encoding for flexible-schema hierarchical files) may be designed to be rewritten with extra data involving computations done at a premium or corrections made to a specific processing step, without recomputing the document through the pipeline or requiring links for indirection, e.g. links in the fashion of HATEOAS which direct the viewer module in the browser to contact a different remote source for data which has not been precomputed for the particular artifact. Nonexhaustively, this departmented representation includes: digested markup; the raw text produced by parsing the markup; metadata germane to the domain of textual analysis and the related data sources; metadata germane to the caliber and version of the processing elements brought to bear on the document; metadata concerning processing and accession dates of the textual artifact; metadata concerning automated readability or other complexity scores computed for the document; parity data used to certify reconstruction of markup following destructive transformations that may occur during the introduction of highlighting elements; human annotation and machine inference records which include their own metadata about annotator identity, annotation time, semantic channel set identification, semantic event tag lists, deletion history, semantic channel polarity related to e.g. rhetorical convincingness, and annotation subrecords which link the ephemeral "physical" representations in the element tree in memory of the viewing module to the logical representations in the annotation and inference record metadata.

This elaborated annotation record structure may be necessary since persisting interactively applied highlights to text in web browsers through the standard browser Web APIs via span indices may not be robust to intersecting spans, span deletion, the insertion of nuisance markup, or human errors made in the accounting of index disruptions all over the document due to the application-layer insertions of multiple spans. This durable span linkage data based upon element attribute mutation with GUID-style annotation identifications can be relied upon when it is generated by a human annotation made with a mouse and applied on a lazy or deferred basis from machine annotations when an inferenced document lacking automatically instantiated annotation events is first loaded by the viewer module. The departmented representation also includes structured records concerning each discovered "sentence" in the text content extractable at will from the enclosed markup, which may be more robustly (cf. merely looking for punctuation tokens) estimated via a deterministic process (e.g. a dependency parser which uses a shift-reduce tree-based "transition system" and a backup data-driven dependency parser for more complex non-projective (i.e. parse tree planarity violating) long-distance dependency parses), or a resource-intensive, transformer-type neural network to effect a sentence boundary token inserting learnable mutation of the input stream.

Sentence records in the artifact datum include: the sentence text; an optionally present sentiment-augmented constituency parse in S-expression form; and a "html backtrace" record that may be a structure with an array of text content string spans and a list of tuples of subspan character indices and a list of tag identifications the length of the number of tuples in the list corresponding to the sequence numbers earlier assigned by the digester, or for an undigested plain textual artifact, sequentially-assigned numbers inferred more casually from document structure, e.g. apparent paragraph breaks.

Figure 6A:
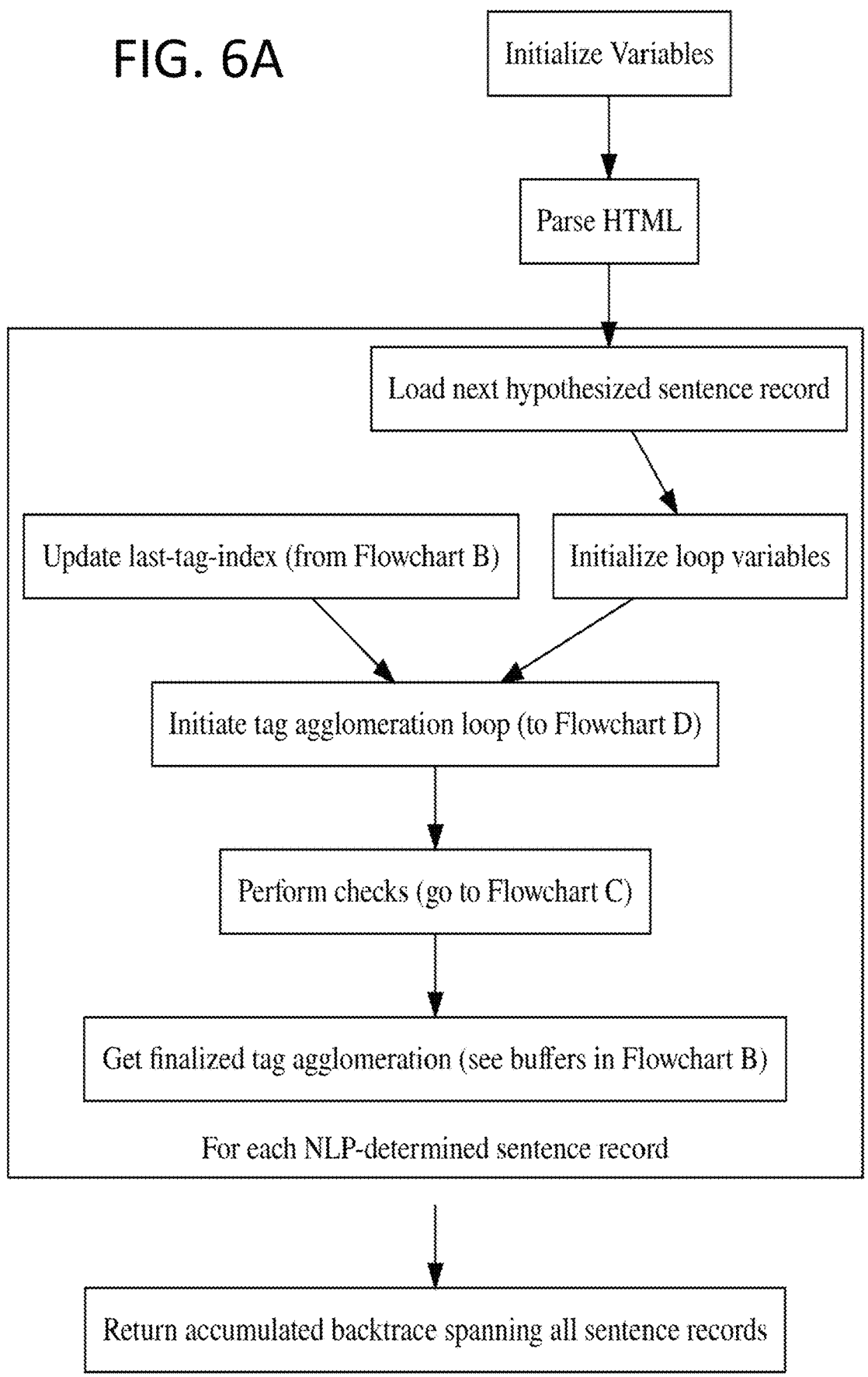
FIG. 6A describes the general algorithmic strategy invented for use in this system to construct the backtrace representation focusing on the main logic for determining, but not committing (FIG. 6B) or detecting issues with (FIG. 6C), the backtrace in accordance with one embodiment. A detailed tag agglomeration loop central to the strategy is depicted in FIG. 6D.
Figure 6B:
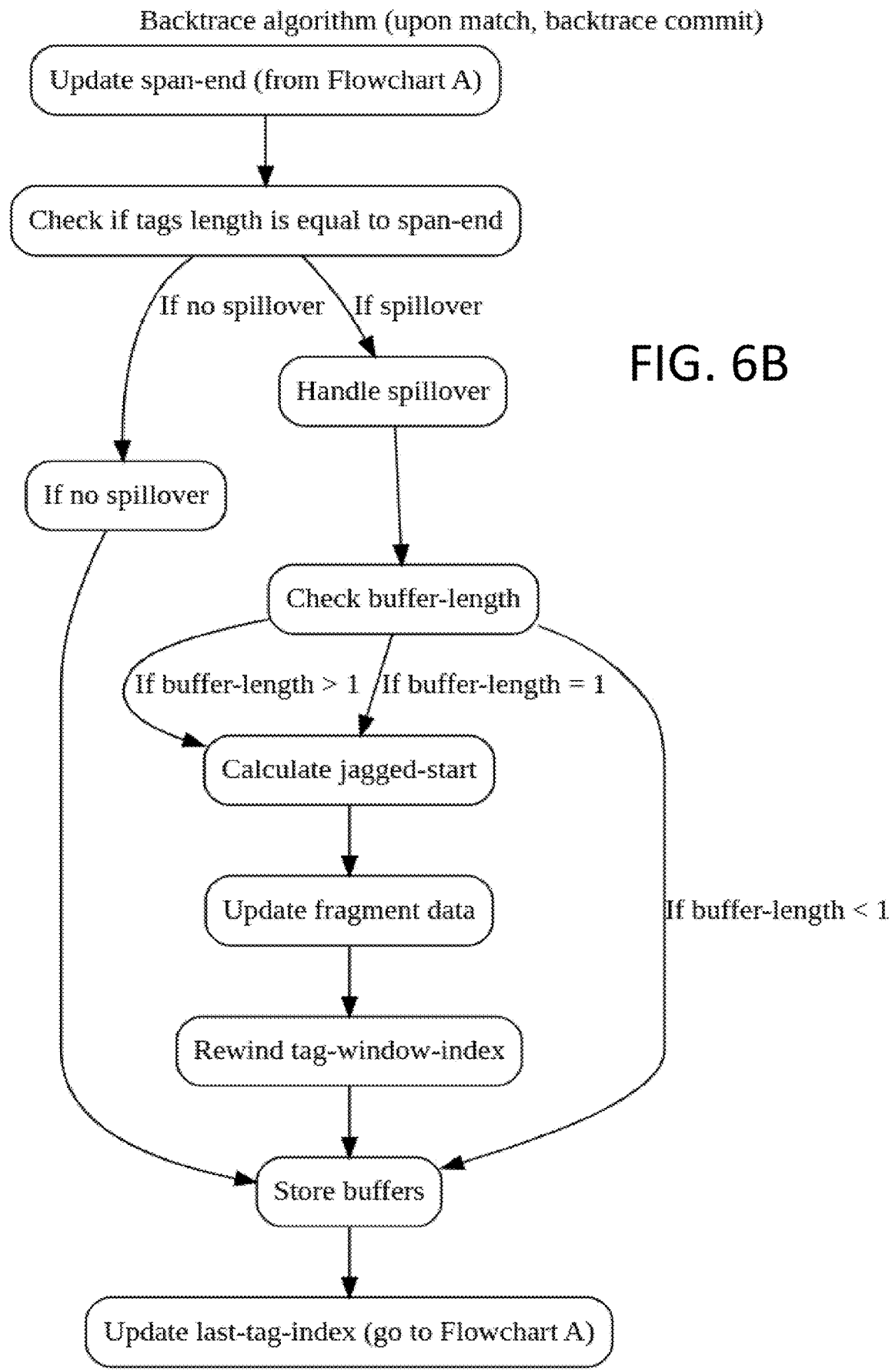
FIG. 6B describes the general algorithmic strategy invented for use in this system to construct the backtrace focusing on the logic upon finding a match, as arrived at in the main loop in FIG. 6A.
Figure 6C:
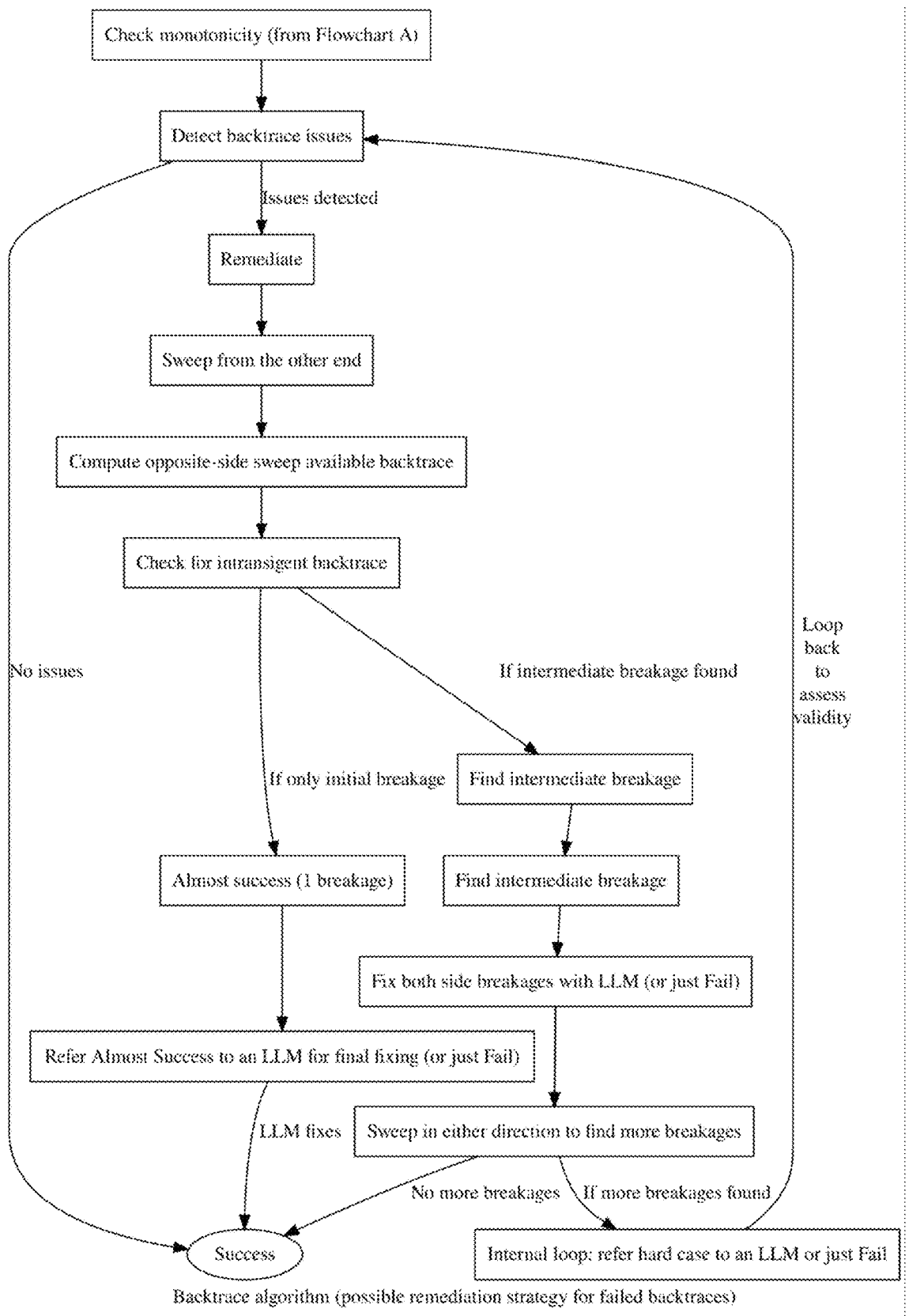
FIG. 6C describes the general algorithmic strategy invented for use in this system to construct the backtrace, focusing on attempting to remediate broken backtrace data encountered after the termination of the main loop in FIG. 6A.
Figure 6D:
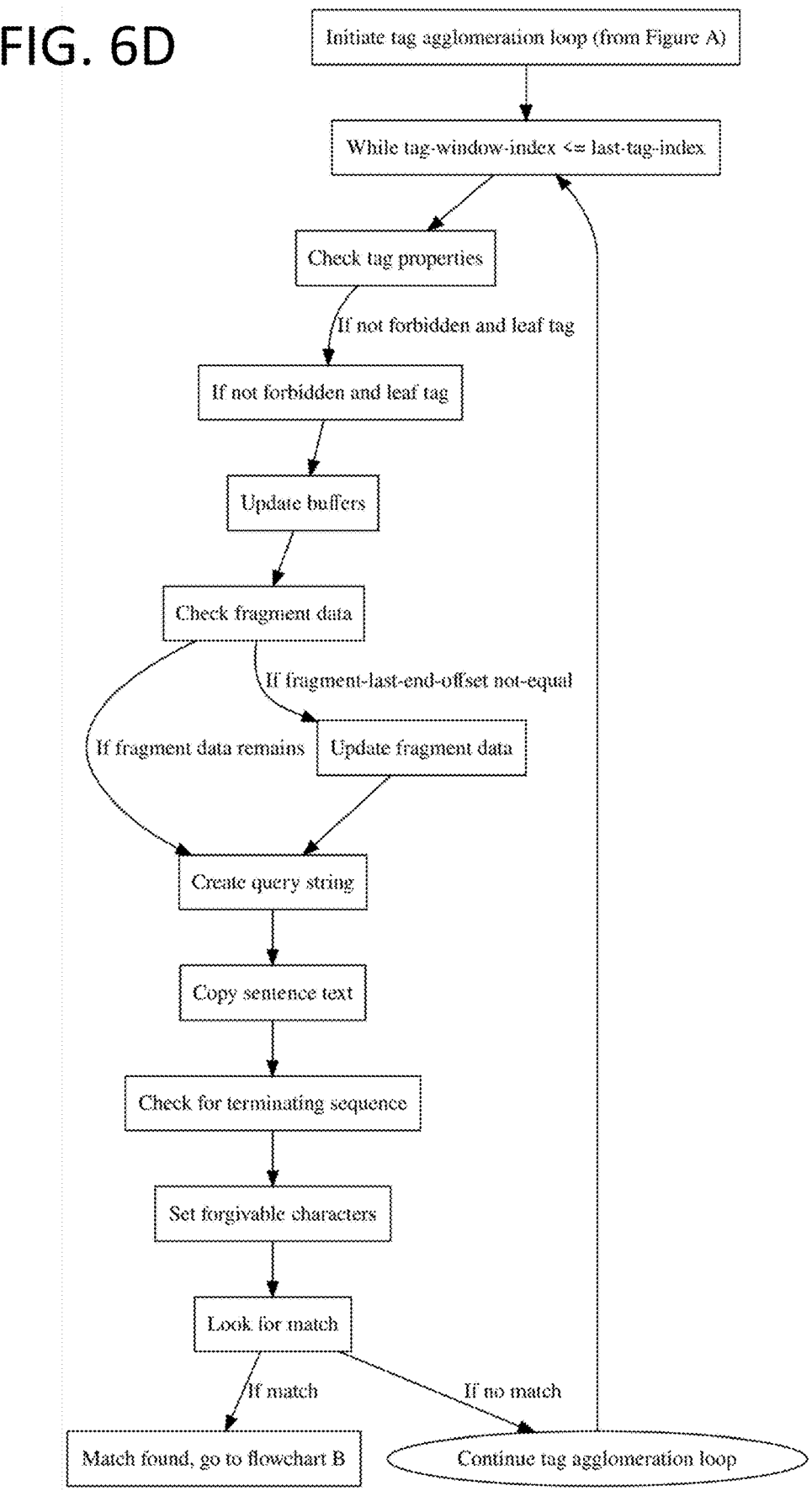
FIG. 6D describes the detailed tag agglomeration loop which is a central operation to the backtrace construction procedure entered into in FIG. 6A, showing that this loop leverages heuristic fuzzy matching methods that attempts to attribute characters in logical constituency units such as sentences across fragments and whole HTML tags, wherein the considered tags for accumulation have been considered eligible.

In FIG. 6A, a flowchart is shown describing the general algorithmic strategy associated with one embodiment of the backtrace determination subroutine, focusing on the portions of the subroutine relating to the primary logic for determining the backtrace, but referring to FIG. 6B and FIG. 6C for the portions of the subroutine which relate to committing the backtrace or detecting issues with the backtrace, respectively.

In FIG. 6B, a flowchart is shown describing the general algorithmic strategy associated with committing the backtrace to a record form once a match (e.g. via fuzzy regular expressions) has been found (as in FIG. 6A). Upon completion, this flowchart reenters the logic of FIG. 6A at the next main loop iteration during a search for subsequent matches.

In FIG. 6C, a flowchart is shown describing the general algorithmic strategy associated with one embodiment of a portion of the backtrace determination algorithm relating to attempted remediation of broken (i.e. logically interrupted) backtrace data. The flowchart continues from the loop termination segment referenced in FIG. 6A.

Backtraces may be computed by the departmented file amasser using a heuristic character-incremental accumulation scheme that uses the target text content to attempt to assign text content bidirectionally to character indices in specific markup tags aggressively but with resort to backtracking if spillover or document exhaustion is prematurely detected. Because the realities of dealing with web markup involve messy insertions of substitute or non-printable characters, the "greedy-with-backtracking" accumulation algorithm of the "backtrace" additionally employs fuzzy regex capabilities to allow a certain amount of slop (e.g. 10 forgivable characters in a localized area) in matching hypothesized fragments of content text, and in the case of a failure to produce a backtrace sweeps back and forth in multiple passes from the beginning and the end of the document to minimize the functional impact of a problematic single failed backtrace assignment. This may be done because computing with a single pass in the presence of such a failure would prove catastrophic for determining the subsequent portions of the reliable backtrace needed by many elements of the viewer's highlighting and internal reference linkage system for applying annotations, undoing annotations, and jumping visually to annotations, or computing statistical measurements of the interaction of overlap of annotations with markup structure or adjoining lexical element (e.g. sentence, prepositional phrase, etc.) structure used in multiple interactive and data quality check functions of the viewer.

The sentiment-augmented constituency parse of each "sentence" can be provided by a pool of language processing virtual or physical nodes in a distributed system of computers offering constituency parsing via, e.g. a perceptron-augmented beam-search-based "greedy" shift-reduce parser or a dynamic programming PCFG (probabilistic context free grammar) dynamic programming parser combined with the sentiment treebank tree-recursive neural network (TreeRNN) for imputing parse-node level sentiment labels at each level of the phrase structure tree via learning the optimal "composition" function shared across parse tree nodes, learned over manual sentiment treebank labelings at the parse-node level, and operating on tree-accumulated text embedding vectors ultimately based upon the leaf-node distributionally-learned vectors computed via neural word embedding models.

An additional feature of the "sentence" records in the textual artifact datum is the potential inclusion of named entity records (e.g. tuples of, e.g. noun phrases believed to correspond to salient named entities in the dependency structure of the sentence, and belonging to well-known categories like organizations, products, landmarks, persons, works of art, cardinal or ordinal numbers, money amounts, nationalities or religious or political groups, or geographical or political entities). Named entity recognition suitable for computing these representations could be provided by tree search and keyword search on a dependency parse of the sentence but may be more effectively computed using a more flexible transformer (e.g. DistilBERT) and special span identification tokens in the nature of approaches to extractive question answering or a less semantically powerful and less resource-intensive convolutional neural network (CNN) implementing the tok2vec approach, which computes token embeddings with long-term dependency learnability crudely approximated by learned convolutional filters.

One of the benefits of the interactive system is that it, along with the representations it relies upon consuming, does not tightly couple with the backend provision of either the direct neural type (e.g. for rhetorical annotation) or traditional computational linguistics type (e.g. NER, SBD, constituency parse) natural language processing, and the departmented representation, as well as the processing metadata, allows selective reprocessing of files and summaries in a principled or link-deferrable fashion as more accurate or more cost-effective architectures and algorithms and vendor services become available to the service operator. Retaining the markup additionally permits the heuristically or neurally adjudicated-to-be purely-visual elements and their associated text content to remain intact and usable in the viewer, yet configurably partially processed by the various NLP operations.

In FIG. 7, example JSON data is displayed hierarchically which partially depicts a possible embodiment of the channel set definitions used throughout the application tiers for, e.g. coloring, tabulation, tagging, and inference purposes.

Figure 8:
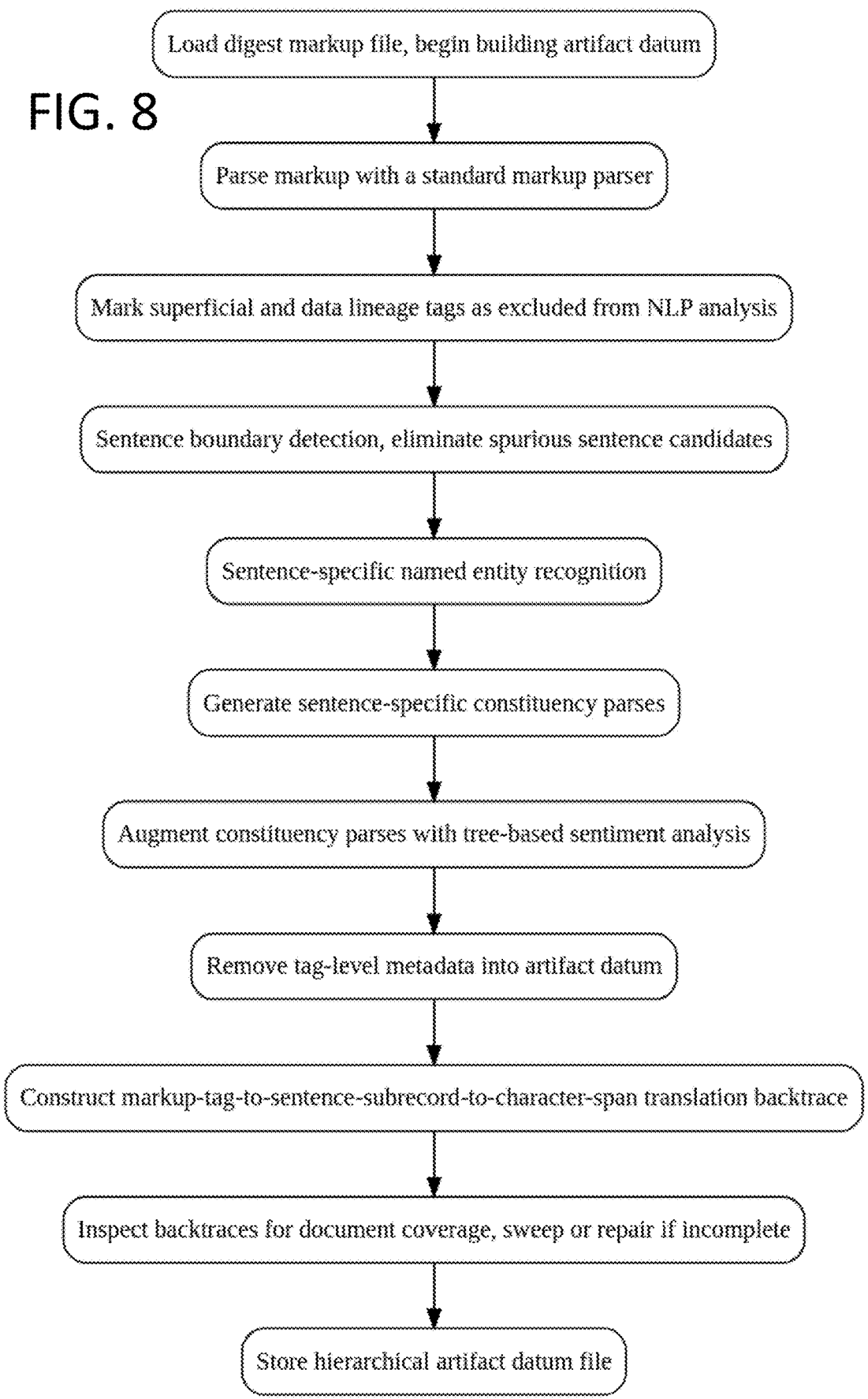
FIG. 8 is a high-level flowchart of document artifact datum file construction in the amasser module in accordance with one embodiment.

In FIG. 8, a flowchart of the high-level logic which might be used in the amasser module is shown.

In FIG. 9A, a schematic record view of an example sentence record (produced by the amasser and available to the viewer is shown.

In FIG. 9B, a schematic record view of an artifact datum is shown. The datum is departmented into subrecords which include machine and user annotation data, channel set definitions, data lineage and miscellaneous metadata, sentence-level records (as shown in FIG. 9A), and text.

Figure 10:
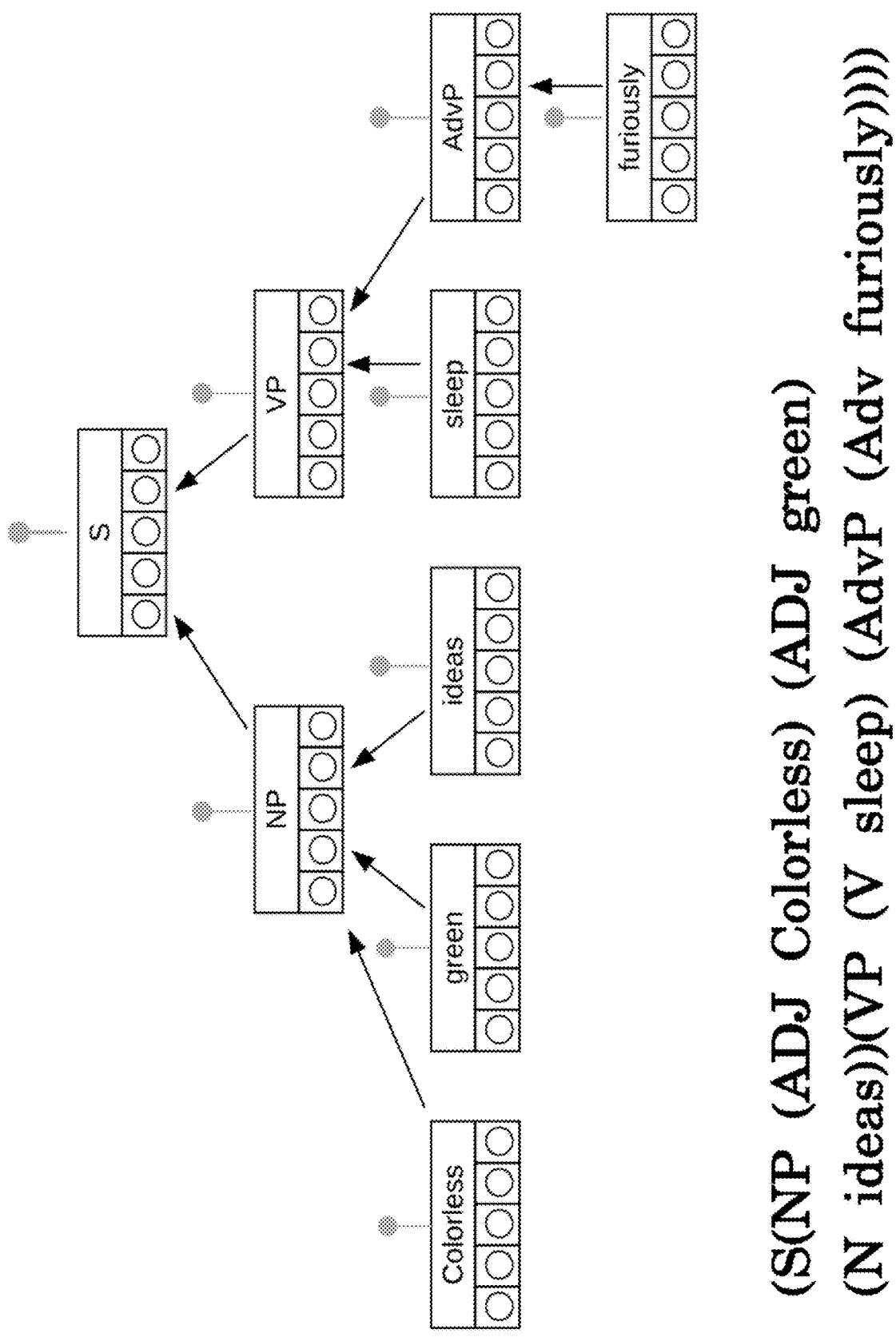
FIG. 10 illustrates a tree recursive neural network (TreeRNN), where all lexical units have neural network readouts and subsidiary lexical units combine vector embedding representations into parent node vector representations by the means of a learned neural semantic composition operation involving tied (i.e. widely-shared) weight parameters.

In FIG. 10, a diagram of a tree-recursive neural network is shown. The tree-recursive neural network may be used to compute the sentiment augmentation of the constituency parse for a sentence. In FIG. 10, an example sentence is shown as a Lisp-style S-expression, which can be augmented by appending sentiment labelings evaluated by the TreeRNN to the lexical unit atoms.

In FIG. 11, example data lineage metadata displayed in the metadata viewer tool of the viewer module is displayed. Data lineage metadata as might originate from the SEC EDGAR database in an embodiment related to equities analysis is shown along with miscellaneous data such as readability statistics and processing timestamps.

The viewer module may be comprised of a central scrollable, augmented document container comprising a viewing pane that displays text via the partially-preserved markup overlain with zero or more channel-conditional colored highlight spans which offer information about the annotation when clicked with a peripheral toolbox of buttons, leading to modal dialogs that primarily display interactive visualizations of various natural language transformations upon the document, as well as interactive exploration tools focal on semantic and lexical units including, but not limited to: sentence candidates; named entities; semantic channels (coarse); semantic tags (fine); sentence parse trees; sentence vector space representations; sentence relational-space force-directed graph representations; applied annotations; inferred machine annotations; hierarchical products of topic analysis (such as topic clusters, keywords, and keyword concordance data); cumulative counts of token, channel, tag mention; and sentence and document level estimates of sociopolitical response conditioned by sociopolitical viewpoint.

Additional tools in the toolbox may include: an embedded console interactive programming environment; a printable report generator; data lineage metadata explorer; and, in the equities analysis embodiment, an advisor pane offering LLM-generated sentences simulating the close analysis of a financial advisor; and buttons which use the markup-embedded ingestion data lineage metadata to generate a chronologically-annotated link to the original data source.

Figure 12A:
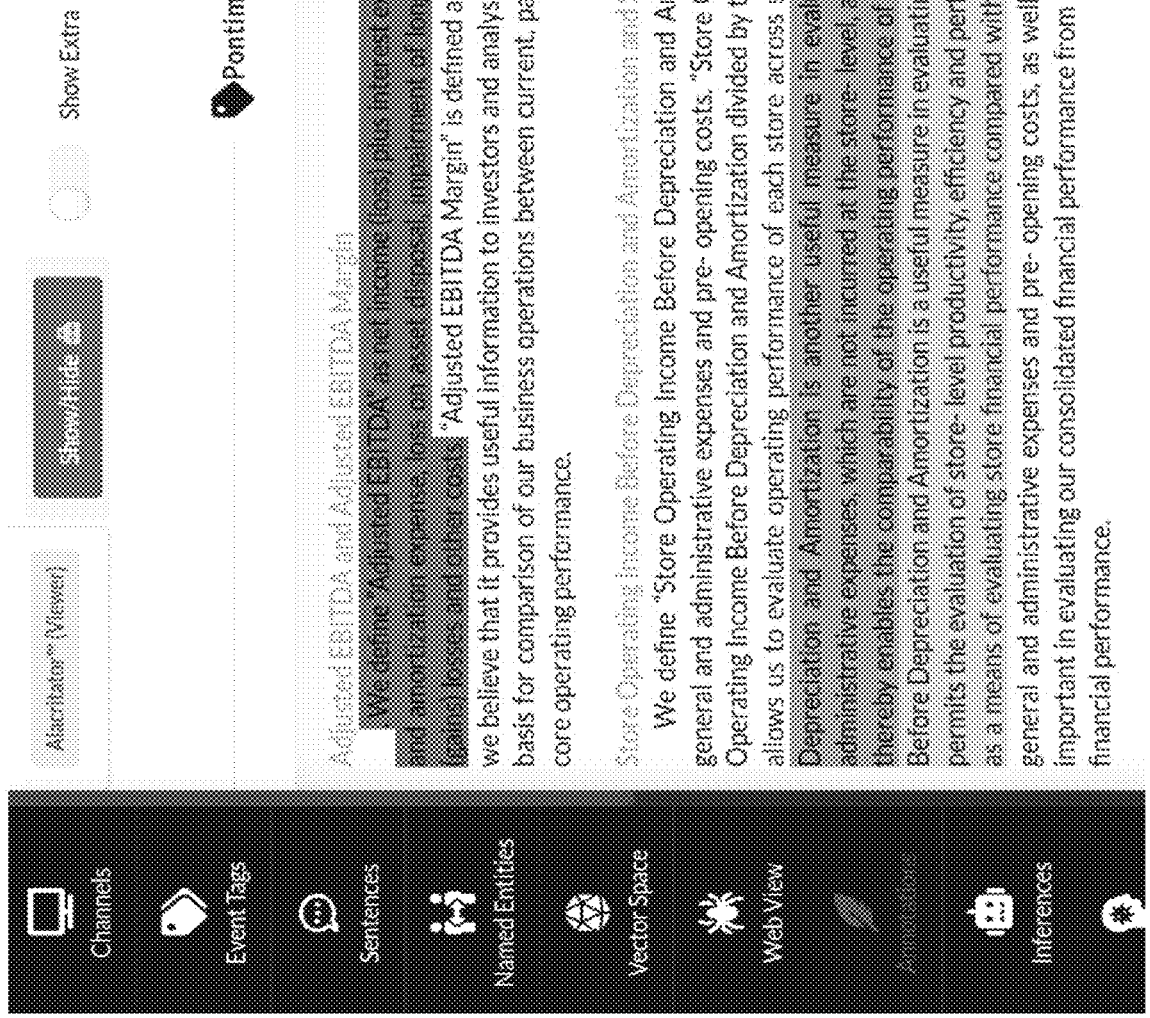
FIG. 12A illustrates a combined annotator-viewer application tier, in viewing mode including a toolbox, mostly consisting of NLP or computational linguistics interactive visualizations that operate on the document data in accordance with one embodiment.

FIG. 12A depicts the appearance of the combined annotator-viewer application tier, configured for viewing mode. A toolbox of visualization, browsing, and analysis tools is visible to the left side of the image.

Figure 12B:
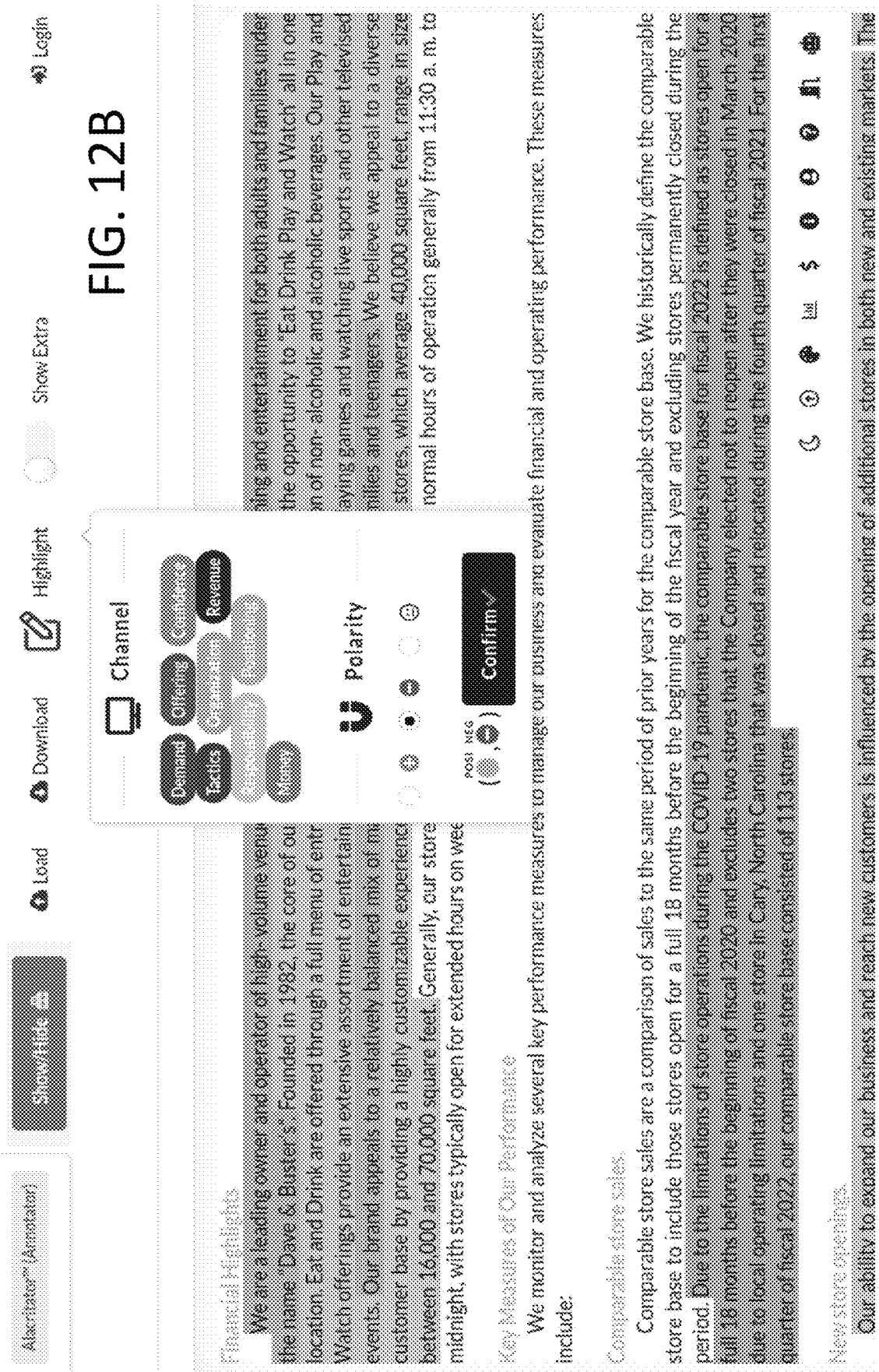
FIG. 12B illustrates a combined annotator-viewer tool, in annotation mode with a virtual highlighter selection and confirmation menu visible in accordance with one embodiment.

FIG. 12B depicts allowing the user to configure the channel of annotation and the polarity of annotation, with a channel set employed in an embodiment related to equities analysis. Once a user has highlighted an eligible text span in the document, they can confirm their highlight with the confirm button.

Existing highlighter records, as represented in the document viewer (but distinct from the logical records in the annotation datum in memory and storable within the departmented document file), may, in one embodiment, be clickable character spans styled in a manner that is meant to suggest the annotation of a physical paper document with colored highlighter markers-intersecting spans combine their color with the use of transparency as to suggest color mixing. In one embodiment, when clicked, the document viewer smoothly scrolls to the annotation site and produces a popup that lists the channel identification of the annotation, a truncated redisplay of the annotation text, and potentially a list of one or more tags associated with the annotation, as well as a graphical indicator of annotation polarity (e.g. a face with a flat facial expression in light blue for Neutral).

In annotation modes, the symbol can be interacted with to change the polarity; in one embodiment, the tag display turns into a search browser dropdown which allows the application or removal of relevant tags, and a means may be provided to remove (i.e. delete) the graphical and logical aspects of the annotation from the viewer and the datum, respectively. As previously stated, the markup may be optionally largely preserved during the digestion of the original ingested document source. Markup may be simplified dynamically in the viewer, so as to increase the document to a readable and standard font size or, e.g. to display the retained markup elements deemed purely visual or semantically superficial (and perhaps unprocessed by NLP operations and not annotatable) at a lower opacity.

When the viewer is in the annotation mode, facilities for loading and saving the document from disk or local storage, or retrieving it from a content delivery network or cloud object store, may be available. Additionally, the user can interactively plan their annotation by opening a menu to select the channel of highlight/annotation and the polarity; the user may, in one embodiment, be freely able to reselect the channel from the available channels defined as part of one or more logical channel sets (in an equities analysis embodiment, e.g. Red denotes Demand, Green denotes Money, Yellow denotes Responsibility according to a channel-set designed through metaplanning to model how rhetorical spin affects firm momentum) and the polarity, configuring the active virtual highlighter. With a virtual highlighter configured, the user can click and drag directly on the textual document markup in the central viewing region to make a contiguous character span selection and click a button to confirm their selection of the annotation, creating the logical annotation span subrecords, logical annotation records, and the visual interactive representation of the annotation upon the document.

Figure 13:
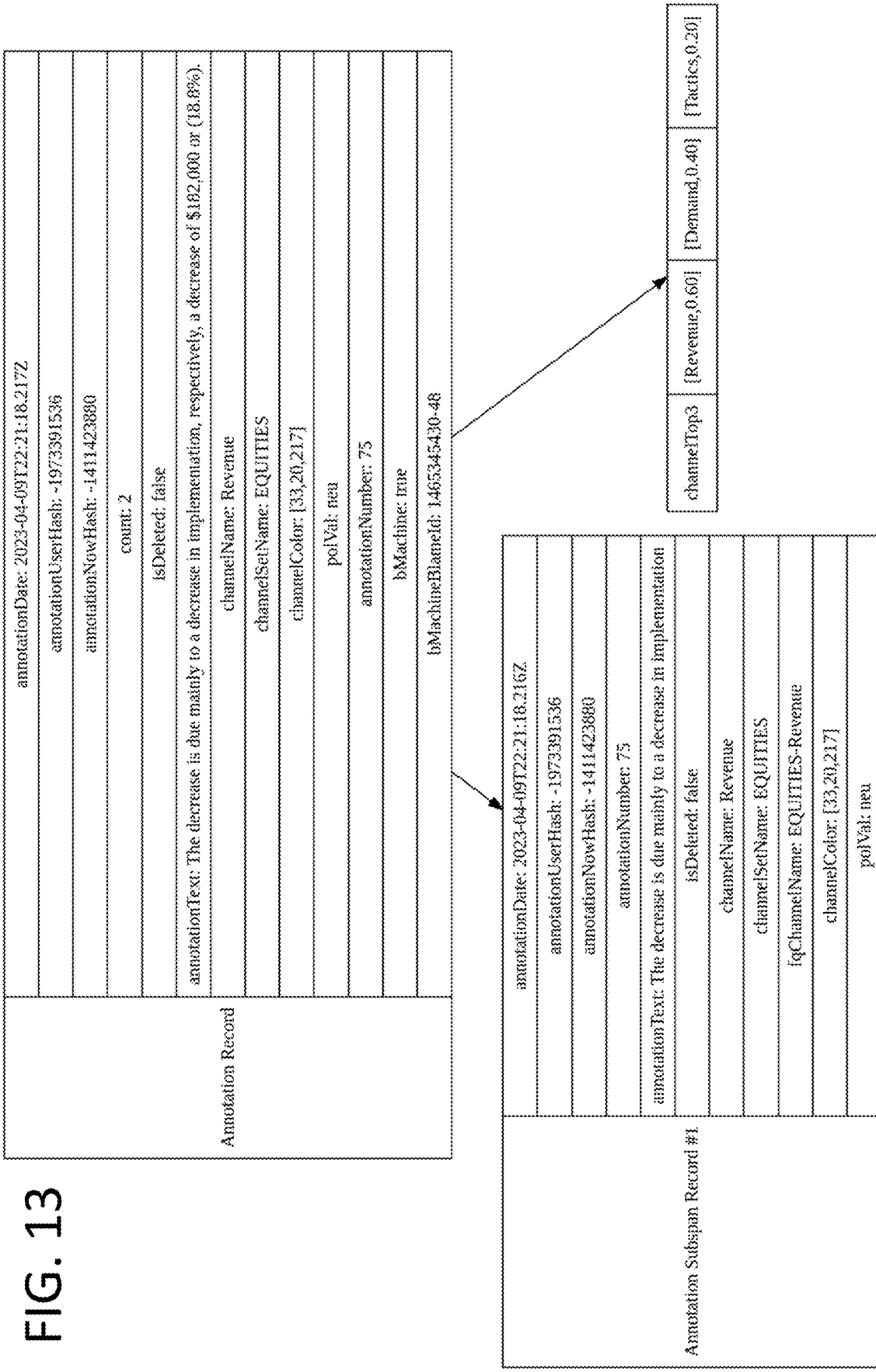
FIG. 13 is a record schematic view of an example single annotation datum (a machine inference, and so containing inference related metadata) consisting of 2 markup subspans and so containing 2 corresponding logical subspan records in accordance with one embodiment, with only one of the subspan records depicted.

FIG. 13 depicts a schematic record view of an example annotation datum. The example datum is a machine inference as opposed to a human annotation and thus includes metadata related to identifying the machine and the uncertainty of the identification.

A highlighting scheme that can conform to all of our requirements for highlights, such as those straddling markup tags and occasionally causing naive fiducial points such as character indices or sibling or parent tag distance to become invalidated by tag envelopment or tag scission, turns out to be highly non-trivial to implement with the APIs currently available for traversal and navigation into the dynamically alterable web element tree under the Document Object Model (DOM). Difficulty arises because the ephemeral user selection highlighting mechanism typically implemented in browsers (e.g. when using Ctrl-F) exists in a pseudoelemental form outside of the DOM, and is able to apply highlights to the rendered browser frame without destructively altering the markup or, through an alternative tactic, perversely applying transparent SVG or styled HTML elements over the text and updating the highlighting shape absolute positions to track character rendering bounding boxes reported by the Web APIs.

The viewer can be equipped with several highlighting schemes which can attempt to make highlights, but the best performing of the best-effort deterministic (i.e. without resorting to machine learning methods in the viewer) highlighting application schemes upon direct markup encountered can be sketched as follows: at the top level, the highlight div element which holds the overarching data concerning and giving rise to the highlight may be composed by considering entries in a record list of selection union index data. For each selection union index record, annotation subspan markup may be applied to the overall markup by a routine which uses text offsets in the record to serially write the prelude (annotation subspan tag start fragment), the preserved intermediate markup, and the postscript (annotation subspan tag end fragment). Determining these offsets involves significant, non-obvious problem substructure.

Figure 14A:
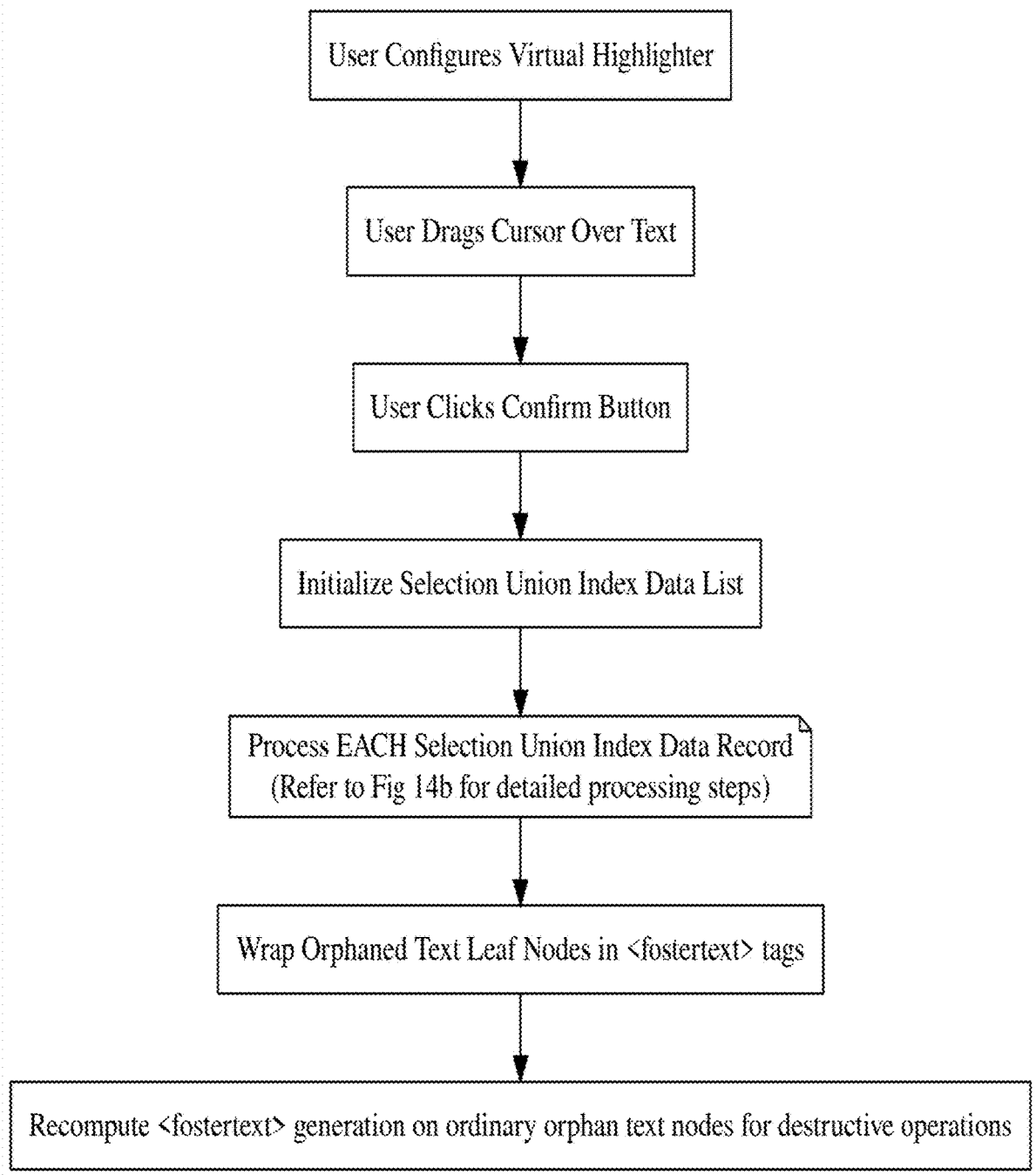
FIG. 14A is a flowchart of the higher-level, outer steps in the suggested markup-based highlight application algorithm, which attempts to stitch new markup affected by the highlight together via prelude and postlude insertion of text with offsets calculated by examining the tag structure of desirable selected text vs. the text of undesirable tags in accordance with one embodiment.
Figure 14B:
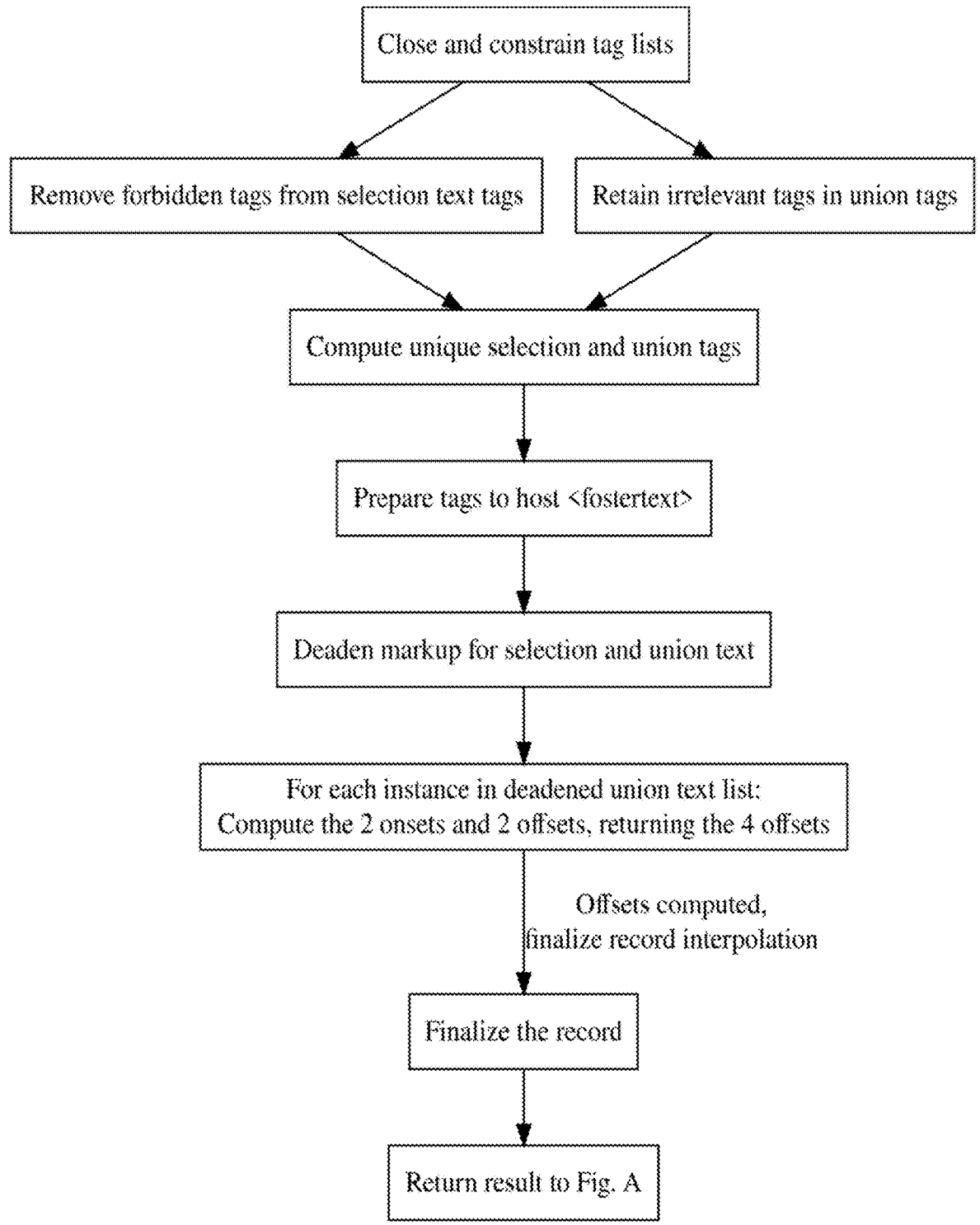
FIG. 14B is a flowchart of the lower-level, detailed processing steps in the suggested markup-based highlight application algorithm, emphasizing the operations of eligible tag fragment calculation and accumulation combining the operations of "HTML deadening" for accurate offset calculation in the presence of inconsistently accounted characters and <fostertext>html element synthesis over content in orphaned sub-element HTML text nodes for efficient management of markup span recalculation as particularly required in applications involving interpenetrating annotation spans.

In FIG. 14, a flowchart is shown detailing the high-level logic of the markup-based highlight application algorithm suggested in one embodiment, including steps such as selection text determination, performing the described procedure of "html deadening", HTML element-level management of text vs. HTML node-level management of text to handle limitations in the textContent browser Web APIs, and the prelude and postlude insertion of text using calculated offsets.

To create the subspan offset record list, selection text versus union text may be computed. "Union text" is taken to mean all text content which is not necessarily actually to be highlighted, such as when we do not want a highlighter to be able to apply styling across a non-printable character, title header, or forbidden document area. To determine these offset fragments, all tags involved in the selection may be taken, with a search through all tags constrained for selection text to return the array of the child nodes of the cloned user selection range if the logical range's start container is the same as its end container, and otherwise to traverse through these containers filtering out copies of these child tags if they are subelement leaf text nodes, or if the tag clone children contain forbidden attributes marking the tag as detected by the digester, amasser, or viewer as forbidden to highlight or consider in mainline NLP processing. Also, all the tags which do not meet these constraints may be additionally taken into alternative consideration for the list of union tags.

Then, the lists of references to nodes may be copied to consider the versions of the lists which exclude parents: all pairs of nodes in the node collection may be checked for a parental relationship—the child or contained nodes may be spared in this consideration of the unique selection tags and the unique union tags. The selection tags under secondary consideration (the parentally-decimated selection tags) may then be set to be transformed such that leaf text nodes are destroyed and their text contents wrapped in a novel html element type "<fostertext>" which may be used to reliably encapsulate text content orphaned by the intercession of newly applied annotation spans and their subspans, or awaiting consolidation when annotations are removed. The selection and union texts may be derived by calling a method called getTextContentAlternate, as unfortunately browsers do not report the literal text content viewable on screen with consistent character offsets and lengths to the markup representations owing to the character encoding process.

A novel approach to implement this method may be used to discover reliable offsets of text content by "deadening" the html markup. Deadening markup occurs by using regular expressions to discover the angle tag subspans of tags (e.g. "<div id=" doomedSpan ">") without regard to hierarchical level of embedding. All matches may be replaced with an otherwise illegal sentinel character (e.g. ">") the length of the match content. Then this parsing boundary sentinel character may be replaced with no character wherever it occurs in the concatenated deadened markup. With the alternative purified, deadened markup-generated text computed for the parentally-bereft lists of union and selection tags, and the union and selection innerHTML easily made available, the last major representation to create may be the deadened union markup (rather than the text) list.

For each instance in the deadened purified union text list, an onset, an offset, and a "deadened onset" and "deadened offset" may be computed. To compute the onset, the selectionText for an instance may be searched for (e.g. using a matching function like indexOf) in the corresponding unionText. To compute the offset, the onset may be added to the length of the selection text. Computing the "deadened onset" and "deadened offset" involve computing a character measurement on a string which traverses the string to consider the number of valid indices (non-sentinel characters) and total indices (any characters), terminating the search and returning the total index where the valid index accumulated is equal to the censored index passed into the measurement. The "deadened onset" uses the onset to determine the censored index, and the "deadened offset" uses the offset; both consider as the string to be measured, the union deadened markup record. The indices that are used for tag splicing at the top level and returned as union text vs. selection text internal and external offsets may be the onset, the offset, the "deadened onset" plus one character, and the "deadened offset" plus one character.

The <fostertext>elements and the mark annotation span elements inserted into the DOM should be able to be removed recursively to recover original markup, however, the problem of orphaned fostertext elements may be considered, and fostertext should manage all text leaf node content so that it can be treated with the same processing attention of a full-fledged html element. To do this, after any destructive operation such as that which may occur with the user addition or destruction of an annotation, the document or a relevant portion deemed to be affected by the operation may be traversed to find all unmanaged text nodes and wrap them in fostertext elements. Text nodes found in navigational elements inserted, e.g. by the UI framework to implement an inline popup, into the document content have to be excluded as candidates for management via fostertext.

While this method may be convoluted and probably not optimal, it was experimentally shown to be the best at meeting design requirements for annotations: being simultaneously and overlappably made directly on markup with the power of designating annotation-illegal restriction subspans from implicated elements while having the annotations generally work across bona fide format boundaries, most imposed restriction boundaries, and most interleaved or directly adjoining self-inflicted annotation subspan boundaries, and also permitting easy DOM-based selector access for statistical calculations elsewhere in the peripheral tools of the viewer while simultaneously providing a durable reference medium that did not trigger the confusing hierarchy and operation-order aware recalculation of various sets of translation indices (such as, notably, the backtrace indices in the sentences data) and subspan indices.

Pure naive index-based schemes or strict recursive subdivision schemes (unworkable for contained or partially contained annotations, and requiring all inner annotations to be made prior to outer annotations) proved insufficient for approximating performance at this task, but the system described need not be limited to using the precise algorithmic scheme described at length to furnish the system's functional interactive capabilities concerning markup-mutational highlighting to the user.

In this way, a user such as a subject matter expert in an annotation role can, without substantial technical sophistication, select coarse semantic channel identifications and polarities, find the areas (potentially sub or supersentential, or across multiple underlying markup tags, in turn potentially punctuated by highlightable or non-highlightable markup tags potentially possessing visible but non-operative text, or intersecting a previous highlight in space and character extent) that they believe to possess those channels and polarities in a first pass, and in a second-pass action interact with the highlight detail viewer to assign fine annotations in the form of semantic event tags which are conditioned upon the channel identification, and which may have their own polarity that could either agree, disagree, or not be comparable with the polarity of the overall annotation.

In an alternate fast annotation mode ("alacritation") comprising one of the tools in accordance with various embodiments, an annotating user can instead perform (at least, but not limited to) all of the coarse channel and polarity identifications via pseudorandomized serial presentation in a modal dialog, an experimental design or data collection routine (n-AFC, n-way alternative forced choice), which is thought to reduce bias and reaction time in psychophysical studies, and the highlights may be identically applied to the document.

Highlights may also be affixed to the display pane by automatic means, such as when viewer module examination of the annotation datum discovers deferred and visually unapplied logical machine annotation records based on character span indices into the sentence text inferenced by backend neural networks, and applies them by means of attempting to robustly match the sentence text indices across sequence-numbered tags via the persistent html backtrace data derived previously by the amasser and evident in the sentence-level subrecords of the annotation datum.

Figure 15:
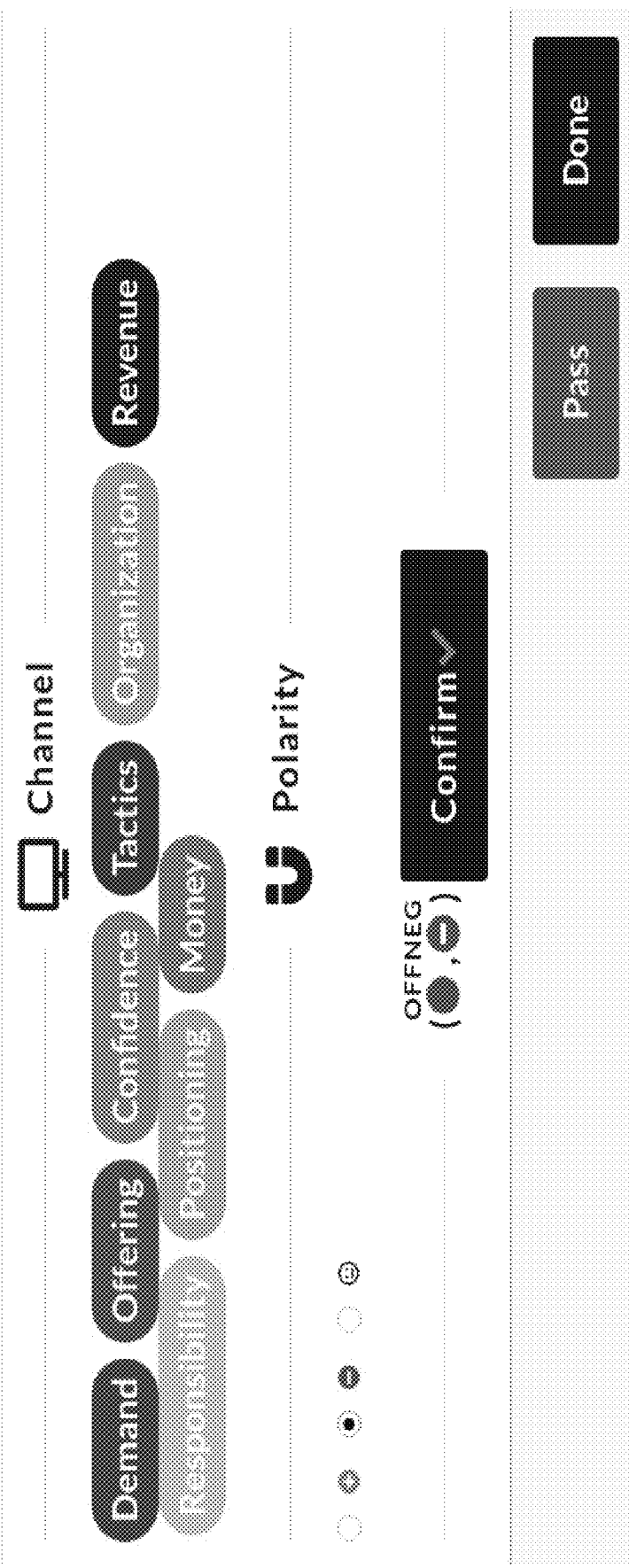
FIG. 15 illustrates an "alacritation" tool for randomized item rapid choice annotation, in which the user may be presented with a series of channel and polarity alternatives, as an alternative to the direct on-document virtual highlighter annotation interaction flow in accordance with one embodiment.

FIG. 15 depicts the "alacritation" n-AFC fast annotation tool which may be available in the viewer tier as an alternative to on-document highlighting. Unlike most AFC tasks, the user may explicitly (temporarily) pass on the annotation.

Figure 16:
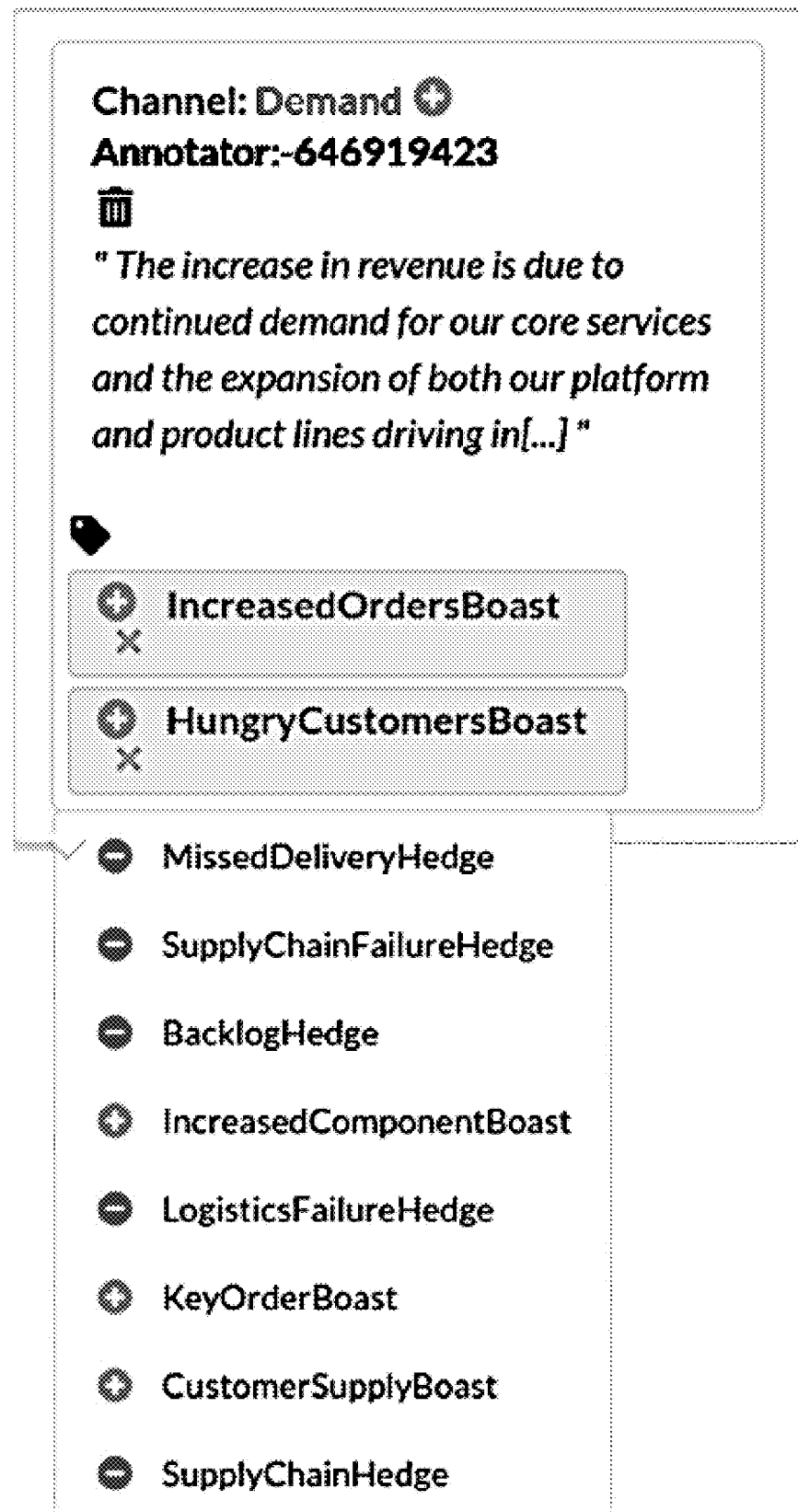
FIG. 16 illustrates an annotation detail popup. In annotation mode, the polarity of the annotation can be changed, the annotation can be deleted, and (channel-specific) tags can be added or removed at will in accordance with one embodiment.

FIG. 16 shows an annotation detail popup in a situation in which the viewer is configured for annotation mode. In annotation mode, the polarity of the annotation can be edited, the annotation can be deleted, and channel-specific tags may be added or removed, e.g. via the tag inclusion menu.

Regardless of the route by which annotations may be requested to be applied, the underlying highlighting scheme may remain the same, including elements such as HTML deadening and the management of HTML text nodes.

FIG. 17A depicts a fragment of HTML showing the <fostertext>HTML elements which the system may use to manage text which would otherwise belong directly to less manageable HTML text nodes. The fragment also evidences an annotation span, whose attributes may include metadata related to the identity of the annotator, the sequence number of the annotation, the present valence of the annotation, the machine or human character of the annotation, and the channel of the annotation.

In FIG. 17B, a fragment of HTML is depicted above a corresponding string which represents a "deadened" version of that HTML, to illustrate the HTML deadening procedure earlier described as a subprocess of a highlighting application algorithm.

The semantic channels browsing tool, focusing on the coarse (i.e. semantic channel) annotations, allows the user to interactively view count data (combined over polarities of positive, negative, and neutral, or split between polarities) graphically, e.g. as visualized by one or more radar plots.

The tool allows switching between multiple channel sets by selecting the channel set by means of a user control such as a dropdown menu; optionally, where multiple channel set annotations on a document artifact are available, the channel set annotations from a previously chosen channel set may be unapplied in the viewer and the channel annotations from a currently chosen channel set may be applied in place.

Channels can be individually activated or inactivated, as by a series of toggle switch UI controls, for the purpose of visualization in the channel tool, or generally in the consideration of the highlights visible on the document. To aid in accessibility for those with impaired or anomalous color vision, an alternate color for the channel, which may be held in the user's browser's local, session, or other auxiliary storage, may be specified by the user with an override as by interaction with a color picker tool, or an automated reassignment may be affected upon request.

In FIG. 18A, a view of the channel browsing tool is shown, in its split valence configuration, where negative and positive polarity channel count data is represented on separate radar chart plots. In this view, all of the channels in a channel set have been made active, meaning that their highlights are visible in the underlying document, and their corresponding axes are operative in the displayed radar chart plots.

Figure 18B:
FIG. 18B illustrates a channel browsing tool in combined valence configuration with collapsed (positive+neutral+negative) polarities in accordance with one embodiment.

In FIG. 18B, a view of the channel browsing tool is shown in its combined valence configuration, where negative, positive, and neutral polarity channel count data are represented in the radar chart plots. Some channels are inactivated by means of the corresponding toggle switches, and so corresponding axes may be removed from the radar chart.

The semantic tags browsing tool, focusing on the fine or inferred-event-related annotations, allows the user to interactively view count data (segregated by tag-level polarity, as in the software's terminology of some events constituting rhetorical boasts, and other events constituting rhetorical hedges) for tags belonging to a particular channel which may tend to belong to one or more channel set definitions. The tool allows switching between multiple available channels by using user controls such as a dropdown menu. The tag counts, including potentially for tags with a document incidence of 0, may be conspicuously displayed next to the name of the count and a proximate indication of the tag's polarity.

Figure 19:
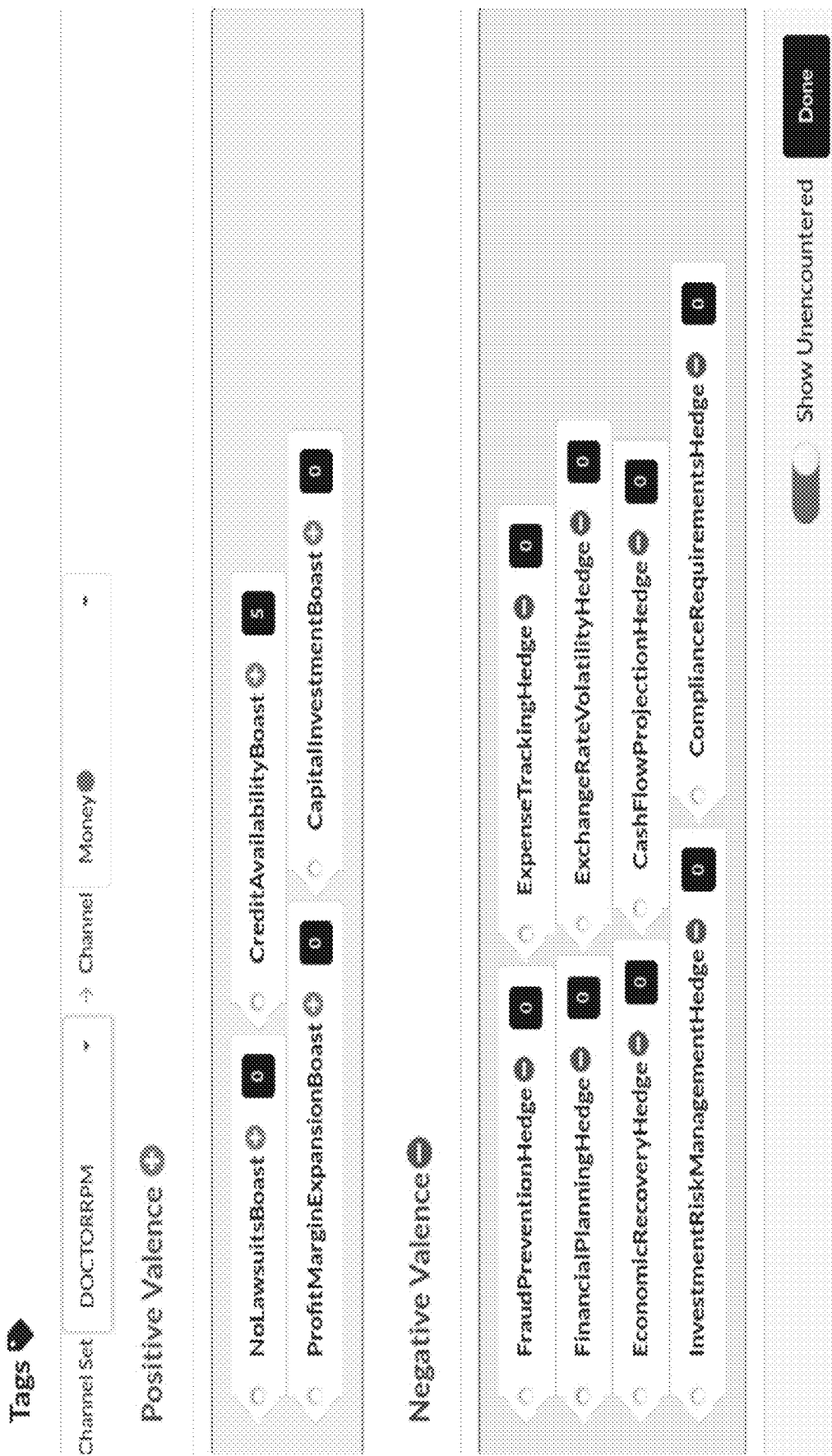
FIG. 19 illustrates a tag browsing tool in accordance with one embodiment.

FIG. 19 displays a view of the tag browsing tool, where no tags happen to be evident, resulting in zero-counts. A channel set has been selected that relates to rhetorical appeals concerning the product offering, so tags which boast or hedge in specific event-related ways related to Offering may be catalogued.

The sentence browsing tool, focusing on the approximate sentences discovered by sentence-boundary detection in the amasser module, allows the user to view data, including but not limited to: indications of the availability of other analyses or the applicability of other tools (such as the categorized named entities detected within the estimated bounds of the sentence; the number of channel and tag identifications partially or wholly coincident with the character span of the sentence; or the optional availability of a constituency parse which permits the interactive tree view of the sentiment-augmented phrase structure parse tree). The use of a spinner-type UI control may facilitate "paging through" the available sentences, and the user may enter an arbitrary sentence index by means of a free text entry field. The tool may contain a button which causes the tool's modal dialog to be dismissed and the sentence to be scrolled to and selected with the browser's pseudoelemental selection mechanism in the viewing region.

FIG. 20 shows a view of the sentence browsing tool. Sentences inferred by sentence boundary detection in the amasser stage are displayed here for the user to progress through. Indications of present named entities or tags or available extra data may appear in this tool.

The named entities browsing tool, focusing on the salient named entities estimated to exist in the text, and potentially categorized by such broad named entity categories as Organizations, Temporal, Regions & Geopolitical Entities, Products, or Legal Articles exposes any of the sentence, or format block, or paragraph, or annotation-indexed postings list which may be segregated by broad named entity category (e.g. as delivered specifically through an hierarchical accordion UI control). Clicking on the posting (e.g. a button control labeled S64, or B5, or A13) might cause the modal dialog to be dismissed and scroll to and select the location in the document of the indexed unit. For convenience, counts of incidence within the specific named entity instances (e.g. SEC, 2013, Rockville) and marginalized or tabulated across one or more of the broad named entity categories may be displayed in proximity to the postings list jump-button controls.

In addition, the tool displays a interactive force-directed graph that the user may click upon, drag to pan, or mouse-wheel actuate to zoom, click upon a network node and drag to tug the node and its linked components (affecting colliding or repulsing components) etc. in an interactive physics-inspired simulation that runs in the dialog. In accordance with one embodiment, clicking upon the nodes exposes information (as with a popup) about the named entity, including but not limited to the entity name, the entity categorization, and the modal annotation discovered across incidences determined to be character span coincident with, or sufficiently adjacent to, the named entity. The graphs displayed within the simulation construe nodes to represent named entities, and connections in the form of links represented by lines to become mathematically induced by character span adjacency across all mentions of a pair of named entities, where a minimally qualifying mention and a mention for a corresponding pair candidate may be configurably adjacent in the sense of inhabiting the same estimated sentence, or a sentence one or more sentences away in either direction radiating from the mention under consideration.

The user may, in accordance with one embodiment, interactively affect this qualification for induction by means of, e.g. a slider UI control specifying, e.g. 0,1,2,3, . . . N sentences distant. Additionally, the color of nodes in the simulation may either signal (e.g. the user may effect the choice of, as by means of a toggle switch UI control) the named entity category or the modal channel discovered in human or machine annotations or inferences approximately coincident with the sentence. The palette of colors may be pre-specified in the logical definition of the channel set or named entities definitions, or defined where this palette information may be absent by an extemporaneous assignment of semantic channels or named entity colors to colors spaced for distinguishability.

Figure 21:
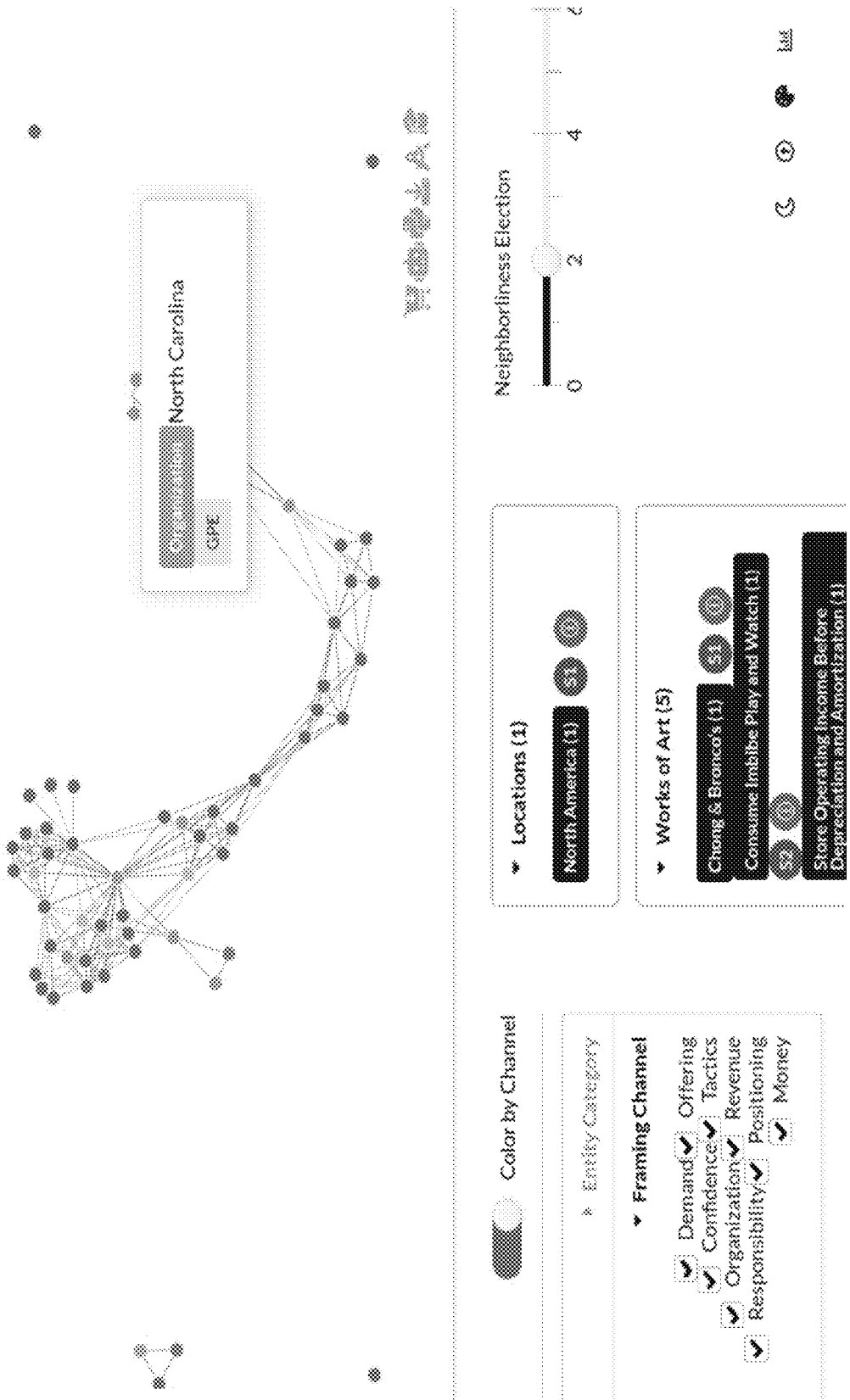
FIG. 21 illustrates a named entities network viewer tool in accordance with one embodiment.

FIG. 21 shows a view of the named entities network viewer tool, in accordance with one embodiment. Named entities discovered in the sentences of the artifact may be represented as nodes colored by modally-discovered channel or by named entity class (e.g. Works of Art, Temporal, Legal, Regions, Organizations). Named entities postings lists may be available as buttons that take the user to the sentence of the entity-mention when clicked. A slider may affect graph induction indirectly by specifying a number of adjacent sentences eligible to draw an arc between a named entity dyad.

The phrase structure tool, focusing on the results of the constituency parse of each sentence, and thus the discovered parse subtrees and leaf node tokens emerging from the root of a sentence's phrase structure tree representation, allows the user to visually discover the structure of the sentence, and, where sentiment data from standard sentiment analysis (as distinct from framing analysis) may be available, the node-level inferences (i.e. machine annotations) of sentiment polarity (e.g. positive, negative) and valence (either strongly or weakly).

In accordance with one embodiment, nodes in the tree may be labeled with their phrase structure category (such as S for Sentence, NP for noun phrase, VBP for non-3rd person singular present tense verb, PRP for proper noun, JJ for adjective, IN for preposition) and, visibly for leaf nodes, their text. Upon mouseover event, or other suitable focus event on the node, a popup or modal-subordinate message listing may cause the hierarchically accumulated text corresponding to the node to appear, as computed by a tree traversal process which accumulates the text of leaf/terminal nodes progressively higher into nonterminal nodes (e.g. mousing over the ROOT may cause display of the full sentence text lacking punctuation; mousing over an adjective results in display of the adjective alone; mousing over a NP node could conceivably display the text "a material adverse effect on our financial position results of operations or liquidity statements concerning projections").

Upon a more deliberate event, such as a mouse click or a double mouse click upon a node, the node could cause any subtree it possesses to collapse or expand, allowing the user to focus only on certain branches of the parse tree, or by another suitable means (a button to Collapse All or Expand All) at the modal-subordinate UI level contract or expand all subtrees for the current sentence or for all sentences so as to more quickly be able to use the UI spinner or free text entry field which, in a manner similar to the sentences tool, permits traversing the array of sentences within the viewer. As with the ordinary sentence tool previously described, a "Scroll into View" or "Jump To . . . " button permits the user to have the sentence scrolled to and highlighted automatically.

The tool may also cause the sentence text and also optionally the text of its "major" phrases (such as the NP and VP phrases restricted within the top N node levels of the syntax tree likely to constitute major clauses or meaningful syntactic divisions of the sentence) to be displayed. Nodes in the tree may be colored and captioned appropriately to the combination of their polarity and valence (one such color mapping could have gray representing Neutral, dark green representing Strongly Positive, light red representing Weakly Negative, and so forth).

Figure 22A:
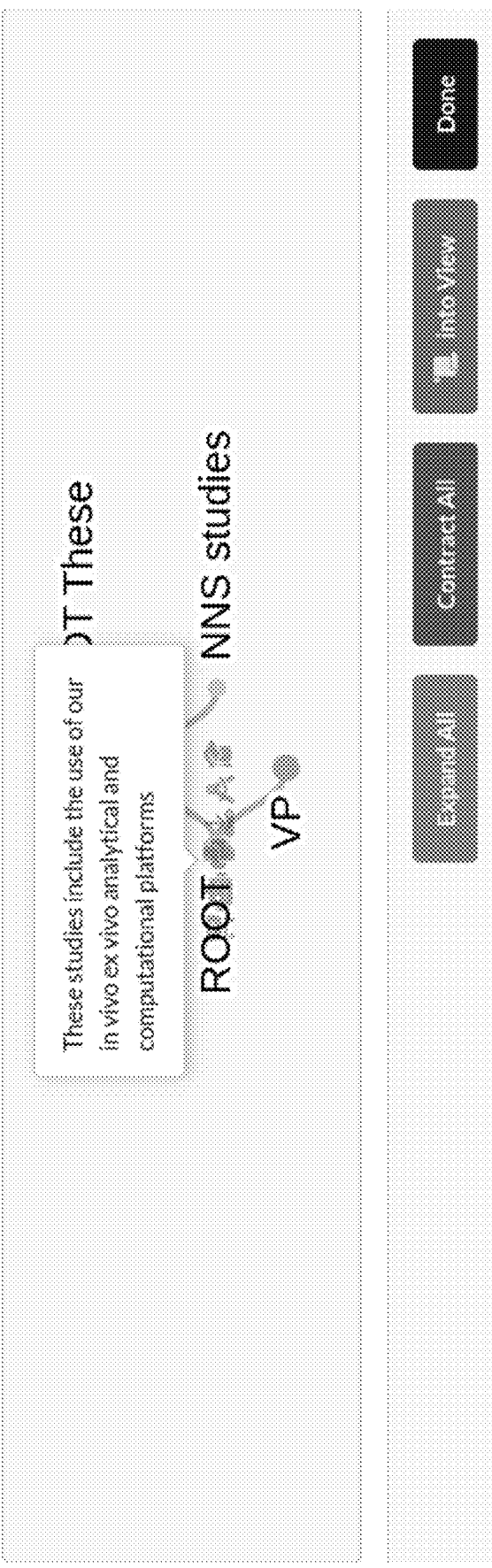
FIG. 22A illustrates a phrase structure tool with a contracted syntax tree in accordance with one embodiment.

FIG. 22A shows a view of the phrase structure tool, with the syntax tree explorable in the tool in a contracted state, in accordance with one embodiment. Sentence detail popup shows sentence text with punctuation removed. Nodes may be colored according to their ordinary sentiment analysis valence (e.g. Green for Positive, Red for Negative, Gray for Neutral).

Figure 22B:
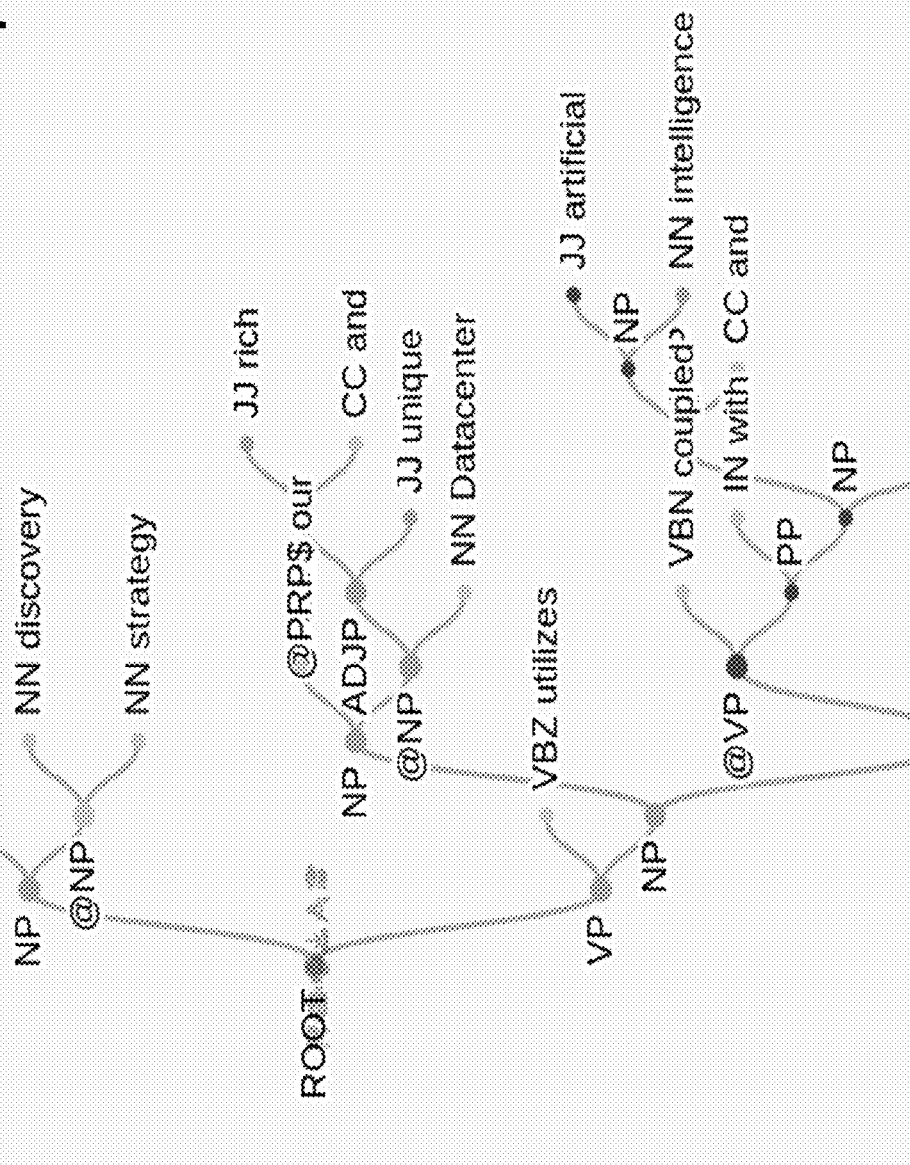
FIG. 22B illustrates a phrase structure tool with a syntax tree expanded and a sentence detail popup showing accumulated subtree text in accordance with one embodiment.

FIG. 22B shows a view of the phrase structure tool with the syntax tree explorable in an expanded state. As with FIG. 22A, a sentence detail popup displays accumulated subtree text (with punctuation removed).

The vector space tool, focusing on viewing constituent elements (e.g. sentences, sequence blocks, paragraphs, human or machine annotations) of the written artifact through the learned low-dimensional embeddings typical to the field of unsupervised learning, allows the user to conduct a spatial analysis of the writing in the document that removes the chronologically-specified narrative progression in favor of position computed, depending upon the similarity of the units in a low-dimensional word-embedding space.

In the course of typical use, the user may choose one or more available dimensionality-reduction algorithms, such as Principal Components Analysis (PCA), t-Distributed Stochastic Neighbor Embedding (t-SNE), or UMAP (Uniform Manifold Approximation and Projection for Dimension Reduction) via a dropdown menu UI control or similar instrumentality. Then, the user may select a granularity or constituent unit of analysis (a sentence, a block, or an annotation), and opt to render the plot by clicking a button. A default plot may be furnished initially having been computed using default options, such as PCA on sentences, or UMAP on annotations.

As in the case of the named entities network viewing functionality of the named entities tool, this tool makes available an interactive plot that the user may click upon, drag to pan, or mouse-wheel actuate to zoom, and click upon a node; however, it takes the form of a scatter plot and not a force-directed graph. Similar to the case of the named entities network, node color can be determined by the modal channel identification of wholly or partially textually coincident spans to the annotation text. In accordance with one embodiment, clicking on the node may trigger an informational popup which displays data including, but not limited to, the annotation text and the modal annotation channel, and it may also provide UI buttons or links to the unit in question, the named entities browser focal on named entities in the sentence, block, or annotation. Further, a button may be made available which may use any combination of precomputed question-response pairs, or a question prompt used in connection with a remote web service API for retrieving an answer and subsequent questions via, e.g. an LLM, to produce insights or standard definitions about the detailed element and display them to the user.

The system computes the positions of sentences, blocks, annotations and similar by: 1) computing phrase embeddings by means of a trained neural network that has been exposed to abundant language data for the purpose of producing lightly or heavily contextual embeddings (such as from word2vec, fasttext, BERT, or the GPT family), which may be done client-side in the case of small model size and with the help of a specialized or generic neural network inference runtime and tokenizer for the computation of the embeddings, and which may be accomplished in the absence of a standard paradigm for contending with phrases by averaging the vector representations of the embeddings for each word or token encountered in, e.g. a sentence to produce a sentence embedding; and 2) applying the dimensionality reduction algorithm earlier enabled, or automatically selecting to reduce the dimensionality of the embeddings to two dimensions for planar viewing (or three dimensions in an add-on specialized for fly-through viewing).

The user, if so entitled, and on a rate-limited, or credit, or soft or hard paywall basis, may elect (by means of an expanded menu) to compute or retrieve remotely alternate embeddings which can substitute for the entry-level quality embeddings they receive at the base level of entitlement to the system; embeddings which may be higher-quality because they have either been trained upon domain-specific texts or with higher quality, higher cost, higher-complexity parameter-intensive models, which should tend to place subjectively similar text pairs closer in space than subjectively dissimilar pairs, and would also tend to group categories of channel annotation more closely together. If the user elects, the system can compute conditional probability densities and fit channel-conditional ellipses to the data points via eigenanalysis and superimpose them on the plot display alongside, optionally, discriminability statistics, such as the mean of the Matthews Correlation Coefficient, effectively performing Gaussian Discriminant Analysis. Alternate embeddings, once computed, can be used in the semantic web view as well.

Figure 23A:
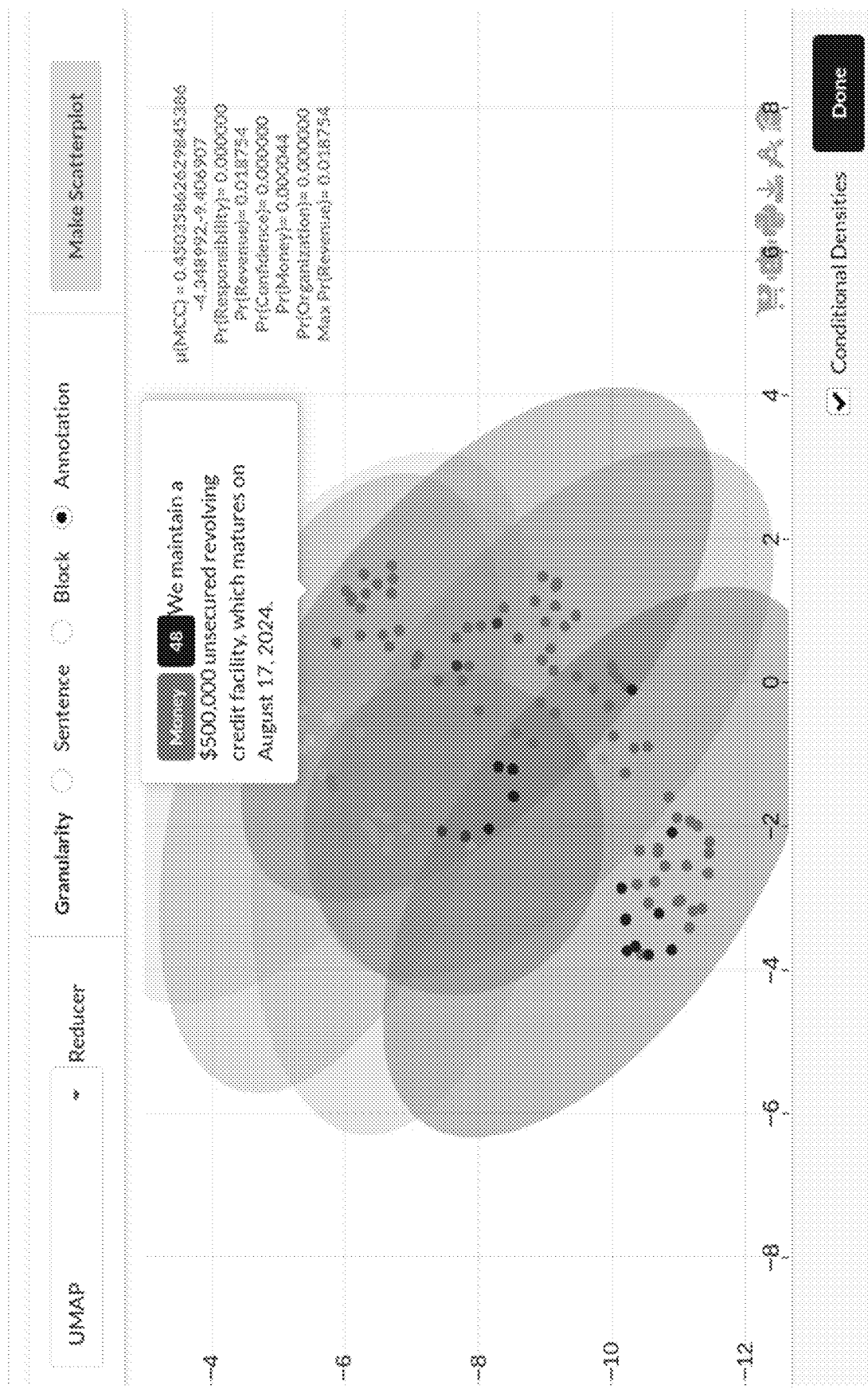
FIG. 23A illustrates a vector space tool, wherein annotations are configured to correspond to nodes, the dimensionality reduction algorithm chosen is UMAP, and the conditional densities calculation option is enabled such that there are displayed fitted Gaussian channel-conditional distributions over the data in accordance with one embodiment.

FIG. 23A shows a view of the vector space tool, with sentences configured to correspond to nodes, and the dimensionality reduction algorithm specified as UMAP, and the conditional densities calculation option enabled. Constituent (i.e. sentence) text may be available in the detail popup made operative by clicking upon a node. The positions of the nodes may be determined by word embeddings averaging into sentence embeddings and originating from a neural embedding model, in this case a supervised FastText model trained upon SEC filing data.

Figure 23B:
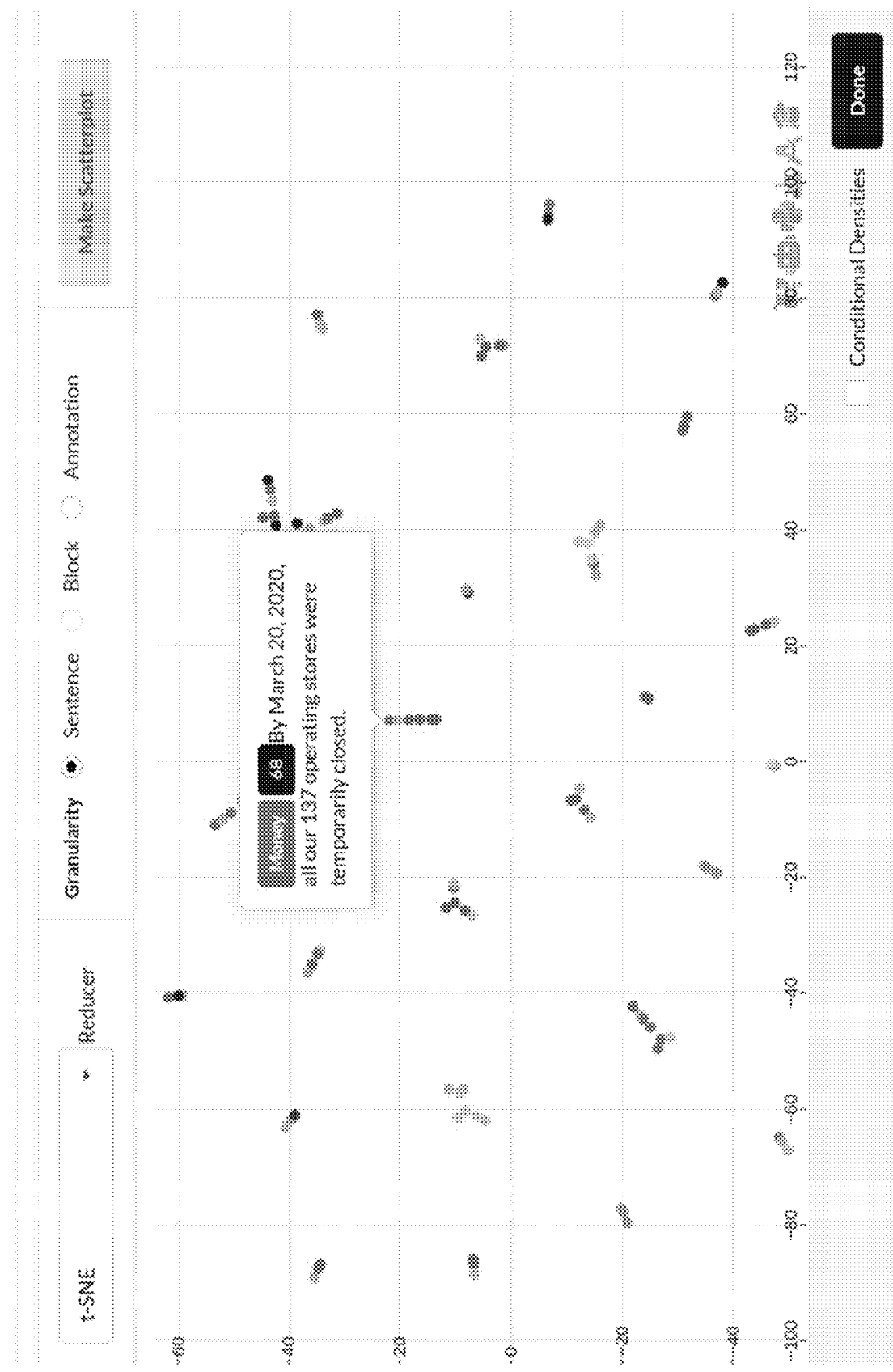
FIG. 23B illustrates a vector space tool, wherein sentences are configured to correspond to nodes, and where the dimensionality reduction algorithm chosen is t-SNE, resulting in a much different, streaky grouping of the sentence-nodes in accordance with one embodiment.

FIG. 23B shows a view of the vector space tool in an alternative configuration to the one in FIG. 23A, where sentences are still configured to correspond to nodes, where the dimensionality reduction algorithm has been alternatively specified to be T-SNE, resulting in a streaky grouping of sentence nodes.

The semantic web tool focuses on the extemporaneous semantic similarity networks a user can interactively induce via their choice of such factors as semantic distance function, chronological/narrative/physical vs. semantic balance factor, and induction laxity (which lowers the threshold for a link/edge/arc to be induced between two artifact-constituent (e.g. sentence, block, or annotation) nodes. In accordance with one embodiment, each of the constituent units (such as sentences, blocks or annotations) corresponds, as in the case of the named entities force-directed graph, to a node in a force-directed graph simulation a user can interact with by clicking and holding to pan, scrolling to zoom, and clicking on a node to produce, e.g., a popup UI element which displays data appropriate the unit, including, but not limited to: the text corresponding to the unit (such as the text of the sentence); the modally-discovered channel identification; the unit identifier (such as the index of the sentence); as well as such interactive links as could permit the user to receive an explanation for the text passage, jump to its mention in the annotated document, etc.

Within the tool, the user may be afforded a number of choices relevant to structuring the underlying graph, including, but not limited to: specifying the semantic distance used in the calculation of the node distances employed to determine whether node pairs induce a connection having met some particular threshold; an adjustable factor related to that threshold of graph induction; and the underlying embedding method used in common between the vector space tool and the semantic web tool being presently described. Graphs may be internally represented by means mathematically and computationally efficient for the graph, that is, graph induction and other operations such as clustering, path finding, component counting, and so on, may be performed on representations including, but not limited to: dense adjacency matrices; sparse adjacency matrices; augmented graph adjacency lists; and so on. Graph operations may be performed in the browser environment (e.g. using Javascript), or by adaptive use of direct WASM wrapper modules implementing mathematical operations (as for the included client-side functionality underlying LDA, PCA, and word embedding determination), or by the execution in a hosted interpreter environment of code implemented in snippets or in off-the-shelf libraries (e.g. in Python, when an interpreter environment has already been initialized at substantial latency to the user, and where therefore a little speed may be sacrificed for a potentially higher quality implementation of mathematical operations).

In accordance with one embodiment, the graph underlying the simulation may be constructed by blending two distances: a semantic distance under the user's control (such as the Euclidean distance between sentence vectors), and a second, "physical" or non-semantic distance (such as the chronological distance defined in terms of the proportion of character distance traversed through the document). The user may interactively adjust the balance factor between these two distances, affecting the proportion of interpolation, reminiscent of alpha blending in the field of computer graphics, as with approximately continuous adjustment of a "slider" UI element. The user may also specify (e.g. with a slider UI element) the induction laxity factor, which is inversely proportional to the threshold distance value used to induce a connection between node pairs. If the user does not wish to adjust the laxity threshold or the balance proportion, they can indicate (as by clicking an onscreen button) their wish that the parameters be marginally (i.e. singly) or jointly (i.e. where the objective function of optimization takes both inputs as free parameters) optimized by means of a function optimizer, such as a randomized or golden section or quadratic-fit search on each of the parameters randomly or alternately, or by the use of some other multiparameter optimizer.

The objective function used by the optimizers may track the subjective and aesthetic goal of producing graphs with few isolates (i.e. nodes lacking any connections), many bridges (i.e. links which, if cut, would separate the graph) and many communities (i.e. areas of the graph with dense connectivity which are nonetheless connected to graph components by relatively few liminal nodes). This objective function which ordinarily requires expensive computation, as with label propagation for community detection or chain decomposition via depth-first search, can be replaced with a simpler objective which subjectively seems to also result in perceptual maxima or approximate fixed points of no improvement: rewarding the minimal range-insensitive difference of average node degree between, e.g. 6-12 connections per node. In an alternative embodiment, the user may also directly specify, as by the instrumentality of a series of dropdown controls, or the use of a free text entry field permitting the entry of code corresponding to a graph induction algebra or query language, attributes or classes of attributes or results of the application of functions (e.g. distance functions) which could cause a link between any eligible pair of nodes to be induced.

Figure 24:
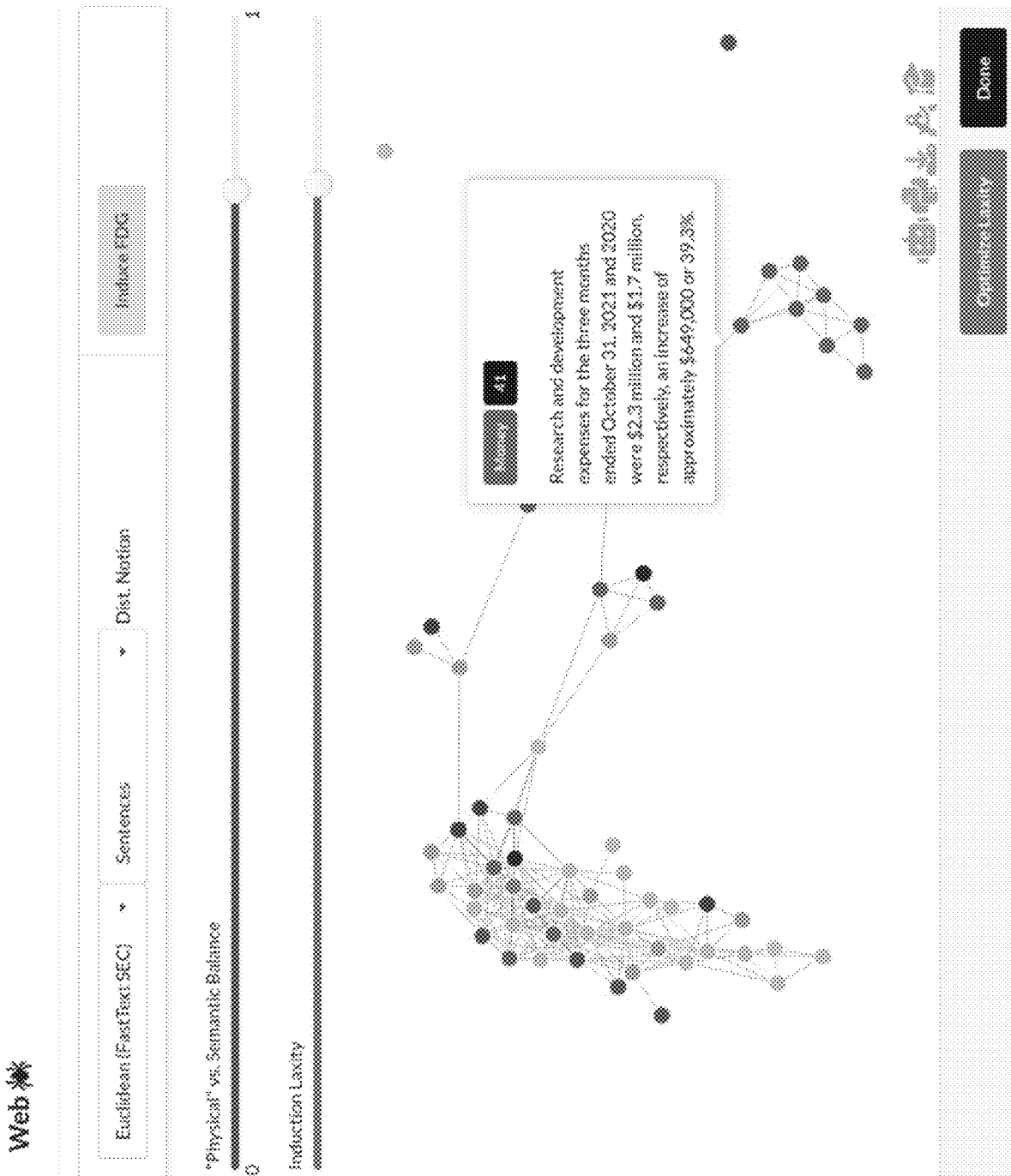
FIG. 24 illustrates a network view tool, whereby the user may be able to extemporaneously induce a graph structure used in a physical force-directed graph layout simulation using the balance and laxity method of inducing a graph from a predetermined distance function in accordance with one embodiment.

FIG. 24 shows a view of the network view tool wherein the user may be able to induce a graph structure in a force-directed graph layout simulation, using the balance-laxity and predetermined distance function paradigm (a critical distance between entities scheme) for graph induction, in accordance with one embodiment. As configured here, the distance used to compute the distance matrix which is transformed by link induction into the graph structure shown is Euclidean distance between the embeddings derived from the Fasttext SEC model on sentences (rather than, e.g. sequence blocks or annotations). The user may adjust the balance and laxity parameters of graph induction via user interface elements, such as, in accordance with various embodiments, sliders, so that a balance may be struck between narrative distance through the document and semantic distance, as represented by the embeddings. The laxity parameter constrains the threshold needed to induce graph arcs. In accordance with one embodiment, when the user performs an input action such as clicking on a node, a detail popup may display the text of the examined constituent and its modal channel identification, and the user may optimize laxity by clicking a button afforded for that purpose.

The token trend tool focuses on the discrete cumulative distribution of freely specified tokens (e.g. words or multiword entities), channel (coarse; intent related) annotations, or tag (fine; event related) annotations, and allows the user to track the course of the incidence of these units of analysis as they appear throughout the document. The visualization may consist of a line chart which increases monotonically for each data series, where a data series may be a number of mentions at a specific amount of progress through the document, such as the proportion of progress through characters in the document at the point of the mention. The data series may be colored for distinguishability, which may take the form of an extemporaneously computed colormap without regard to unified color definitions, or which may (e.g. in the case of channels) reference the color definitions used elsewhere in the application. In accordance with one embodiment, by means of actions including clicking or hovering the line chart, a popup or data cursor detail UI element may be made to appear listing the counts and providing a color legend for each data series and displaying a proportion of progress through the document. The user constructs a field of analysis units for this tool by means of a search box as implemented through, e.g. a dropdown menu UI control with a multiple selection paradigm, whose contents may be filled by having chosen whether the field of search may include tokens (and thus named entities), channel identifications, or tag identifications as by the use of, e.g. radio or checkbox UI elements, and the system suggests such tokens, channels, or tags as it finds available and appropriate within the document.

Figure 25:
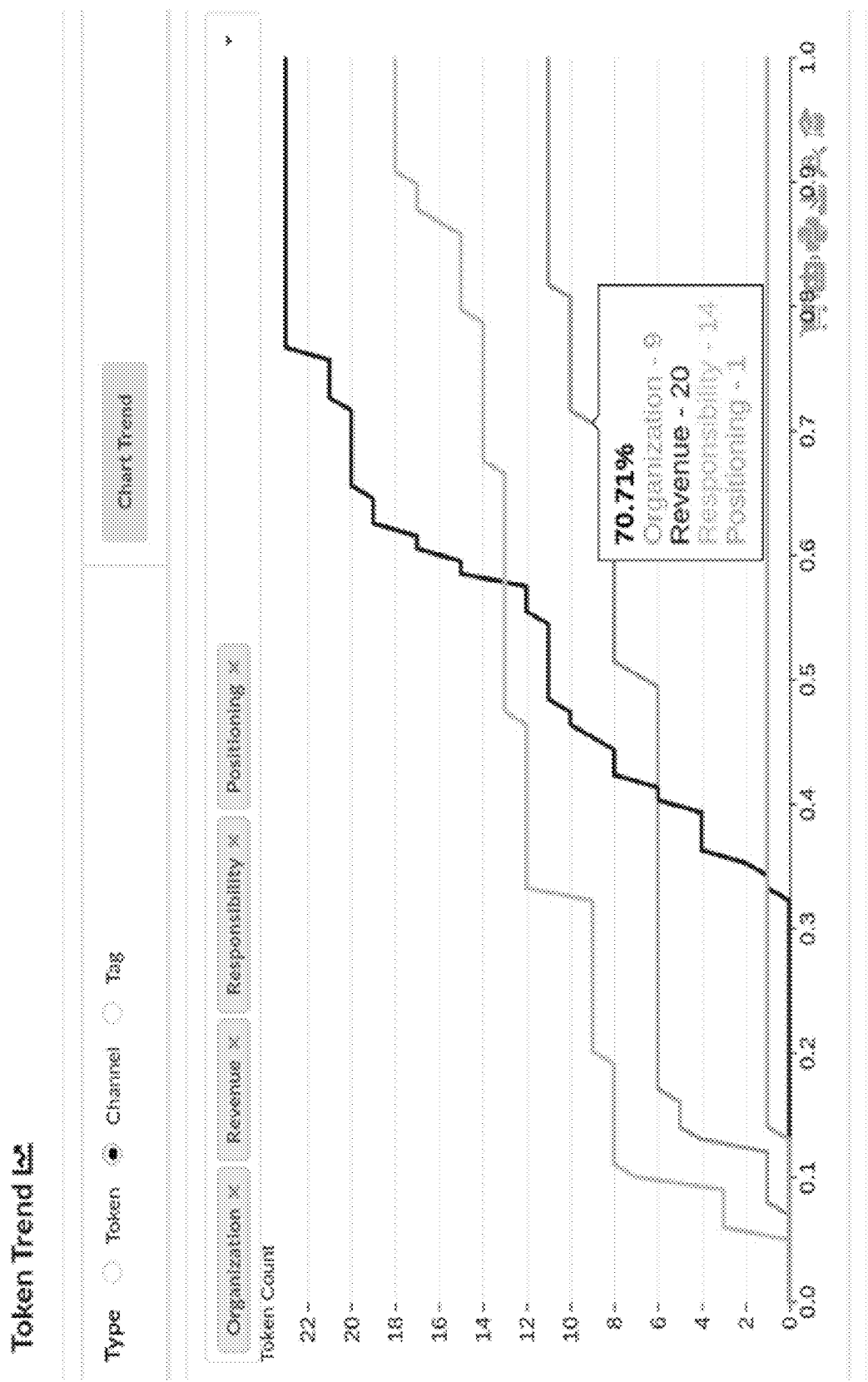
FIG. 25 illustrates a token trend tool which plots data series corresponding to the cumulative incidence of recurring elements (such as free entry tokens, named entities, channel annotation identifications, and tags) as the document develops over narrative (e.g. character distance) time in accordance with one embodiment.

FIG. 25 shows a view of the token trend tool which plots data series corresponding to the cumulative incidence of recurring elements such as free entry tokens, named entities, channel annotation identifications, and tags as the document develops over narrative (e.g. character distance) time, in accordance with one embodiment. Mousing over the series may produce a data cursor which reads out the vertical position values attained for each series. The radio buttons at the top may constrain the search to one of tokens (including named entities), channels, and tags, and the multiple selection box may be autocompleted with suggestions harvested from the logical structure of the document artifact.

The topic clusters tool focuses on the topic clusters, keywords, and keyword incidences that can be discovered in the document by means of topic analysis from the field of natural language processing. The interactive portion of the system may be largely agnostic to the computational method used for topic analysis, however, the system includes at a base usage tier for the user the relatively slow method of Latent Dirichlet Allocation for topic modeling which uses a Markov Chain Monte Carlo process to derive topic clusters bottom-up from text in the document, which yields a hierarchical data structure that includes keywords potentially multiply in small clusters of other keywords grouped by common mention and which keeps incidence data subordinate to cluster data. The method can be augmented through the system with stopword detection and removal occurring prior to the main analysis. Alternate realizations compatible with the system include topic clusters as suggested by a large language model or through the use of a smaller language model such as BERT, and either may be capable of naming the discovered cluster.

For instance, without labeling by a neural network language model and using the base level LDA and stopword removal alone, the system might discover a "topic0" cluster with the keywords (e.g. discovery, computational, targets, strategy, development, therapeutic, platforms, drug, experimental) which could relate to more business-oriented uses of computational drug discovery, whereas a "topic1" cluster with alternate keywords (e.g. biomarker, validate, facilitate, reagent, molecule, neuropharmacology, assay, genomics, synthesis) might relate more to the scientific aspects of the pursuit. The system augments traditional hierarchical analysis data with specificity relative to the units of constituency used by the system (e.g. sentences, blocks, machine and human annotations) and with reference to the modal channel identifications which coincide with those units.

The user may be furnished with an interactive hierarchical, zoomable bubble-map representation, in accordance with one embodiment. When an analysis is conducted, the outer-level bubbles represent topic clusters. Upon clicking on a topic cluster, the visualization may zoom in to expose one or more keywords in the cluster. Upon clicking on a bubble representing a keyword or similar (compatible topic analysis schemes can discover phrases that are not limited to single word tokens), the visualization may further zoom to a list of postings. For instance, in one traversal down from the topics cluster to incidence data level, a user might see a field of focal bubbles captioned with the topic identifiers (e.g. topic0, topic1, topic2, topic3, topic4), and upon clicking on the element representing "topic0" might see bubbles corresponding to keywords or similar linguistic division instances (e.g. reported, related, obligations, reflected, results, financial, disclosed, transactions, operations, parties), and upon clicking "related" might see bubbles listing incidences S43, S49, S62, S0 (corresponding to numbered sentences that the key word or phrase or composite element appears in).

Upon user actions including clicking on the lowest-level (incidence) bubbles or mousing over the bubbles, a popup may appear listing the location of incidence, a possibly truncated text caption derived from the unit of incidence (e.g. for "related" the system may return popups referencing S43 as "The increase for the 3 and 6 month periods was mainly due to increased compensation and sequencing costs related to our increased investment in our drug discovery platform" and S49 "The increase was primarily due to an increase in compensation as well as an increase in IT related expenses to support growth", and a link which can dismiss the visualization and scroll the user to the incidence within the main viewer pane. Bubbles may be colored at various levels (such as the intermediate keyword level) with the majority channel identification at that level. The system further may allow restricting the analysis by the use of one or more user specified options, in particular, those restrictions imposed on granularity and scope.

The user may indicate that the analysis is to be performed on the granularity of sentences, blocks, or annotations (thus at the bottom level possible, incidence location identifiers might variously resemble S3, B14, A151), for example by means of a radio button UI element. The user may further indicate that the analysis is to be performed on the whole document, the user selection made with the pseudo-elemental, browser-based selection mechanism involving clicking and dragging to create an ephemeral highlight at the browser level, or to units of granularity which coincide with specific channels (e.g. Revenue or Corporate Responsibility). In the case particularly of a user selection, the system may refuse to carry out the analysis on the basis of not having enough data for topic analysis. In the case of a channel restriction, restricting the mentions to those with channel involvement concerning Corporate Responsibility might produce topic bubbles with keyword subordinates that are overwhelmingly, but not completely, yellow as Revenue or Product Offering annotations might actually be modal among these mentions, even when restricting to mentions with Responsibility channel involvement.

As with the case of several other tools, including the vector space tool involving embeddings, better topic analysis that takes place server-side rather than client-side could yield faster or higher quality results depending on an end-user's personal computing resources and their subjective quality standards for analysis. Therefore, the system may make available external analyses (integrating with the same scheme for visualization and exploration) on a credits-based, or rate-limited, or paywall-based, or API key on-demand, or subscription basis, in accordance with various embodiments.

Figure 26A:
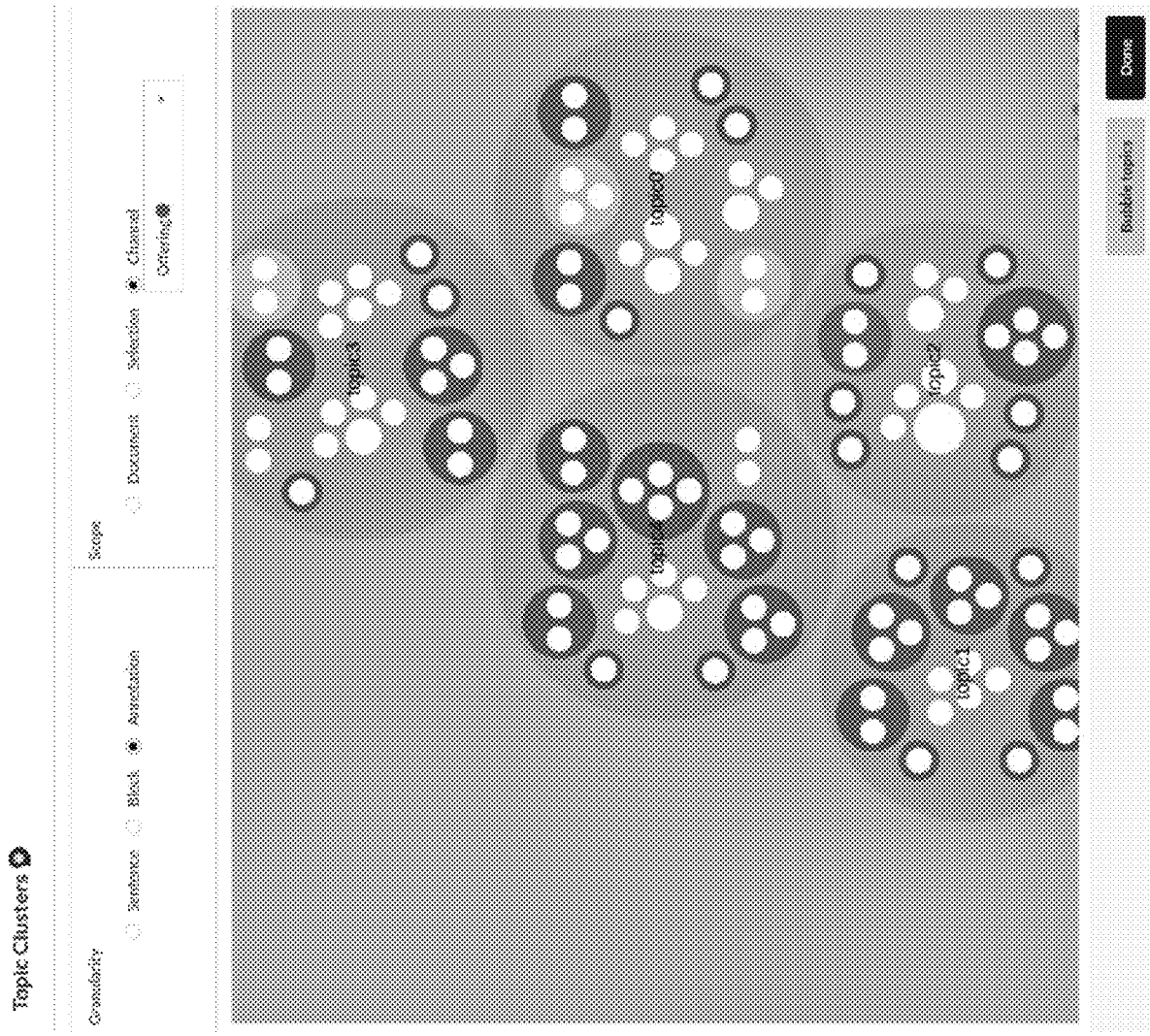
FIG. 26A illustrates a topic bubble-map visualization tool at its highest level, depicting clusters of topics in accordance with one embodiment.

FIG. 26A illustrates a view of the topic bubble-map visualization tool at its cluster-of-topics highest level, in accordance with one embodiment. In this specific depiction, keyword clusters as harvested through LDA and not yet labeled by a downstream transformer cluster naming procedure are evident. The user can adjust the granularity of where "topics" can appear, such as in sentences, blocks, or annotations for the purposes of building a concordance. The user may restrict the scope of the analysis by specifying as valid the whole document, the user browser text selection, or only those units which intersect with at least one channel annotation for a given channel. The modal channel identification may be used to color subordinate bubbles and need not cohere with the selected channel annotation minimum restriction. The user may click on any of the bubbles to descend to the next level of topic analysis data.

Figure 26B:
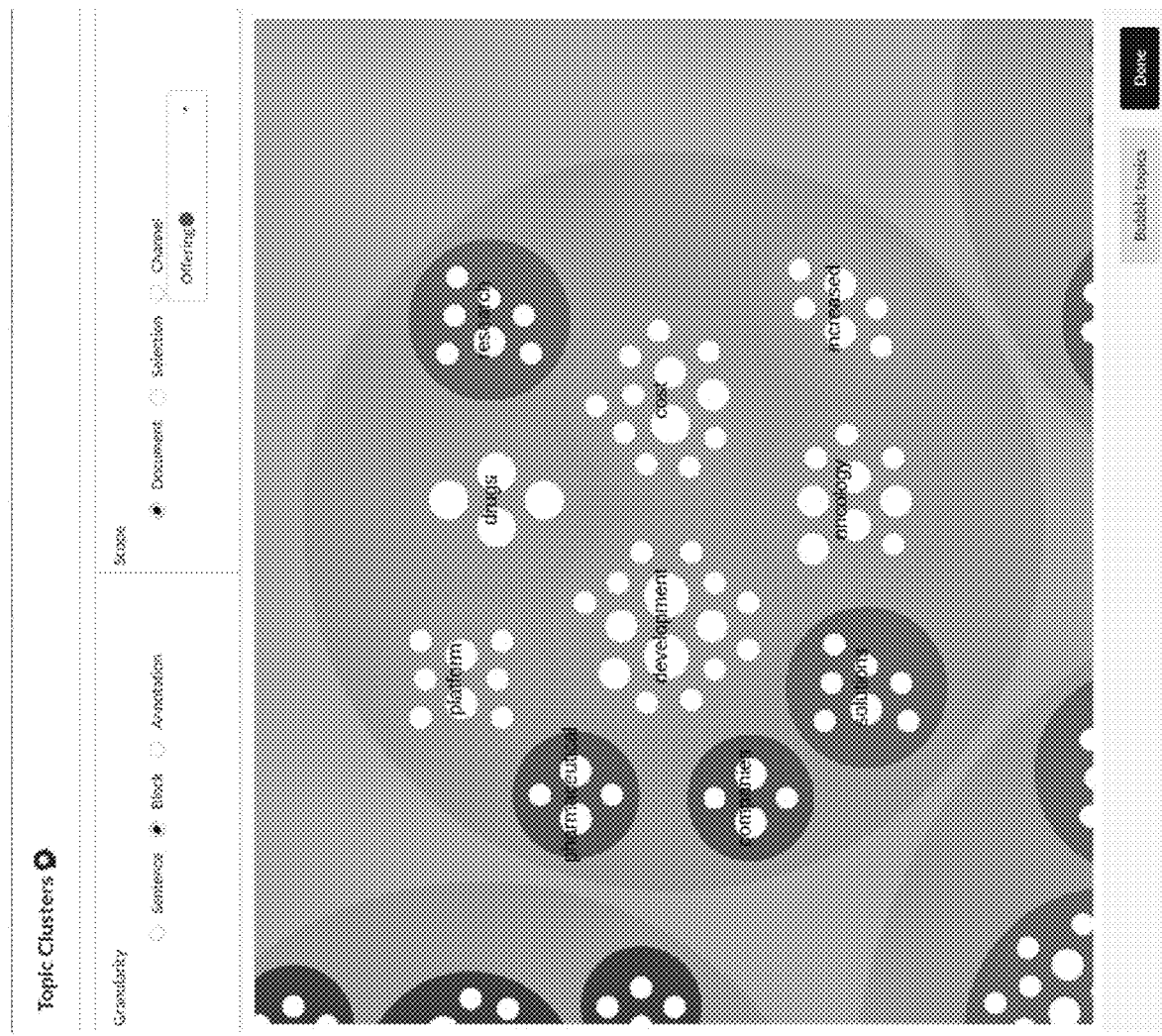
FIG. 26B illustrates a topic bubble map visualization tool at its intermediate level, depicting the content of clusters of topics in accordance with one embodiment.

FIG. 26B depicts a view of the topic bubble map visualization tool at its intermediate level focusing on the content of topic clusters, in accordance with one embodiment. The method in this depiction generates mere keywords so the subcluster circles may be labeled with the keywords and colored with their modal channel identification and sized proportionately to the incidence count of the mentions.

Figure 26C:
FIG. 26C illustrates a topic bubble map visualization tool at its lowest level, depicting the incidence data for keywords as they have already been assigned to clusters in accordance with one embodiment.

FIG. 26C depicts a view of the topic bubble map visualization tool at its lowest level focusing on the incidences of the topic members (in this case, keywords) in specifically identified text constituents, in accordance with one embodiment. Bubbles at this level may be labeled with their constituent id (e.g. S12 for Sentence No. 12, B24 for Block No. 24, A101 for Annotation No. 101), and sized proportionately to the mentions.

The synthetic viewpoints tool focuses on modeling the sociopolitical response to the document using linguistic analysis-by-synthesis via applying to the repeatedly sampled output of generative language models trained on, e.g. social media utterances thought typical of such a viewpoint standard sentiment analysis or direct impact evaluation by e.g. a transformer neural network at a whole document or document subunit (e.g. sentence) grain. The user may be able to view these evaluations interactively within the application, potentially either on a precomputed or on a on-demand (e.g. credits-based, rate-limited, paywall-based, API key or subscription basis) by means of a series of gauge visualizations which show each viewpoint's response score to the whole document, in accordance with various embodiments. When a gauge is made active, as by being the default (e.g. first) gauge or upon being clicked by the user, a scalar field heatmap of squares may be displayed on the tool pane. The color of the square may indicate the polarity and the valence of the response (e.g. a bright green square when the Environmentalist viewpoint gauge is active may indicate a sentence the system has identified as likely to be positively received by an audience with that viewpoint, a dark red square when the Venture Capitalist viewpoint gauge is active may indicate a sentence the system has identified as likely to be negatively received by an audience with that viewpoint).

In accordance with one embodiment, clicking on the square may cause information to appear (e.g. in the form of a popup) which e.g. displays the viewpoint caption, the sentence specific score, a list of keywords or named entities discovered in the sentence during synthetic viewpoints analysis or ordinary document analysis through the normal operation of the system (which may also bear response scores) and a series of observations which may be emitted by a neural language model (e.g. BERT, GPT-4, GPT-Neo-X) concerning the sentence. Synthetic observations about the whole document may also be conspicuously displayed within the tool pane at large, either summarizing the viewpoint scores jointly, or conditioned upon viewpoint in the "voice" of the pooled "speaker".

The general procedure involves harvesting a plurality of messages, articles, or other written artifacts from persons known or suspected to be characteristic of a certain viewpoint, such as the Tweets of members of Congress belonging to the Republican or Democratic parties. A system may collect these utterances and use them to fine-tune existing pre-trained neural language models of intermediate capacity, such as BERT or GPT-Neo-X), conditioned upon a viewpoint, in an offline mode.

At synthetic viewpoint datum preparation time, each sentence may be placed into randomly selected polarity-tainted prompt templates such as "The most utterly terrible thing about <SENTENCE> is" and the synthetic viewpoint system invokes the viewpoint-specific generator networks a specified number (e.g. 100) of times per original sentence (applying a replacement to switch it for the replacement macro instance in a template to create a prompt) to field a list of productions. Each production may then be fed to tree-based sentiment analysis as with the sentiment-augmented parse tree used elsewhere in the system derived from TreeRNNs, or to a direct sentiment scoring network using an ordinary neural language model (such as BERT). Individual named entities, keywords, and adjectives may be extracted and also subject to direct sentiment analysis. The score (e.g. 0-100, or −100 to 100) may be estimated based on, e.g. taking the scaled proportion of negative or positive productions, e.g. with a discounting factor or downweight applied to negative productions made from negativistic or derogatory prompt templates and a discounting factor applied to positive productions made from positive or optimistic prompt templates. Since sentiment analyzers commonly also issue "Strongly Positive" and "Strongly Negative" determinations, these strong emphases can add additional positive or negative scoring to the production.

In an economically advantaged environment, the system can depend upon direct generations from LLMs such as GPT-4, adaptively eliding the production of a large number of unreliable nonsense productions (e.g. from a model with the impoverished language modeling facilities of GPT-2) in favor of a few high quality productions from a large language model prompted with stereotype-generating text such as "Respond to the following quote creatively as a caricatural right wing paleoconservative: <prompt>" or "Respond to the following quote as a caricatural left-wing bleeding-heart activist: <prompt>". Comments which may be displayed verbatim to the end users, e.g. at the sentence or whole document level may be prioritized for generation by more competent language models, while the sentiment oriented facets of the system can be served by less competent, more economically viable models with less strenuous runtime requirements allowing the system to adapt gradually as economic considerations allow with the fast-moving state-of-the-art in natural language processing.

To reduce inference costs, further, the system may impose an initial processing step involving a less capable language model (such as a BERT variant) with a classification head that may deem the sentence as sociopolitically inert, either on a per-viewpoint or omnibus over-all-viewpoints basis, preventing the expenditure of computation on neutral sentences which may tend to be simple summaries of fact. Neutral sentences may also be skipped over by scalar field run detectors performing clustering or anomaly detection in coordination with the insight-generating functions specified elsewhere in this disclosure.

Figure 27A:
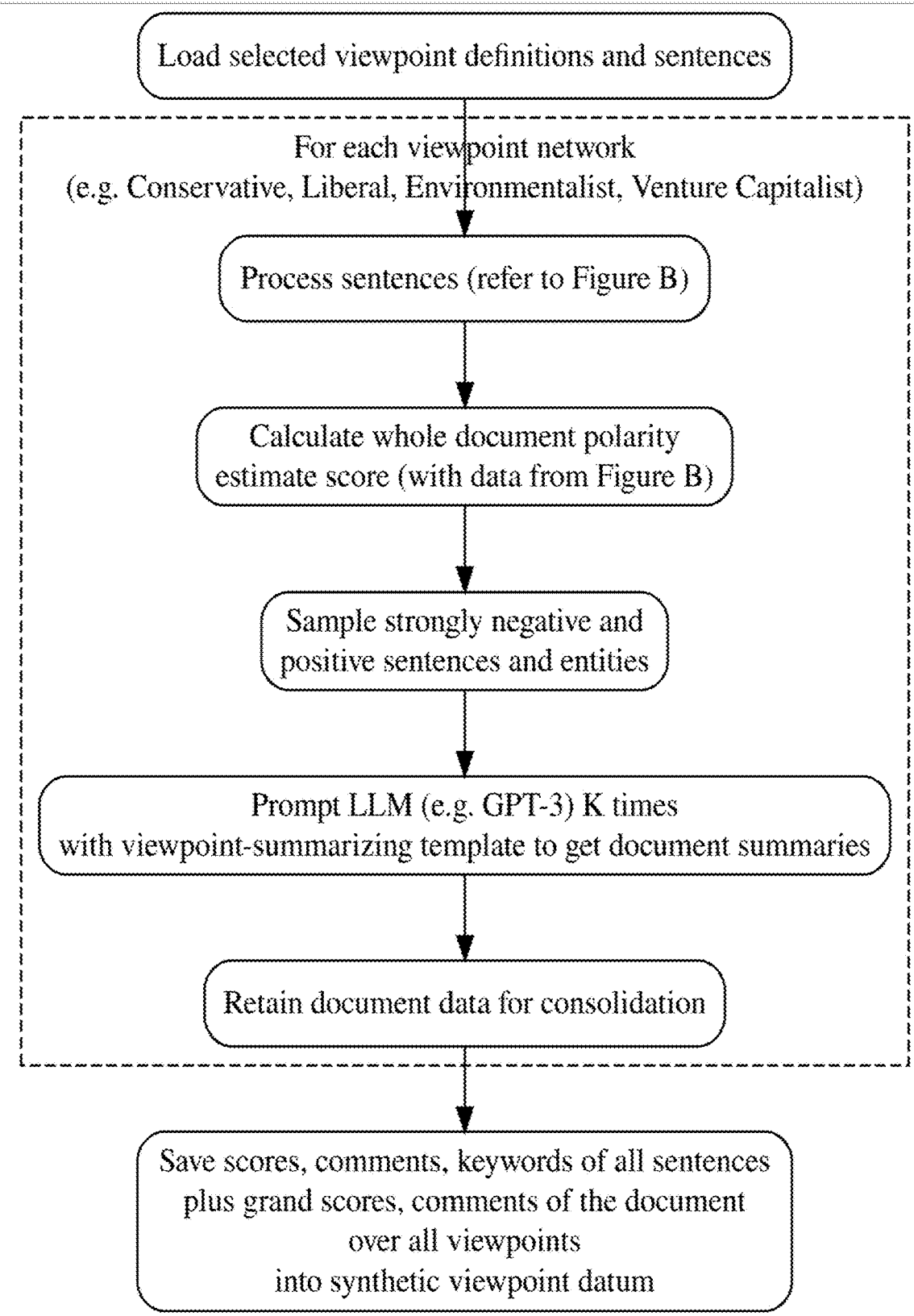
FIG. 27A is a flowchart of the high-level operation of the synthetic viewpoints data generation facility in accordance with one embodiment, focusing on the viewpoint-varying outer loop of the synthetic viewpoint calculation.
Figure 27B:
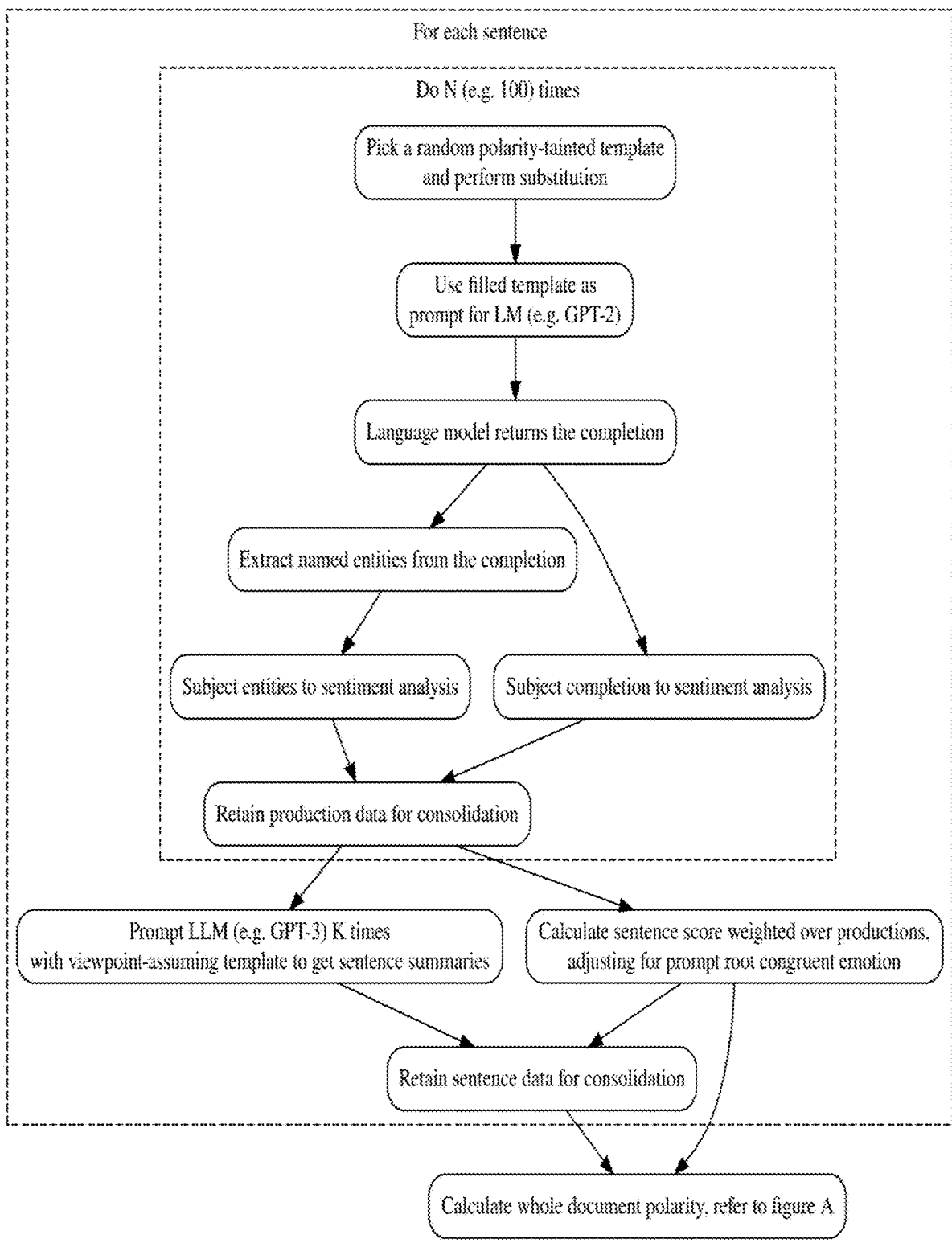
FIG. 27B is a flowchart of the lower-level operation of the synthetic viewpoints data generation facility in accordance with one embodiment, focusing on the inner sentence-varying and random-production-varying loops that estimate sociopolitical viewpoint data using a mixture of potentially weak language models for polarity-tainted sentence production, ordinary sentiment analysis for aggregate scoring, and strong language models such as LLMs for literate summaries & commentary.

FIG. 27 shows a flowchart of the high-level operation of the synthetic viewpoints data generation facility, illustrating how strong language models may be used to provide literate summaries, and how weak language models can contribute more reliable emotional data through averaging over repeated production. Sentence-level data and document-level data may be produced to be able to be displayed to the user.

Figure 28:
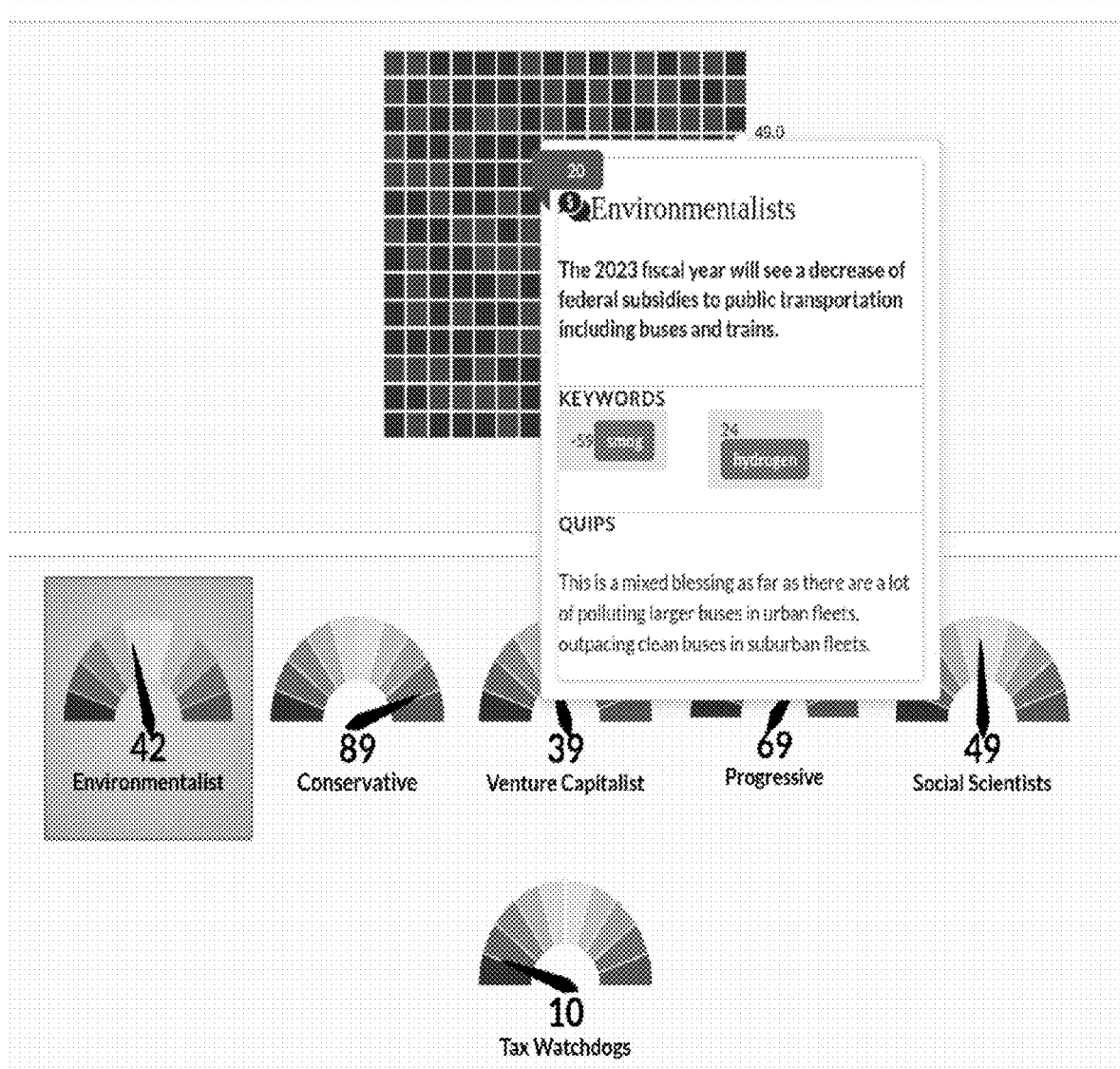
FIG. 28 illustrates a synthetic viewpoints tool, with gauges corresponding to sociopolitical viewpoints and a neural estimate score of how well the groups respond differentially to the document in accordance with one embodiment.

FIG. 28 shows a view of the synthetic viewpoints tool in accordance with one embodiment, with gauges corresponding to sociopolitical viewpoints, and a neural estimate score of how well the groups respond differentially to the document. The score may ultimately be based on synthesizing and sentiment-scoring opinions generated by generative language models fine-tuned on online utterance data from members of each interest group. Clicking on a gauge may make it active and the corresponding scalar field heatmap of squares operative. The heatmap may be colored according to similar estimates at the sentence level. Clicking on a square may cause a popup to appear with elements including the text, the score from the group, the keywords and sentiment-related scores issuing from keyword extraction on the synthetic productions responding to the sentence, and synthesized user-suitable commentary from more capable language models pretending to encompass the viewpoint.

The report generator tool may provide, in accordance with one embodiment, a facility to the user to download printable summaries of the file, including, but not limited to: a channel-specific listing with semantic channel counts; and semantic tag labels and counts and polarity restricted to channels in one or more channel sets with more than zero identifications in the document; a highlight-laden view of the main document made friendly for printers, removing the navigational elements of the viewer such as the header, footer, and toolbox navigation bars; a printable version of the report generated in connection with the advisor tool; a listing of question answering or summarization results generated in, e.g. the force-directed graph or vector space views; a listing of computed or precomputed insights generated using e.g. the insight-generating functionality made operative by using the plot-specific menus in conjunction with system-internal or system-external LLMs. In addition to providing templated HTML, which may inhabit a shrunken viewing pane in the middle of the modal, the system may provide a means to download generated presentation files as synthesized through code generation of LaTeX beamer code or an intermediate language that can be used to produce presentations in a commercial software package.

Figure 29:
FIG. 29 illustrates a report generator tool which allows the user to select one or more report templates, which will be filled by the system with the relevant information from the document in accordance with one embodiment.

FIG. 29 shows a view of the report generator tool which allows the user to select one or more report templates which may be filled by the system with the relevant information from the document. In the depiction, the selected and previewed report is the Channel Summary Report, which lists the channel annotations in a printer-friendly way suitable for download or printing.

As the annotations described: 1) evince a complex implementational embodiment incorporating copious markup rewriting to produce durable markup spans and enable statistical queries of e.g. modality and adjoinment, or conditional display in combination with hierarchical logical and potentially composite annotation, or multiple-span annotation records operative to train neural network ensembles for framing analysis; and 2) they receive inference judgments upon the three questions of channel identification, bag of tags imputation, and tag-several, channel-conditional polarity estimation, and not mere text or inline markup, the inference and annotation browser provides a facility to the user to view human and machine inferences in a manner similar to the sentence browser, such that data and metadata including e.g. the annotation text, complexity, and available tags or coincident named entities on the annotation can be displayed conveniently to the user.

In accordance with one embodiment, congruent to the implementation of the sentence spinner tool, the user may use left and right arrow buttons to click to advance or retreat their selection between a number of channel-filtered alternatives, or enter a specific index corresponding to encountered instance count in a free text entry field which may be made operative at the top of the spinner control, e.g. where the numerator of (e.g. the 1 of 1 of 5) may appear. To make convenient the selection of channel groups the user may deem relevant, especially in the case of pooling channel sets into a large combined channel set, a user may, by the instrumentality of a multiple selection dropdown UI element similar to the one used in the token trend tool, select a subset of channels to be represented in the available range of human annotations or machine inferences accessible via paging through or directly changing the state of the spinner UI element, narrowing down the number of annotation or machine inference records which may be locally available in the annotation datum file.

Figure 30:
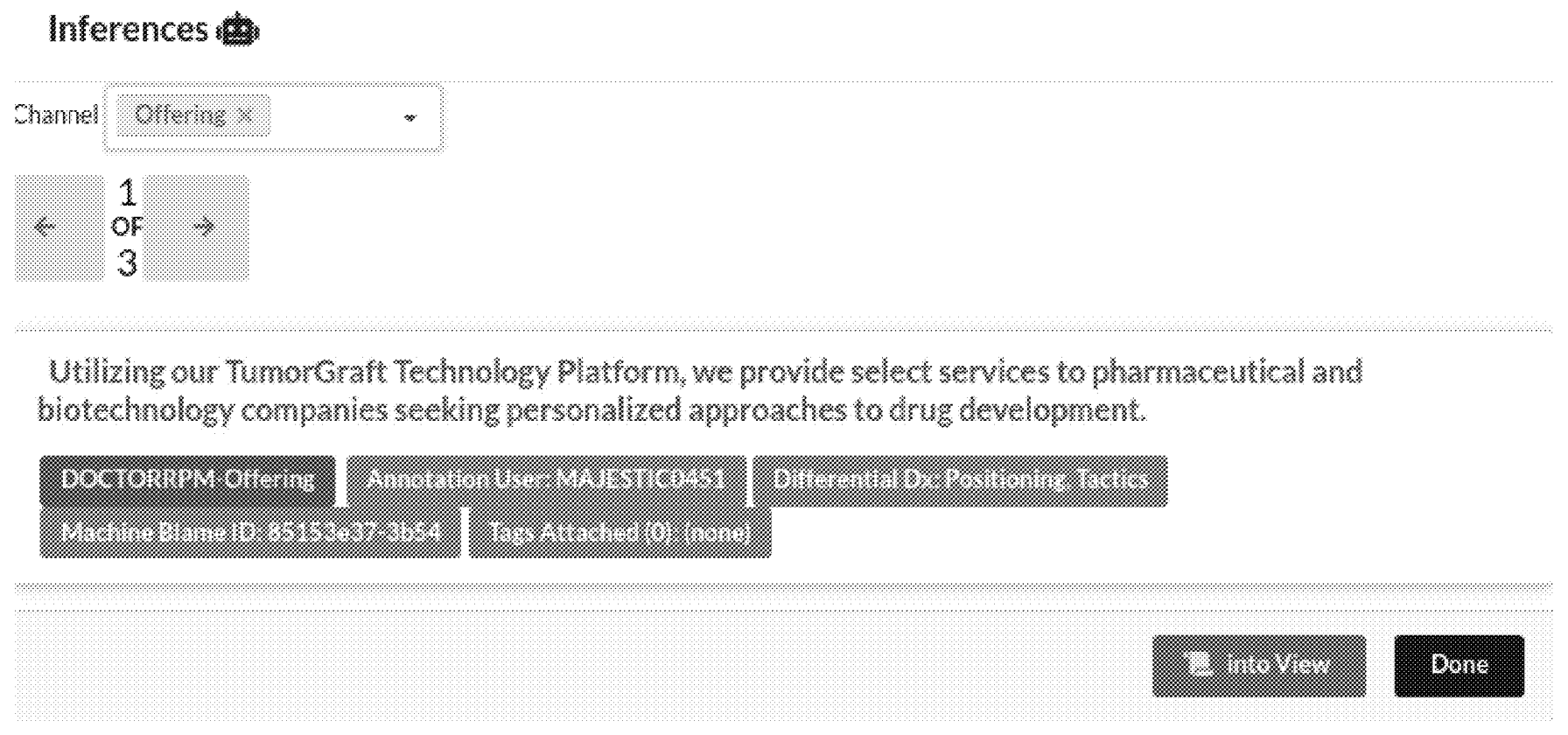

FIG. 30 shows a view of the inferences metadata tool which, in accordance with one embodiment, allows navigation through the inferences made by the system analogous to human annotations for which there may be a visually and logically corresponding tool. Rather than merely listing text, the annotations or inferences may be displayed alongside relevant annotation metadata, which may include annotator usernames or neural network model version identifiers or 2nd and 3rd place annotations.

The dashboard tier of the application includes a plurality of interactive visualizations and UI elements and controls suited to accomplishing the task of entity performance and semantic analysis. In an embodiment related to the field of equities analysis, the dashboard's primary performance data may be derived from the stock price time series, OHLC data, and fundamentals analysis indicators such as the debt-to-equity ratio, the market capitalization, the operating cash-flow, the enterprise value, and the shares outstanding. The primary semantic data may be derived from the summary files of, e.g. channel identification count, event-related tag data, and vector embedding representations of the document.

The performance time series may, in accordance with one embodiment, be displayed in an interactive line plot. The line plot may comprise one or more data series. In typical use, the primary data series may be the only data series plotted unless an analytic signal comprising one or more data series deriving from the performance time series or other peripheral performance indicators is applied. In an embodiment relating to equities analysis, the performance time series may be augmented optionally via the application of technical analysis indicator lines and supporting plot elements, such as added points or thresholds. The user may select, as by the instrumentality of a UI dropdown box control containing the names of the technical analysis methods, a method they wish to see applied, and zero or more series and their supporting elements appear upon the line plot providing analytic facilities, including but not limited to: thresholds or lines suggesting when a stock may be oversold; smoothed versions of the time series; increase and decrease quantiles; suggestions to sell or buy the stock; and so forth.

Examples of technical analysis methods common in the financial analysis industry which can be made available to the user include well-known methods such as: SMA, WMA, HMA, MACD, AROON, CCI, Stochastic Oscillator, ATR, Supertrend, Fibonacci Retracement, Donchian and Keltner channels, and Ichimoku clouds. In accordance with one embodiment, zero or more technical analysis methods may be applied to the plot and removed by making an alternate selection in, e.g. the dropdown UI control. Either in response to an election that may be made, as by the instrumentality of a checkbox by the user, or by the system if it judges that the alternate plotting mode may be necessary because of the ordinate dynamic range of the plot series, the augmenting signal lines may be plotted, optionally, along with the original line in one or more separate plots appearing in one or more modal auxiliary plot dialogs.

In addition to the analytic signal lines, in accordance with one embodiment, the time series plot may also cause to be displayed an abscissa reference line corresponding to a specific point in time, such as, in an embodiment related to equities analysis, the publication date of a quarterly report 10-Q. The abscissa reference line may be triggered to appear on a specific date by multiple instrumentalities, such as clicking upon a square corresponding to a day in the calendar raster plot or entering a date in a text box, and its corresponding manifestation may appear in other visualization areas with a corresponding chronological domain, such as the semantic time series, or, in an embodiment related to equities analysis, a candlestick plot.

Additionally, in accordance with one embodiment, the line plot may be underlain with a UI control functioning equivalently to a checkbox or toggle switch which permits the time series control to enter a "semantic" mode when the user enables the toggle, affecting this analysis region as well as other analysis regions (such as: in an embodiment related to equities analysis; a dynamically-windowed candlestick plot; price to semantic channel count correlation; and fundamentals analysis statistical display regions), whereby the original performance time series will be replaced or deemphasized by the semantic channel-count time series derived at the artifact level of summarization.

In accordance with one embodiment, transiting the mouse cursor along the performance time series updates the data cursor which displays the primary performance measurement at the chronological point clicked in addition to any analytic signals, but it also advances one or more yoked visualization elements, such as the semantic count radar charts or, in an embodiment related to equities analysis, the dynamically-windowed candlestick plot (as may lead from, or center about, the chronological point in time corresponding to the horizontal position along the performance time series plot as transformed through the scaling function in the plot metadata). In the case of the radar charts, the system may update the radar charts to reflect the last encountered semantic channel-count data moving through time rather than requiring an exact coincidence of the mouse-sampled time point and, e.g. a report publication date. To prevent the user inadvertently changing the focal date when they wish to transit to a different analysis region, an inhibition-of-return cooldown mechanism may be specified wherein after an action such as clicking or double-clicking on the time series plot, a timestamp may be registered which may be checked for currency (e.g. issued in the last 10 seconds) by any internal plot update event, quashing the event if the cooldown or waiting period triggered by the more deliberate user action has not been satisfied. In this way, a user may find a date on the performance time series, click to fix the date and then quickly transit in any direction towards perhaps a candlestick plot or radar chart without fear that the focal date may be spuriously advanced, a mechanism that may be particularly useful for desktop users over single or multitouch input entry mobile or tablet users who can avoid the spurious transiting problem entirely.

Figure 31A:
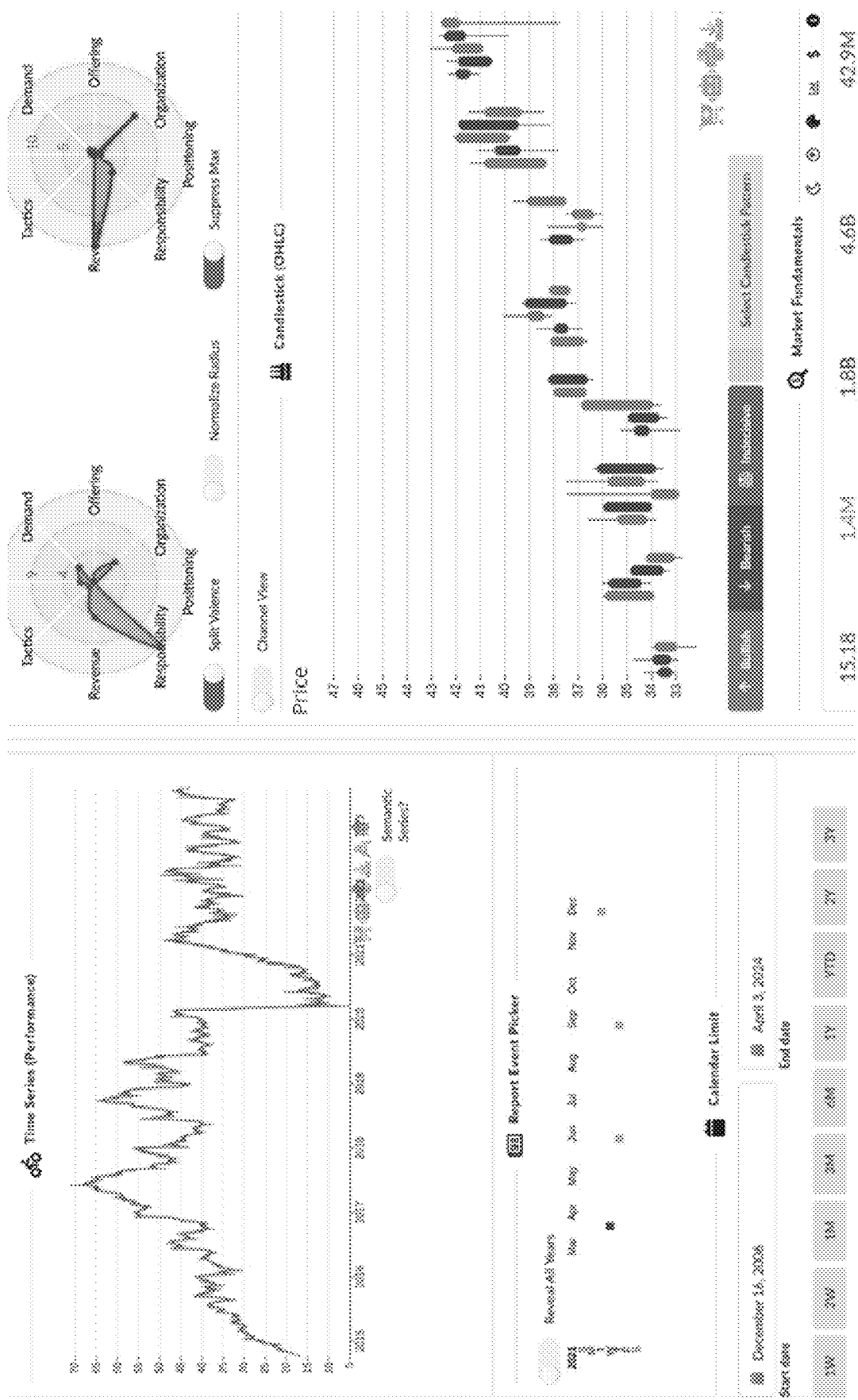
FIG. 31A illustrates the upper portion of the dashboard tier of the application, in an embodiment related to equities analysis, and in a performance mode emphasizing the performance time series with a candlestick plot connected to a calendar control and one or more radar plots.

FIG. 31A shows a view of the dashboard tier of the application, in an embodiment related to equities analysis, and in the performance mode emphasizing the performance time series and a candlestick plot connected to a calendar control and one or more radar plots. The dashboard's upper section is visible and it is configured in a mode to preference the display of performance related data, such as the time series of price, and the candlestick plot corresponding to OHLC data. Semantic channel count data may also be visible in the radar plot section which changes to track activity when a focal date is set by moving across the time series or by setting a focal report by clicking upon a report-corresponding square in the calendar raster plot, also advancing the dynamically-windowed candlestick plot. A technical indicator dropdown box related to an embodiment related to equities analysis allows the application of a standard technical analysis indicator such as the Simple Moving Average, the Moving Average Convergence Divergence, and the Exponential Moving Average (red overlay series).

Figure 31B:
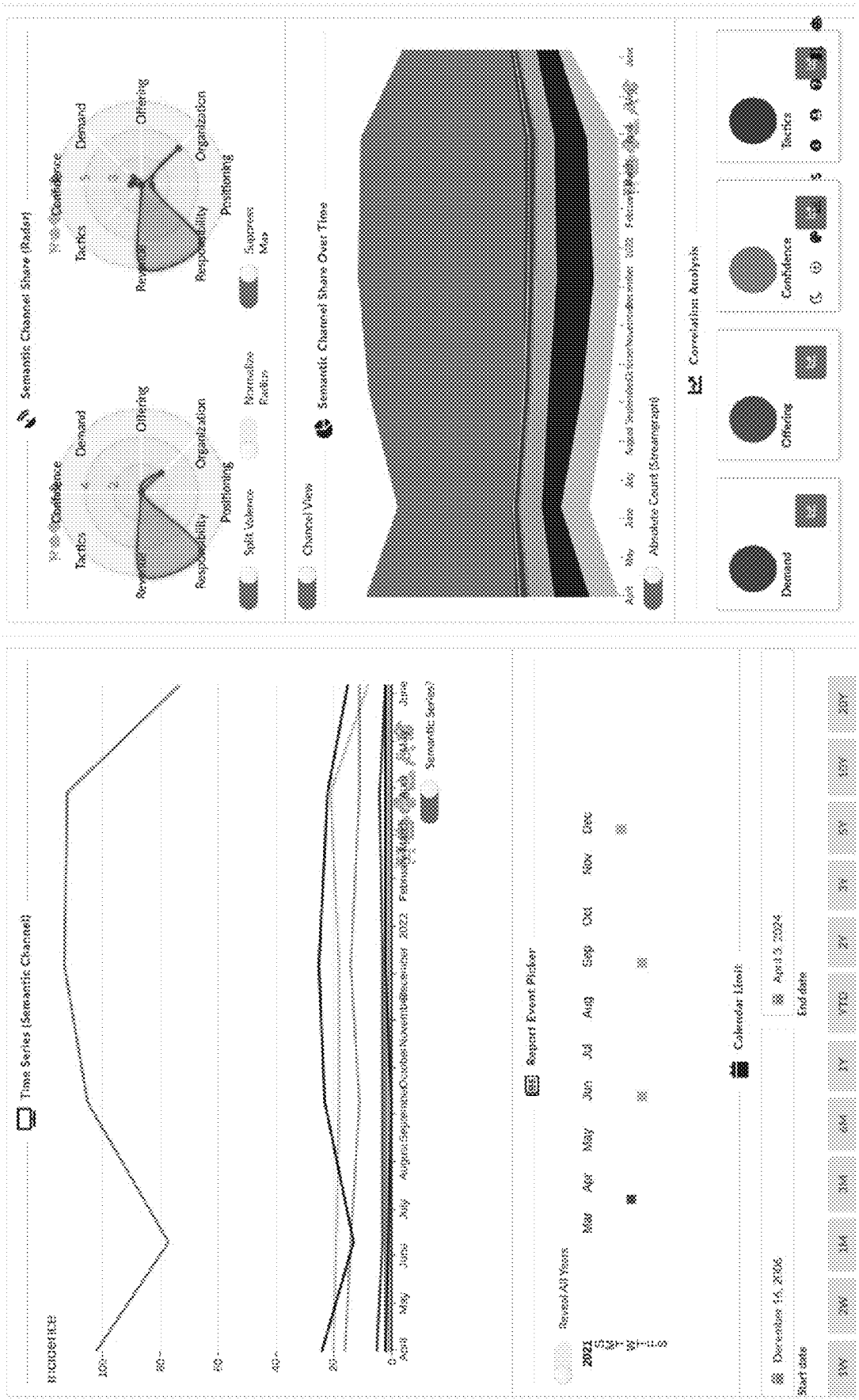
FIG. 31B illustrates the upper portion of the dashboard tier of the application, in an embodiment related to equities analysis, and in a semantic mode emphasizing channel count visualizations.

FIG. 31B shows a view of the dashboard tier of the application in an embodiment related to equities analysis, and in the semantic mode emphasizing channel count visualizations. The dashboard's upper section is visible, including an area chart such as a stacked area chart or a streamgraph emphasizing the share of channel count data in a different, diachronic way to the channel count data in the radar plots (which refer to a specific artifact/report). The performance time series (i.e. price) plot has been replaced with a semantic series, giving yet another redundant view of channel count data.

The semantic count data may be purposefully displayed in a number of redundant ways, and via a plurality of visualization elements, so as to increase the chance of a user realizing the potential effects performance data exerts upon semantic data across artifact publications and the potential effects semantic emphases in the artifacts bear upon performance. In accordance with one embodiment, in addition to the semantic channel-count time series referenced in contrast to the performance time series and conspicuously available in the semantic view mode, one or more radar plot UI elements display semantic channel-count data.

To review the radar plot paradigm, channel identification types (e.g. Money, Demand, Confidence) may be assigned different radial axes, and the counts for each type load onto the axes to create, e.g. a convex shape. Available radar plot configurations for displaying unconditional and conditional channel-count data include, but are not limited to: combined channel count data unconditional on identified polarity (e.g. grouping positive and negative and neutral valence channel identifications); positive polarity channel identifications only in proximity to negative polarity channel identifications only, i.e. shown simultaneously so the user may gain an appreciation of the positive vs. the negative channel counts.

In accordance with one embodiment, as previously mentioned, the radar plots may be regenerated upon the application registering a new focal report or focal date of interest, as by a date picker UI control, or clicking upon the day squares in a calendar raster plot, or transiting the mouse across the performance or semantic time series. The user may select display options (e.g. through the instrumentality of one or more toggle switch UI elements) for expanded convenience of comparison including, but not limited to: splitting a combined valence radar plot into its positive and negative twinned decompositions; normalizing the radius of the simultaneously displayed plots to an encountered-in-common maximum value so that plots of different valence remain visually commensurable instead of relying on individual dynamic determination of plotting range; and suppressing the maximum encountered-in-common axis as would permit meaningful shape analysis of the radar plot in the presence of a large outlier category (e.g. in an embodiment related to equities analysis, a Money or financialization channel dominating all other channels in firms with short filings that may tend to list primarily new or ongoing sources of funding over time spent devoted to describing organizational initiatives, partnerships, new markets, or technologies in development).

Figure 32A:
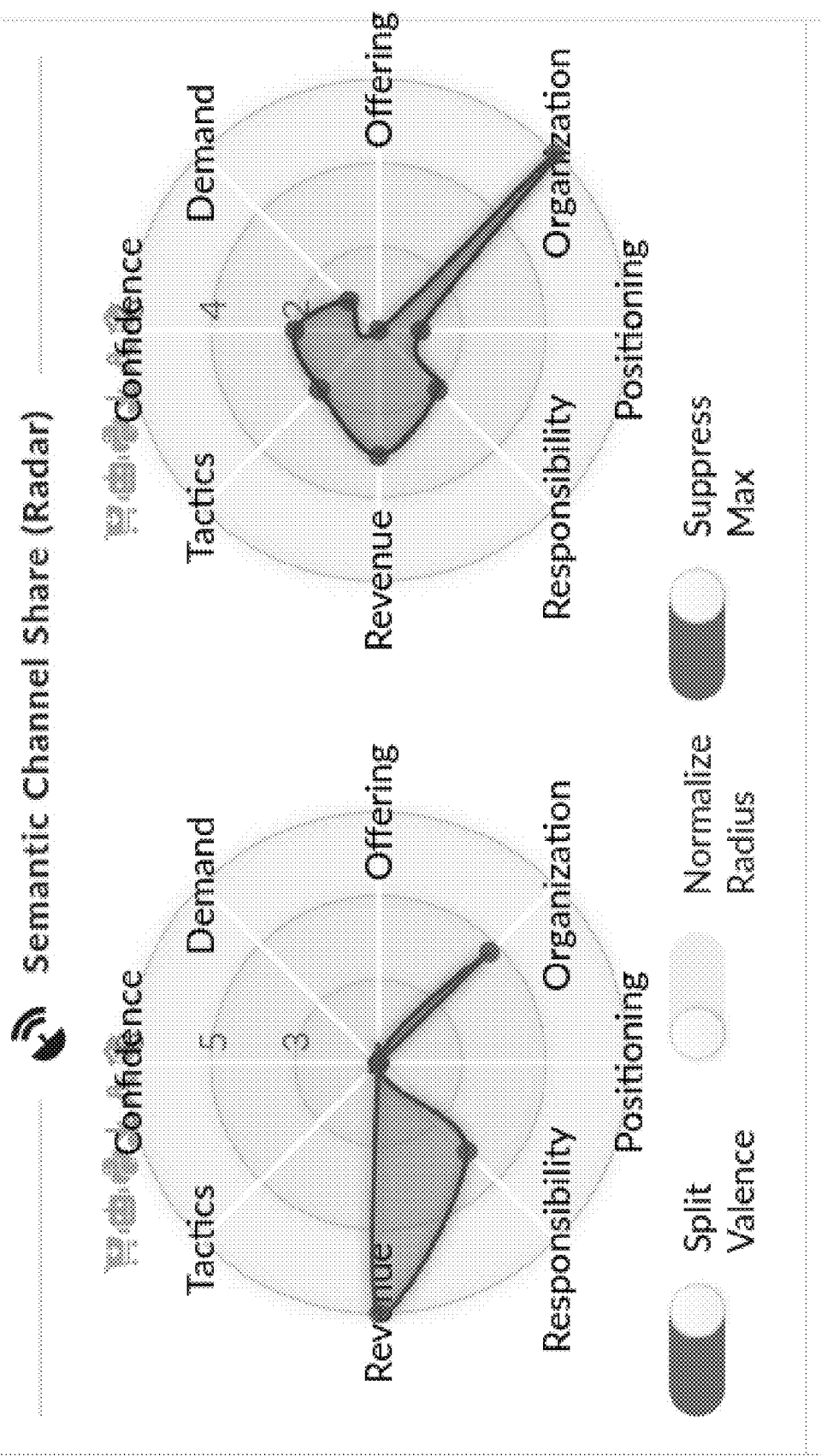
FIG. 32A illustrates semantic channel count data radar plot visualizations configured in a mode to split the channel count data into positive polarity and negative polarity counts.

FIG. 32A shows, in accordance with one embodiment, a view of the semantic channel count data radar plot visualization configured in a mode to split the channel count data into positive polarity and negative polarity counts. Visible may be similar options to remove the most frequently occurring axis in the case that it is an extreme outlier, and to normalize the maximum achievable magnitude on any axis by a maximum computed in common.

Figure 32B:
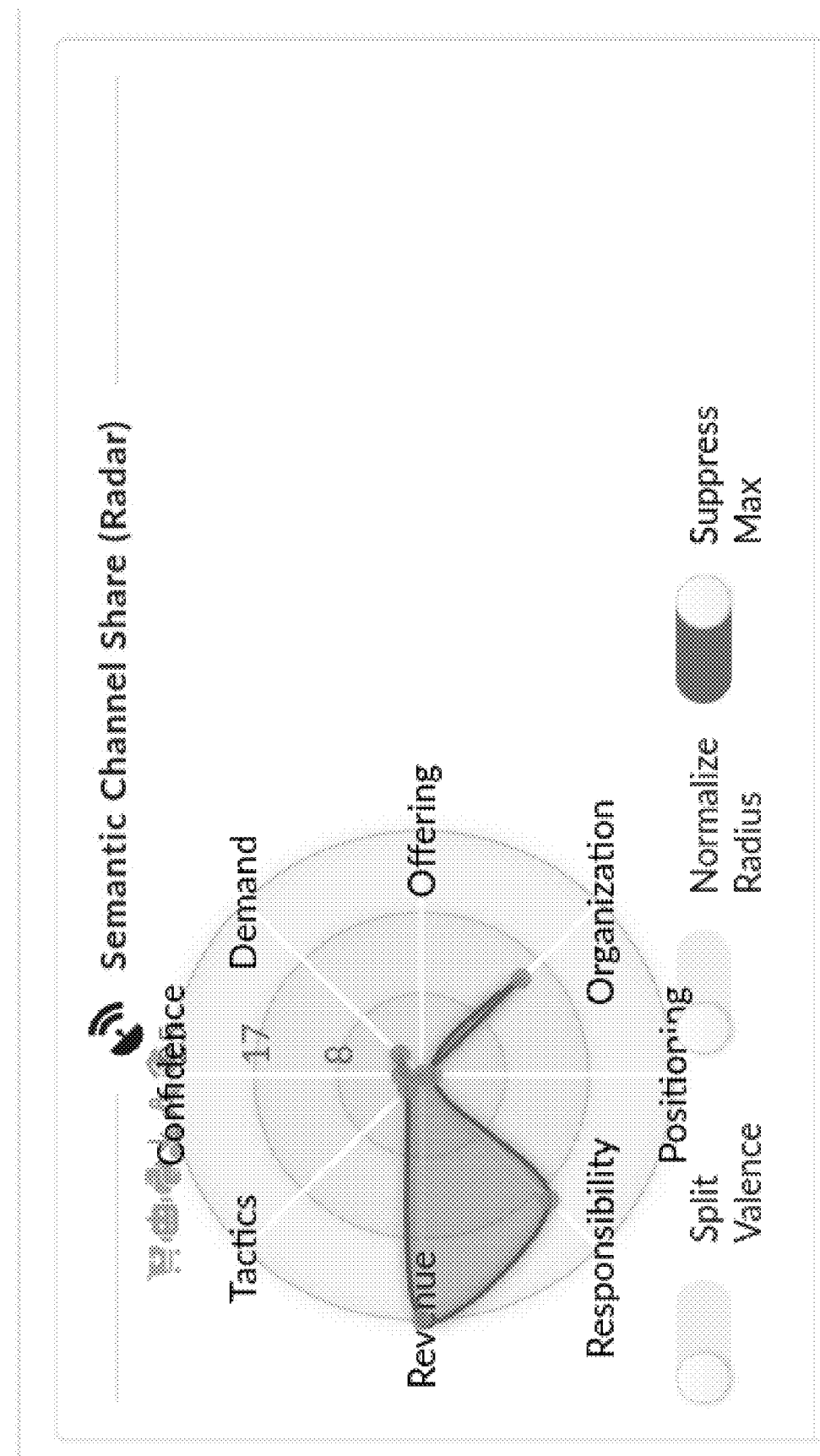
FIG. 32B illustrates semantic channel count data radar plot visualizations configured in a mode to not split the channel count data into positive polarity and negative polarity counts, which instead combines the negative, neutral, and positive polarities.

FIG. 32B shows, in accordance with one embodiment, a view of the semantic channel count data radar plot visualizations configured in a mode to not split the channel count data into positive polarity and negative polarity counts, encompassing negative, neutral, and positive polarities.

In accordance with one embodiment, a further redundant recapitulation of semantic channel-count data may be embodied in the form of an interactive areal plot visualization such as a stacked-area chart or a streamgraph UI element, where the channel-count data over historical time may be visualized as regions which wax and wane across abscissal time. In the stacked-area chart visualization, the proportion of channel counts (which may be considered unconditionally or conditional upon a single polarity) may be emphasized, and for each abscissal sample point in time a vertical share of the plot may be apportioned in relation to the proportion of the channel-specific counts of all operative channel-specific counts. The reference abscissa line which appears on the performance time series visualization and the semantic time series visualization and, in an embodiment related to equities analysis, on the candlestick plot visualization also appears in these area plots, yoked to the selection of the focal date as elected by, e.g. clicking on an artifact-corresponding date in the calendar raster plot control.

In accordance with one embodiment, the user may select, as by the instrumentality of a toggle button UI control, to see "Absolute Counts", at which point the system may cause to appear in place of the stacked area chart a "streamgraph" which considers absolute counts and not proportions, thus losing the preservation of equal totally filled plot area over time but gaining a means to display the relative scale of channel counts over time (e.g. as may make plain the greater length of reports over time). In either the streamgraph or the stacked area chart, certain regions colored in accordance with the colors joined to the channels in a channel-set definitions manifest (as elsewhere in the application) may become extinct or emerge at specific chronological time points suggesting extreme de-emphases of a persuasive or rhetorical avenue of appeal over time, or renewed or emergent emphases of a persuasive or rhetorical avenue of appeal over time.

In accordance with one embodiment, clicking upon one of these area charts will make available, as by the instrumentality of a popup tooltip UI element, information including, but not limited to: the channel name corresponding to the clicked region; the channel count at the closest matching or temporally last achieved closest matching point in time; the corresponding percentage; and the date used for matching. A small data cursor object (such as a circle) may make this date correspondence explicit by snapping to a specific date abscissa and an ordinate position at the top or bottom extremity of the channel-specific region, such that the user can distinguish unsampled time from sampled time points regionally.

Figure 33A:
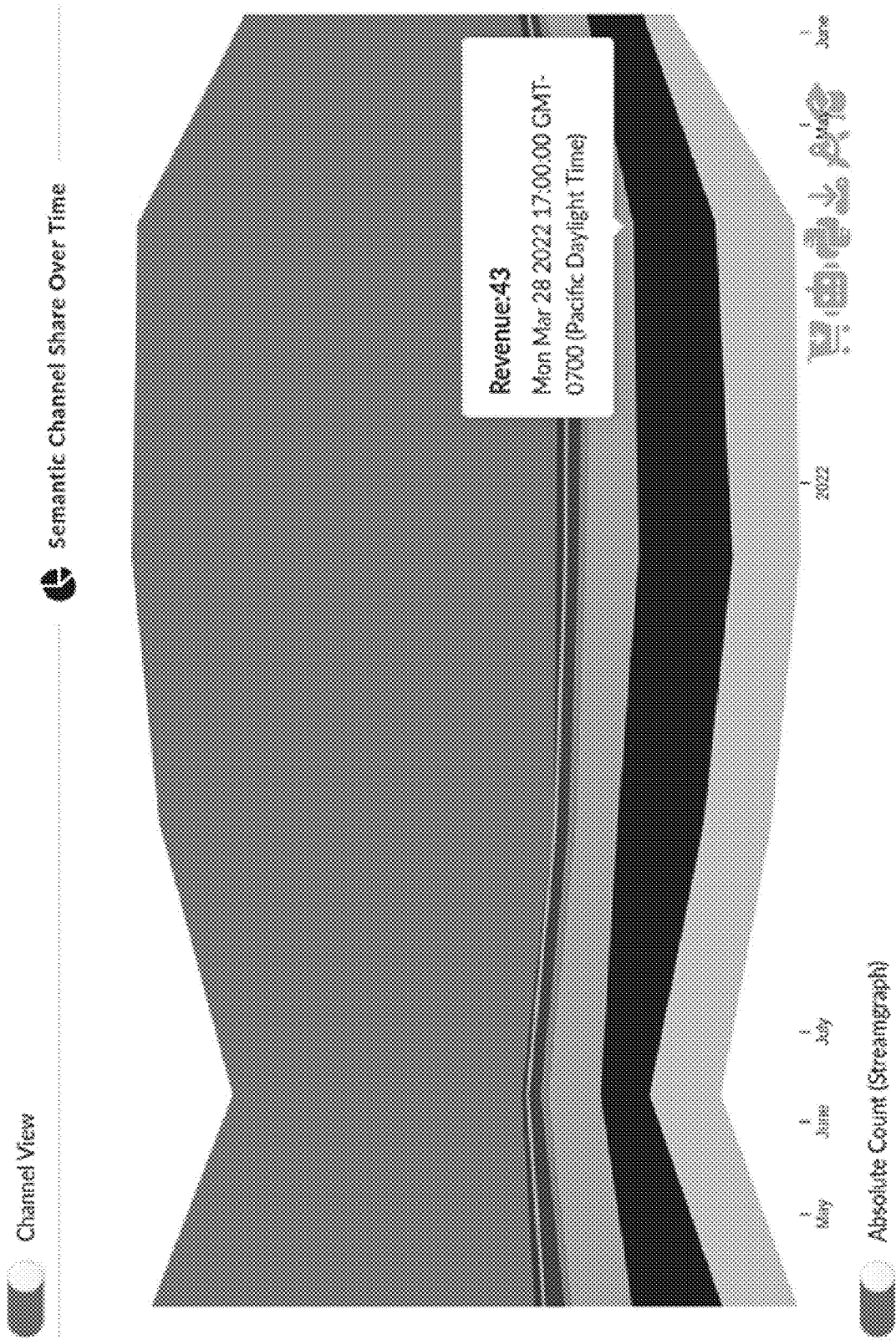
FIG. 33A illustrates an area chart visualization in streamgraph form emphasizing absolute channel count numbers in addition to the percent share of the channel count at a particular artifact incidence time in accordance with one embodiment.

FIG. 33A shows a view, in accordance with one embodiment, of the area chart visualization in the streamgraph form emphasizing absolute channel count numbers in addition to the percent share of the channel count at a particular artifact incidence time. A reference abscissa line set by clicking on the calendar raster plot square corresponding to an artifact/report may be visible here. The colored slices may be apportioned vertical extent in proportion to the channel counts (unconditional of polarity). Clicking on a region may cause a data query cursor to snap to the top of the region at a defined domain point so the user can appreciate exactly when the height was changed by an artifact publication, and a popup may appear with information including the time corresponding to the snapped-to point, the channel slice channel name, and the channel slice channel count.

Figure 33B:
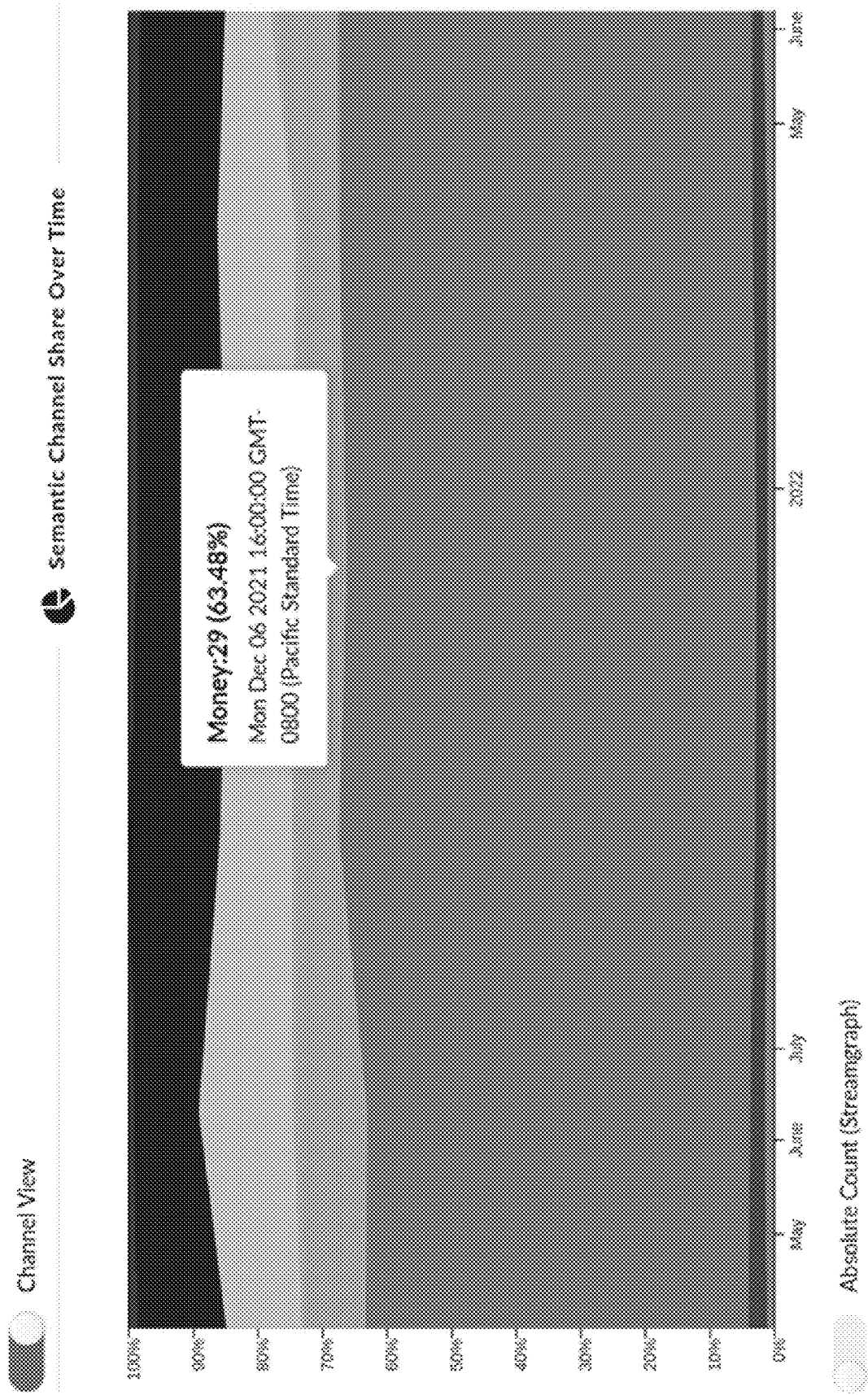
FIG. 33B illustrates an area chart visualization in stacked area form emphasizing percent share of the channel count at a particular artifact incidence time in accordance with one embodiment.

FIG. 33B shows a view of the area chart visualization in the stacked area form emphasizing percent share of the channel count at a particular artifact incidence time.

In an embodiment related to equities analysis, the conventional candlestick plot used in the field of financial analysis may appear (e.g. if the Semantic View mode is not engaged). This candlestick plot has its domain dynamically adjusted to a subset window conditioned upon making central or otherwise defined within the domain of the plot the focal date determined as before, as by, e.g. transiting over the performance time series, selecting a calendar raster plot square, or similar. In line with conventions of candlestick plots in the financial industry, the data may color the candlestick elements according to their opening and closing price (e.g. a candle may be displayed as red because its closing price was below its opening price).

Clicking upon the body of a candle, or its low and high process whiskers, may cause to be displayed, via the instrumentality of e.g. a popup UI element control, information including but not limited to: the date represented by the candle; the category of the day corresponding redundantly to red or green; and the individual Open, High, Low, and Close data; as well as potentially trading volume information and other trading day relevant indications (e.g. technical analysis indicators computed for that day) or textual summaries (such as generated narrative descriptions for anomalous days) useful for financial analysis. The reference abscissa line initiated, for instance, by clicking on one of the calendar raster plot squares, and represented in common with the yoked versions in the performance time series, semantic time series, and stacked area and streamgraph plots, may be displayed over the appropriate candle, or, if the line should appear at a location not within the window, at the appropriate horizontal extremity of the window, e.g. at the right edge of the plot for a date in the locally-relative future, and at the left edge of the plot for a date in the locally-relative past outside the bounds of the plot's temporal window domain.

Figure 34:
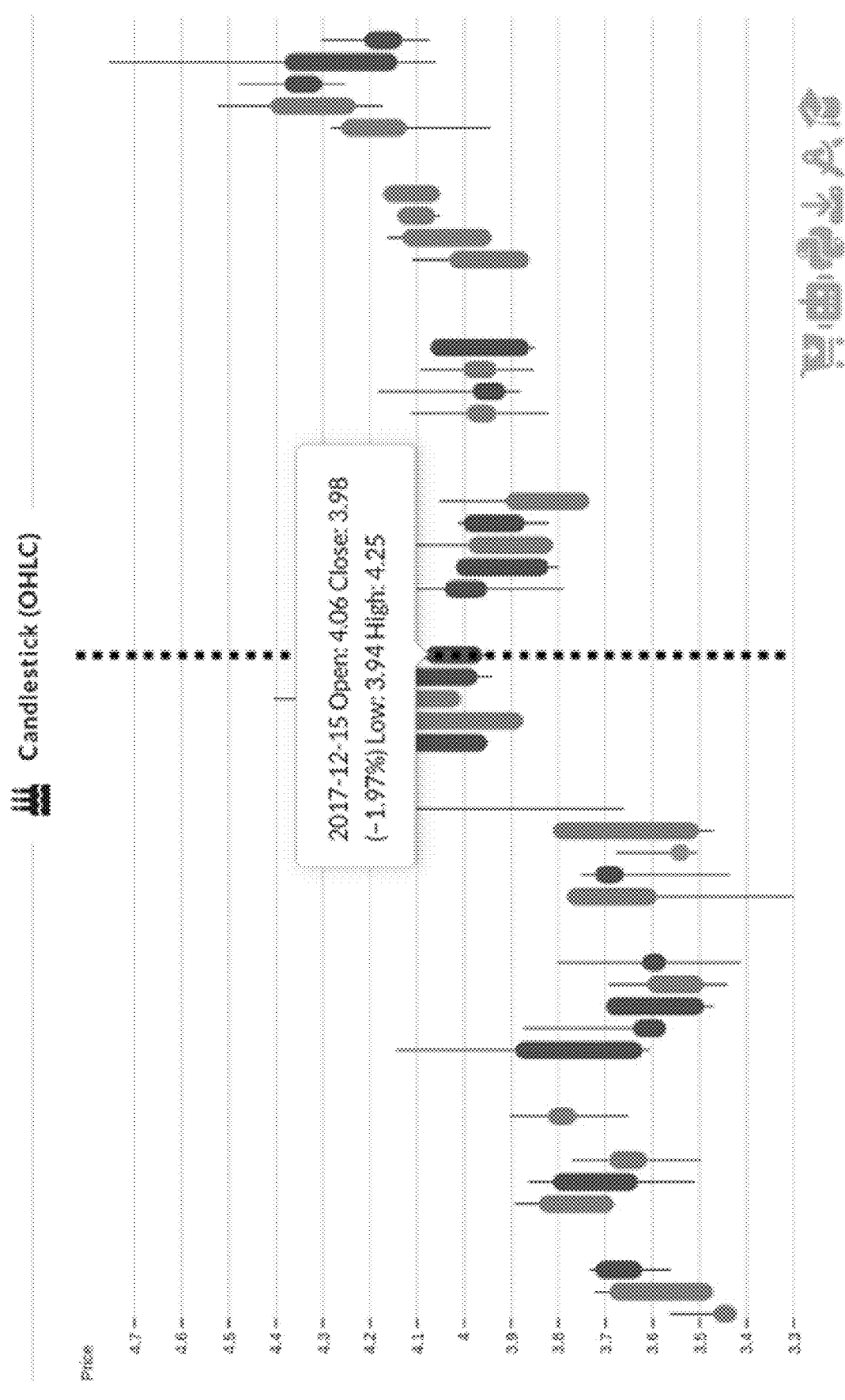
FIG. 34 illustrates a candlestick plot with reference abscissa line associated with a focal report date in accordance with one embodiment relating to equities analysis.

FIG. 34 shows a view of a candlestick plot associated with an embodiment related to equities analysis, with a reference abscissa line associated with a focal report date. The line may be centrally visible and might appear after an artifact's square on the calendar raster plot UI control was clicked. Clicking on a candle may display information including the data, the open, the close, the low, and the high price (and may further display, e.g. pattern analysis or qualitative candlestick analysis or trading volume data)

Further, in an embodiment related to equities analysis, the system may cause to be displayed a pane of relevant fundamental analysis indicators, such as the Operating Cashflow, the EBITDA, the Gross Profits, the Total Revenue, or the Average Volume. These listings may take the form of, for instance, a list of spaced-out, center-justified, magnitude-truncated form (e.g. 25.5M, 15B) numbers for the statistic above or below the name of the statistic. The system may color these statistics in a number of ways as advised to the user: e.g. the system may color each statistic black; the system may color each statistic according to a category related to clusters of statistics or related to the channel colors established for the channel set and used elsewhere in the application; and the system may color each statistic according to whether machine learning done with a model such as a random forest, or a support vector machine, or a neural language, or symbolic rule-based expert system considers the statistic in light of other related statistics to be, e.g. Abysmal, Poor, Fair, Good, or Excellent. One or more statistics may bear info buttons that cause informational tooltip popup UI elements to expose a description of the statistic, and, in the evaluative judgment mode just described, the reason the number is colored in line with a suggestion that it may be encouraging or worrying.

FIG. 35 shows a view of the fundamental analysis indicators display panel, which displays performance fact data in an embodiment associated with equities analysis. In a specific embodiment, the display panel may also display data lineage data when a button next to each indicator or fact is clicked detailing the date of effective calculation of the figure. Facts are here colored at random but in one specific embodiment, rules may be learned for coloring the facts in congruence to their encouraging nature or discouraging nature as encoded in a learned relational rules or machine learning system for determining when an indicator may be anomalous.

Figure 36:
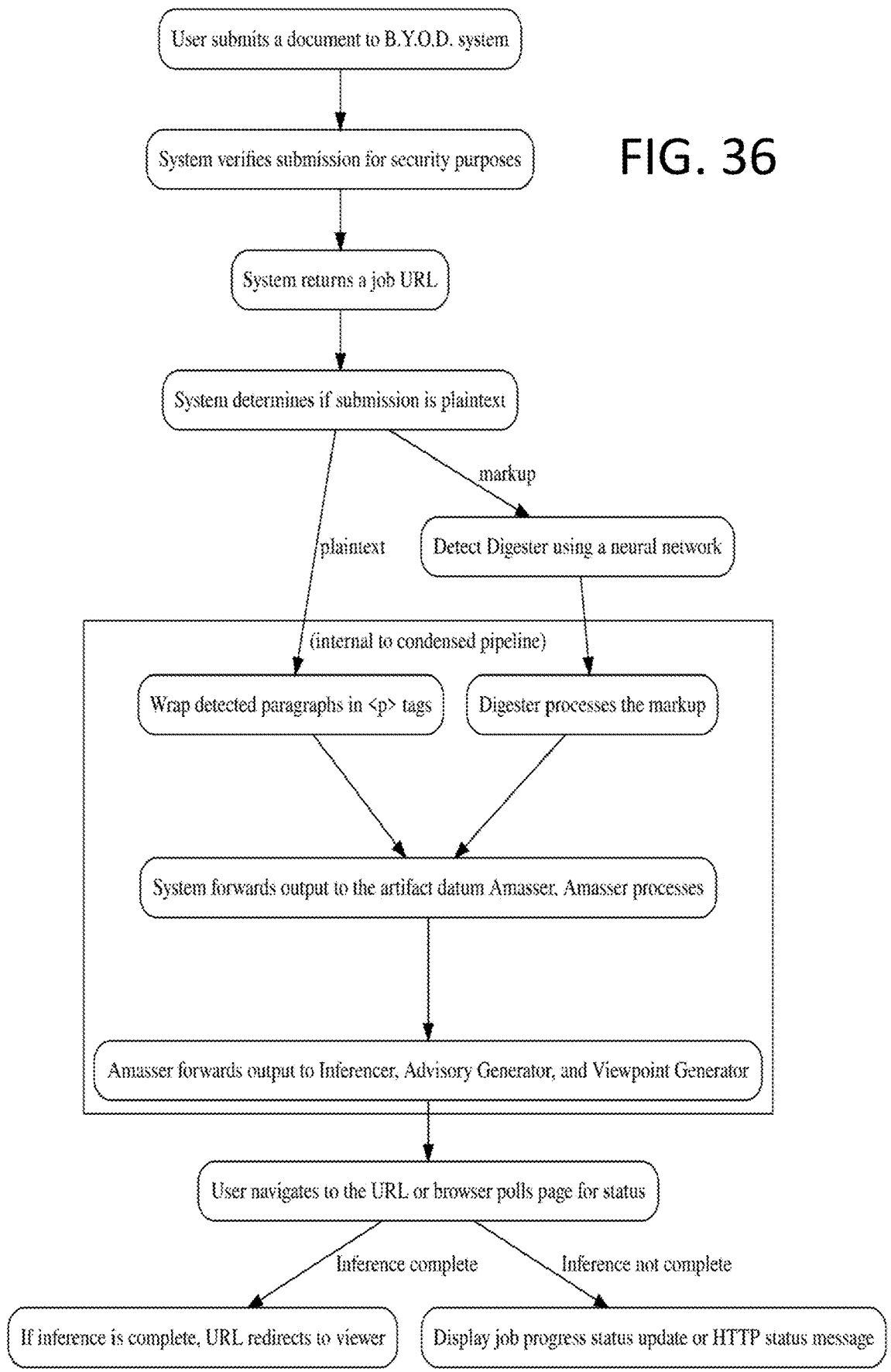
FIG. 36 is a flowchart detailing the high-level operations of a Bring Your Own Document mode which adapts the system to viewer-centric analysis of custom user-supplied documents on a condensed and potentially privately contained data pipeline in accordance with one embodiment.

FIG. 36 provides a flowchart detailing the high-level operations of a Bring Your Own Document mode, in accordance with one embodiment, which adapts the system to viewer-centric analysis of custom user-supplied documents on a condensed and potentially privately contained (e.g. for processing atomicity) data pipeline.

The calendar raster plot control, in accordance with various embodiments, enables the user to pick a new focal artifact (e.g. in an embodiment related to equities analysis, a specific quarterly or annual report) which may tend to cause the system to select a coincident focal date for the purposes of updating the visualizations and unpooled entity and tag listings. The calendar is termed a raster plot for the purposes of this application owing to the similarity between an array of spaced event squares and the firing spike raster plots encountered in the neurosciences. Each square in the raster plot may be colored according to the artifact class (e.g. 10-Q receives a light green color, 10-K receives a dark green color), and the days may be subplot segregated by calendar year, where the vertical axis specifies the weekday and the horizontal axis specifies the calendar month. The calendar raster plot, in the course of its normal operation, adaptively displays one year at a time, corresponding to a current focal date, which may be updated as previously mentioned, e.g. by transiting the mouse cursor over the performance time series and encountering artifact dates, or by transiting the mouse cursor over the semantic time series where each defined point definitionally represents an artifact date.

In accordance with one embodiment, the user may elect to view all or most years with performance or semantic history in the system, or all years currently configured to be visible within the system by means of an instrumentality identical or equivalent to a toggle switch UI control (e.g. bearing a caption such as "Reveal All Years"). Upon enablement of the toggle switch control, the enclosing UI element may cease to perform its adaptive data cursor following functions and cause to appear a series or paginated series of years displayed in the same raster plot format. In either configuration, clicking upon an artifact's (or artifact date's, as in the case of multiple artifacts, the selection of one of which can be settled with a disambiguation control offering multiple buttons captioned with an artifact identifier) square may cause a UI popup control to be issued in the vicinity of the square, bearing information including, but not limited to: the filing date or preparation date or the qualified compliance date of the artifact; the semantic channel counts of the artifact, broken down to positive and negative channel identifications and jointly tabulated over positive, negative, and neutral channel identifications; abbreviated tag and entity incidence data; and a LLM-generated summary of the report.

Within the popup control may also be buttons made available for the convenience of the user, including, but not limited to: a button specialized to the data source system, which, if appropriate for the domain, may take the user via a browser redirect or generated hypertext link to the original data source or an approximately similar source of data (e.g. in an embodiment related to equities analysis, the button would take the user to the SEC's summary page or the XBRL viewer for the primary document of the filing, as opposed to the plaintext and encoded file transmission record); a button which opens the artifact in the artifact viewer/annotator by means of a browser redirect or generated hypertext link affording convenient user traversal to an artifact without having to place its artifact identifier in a URL query string (e.g.
/annotator.html?docuid=0000771856_
000162828017012357); and a button for "Tags & Entities"

listing which will scroll the dashboard page down to the tags and named entities section and change the focal date to one of the dates associated with the report metadata such that when the tags and named entities listing area is not configured to pool multiple or all reports, the listing area conspicuously displays the relevant date alongside (or otherwise in the immediate vicinity of) a categorized listing of available tags and named entities discovered in the particular report.

In accordance with various embodiments, the listing of the tags and named entities may be comprised of multiple grouping areas corresponding to, e.g. named entity types (e.g. Organizations, Regions & Geopolitical Entities, Temporals, Works of Art, Nationalities or Religious/Political Groups) which contain postings lists listing the entity text (e.g. SEC, Wyoming, October, COVID-19, Latin American) and the entity count, as well as document jump buttons in the case of pooling over a range of documents (e.g. a button D22 takes the user to the 22nd document by means of popping up the tooltip popup which ordinarily would be accessed by means of the calendar control, which in turn may afford quick access to the document by means of the annotator link button, and to which link may be added an entity identifier which could cause the annotator to open to the selected document and then immediately to the named entities browser network tool with a focus upon the entity group corresponding to the group in the dashboard where the action originated).

In accordance with various embodiments, as with the transition between application tiers of the entity universe or competitive map view tier to the dashboard tier, which may possess a similar button in the dashboard for the means of user traversal to the higher universe view in addition to e.g. a tooltip button to descend from the universe view into the dashboard view, the most subordinate artifact viewer tier may, where metadata about the reporting entity may be available within the artifact datum, cause a button to appear in the viewer (e.g. with an up arrow icon) which can allow the user to transition (e.g. back) into the entity view (dashboard tier) from the artifact view (viewer tier).

Figure 37A:
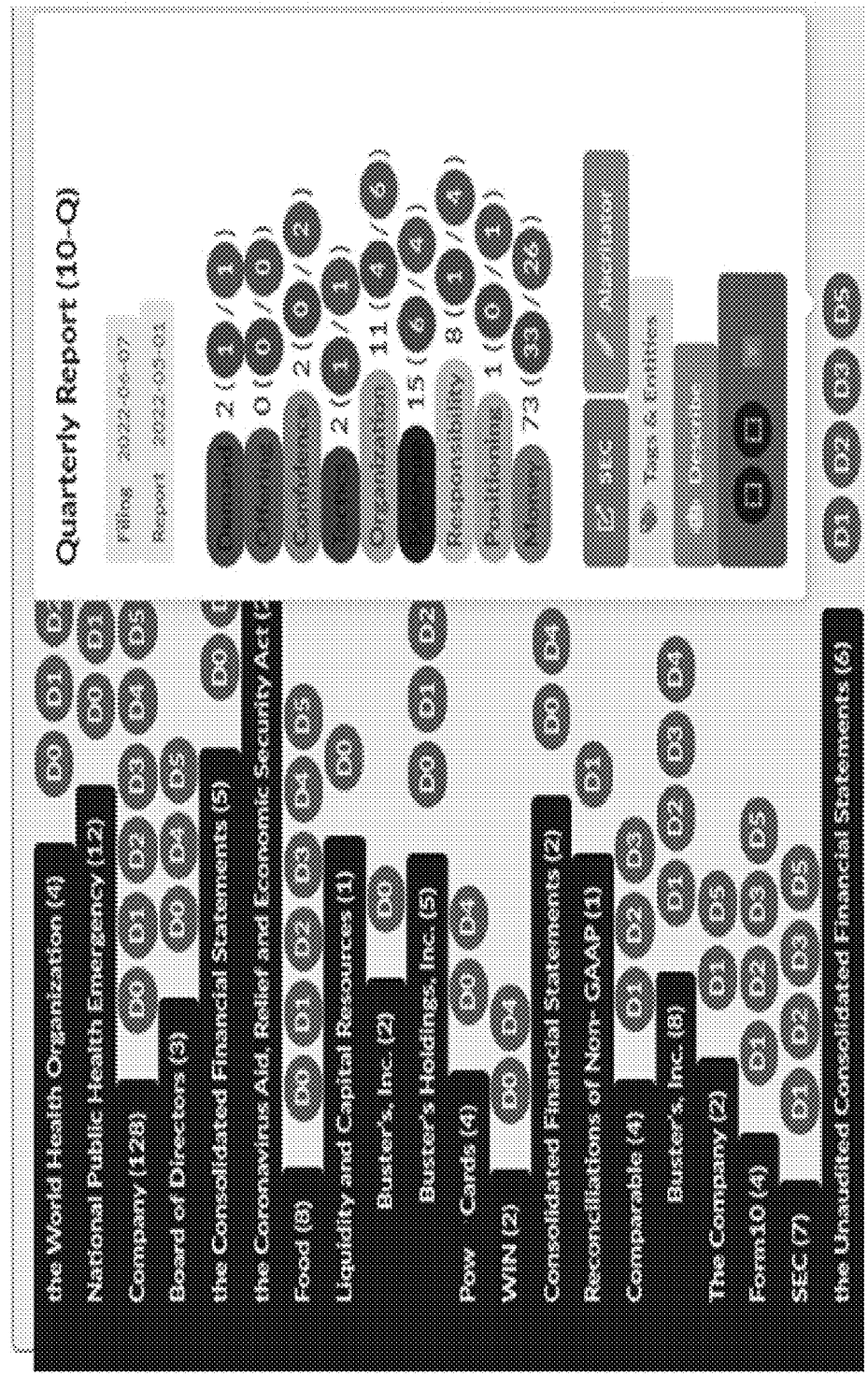
FIG. 37A illustrates a tags and named entities postings/incidence list data display area, focusing on exhibited named entities in pooled date range mode in accordance with one embodiment.

FIG. 37A shows a view, in accordance with one embodiment, of the tags and named entities postings/incidence list data display area, focusing on exhibited named entities in pooled date range mode. Named entities may be listed with their text, grouped by their category, and buttons may be made available, which, when clicked, cause the appearance of the artifact detail popup (e.g., D14 for Document No. 14) otherwise summonable through clicking on nodes in the artifact graph view or squares upon the artifact incidence calendar raster plot. The unpooled (e.g. single day view) may be invoked, e.g., by a toggle and using the calendar or by clicking a Tags & Entities button in the detail popup.

Figure 37B:
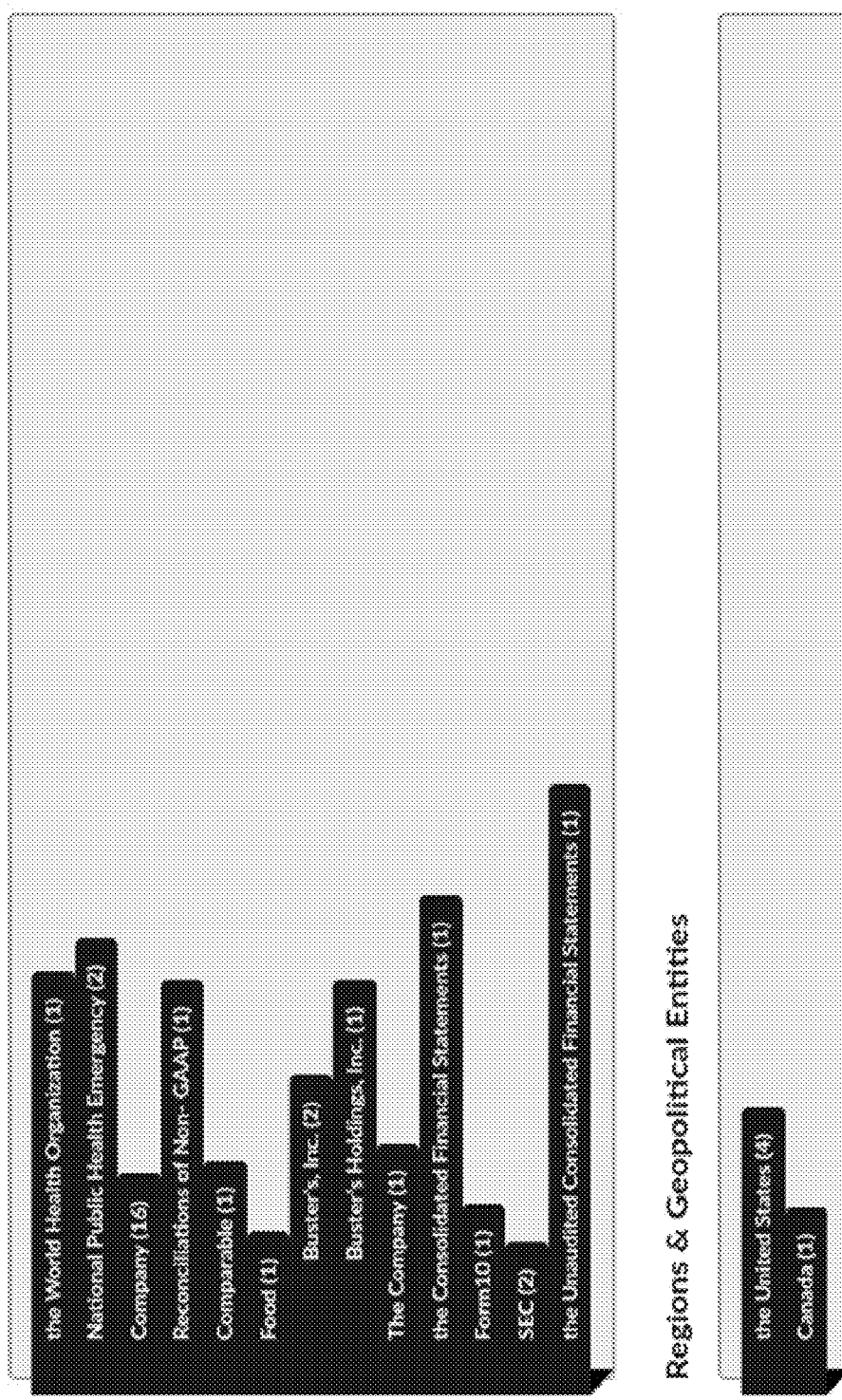
FIG. 37B illustrates a tags and named entities postings/incidence list data display area, focusing on exhibited named entities in unpooled mode in accordance with one embodiment.

FIG. 37B shows a view, in accordance with one embodiment, of the tags and named entities postings/incidence list data display area, focusing on exhibited named entities in unpooled mode, focusing on the single day (related to an artifact publication) alone.

In accordance with various embodiments, a calendar limit control may be made available in the system to allow the user to rerun most, or all of, the visualizations and analyses on a temporal subset of the performance and semantic data concerning the entity in question. In general, the majority of the visualizations and analyses may be regenerated with the selected temporal subset, as if the potentially greater quantity of data available to the system at large did not exist, allowing the user to view the plurality of analyses in a "zoomed-in" fashion, e.g. as might better focus time-series analysis upon the most recent few years. The user may affect this time restriction functionality by instrumentalities including, but not limited to: specifying start and end dates through the use of corresponding free date-entry fields; or calendar date picker UI controls of a conventional variety (e.g. which display valid months at the conventional days of the month level, but also permit quick selection of months and years from arrays of the same); or clicking one or more prespecified quick temporal lookback window determination buttons (e.g. with captions such as 1 W, 2 W, 1M, 3M, 6M, 1Y, YTD, 2Y, 3Y, 5Y, 20Y, MAX, corresponding to lookback periods to consider within the tool, starting from the current user or browser date).

Upon specifying or otherwise modifying this range, the system may refuse to make the change on e.g. the grounds of insufficient or unavailable performance or semantic data, or make the change throughout one or more of the interactive visualizations by means of storing a subset datum and reinitializing and recalculating these visualizations using that subset datum. When the user specifies a new time period (which may include the total available historical period) the original, non-subset datum will be used as the basis for the next instance of subsetting, preserving the user's temporal freedom of analysis timescale throughout this tier of the application in a manner which does not force the user to reload the application or web page to clear the application of subsetting.

Figure 38:
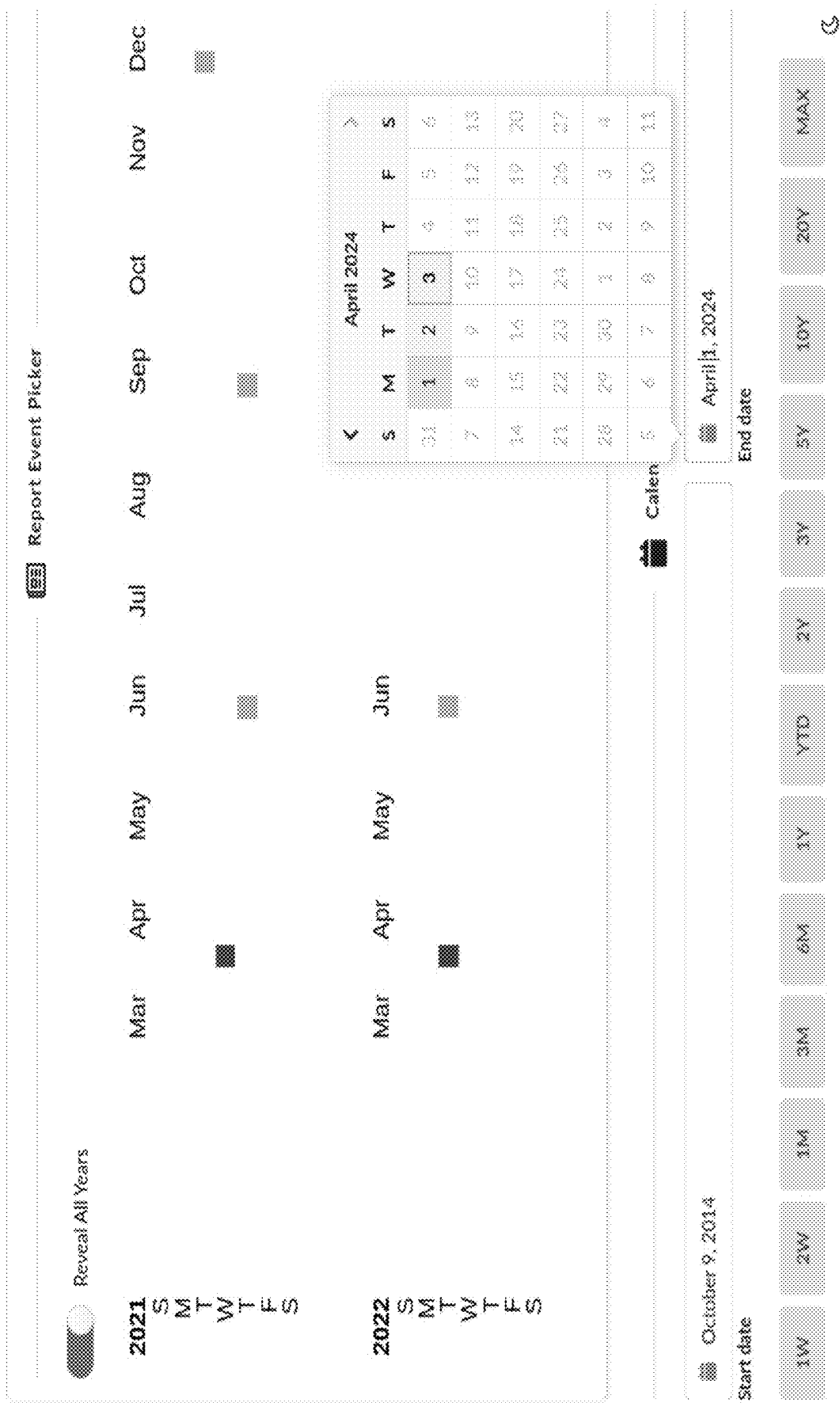
FIG. 38 illustrates a calendar raster plot control and calendar limit temporal subsetting functionality user control with calendar limit start date date-picker visible in accordance with one embodiment.

FIG. 38 displays a view, in accordance with one embodiment, of the calendar raster plot control and calendar limit temporal subsetting functionality user control, with calendar limit start date date-picker visible. The calendar raster plot lists artifacts in squares in an array indexed 2-dimensionally, e.g., by weekday and month. The squares may be colored according to artifact type (here, in an embodiment related to equities analysis, 10-Qs and 10-Ks). Clicking the squares may trigger the artifact detail popup, set the focal date, or make the abscissa line operative in one or more yoked visualizations at the date. The calendar limit control allows most of the dashboard visualizations to be recalculated simulating that they only have the data deriving from the time period specified, e.g. by date picker, direct parsed text entry, or the quick lookback period buttons visible at the bottom of the figure.

In accordance with one embodiment, a seasonal flux control focuses on the variation envelope of the performance time series or subseries of the semantic time series over single-year pooled or unpooled calendar time, allowing the user to observe such descriptive statistics indicators of fluctuation as the mean, maximum, and minimum observations at different coarsely or finely sampled points of calendar time, as available. For instance, in an embodiment related to equities analysis, densely-sampled (e.g. during trading days on an exchange) OHLC or price time series date may be available around the whole year, whereas quarterly and annual reports may be sparsely occurring enough to be issued on separate days. The seasonal flux control consists of a visualization that can in theory handle both of these kinds of data in addition to a time series selector (e.g. for average price, Demand channel counts, Tactics channel counts), and a multiple selection dropbox UI control which selects specific calendar years into or out of the averaging (e.g. if the user only picks 2020 in the control, all price and channel count data visualized may only come from the year, but if they pick 2014, 2017, 2021 then data may be integrated as valid points, and in the case of multiple coincident points, they may figure into per-diem averages, minima, and maxima, etc.).

Unlike a typical time series control, the seasonal flux control in accordance with one embodiment is polar and wraps around to convey the idea graphically of cyclicality. When a user's mouse cursor resides within the interactive bounds of the graphical element of the control, the mouse position within the viewport may be extracted, the difference vector normalized, and the angle extracted by conventional use of elementary trigonometry. Then the data cursor point may be placed upon the defined point in the series with the closest angle match to the user supplied angle. The user can move their mouse about the circle and have the cursor follow the average-corresponding ordinate plotted in the polar-display time series. Upon clicking with the mouse, a popup UI control displays the operative date of analysis and information including but not limited to the current performance indicator (such as price or semantic channel count)'s absolute or average value, and any such summary statistics (e.g. the min or max observed value at the date) as may be deemed appropriate to additionally display.

Figure 39A:
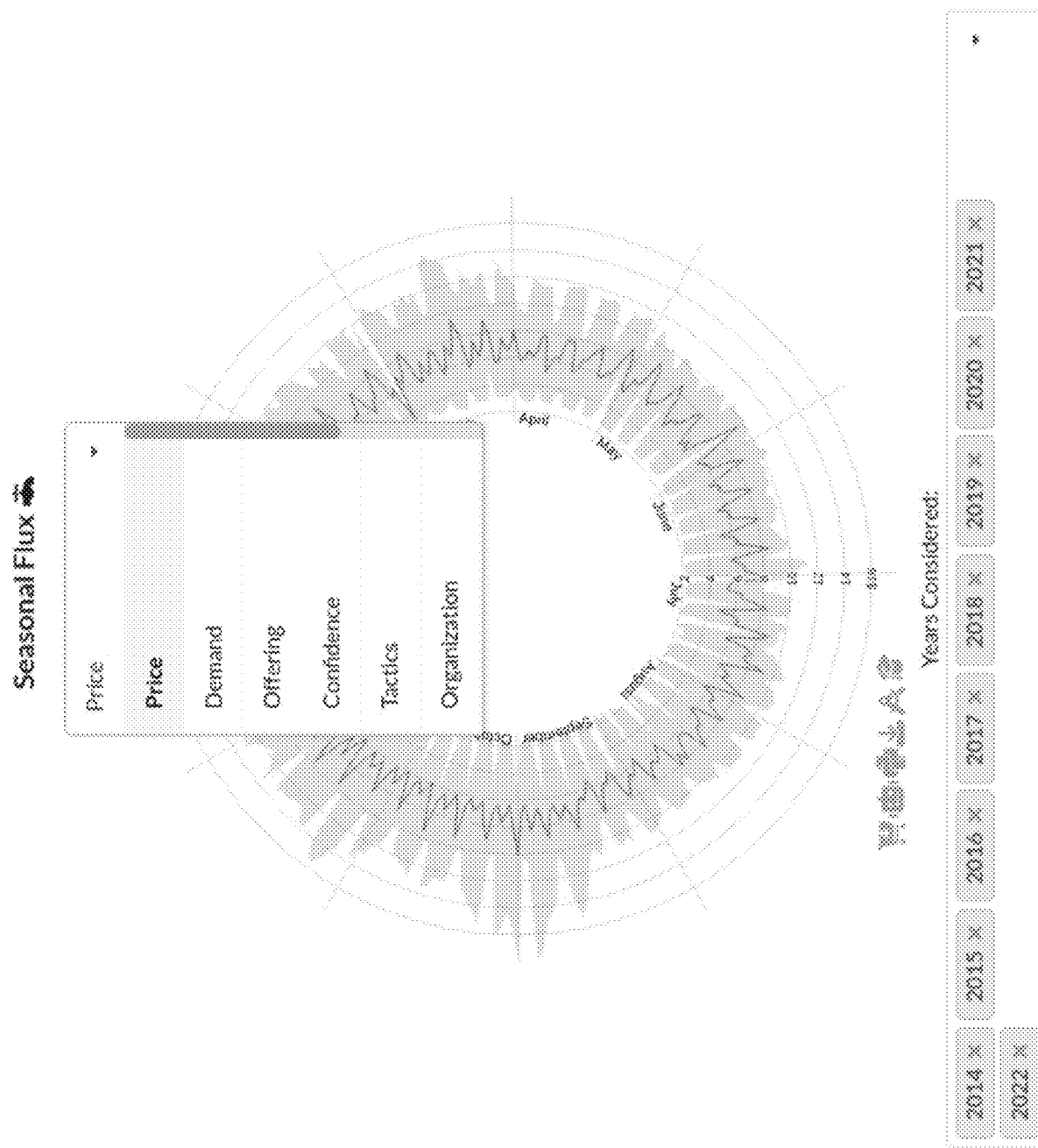
FIG. 39A illustrates a seasonal fluctuation visualization which plots the performance or semantic time series as selected via statistical summary measures such as the average, the minimum, and the maximum in accordance with one embodiment.

In FIG. 39A, a view of the seasonal fluctuation visualization which plots the performance or semantic time series as selected via statistical summary measures such as the average, the minimum, and the maximum, is depicted. The user selects the time series to view, and the visualization renders the lines on a polar graph which can be moused-over to extract an angle to trigger a popup listing, e.g. the average value. Years on the calendar can be included into and out of the average by a multiple selection dropdown box.

Figure 39B:
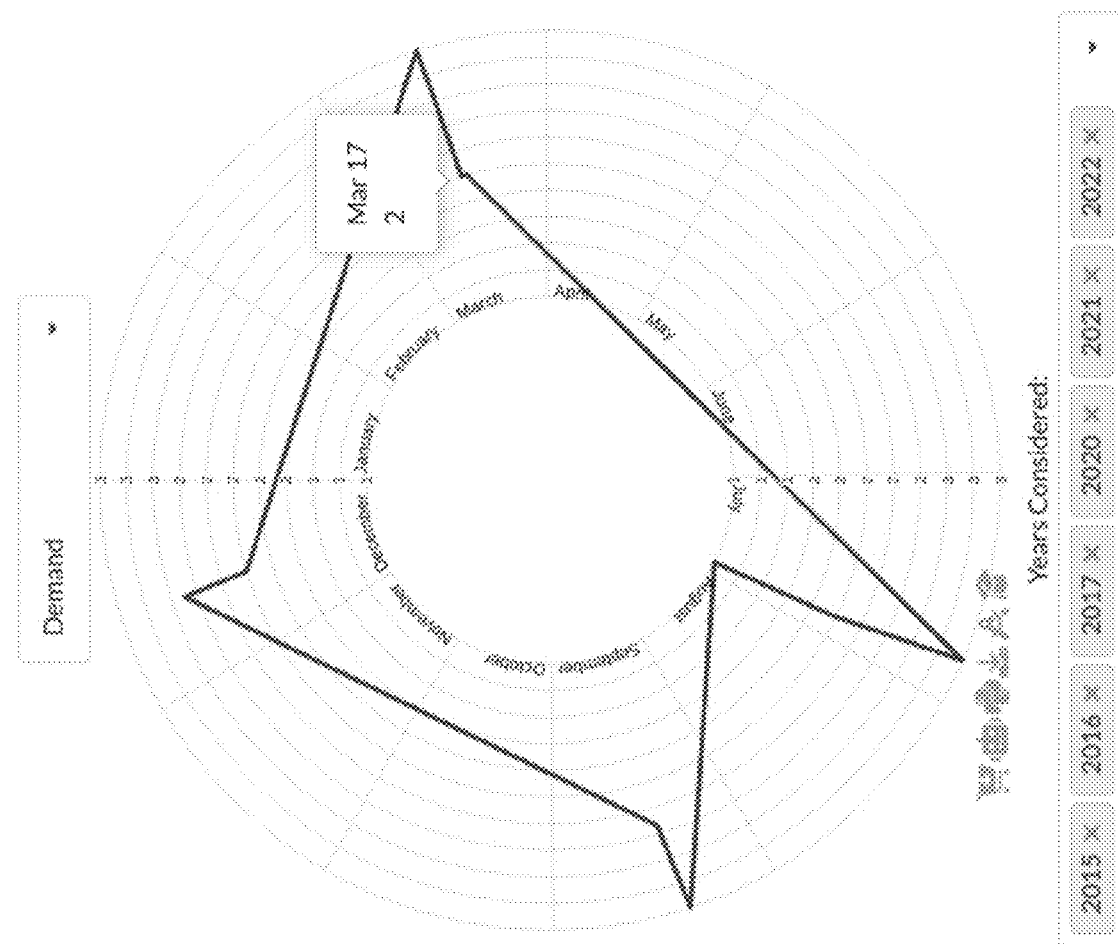
FIG. 39B illustrates a seasonal fluctuation visualization in semantic channel mode in accordance with one embodiment.

In FIG. 39B, a view of the seasonal fluctuation visualization, in semantic channel mode, for the Demand Channel, is depicted. Sparse data leads to less frequent exact alignment such that the sampled data point stands in for the average, min, and max. The data cursor showing the date and channel count is visible.

The dashboard tier of the application, in accordance with one embodiment, may also contain a "token trend" visualization of similar character to that displayed in the annotator. The user may, as with the instrumentality of a single-selection radio button UI element, designate named entities, channels, or tags to view the cumulative incidence lines thereof. Unlike in the case of the annotator, the user may not initiate free entry of tokens, as the set of named entities which may occur may be fixed in, e.g. the summary file which has been computed from the subordinate artifact level. Otherwise, the use of the visualization follows in the fashion established in the annotator: having chosen a unit of analysis to track (i.e. named entities, tags, or channels), the user may select, as by the use of a search dropdown box whose valid items may be restricted to occurring named entities, channels, or tags respective to the user's prior or a default selection, one or more named entities, channels, or tags and click an onscreen button to update the chart. Then data series along a chronological domain (but as compared to the character progression or narrative notion of chronology, here the calendrical time sense of chronology (e.g. 2015-2021), may be plotted corresponding to the cumulative incidence of these units. A data cursor, either in the form of a caption element which may update continuously with the transit of the user's mouse or discontinuously in the form of a popup which may be triggered in response to a user click in the plot region may appear with information including the date at the horizontal position of the cursor, and the unit counts at the position of the sampled point.

Figure 40:
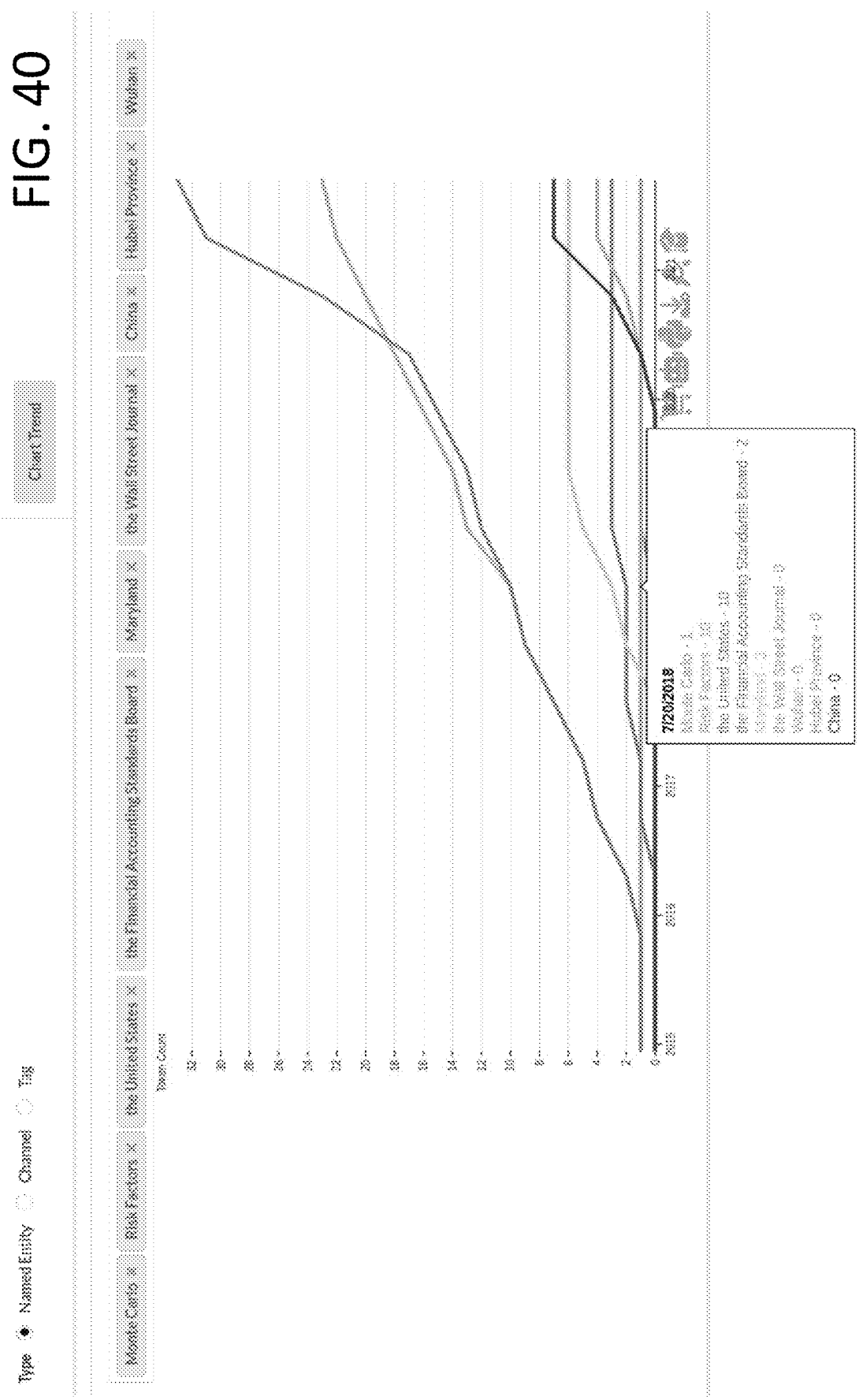
FIG. 40 illustrates a token trend visualization analogue at the dashboard level in accordance with one embodiment.

FIG. 40 shows a view of the token trend visualization's analogue at the dashboard level. Here named entities, channels, and tags are the units and there is actually no free token entry permitted because the named entities, channels, and tags are only those with corresponding data in the L1 summary files, and sentence text from the original artifacts may not be available.

The dashboard tier of the application further contains an instance of the force-directed graph visualization focused upon the extemporaneously inducible relationships between artifacts. In accordance with one embodiment, just as with the force directed graph in the annotator, the user may perform the actions of panning and zooming the graph viewport and clicking and dragging nodes which exert repulsive forces in the simulation. Clicking upon the nodes at this level of the application may trigger a popup identical to those which may be made to appear as by clicking upon artifact squares in the calendar raster plot or by clicking document jump buttons in the pooled tags and named entities listings, i.e. popups which display, e.g. the channel counts encountered in the course of the related document. Here, the "physical" or chronological or non-semantic distance used may be calendar time, and the semantic distance may be adjustable by the user as by the instrumentality of a dropdown UI selection box which may list such distance functions as, e.g. the distance between price levels, the cosine distance between bags of words vector representations of named entities, and the Euclidean distance between the multilevel aggregated word (i.e. averages of sentence vectors) embeddings stored in the document summary data.

In accordance with one embodiment, as discussed in the disclosure relative to the force directed graph for artifact constituents such as sentences, the user may be furnished with two slider UI controls with which they can set the balance (affecting the blend between distances) and laxity (affecting the critical threshold of distance for arc induction). By means of, e.g. a button UI control, the user can indicate that they wish, e.g. for the laxity setting to be determined by the perceptual optimization objective (such as the objective emphasizing bridges and communities while penalizing the number of isolates, or the simpler degree-based objective computing a range-insensitive difference rewarding a small number of links per node). In view of the presentational issue of one channel dominating the others for some channel sets, as addressed with the radar plot, this visualization also includes a toggle switch UI element which upon enablement suppresses the most modally-discovered channel over all artifacts so that the second most dominant channel color may be displayed.

FIG. 41A shows, in accordance with one embodiment, a view of the force-directed graph visualization available at the dashboard level, where nodes are artifacts, with dropdown menu selecting the semantic distance evident. The interaction paradigm may be roughly equivalent to that in operation at the viewer level, with changes including the different popup for artifact detail vs. constituent (e.g. sentence detail), the different set of distances based on L1Summary and performance data, the notion of the "physical" analogue of distance representing calendar rather than narrative time, and the coloring of the nodes corresponding to the modal channel identification of the artifacts rather than constituents.

Figure 41B:
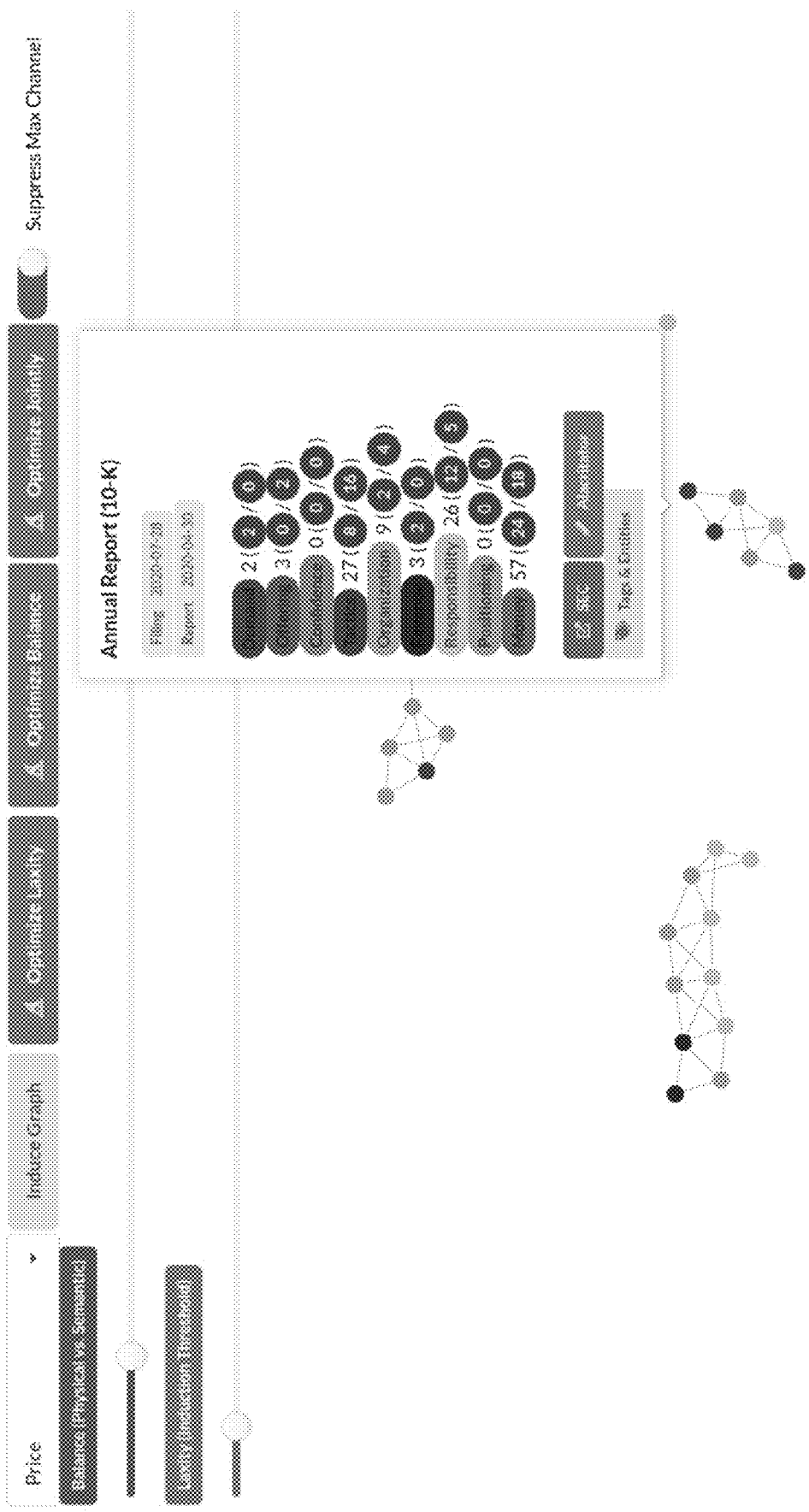
FIG. 41B illustrates a force-directed graph visualization available at the dashboard level, where nodes are artifacts, an artifact detail popup is evident and balance and laxity sliders are visible, with maximum/modal channel color suppressed in accordance with one embodiment.

FIG. 41B, in accordance with one embodiment, shows a view of the force-directed graph visualization available at the dashboard level, where nodes are artifacts, with artifact detail popup evident and balance and laxity sliders visible, and maximum/modal channel color suppressed.

A correlation analysis control, in accordance with one embodiment, focuses on providing standard correlation analysis between channel-specific counts defined for individual artifacts, and the performance level (e.g. price) at a closest-matching point in time. A bank of channel correlation buttons on the dashboard area allows the user to press the corresponding correlation button to trigger a modal UI control to pop-up exposing a correlation analysis. The correlation analysis features a scatter plot where the abscissa points may be discrete channel identification counts (e.g. 2 counts for Revenue related appeals) and the ordinate points may be performance levels (e.g. $13.71 USD). Clicking on any of the points may cause a popup to appear with information including but not limited to the relevant approximately matching date pair, the number of channel identifications, and the performance level. Where applicable (e.g. in situations where not all data points for a channel have a sustained constant count), the correlation analysis may display a line of best fit, as by a sum of squares calculation of the slope and intercept parameters, and clicking the line of best fit may cause to be displayed a popup with information including, but not limited to the correlation coefficient r, the coefficient of determination r/\2, and a verbal statement of the correlation's strength and polarity (e.g. "Weakly Negative").

Figure 42A:
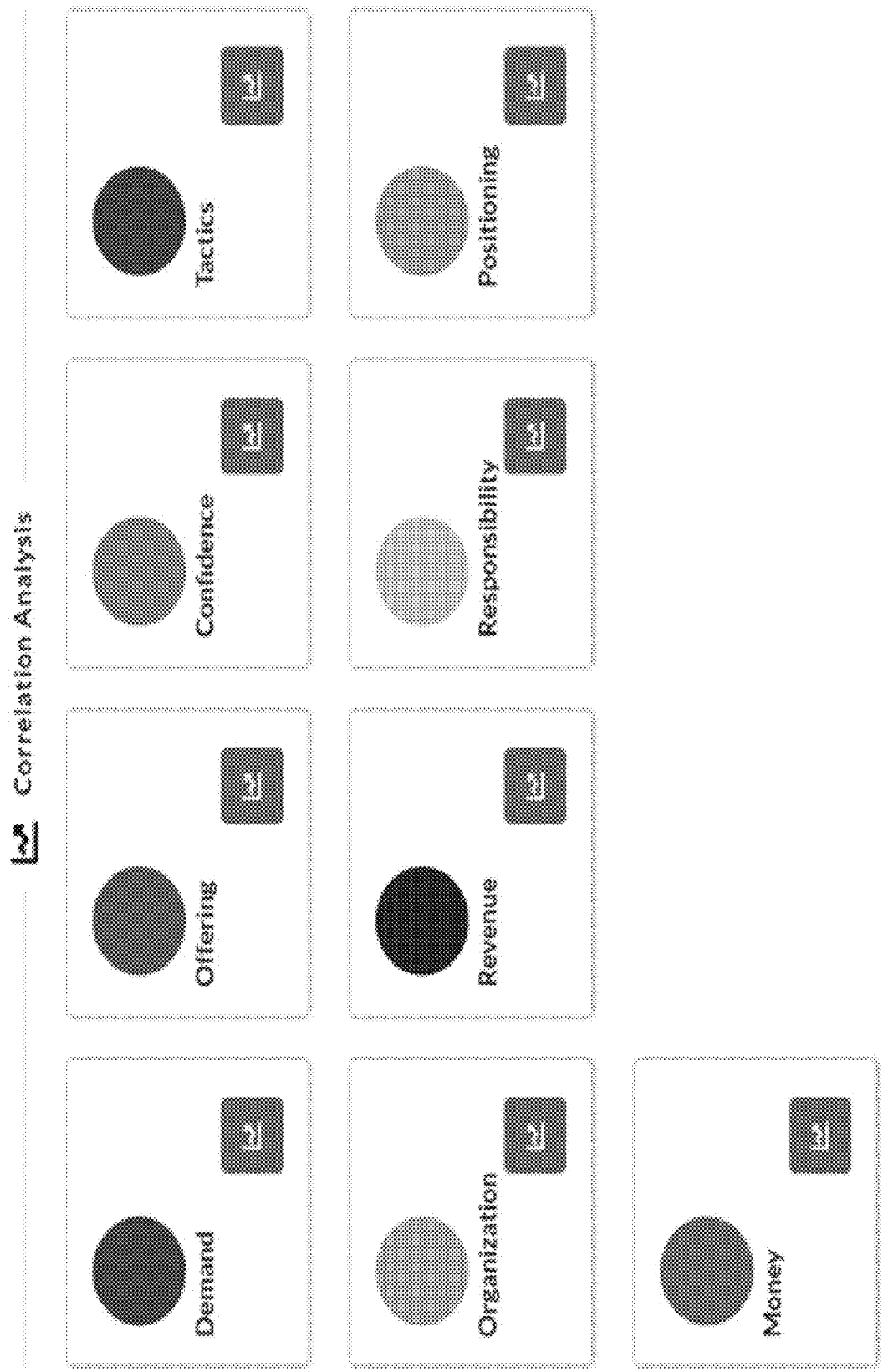
FIG. 42A illustrates a correlation analysis UI button bank panel in accordance with one embodiment.
Figure 42B:
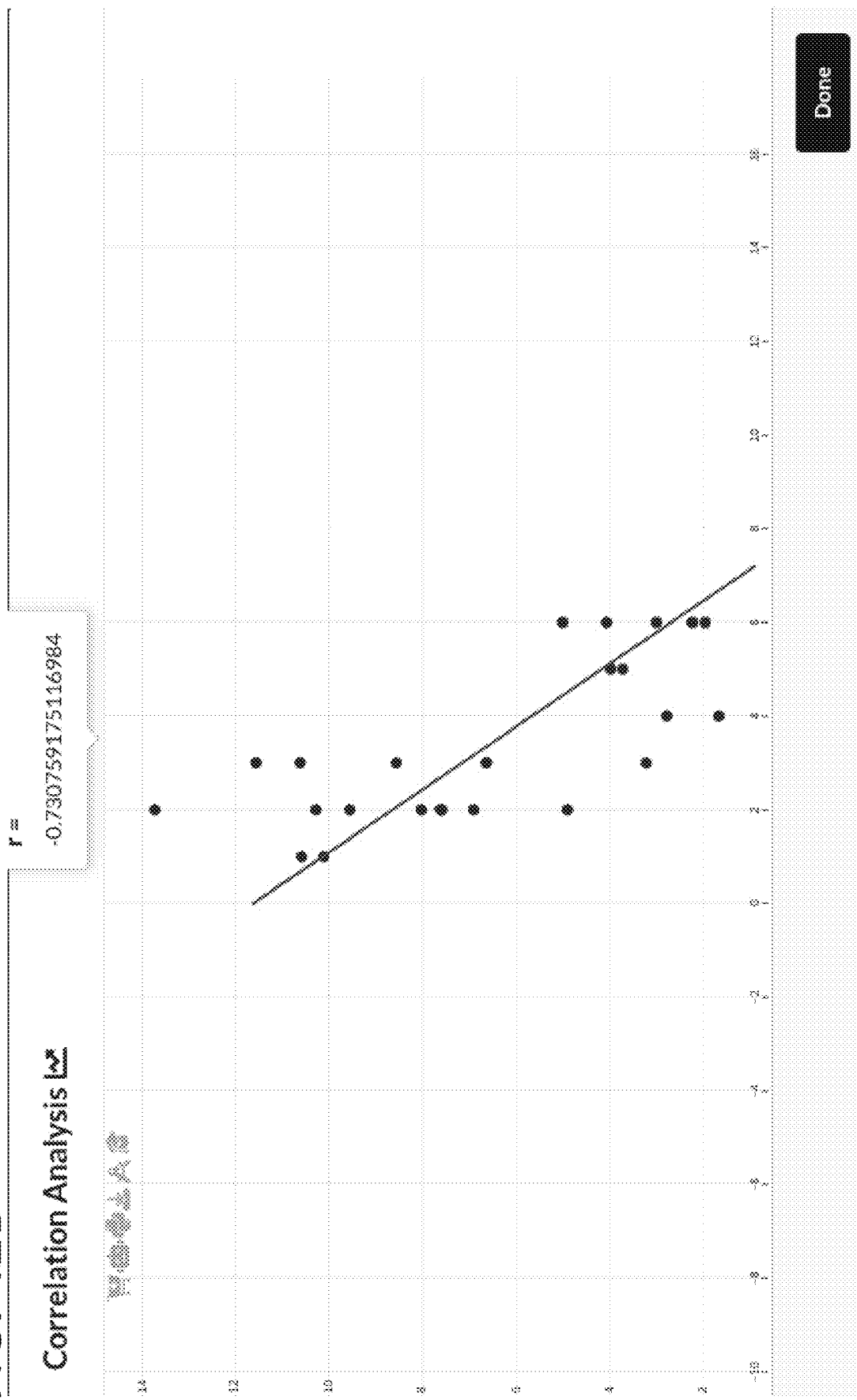
FIG. 42B illustrates a correlation analysis UI modal which performs standard correlation analysis on the channel count data and the performance data in accordance with one embodiment.

FIG. 42A shows a view of the correlation analysis UI button bank panel, which may be comprised of a card corresponding to each channel, associated with a button which launches a correlation analysis UI modal as depicted in FIG. 42B.

FIG. 42B shows a view of a correlation analysis UI modal which performs standard correlation analysis on the channel count data (abscissa) and the performance data (e.g. in dollars of share price, ordinate). A line of best fit may be calculated by a standard sum-of-squares residual minimization and if appropriate (e.g. defined slope) and superimposed on the plot. As by clicking on the plot, one or more correlation statistics such as the r value may be displayed in the proximity of the plot.

A temporal flow query control, in accordance with one embodiment, focuses on providing the non-obvious analysis which involves computing a flow diagram and conditional counts and probabilities involved with a sequentially-applied, potentially asymmetric temporal windowing of the performance and semantic data. It allows the user to specify, as by the instrumentality of free text entry fields parsed for numeric entry combined with corresponding dropdown UI controls listing the particular unit of temporal or quasi-temporal distance (e.g. days, weeks, months, years, reports, 10-Ks, 10-Qs) prior and post temporal window spacings which determine a prior and a post-central observation time for performance and semantic data. In one mode of operation, windows may be constructed so as to not overlap, but in the typical mode of operation, windows may be assessed at each defined time point (e.g. days for which price data exists from the stock market) and the flanking observation points may be used merely for assessment and not the construction of temporally disjoint windows.

To perform a temporal flow query, the user selects, as by the instrumentality of a dropdown UI control defined with such alternatives as, e.g. Price Level, Channel: Confidence, Channel: Positioning, a prior, central, and post measurement to assess. Once the user has specified all three measurements or has implicitly endorsed a default option (e.g. Price) for any of the three options, the system: 1) constructs the windows; 2) attempts to find the closest matching dates as semantic and performance data may not be continuously defined; 3) assesses the measurement specified; 4) agglomerates the results at each relational frame of measurement (i.e. the central point of measurement and its two relative prior and posterior points of measurement) adaptively according to the measurement (such as by use of predefined but macroeconomically determined levels, e.g. the colloquial classification of a stock price as belonging to "junk", "growth", "emerging", "cyclical", or "blue chip" reminiscent price levels, or as by use of adaptively binned levels, e.g. 0-5,5-10,10+ as determined by a histogram binning algorithm such as Sturges' formula or the Freedman-Diaconis rule); and 5) computes the conditional counts of trajectories flowing through the agglomerated measurements across the transitions comprising the windows (e.g. Prior→Central, Central→Post) which yields a graph of counts related to conditional probabilities which can be used to compute flow widths for drawing a Sankey flow diagram, which may then be displayed in the visualization region.

Figure 43A:
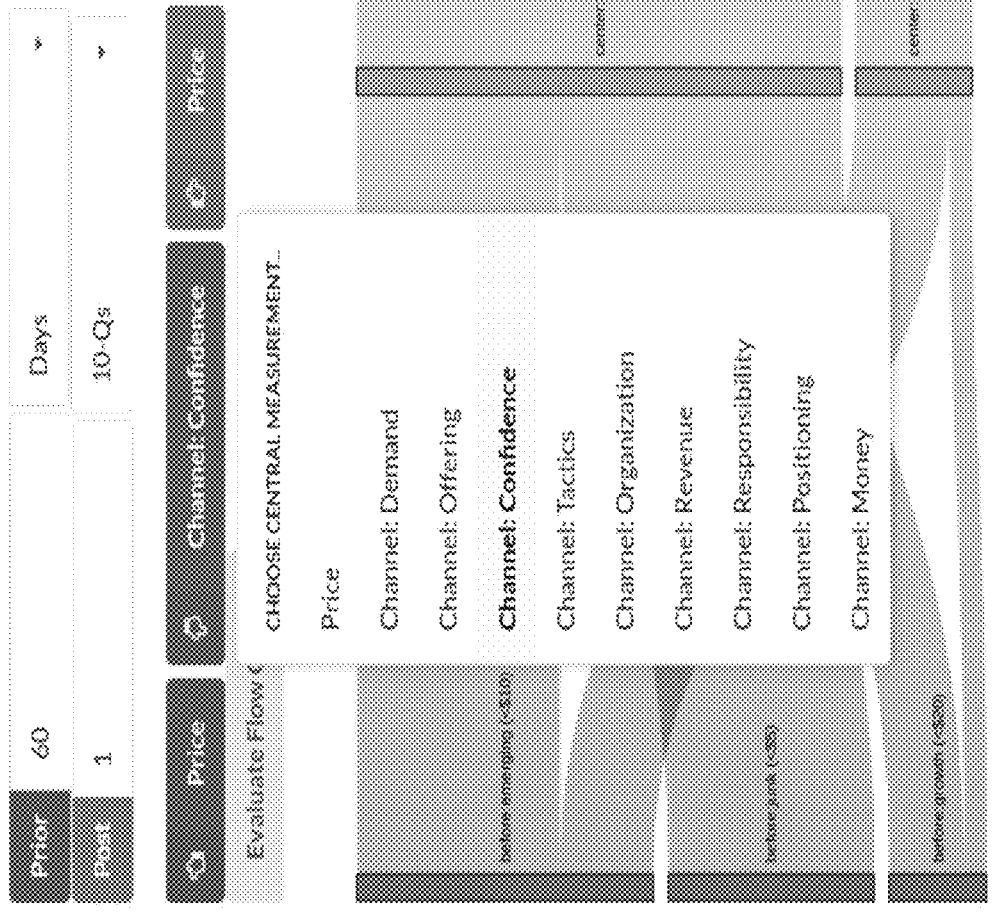
FIG. 43A illustrates a temporal flow query visualization which computes conditional counts of relative-time-window trajectories in accordance with one embodiment.

FIG. 43A shows a view of the temporal flow query visualization, which computes conditional counts of relative-time-window trajectories as transiting through center-relative-pre, center, and center-relative-post time periods, where measurements (selectable from performance related data such as price, but also semantic data such as channel count) may be assessed at the time points for a series of iteratively constructed, possibly asymmetrically-spaced temporal windows and then adaptively agglomerated into categories.

Figure 43B:
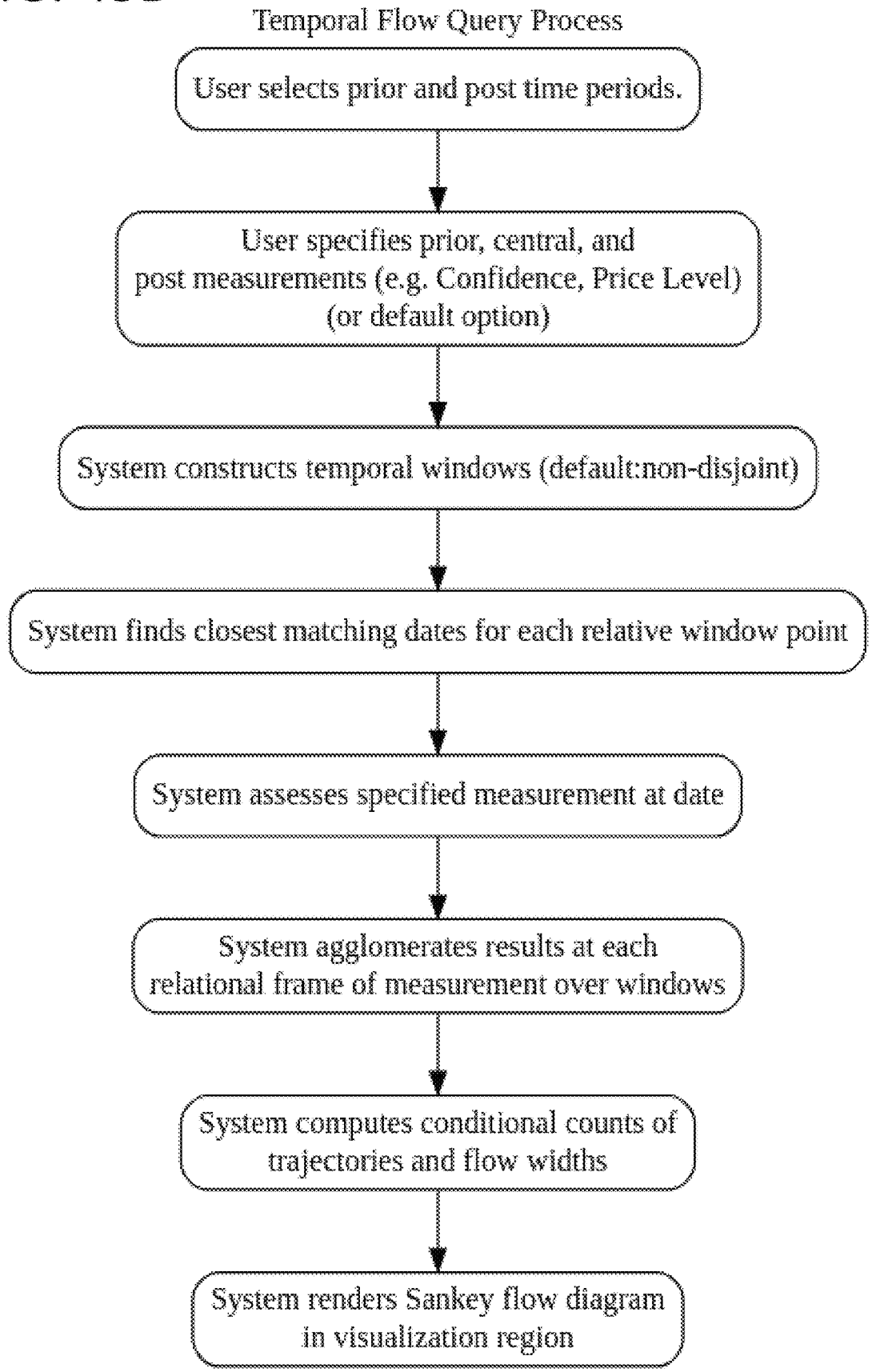
FIG. 43B is a flowchart of high-level operation of user interaction and construction of temporal flow query visualization.

FIG. 43B displays a flowchart of the high-level operation of user interaction and construction of temporal flow query visualization.

The entity universe or competitive network map viewer tier of the application focalizes a force-directed graph in which the nodes represent the entities themselves, in contrast to the lower-tier visualizations in which the nodes represent textual artifacts produced by the entities and in which the nodes represent artifact-constitutents such as sentences. In accordance with one embodiment, as with the other force-directed graphs, the user may pan through the graph simulation by clicking and dragging empty space, zoom into the visualization as by the actuation of the mouse wheel, and click and drag specific nodes to move them and their connected component nodes through the physical simulation. In accordance with one embodiment, when a user clicks upon a node corresponding to an entity, the system may cause to appear a popup UI element with information proper to the entity and available in the summary product of the 2nd-level summarizer module, which as in the dashboard may be retrieved by means of, e.g. the browser fetch capability over HTTP from a remote network location or the use of a content delivery network or web service API.

Depending on the textual domain under consideration (e.g. equities analysis and filings, educational evaluation and student papers, employer evaluations and job postings, media consumption analysis and news articles), the content of this popup and the available "physical" (i.e. performance-related; non-semantic) and semantic distances to select may tend to vary substantially. For instance, in an embodiment related to equities analysis, the popup may display information including, but not limited to: the operating capital, the market capitalization, a recent price, the name of the firm associated with the stock, the stock ticker, the logo of the company, one or more industry taxonomy tags associated with the operations of the company, and a URL or link button which allows the user to navigate to a system-external web page which may be associated with the company.

In accordance with one embodiment, generically and with minimal respect to analysis domain, the popup may also include, as by the instrumentality of a pair of dropdown or accordion UI elements, an interactive and initially compact listing of the top K (e.g. 30) named entities and tags discovered across the history or a subset of the history of the artifact productions, as calculated by the second-level summarizer module.

In accordance with various embodiments, the user may select "physical" or performance or non-semantic distance as by the instrumentality of a dropdown UI menu element, corresponding to measurements deriving from domain-specific distances such as the absolute value distance between operating capital, readership, student grades, or the number of employed persons, or e.g. any more sophisticated penalized, partially insensitive, or alternative composite distance such as may summarize multidimensional distances with alternative base distance functions or metrics normally encountered in the fields of machine learning or information geometry, for example, Manhattan distance in a multidimensional space considering one or more performance dimensions.

In accordance with various embodiments, the user may select semantic distances, including those specified (with distance-function basis potentially less familiar than vector Euclidean distance or cosine distances) incorporating, e.g. summary geometric information such as the mean or variance vectors of mean or variance vectors of sentence embeddings computed at the artifactual level of processing and bubbled up through the hierarchical summary files.

Figure 44A:
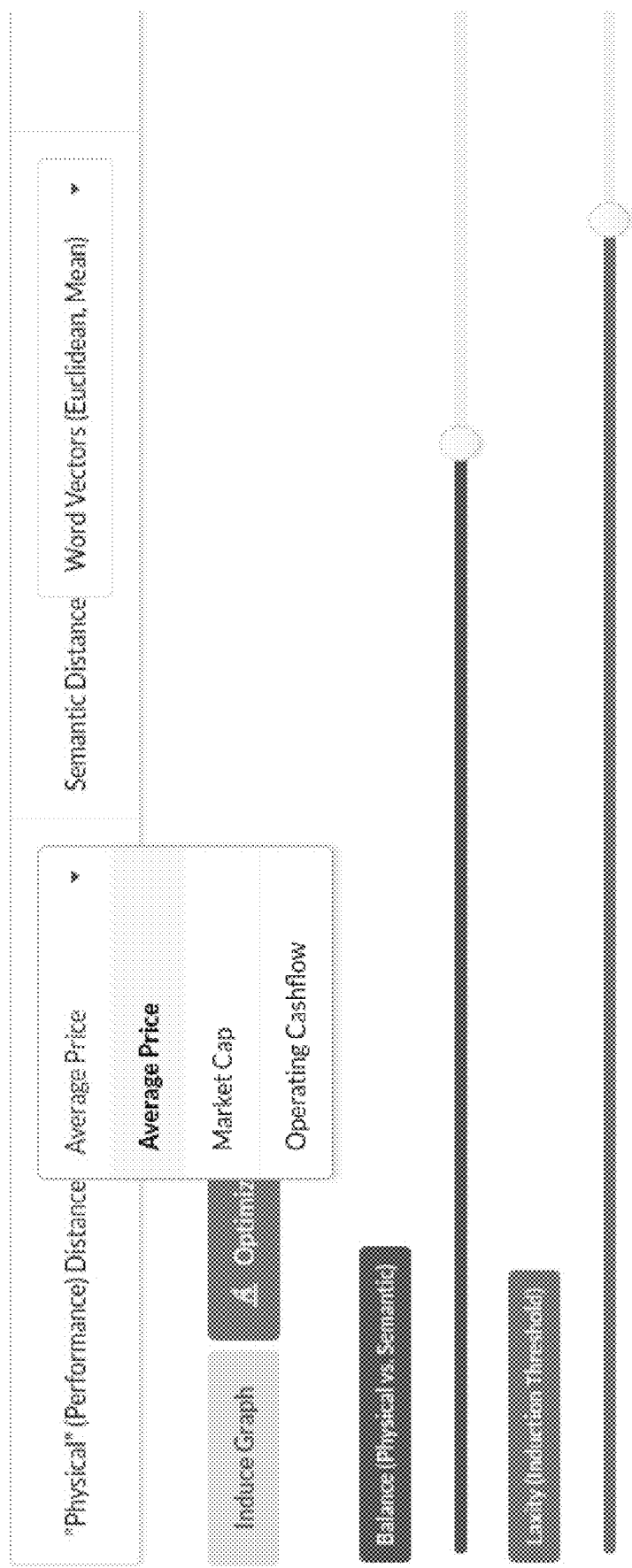
FIG. 44A illustrates a distance configuration region of the interactive force-directed graph visualization at the highest tier of the application, where nodes are the entities themselves in accordance with one embodiment.

FIG. 44A displays a view, in accordance with one embodiment, of the distance configuration region of the interactive force-directed graph visualization at the highest tier of the application, where nodes are the entities themselves. In a large departure from the interaction paradigm used in the lower tiers of the application, the "physical"-analogue distance may be configurable. Instead of being based on a natural notion of time, the distance between entities may be focused on domain-specific concepts of distance and potency or competition, such as the average stock price, market capitalization, and operating cashflow. Semantic distances involve information primarily available in the L2Summary file representing a competitive universe, such as the Euclidean distance between the mean vector of the mean vector of sentence embedding vectors in artifacts attributable to the entity.

Figure 44B:
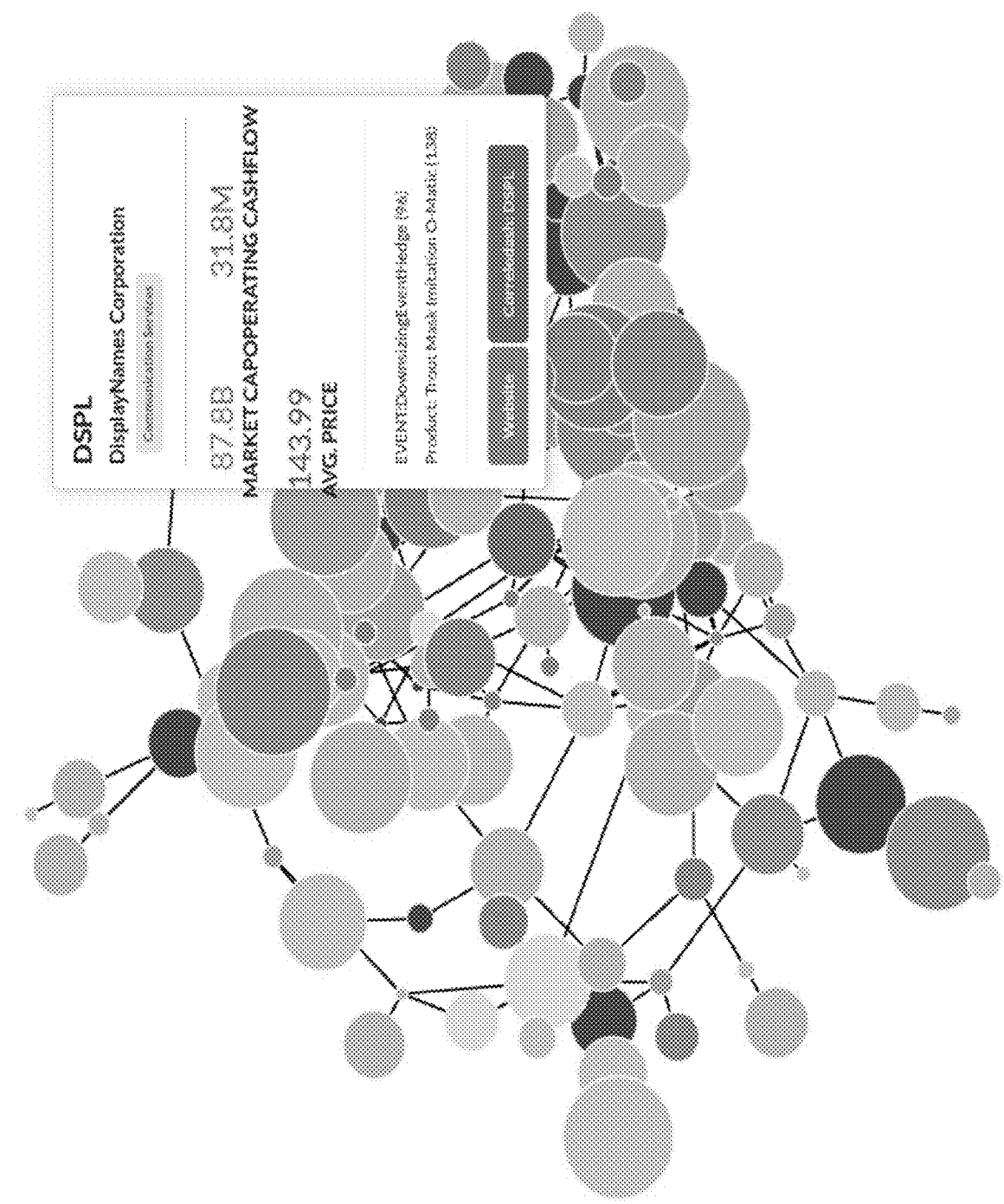
FIG. 44B illustrates a force-directed graph simulation viewport at the entity universe level with a popup having information about an entity as collected from an L2Summary file in accordance with one embodiment.

FIG. 44B shows a view, in accordance with one embodiment, of the force-directed graph simulation viewport at the entity universe level with a popup with information about an entity as collected from an L2Summary file. This includes information that has been bubbled up from the L1Summary file and performance information that was also previously available, perhaps in more detail, at the dashboard tier. As with the dashboard artifact popup, the entity universe entity popup may allow navigation down to the subordinate analysis tiers.

Figure 44C:
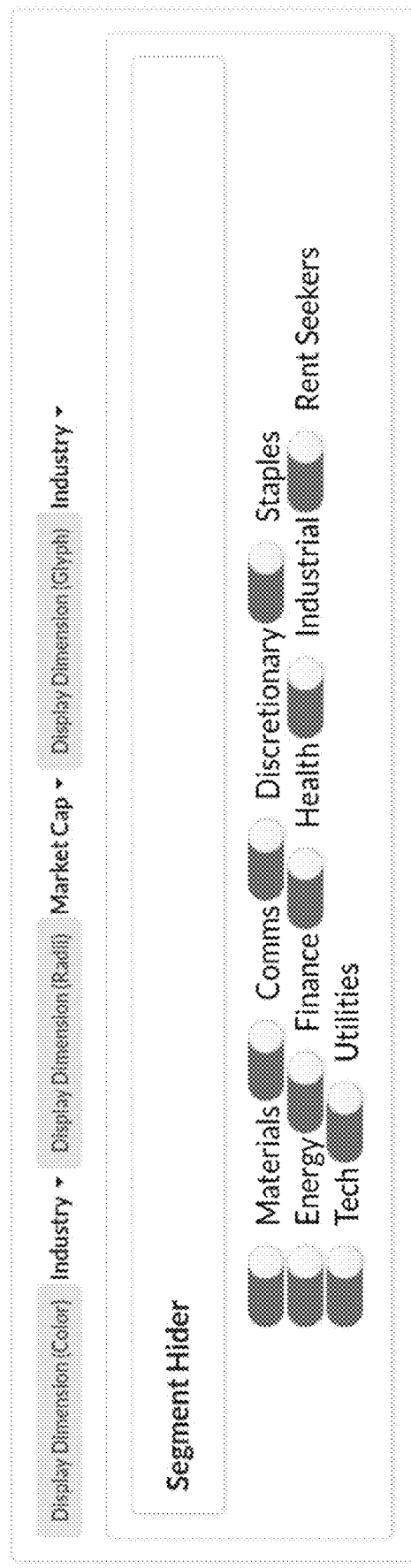
FIG. 44C illustrates display dimension attribute dimension specification dropdown boxes that assign attribute dimensions to display dimensions, and also an entity genre-hiding toggle-switch bank in accordance with one embodiment.

FIG. 44C shows a view, in accordance with one embodiment, of the display dimension attribute dimension specification dropdown boxes that assign attribute dimensions (which may be many, such as market cap and operating cashflow) to display dimensions (which tend to be few, such as color and size), and also the entity genre hiding toggle switch bank, which may allow hiding from display nodes in the graph available simultaneously in the local L2Summary data but which we do not want to display, e.g. for reasons of maintaining simulation performance on a less capable personal computer.

Figure 44D:
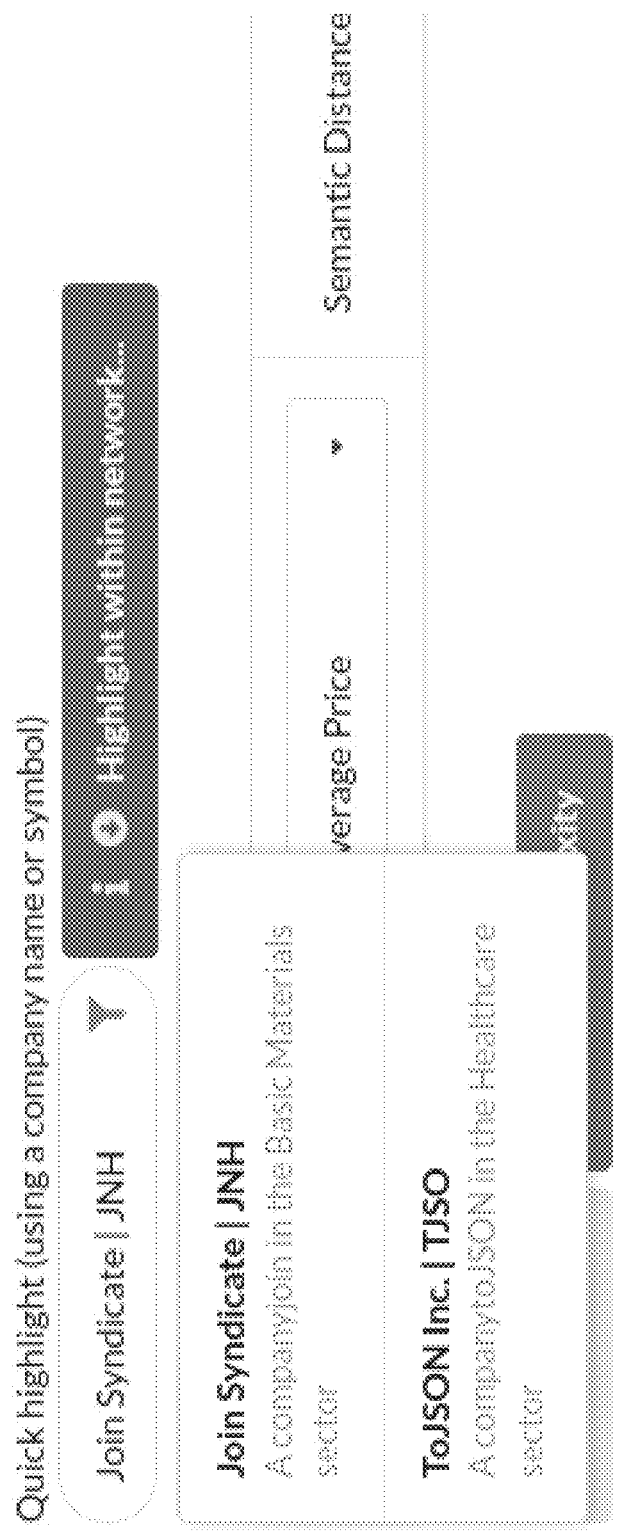
FIG. 44D illustrates a single-entity, single-identifier node highlight mechanism which allows the autocompletion of a match with a single identifier in the L2Summary data file adjacent to highlight within network button in accordance with one embodiment.

FIG. 44D shows a view, in accordance with one embodiment, of the single-entity, single-identifier node highlight mechanism which may allow the autocompletion of a match with a single identifier in the L2Summary data file adjacent to a "Highlight within Network" button. Once a match is made, the user may elect to press a "Highlight within Network" button to make visually salient the node corresponding to the lone matched entity, e.g. as by any combination of panning and zooming to the node, issuing a tooltip-style popup from the node, blinking the size of the node, or applying the SVG style-based graph highlighting mechanism used elsewhere in the application.

Specific to this tier of the application may be facilities beyond those encountered in the lower-level force-directed graph simulations at lower tiers, e.g. in accordance with various embodiments, the common facilities of panning, zooming, tooltip popup expansion, community or connected components highlighting (as in conjunction with the insight-generating function facet of the system, the injection of question answering text captions or suggestion branching nodes in conjunction with an external LLM or similar), the specification of physical and semantic distances, and the adjustment of laxity or balance. As before, the combination of laxity or balance can, in accordance with various embodiments, be adjusted by automatic optimization of laxity or balance singly, or the joint combination of laxity or balance as by the use of 1-D or 2-D stochastic (e.g. randomized search) or mathematical (e.g. polynomial fit) or hybrid (e.g. golden section search) optimization of a perceptual objective, such as that which uses a complex graph-theoretic objective involving bridges, communities, and isolates, or one which rewards connectivity of intermediate average degree.

In accordance with various embodiments, the differentiating features of the visualization at this tier of the application mitigate the problems associated with force-directed graph simulation for the large number of nodes expected to represent entities in fields of application, e.g. an attempt to depict an entire stock exchange such as the 2000+symbols listed on the NYSE and NASDAQ. Mathematical mitigation measures (such as local simulation freezing or simulation temporal and/or body subsampling of e.g. an approximate Barnes-Hut n-body simulation) may be possible to employ in the operation of the system, but a simpler advance may be to introduce interface design elements which contend with the simultaneity of presenting substantial numbers of entities within the viewport. These particularly include, but are not limited to: 1) a node identifier filtering UI control which allows fuzzy or partial matching of an entity's identifier (e.g. the single identifier of name or ticker) to user-entered text, focalizing a match, so that the user may click on, e.g. a UI button which causes a non-hidden and summary-available node that may or may not be visible in the viewport to become centered by automatic panning and zooming operations, and which may cause the tooltip popup associated with the node to become conveniently displayed for the user in the proximity of the corresponding node; and 2) a system of categorical node-hiding UI toggles (e.g. for coarse industrial divisions) which hide from display or simulation those nodes in corresponding categories whose toggles have been enabled.

Additionally, the user may, in accordance with various embodiments, also attempt to make use of the few informational perceptual display dimensions naturally available to a plotting system displaying a network simulation (e.g. node color and node size), and may, as by the instrumentality of UI dropdown box elements, choose which attribute dimensions (e.g. market cap) receive emphasis on a display dimension (e.g. node size). For instance, a user may select that color should correspond to industrial division, or to primary channel identification, or to secondary channel identification, or that size or extent of the node should correlate to enterprise value. In this manner, the system exposes, partially in visual terms, the field of actually simultaneously available logical hierarchical file records concerning entities made available by the 2nd level summarizer.

This data may, in accordance with various embodiments, be made available to the user without resort to any of the data records directly consumed at the dashboard or artifact viewer tiers, potentially accruing economic operation advantages that avert the need for the system's computing, maintaining, retrieving, or querying, e.g. a combined graph database, fulfilling the deferred loading, force-directed graph centric, browser concept. A unified information graph database may in fact conceivably be computed conveniently from a tree traversal of summary files and artifact files to create an explorable unified graph, e.g. in an environment of reduced computational costs where the system operator may wish to recover query flexibility.

FIG. 45 shows a truncated record visualization of a performance time series data file as produced by a gleaner module, in accordance with one embodiment. In the depicted example, the "d" key holds the timestamp values which are the sampling abscissas for the Open, High, Low, Close, & Volume Data, in an embodiment related to equities analysis.

FIG. 46 shows a record visualization of one embodiment of a gleaner file with entity data (e.g. stored in the entity database) and performance facts (which change over time, as gleaned from an external upstream data source).

The gleaner (or performance data retriever) module ingests fast-cycle (e.g. stock price data) and slow-cycle (e.g. stock fundamentals data) time series or fact data in large or small lots from a plurality of upstream data providers using an architecture, wherein various custom ingestion frontends specialized for available data sources feed into a fact reconciliation, gap detection, gap resolution, and date range query building engine comprising an intermediate stage with a terminal stage producing one or more consolidated intermediate data products for use in the archival of historical data, the offline analysis of historical data, and the consumption of historical data by a web application, such as the dashboard tier of the interactive system described.

Ingestors within the gleaner module generically incorporate properties such as metadata relevant to the data lineage of performance data (e.g. url, ingestor version, remote API version) and may be configured to operate generally within an area of historical time (e.g. Jan. 1, 2014 to Dec. 12, 2021). By means of a cache of local files which can optionally be synchronized with a cloud object store system, an ingestor manages one or more entities to track the performance data thereof. Further, the ingestor can enroll, disenroll, and report on the contiguity of performance data for entities under tracking. For instance, performance data ingestors used in an embodiment related to equities analysis can report useful summary data to system operators concerning missing date incidence in the data, including but not limited to: how many dates exist in the time series; the earliest date for which there is data; the latest date for which there is data; the number of missing dates at large for which there is data; the number of dates for which there is not authentically missing data (because the day is a weekend or U.S. Federal holiday or a known exchange holiday); and so forth. The ingestors may be equipped to deserialize data (e.g. to perform this reconciliation) and serialize data in a variety of file serialization formats designated for particular consumers (e.g. CSV for internal analysts; JSON for the web application; Parquet for range queries, long-term time series archival storage, and automated analysis), along with serializing metadata managing the state of the performance data store itself.

The generic implementation of the ingestor module specifies generic operations which run in scenarios including, but not limited to: prior to processing any of the entities; after processing all tracked entities; prelude operations to be undertaken prior to processing a single entity in the course of communications with an external system such an upstream data source embodied as a web service API; postlude operations to be undertaken after processing of a single entity in connection with an external system concludes; operations to undertake prior to reconciliation; operations to undertake during reconciliation; and operations to undertake after reconciliation. Ingestor implementations specialized for different data sources and operating on distinct classes of data may be grouped by priority such that the system can select the next most reliable or cost-effective data source for the class of data (e.g. historical stock price time series data, or currently computed single point fundamentals analysis data).

Since upstream data providers may vary in the economic scheme used to extract value from their data (e.g. as by use of a credits system, blanket access to data for a fixed fee, a hard monthly rate limit, or access which may be restricted to a specific historical range of dates), the gleaner module may optimize to apply these queries across a combination of ingestor and upstream source dyads and with reference to the cost incurred by the need for data on specific dates interacting with the available minimum queryable units of data in a provider's access scheme (e.g. access to the whole historical record vs. configurable date ranges up to 90 days long) by use of an objective function that attempts to apply the most granular date range queries upon missing data and estimates the cost per date. Specific implementations of specialized forms of the generic ingestor would tend to directly manage the low-level interaction with upstream data sources which could assume various manifestations, such as downloading a tabular file over HTTP, making a JSON REST API request over HTTPS with a secret API key, or using an alternative exchange protocol such as gRPC, GraphQL, SOAP, etc.

Figure 47:
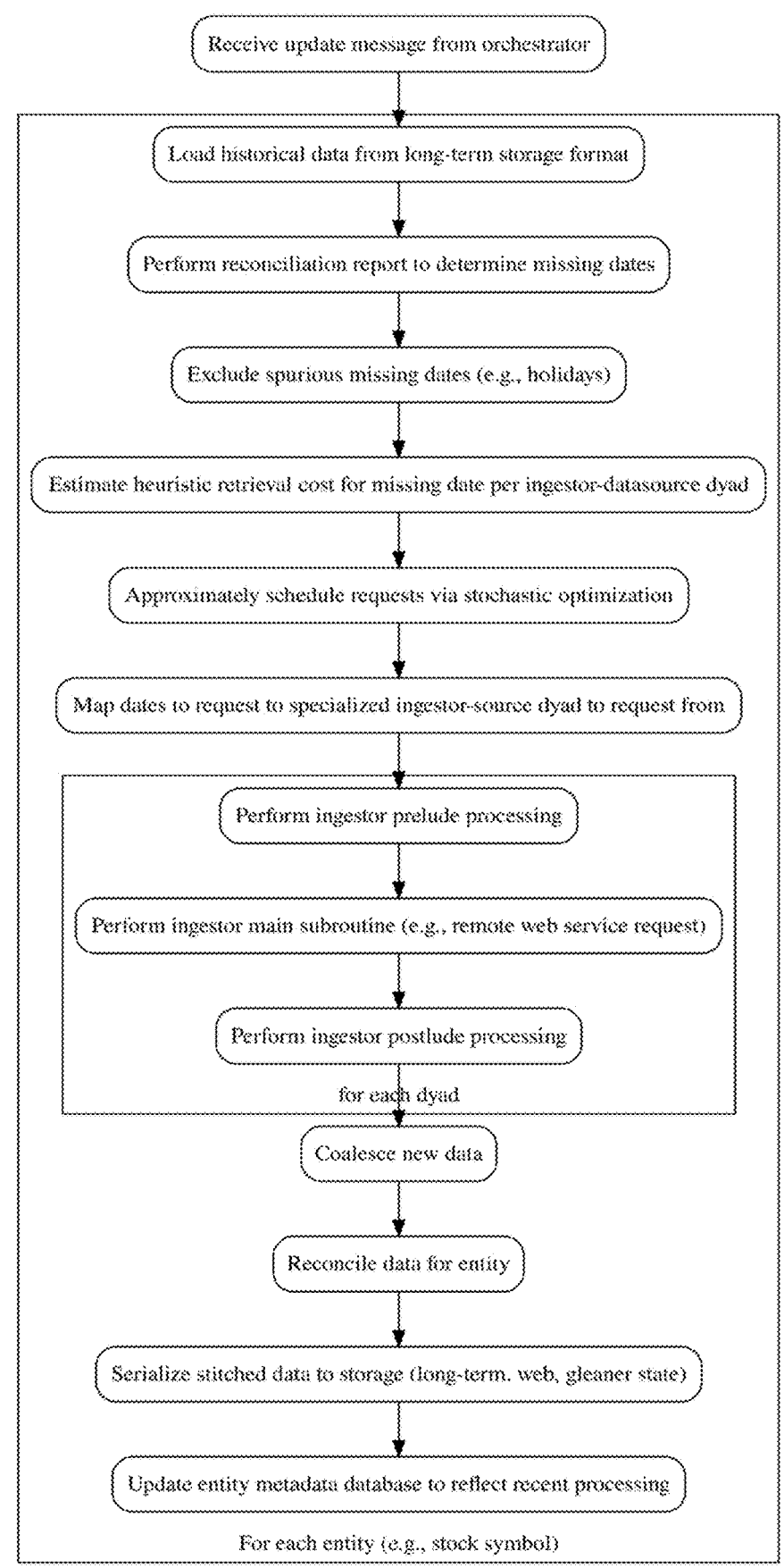
FIG. 47 is a flowchart of high-level operations of gleaner modules managing a type of performance data.

FIG. 47 displays a flowchart of high-level operations of gleaner modules managing a type of performance data (separate stores and ingestors may be used for facts vs. time series).

The inferencer module (which works in conjunction with an analogous trainer module which trains the neural networks specialized for making synthetic channel, tag, and polarity components of framing annotations to accomplish their tasks) focuses on creating annotation records substantially similar to those created within the annotation datum modified by the annotator facet of the viewer application module. That is, in general, it produces per-annotation (i.e. machine inference) metadata including, but not limited to: a virtual annotator ID; a fully-qualified channel name (channel set plus channel name); an annotation sequence number; an annotation timestamp; and annotation hash depending on the timestamp; a polarity value inferred conditional upon prior channel inference; the sentence text; and the top K (e.g. 3) channel identifications.

The channel identifications may be inferred by an omnibus classifier or a cascade of classifiers based on transformer neural networks or other unspecified neural language models (e.g. a highly capable network such as GPT-3 as used for classification by text generation). Additionally, the annotation inference record may include: the unrectified (e.g.

presoftmax) model confidence; a list of threshold tags identified by a classifier or cascade of classifiers based on transformer neural networks or other unspecified neural language models and conditional upon channel identification. The specific choice of classifying models (e.g. BERT or GPT family variants, such as DistilBERT or GPT-4, or other families of models such as T5) may tend to vary roughly interchangeably as the state-of-the-art in natural language processing advances and with regard to economic considerations as determined by the system operator and market conditions, but they will tend to be neural language models with some of the characteristics of current transformer type neural networks, including but not limited to: being trained in a semi-supervised manner; being fine-tuned from pre-trained examples; and performing serial inference of subsequent tokens which are not necessarily words by means of nonlocal attention methods.

The models may be trained by the use of the training module which performs a reverse operation to the inferencer, which consumes hierarchically organized annotation datum files and performing inference on the text extracted from and referenceable to any document markup (e.g. HTML) which may contain the text in the original textual material. To reiterate, the neural networks performing framing analysis inference with event-related tags and types may be arranged in any economic configuration, including but not limited to: omnibus classifiers; one vs. rest ensembles with a consensus step; or few-shot methods which use agentic or standard completion LLMs to answer written prompts asking questions about framing attributes directly (e.g. "Considering the definitions of channels I have provided to you, please classify the following sentence with one of the provided channel names: <sentence>."). For example, in one embodiment, the channel for a sentence may be determined by a one vs. rest ensemble of single-channel responsive BERT networks, with a consensus step reconciling the individual ranges of unrectified output neuron firing variation; the polarity determination may be routed based on the channel to an channel-specific polarity detector network; the tag determination may be done by prompting a GPT-type model with information related to the channel (e.g. "Given this list of tags concerning Revenue themes: <list of tags>, which 0-3 do you consider to be present in the following text: <text>?").

The exact character of the neural network or neural networks used in concert to affect bilevel, 3-determination (i.e. channel, bag of tags, polarity) framing analysis may change the perceived quality of analysis results experienced by the end user but does not change their essential role or representation in the interactive system. This may also be the case for products of earlier processing modules such as the amasser module or the annotator: the representations of the departmented artifact file, and the highlight markup tags and the logical annotation data within such artifact files may be directly computed by a capable LLM (such as GPT-4). A benefit and key feature of the system as flexibly designed is that the quality of results as experienced within the interactive portion of the system can improve over time as the commodity and fine-tuned or prompt-engineered inference engine may be upgraded—the underlying specification of the data model and details of the interactive analysis system need not rapidly change or evolve.

Figure 48A:
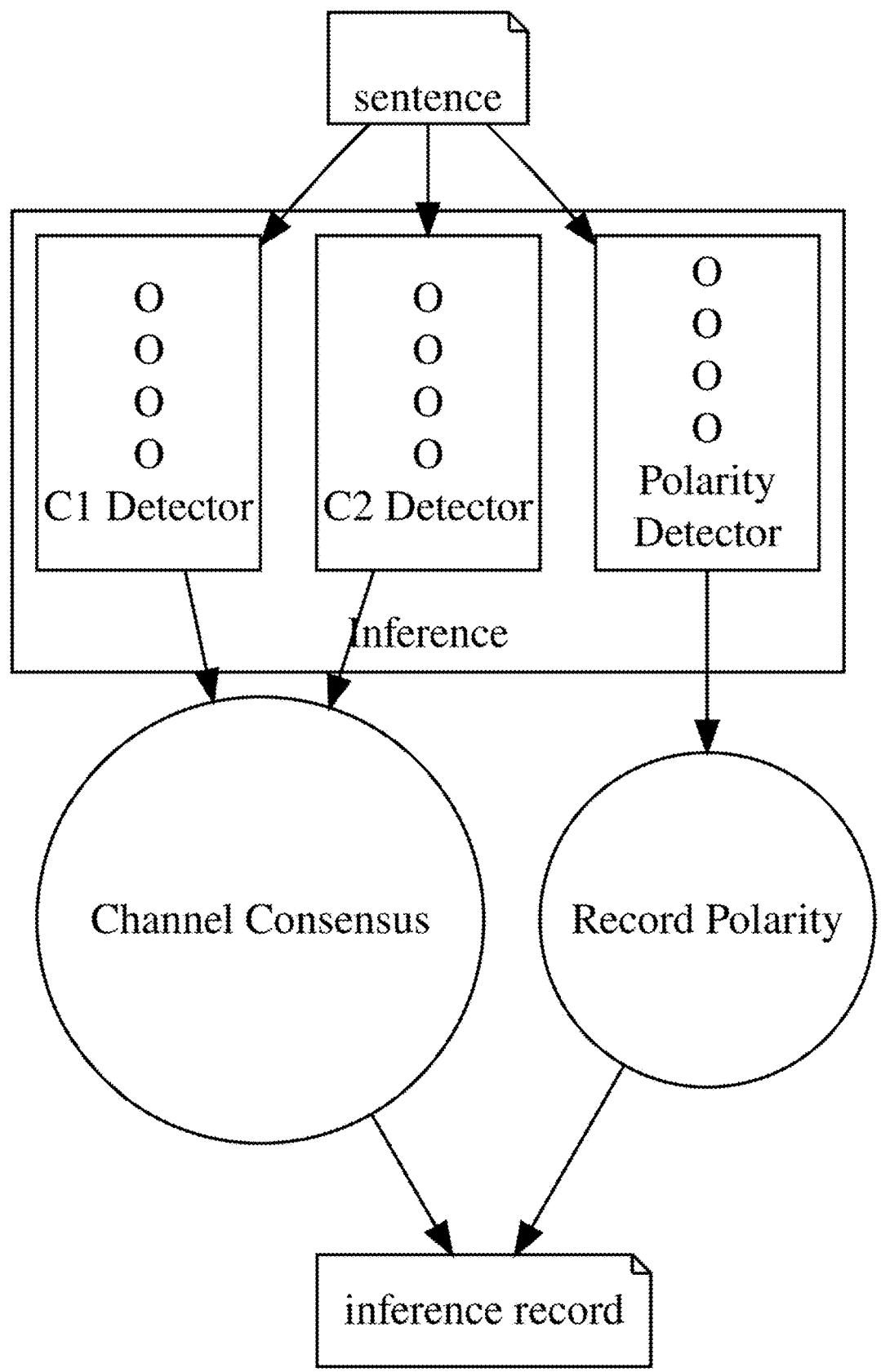
FIG. 48A is a flowchart of one potential method of populating an inference record in a filled document annotation datum by channel and tag inference, typified by channel-unconditional polarity detection.

FIG. 48A provides a flowchart of one potential method of populating an inference record in a filled document annotation datum by channel and tag inference, typified by channel-unconditional polarity detection. In this variant, the channel may be determined by a consensus step (e.g. most probable label proportional to unrectified neuron firing level, accounting for firing dynamic range) downstream of two single-channel-responsive networks. The polarity may be determined in a channel-agnostic manner from the sentence text using a channel-agnostic, omnibus-style polarity classification network. The inference record may include the top-K channel identifications identified in the consensus step and the tags identified in the sentence by an LLM instructed to pick tags from a channel-conditional list of tags.

Figure 48B:
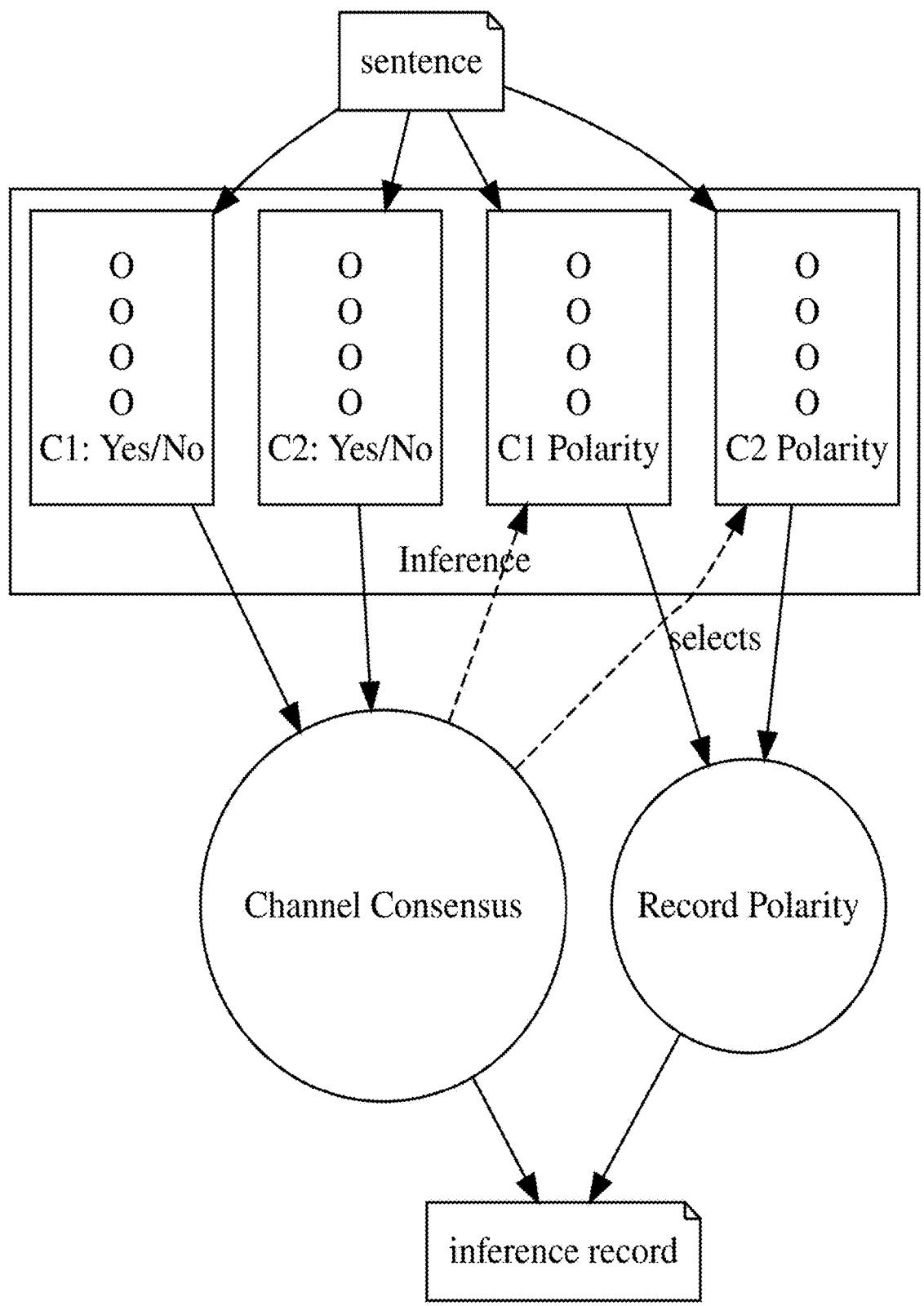
FIG. 48B is a flowchart of one potential method of populating an inference record in a filled document annotation datum by channel and tag inference, typified by channel-conditional polarity detection.

FIG. 48B provides a flowchart of one potential method of populating an inference record in a filled document annotation datum by channel and tag inference, typified by channel-conditional polarity detection. In this variant, the channel may be determined by a consensus step downstream of two channel-responsive networks. The polarity may be determined (post-consensus) using one of the channel-specific polarity networks trained only on channel-identified text.

In accordance with one embodiment, the L1Summarizer (first-level summarizer, or artifact summarizer) module, either periodically as assigned by the Orchestrator or as triggered by a document inference operation, builds a summary file that composes an array of per-document records which includes, but may not be limited to: 1) the document data lineage and report-related metadata; 2) the counts of semantic channel identifications for each covered channel set; 3) the counts of semantic event tag identifications associated with channels; 4) the category-segregated named entities incidence data; and 5) one or more vector representations of the document in embedding space, such as mean or variance summary vectors of document sentence vectors.

This first-level summary representation serves as the main source of document data that the dashboard tier of the application uses to represent the coarser results of document processing at that tier. This design accomplishes the purpose of decreased data transmission cost to deliver analytic insights to the end user (i.e. the end user may manually request the full document by visiting the artifact viewer tier) while allowing, in accordance with one embodiment, the backend conversion of hierarchical summary data into, e.g. a graph database where the entity universe summary files, the artifact summary files, and the artifact files themselves may be used to induce a full or partial explorable graph, which can be navigated through network traversal or may be fully or partially encoded via, e.g. a graph embedding for the purposes of processing by a graph neural network for inference to categorize, e.g. the performance fate or the semantically-related character of one or multiple entities, artifacts, or artifact constituents based on arbitrary sub-graphs of the unified graph representation.

Figure 49A:
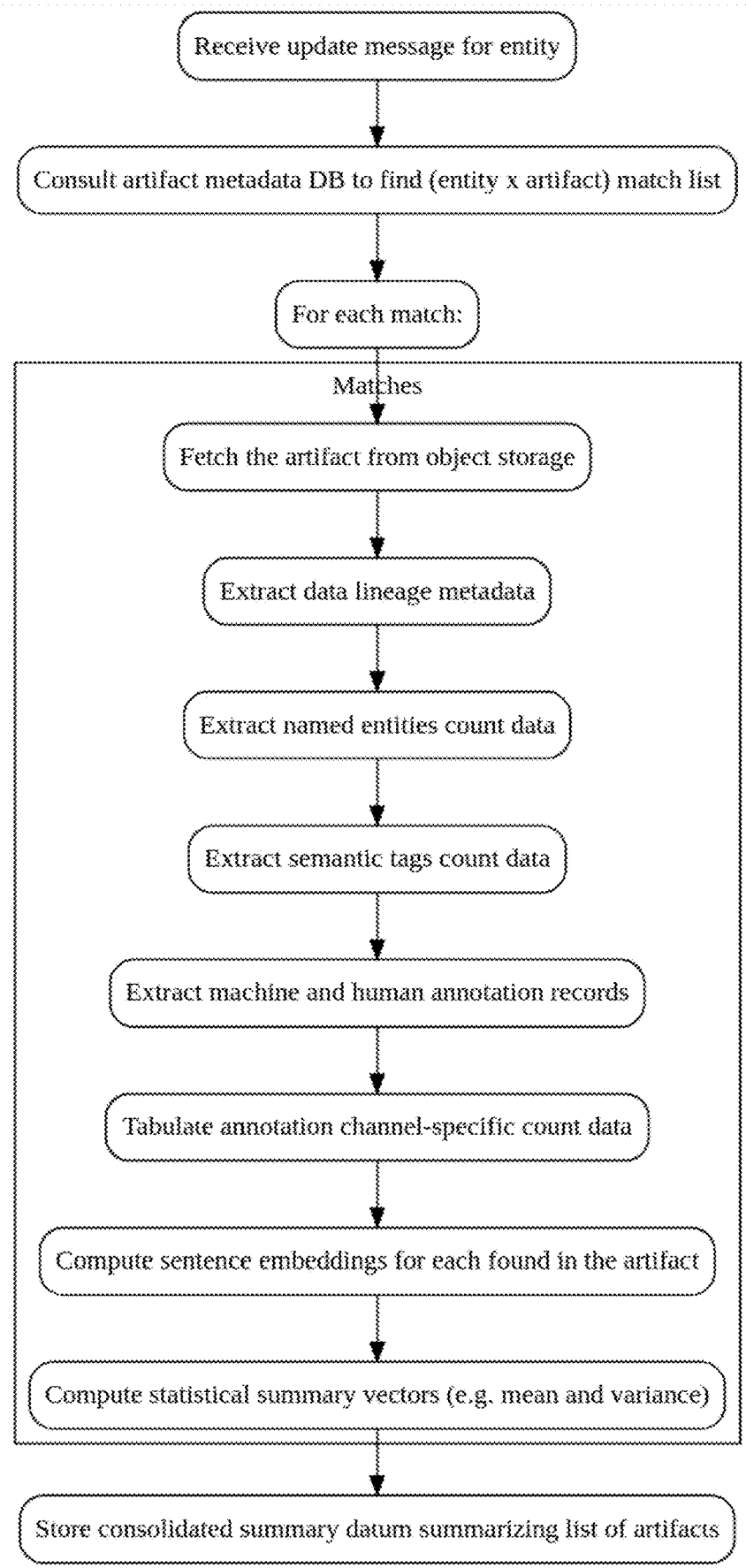
FIG. 49A is a flowchart of high-level operations of a L1Summarizer in typical configuration in one embodiment.

FIG. 49A provides a flowchart of high-level operations of the L1Summarizer in typical configuration, in accordance with one embodiment. The summarizer takes an entity identifier (e.g. which may be registered in the entity metadata DB) and queries the document metadata DB to locate the files which correspond to the entity. Then it disassembles those artifact files and extracts some select information to be exposed at higher levels.

FIG. 49B shows a record visualization of one embodiment of the L1 summary file produced by the L1Summarizer from a list of artifacts, in accordance with one embodiment. The summary incorporates data lineage data particular to the domain, channel count data related to zero or more channel sets, "named entity" data, other data about the entity, and summary vectors computed from sentence embeddings in the text which might contribute to localizing the document in conceptual space.

The Orchestrator (or processing orchestrator module) manages the initiation of messages into work queues throughout the system. It registers information related to entities in coordination with the entity registration metadata database and the artifact processing metadata database. It may be interactively used by a system administrator to resolve problems or assign ad-hoc processing or reprocessing workloads or may run periodically according to a generic chronological system task scheduler (e.g. as by using a cronjob), and it may also be the point of interactive or automated registration of entities.

In an embodiment related to equities analysis, a system administrator can interact with the Orchestrator module to match a listed stock by company name, company symbol, or some other substring of a standard identifier and receive information including, but not limited to: the EDGAR CIK code of the organization, and a fully-qualified ticker including a codeword for the exchange and the unique ticker symbol on the exchange.

In accordance with one embodiment, upon enrolling an entity into the registration metadata database, the Orchestrator establishes initial timestamps in the database which may be updated (e.g. by referencing the artifact processing metadata database on a periodic or processing event triggered basis) which specify the last time intermediate data files such as first-level semantic summary files, second-level semantic and performance summary files, performance time series files, and performance fact files were computed for the entity. These timestamps may be noted, maintained, and referenced when the Orchestrator is invoked in an update mode, whereby when the timestamps indicate stale data, the Orchestrator causes the dispatch of entity-related work request messages to one or more work queues connected to the artifact ingestor, performance time series ingestor, performance fact ingestor, first-level summarizer, or second-level summarizer modules.

Figure 50A:
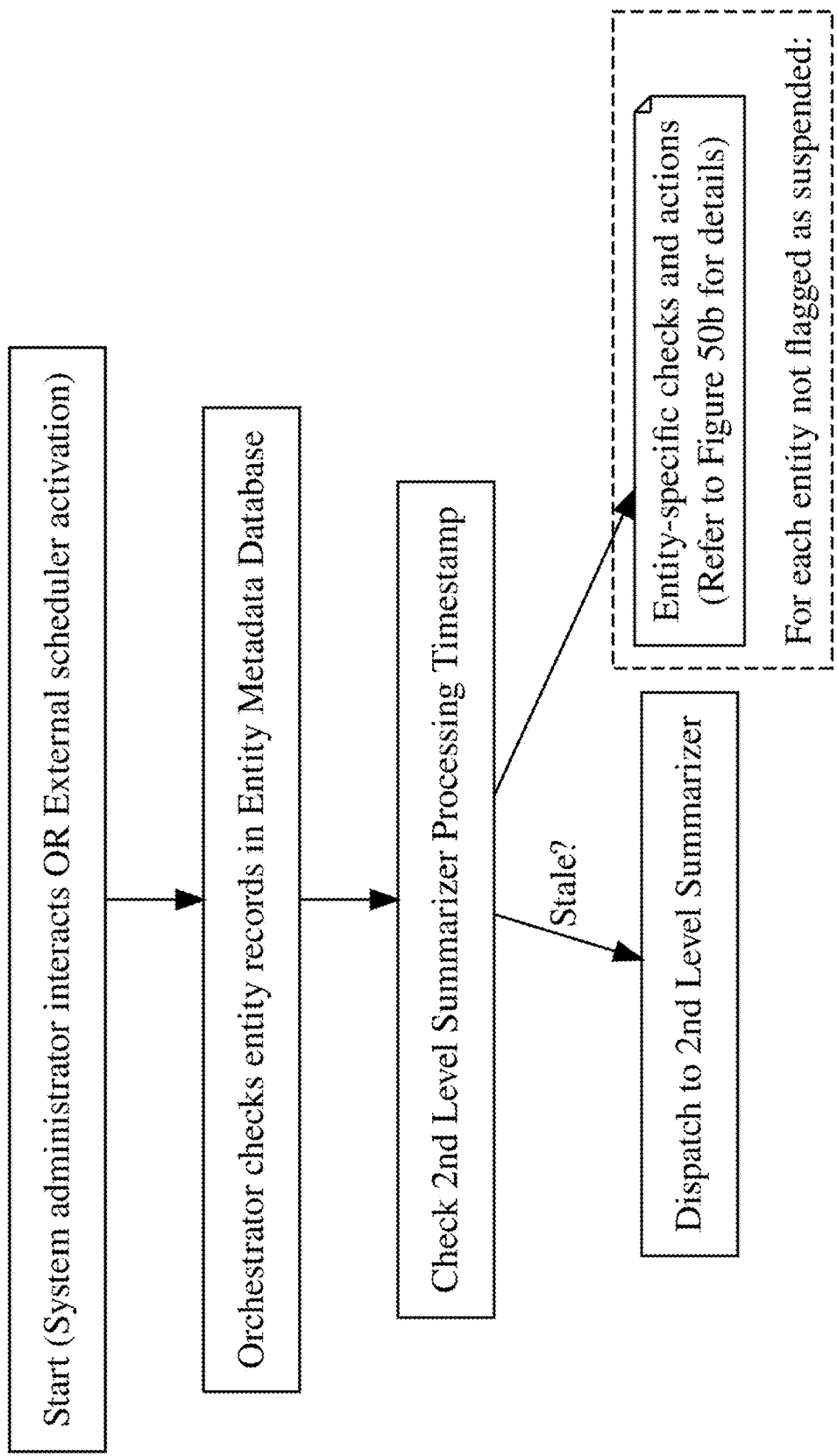
FIG. 50A is a flowchart describing higher-level operations of an orchestrating module in an update mode in accordance with one embodiment, emphasizing the outer operations of checking for the entity records in a metadata store, ensuring against the staleness of L2 summaries, and initiating entity-specific checks and staleness remediation actions for individual entities.
Figure 50B:
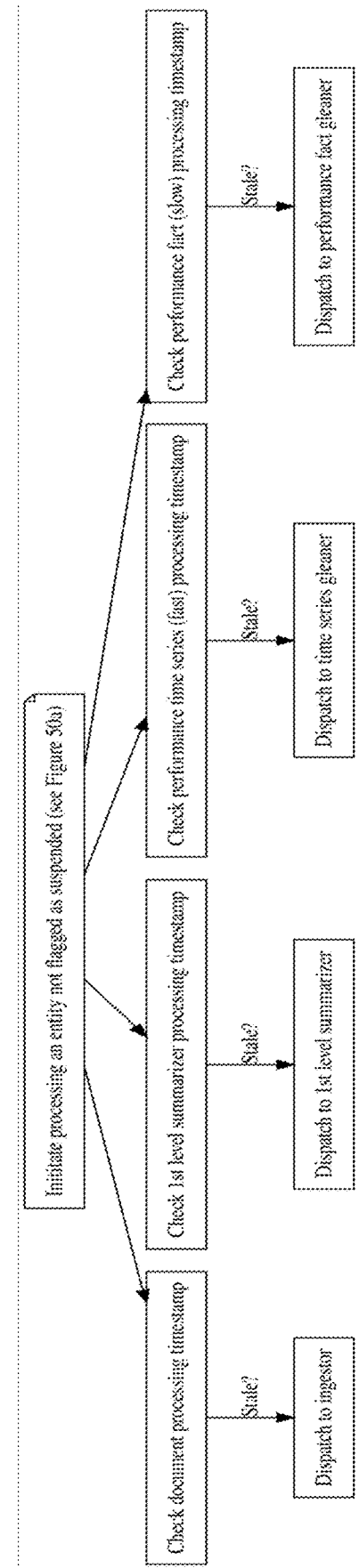
FIG. 50B is a flowchart describing lower-level operations of an orchestrating module in an update mode in accordance with one embodiment, emphasizing the lower-level operations of the orchestrating module, involving checking staleness timestamps and conditionally sending update request messages to modules such as the ingestor, L1Summarizer, time series gleaner, and performance fact gleaner to update entity-specific information for actively registered entities.

FIG. 50 provides a flowchart detailing the high-level operation of the orchestrating module in an update mode (as opposed to an interactive mode for lookups, enrollments, suspensions, etc.) in accordance with one embodiment.

The L2Summarizer (or 2nd-level or entity-level summarizer), in accordance with one embodiment, either periodically as assigned by the Orchestrator or triggered by an artifact inference or performance data update operation event, constructs a summary representation akin to the summary representation produced by the artifact-level summarizer. For each entity (e.g. a firm), the summary representation includes, non-exhaustively: internal and external identifiers (such as a company name, a company tax identifier, or a URL to the company website, or a company logo); data lineage and performance indicators (e.g. in an embodiment related to equities analysis, the market capitalization, price-to-earnings ratio, average price, EBITDA, or similar of a listed public company); top-K tags summary count data and entity summary count data as tabulated over a range of artifact productions; and summary vector representations of the entities which may be, e.g. computed from statistically summarizing, as by an average, the artifact-level vectors available in the 1st-level summary which were in turn summarized by the artifact-constituent level vectors, also as by an average.

Figure 51A:
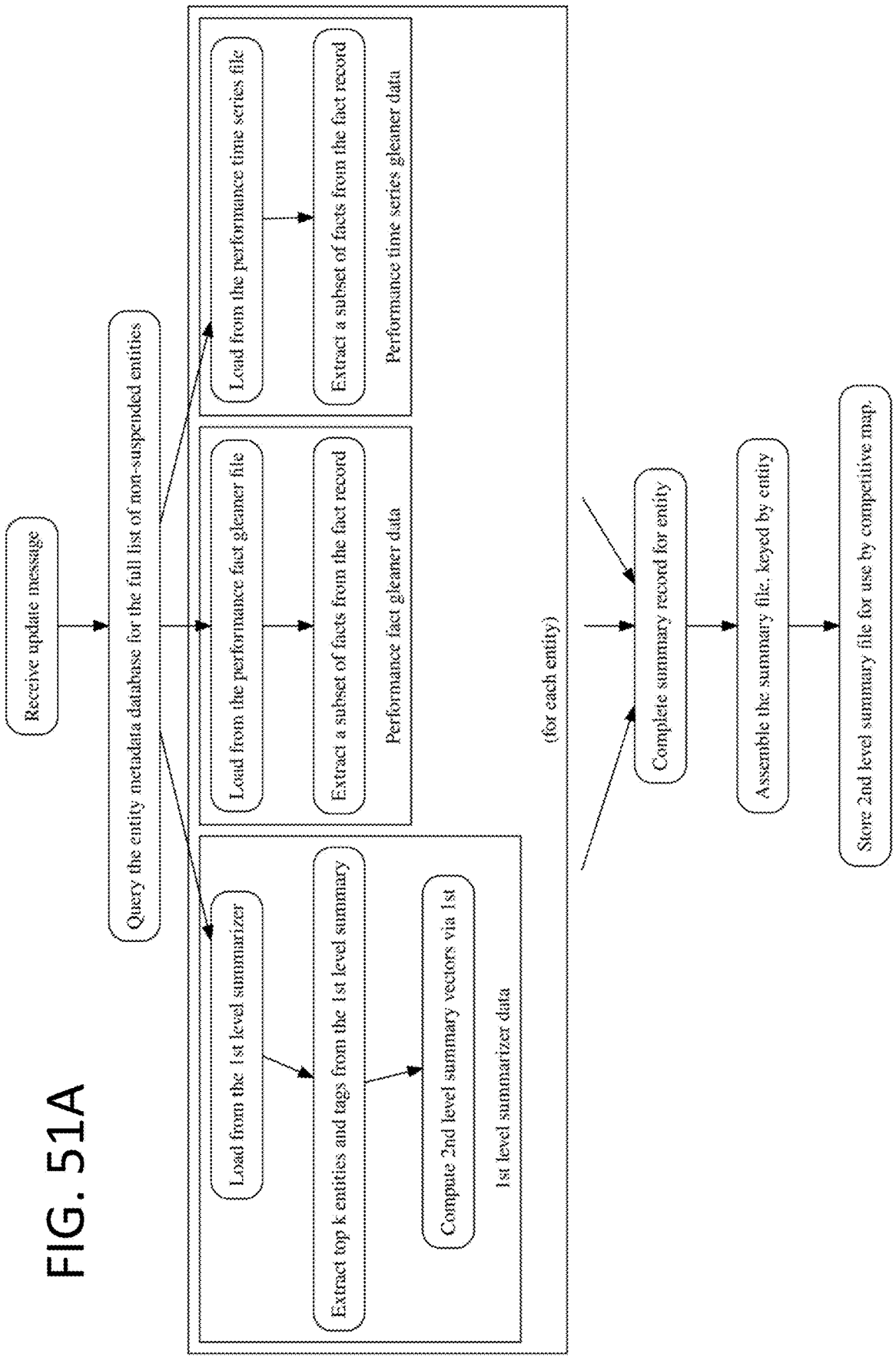
FIG. 51A is a flowchart describing typical operations of the L2Summarizer, operating on stored summary representations earlier computed by the L1Summarizer, the performance time series gleaner, and the performance fact gleaner in an embodiment related to equities analysis.

FIG. 51A, in accordance with one embodiment, provides a flowchart that offers a high-level overview of the typical operations of the L2 Summarizer, operating on stored summary representations earlier computed by the L1 Summarizer, the performance time series gleaner, and the performance fact gleaner.

FIG. 51B provides a record visualization of one embodiment of a subrecord in an L2 summary file produced by the L2Summarizer from an L1Summary, and gleaner time series and fact records. The summary incorporates entity data (e.g. from the Fact records or from the L1Summary); top-K named-entity data, semantic vector data, and top-K tag data 0 (ranked and truncated by pooling L1Summary subrecords); and performance data (e.g. avgPrice) from both varieties of gleaner performance data file.

A feature of the system aims to provide the user with artificial intelligence backed explanations for plots and charts in accordance with one embodiment. The user can click the adaptive plot menu option for LLM-assisted insights and click or otherwise interact to generate insight prompts (either client-side or server-side). The prompts can then be interactively sent, either manually, or as a combined step to a commodity LLM (such as GPT-4) or a system-hosted LLM from a language model pool. The prompts may be mechanically generated from plot instance-specific templating combined with plot-class appropriate statistical anomaly detection.

"Insight-generating functions" particular to a plot instance (such as a line chart in the role of a stock time series) take the plot DOM object in memory, which has been instrumented with metadata referencing the data used to create the plot, and which allows programmatic retrieval of individual plot elements, and thereby pass a subset of plot elements and the associated plot data to one or more randomly selected statistical anomaly or statistical cohort identification or clustering functions. The randomization can be conceptualized as a step in a Markov process, where a probability or unnormalized probability weighted list of alternatives helps to structure a pseudorandom choice of propensity to select an alternative, as by fitness-proportionate or "roulette-wheel" selection (as this method is referred to in the fields of evolutionary computation and genetic algorithms). Each plot instance type can have a different weighting indexing into a mapping of anomaly detection functions (e.g. 2-dimensional outlier detection as by Angle Based Detection or Local Outlier Factor), which take as input the plot elements and associated plot data, and which may be generally appropriate to a restricted subset of broader plot classes (e.g. finding communities or connected components at random in force-directed graphs vs. being specialized specifically for the entities, artifacts, or artifact-constituents force-directed graphs; or finding local maxima as opposed to specifically finding maxima in a time series of historical stock price; or category extinction in an area plot or streamgraph, as opposed to an out-of-business event in a streamgraph of a field of competitors).

In accordance with various embodiments, the result of anomaly or cluster detection (returning the plot elements and the associated data comprising the anomaly or cluster or subgroup to be visually made salient to the user) may be used along with knowledge of the function selected to index into or otherwise make operative one or more textual templates used to describe the cluster. For instance, if a community cluster detection yields a random cluster in a graph of sentences, the calling insight-generating function may invoke methods on the plot and the associated data to produce a LLM prompt that incorporates the sentence texts or subsets of sentence texts themselves (with or without reference to the graph structure) in combination with generic analytical questions or knowledge statements integrable by a highly-competent LLM, as with "Keep in mind that next-generation sequencing has become extremely affordable in recent years. Consider the following statements from the company in the area of the scientific or technical Offering: <sentence1><sentence3><sentence7>. What are the advantages and disadvantages of this approach?".

The cluster or anomaly or subgroup can be visually implemented by one or more attention-capturing methods integrated into the plot system, such as drawing a large red arrow whose arrowhead may be directed at one or multiple data points on a time series, or causing to be rendered a transparent ellipse fit over the data points, or temporarily styling a graph to make distinct the involved nodes and edges by respecifying their SVG stroke or fill.

In accordance with various embodiments, manually or automatically, and metered by a rate-limiting or API-credit related system that enacts a soft or hard paywall or which prevents excessive use, the prompt can be dispatched to the LLM and the response can be displayed. If the system is configured to permit transparency of the prompt the computation of the prompt in coordination with randomized filling of the templates or a rule system can be performed on the client, and the prompt produced mechanically may be displayed to the user. If the system is configured to prevent data transparency as to preserve trade secrets, a representation of the data and the plot elements or these in combination with the results of anomaly or cluster detection on the client may be dispatched to backend systems which perform the final leg of the computation and which thereby protect secret prompts which could confer or preserve economic advantage related to the apparent "intelligence" of the system.

In accordance with one embodiment, an insight inhibition-of-return mechanism implemented with a data structure which allows enduring set membership queries (e.g. a hash map, or a Bloom filter), or which has a limited query memory (e.g., a ring buffer), may prevent the system from generating duplicate "insights" at each stage (e.g. prior to the insight-generating function returning or after it returns its results) by means of storing, e.g. the entire content of a generating prompt, a hash of the prompt, or a hash of identifiers or XPath patterns of the plot data elements and underlying plot data which generates the insight, for the purposes of reducing cost under excessive use, and also for showing users fewer repeated insights so that the user retains a greater estimate and subjective feeling of the intelligence of the system.

Figure 52A:
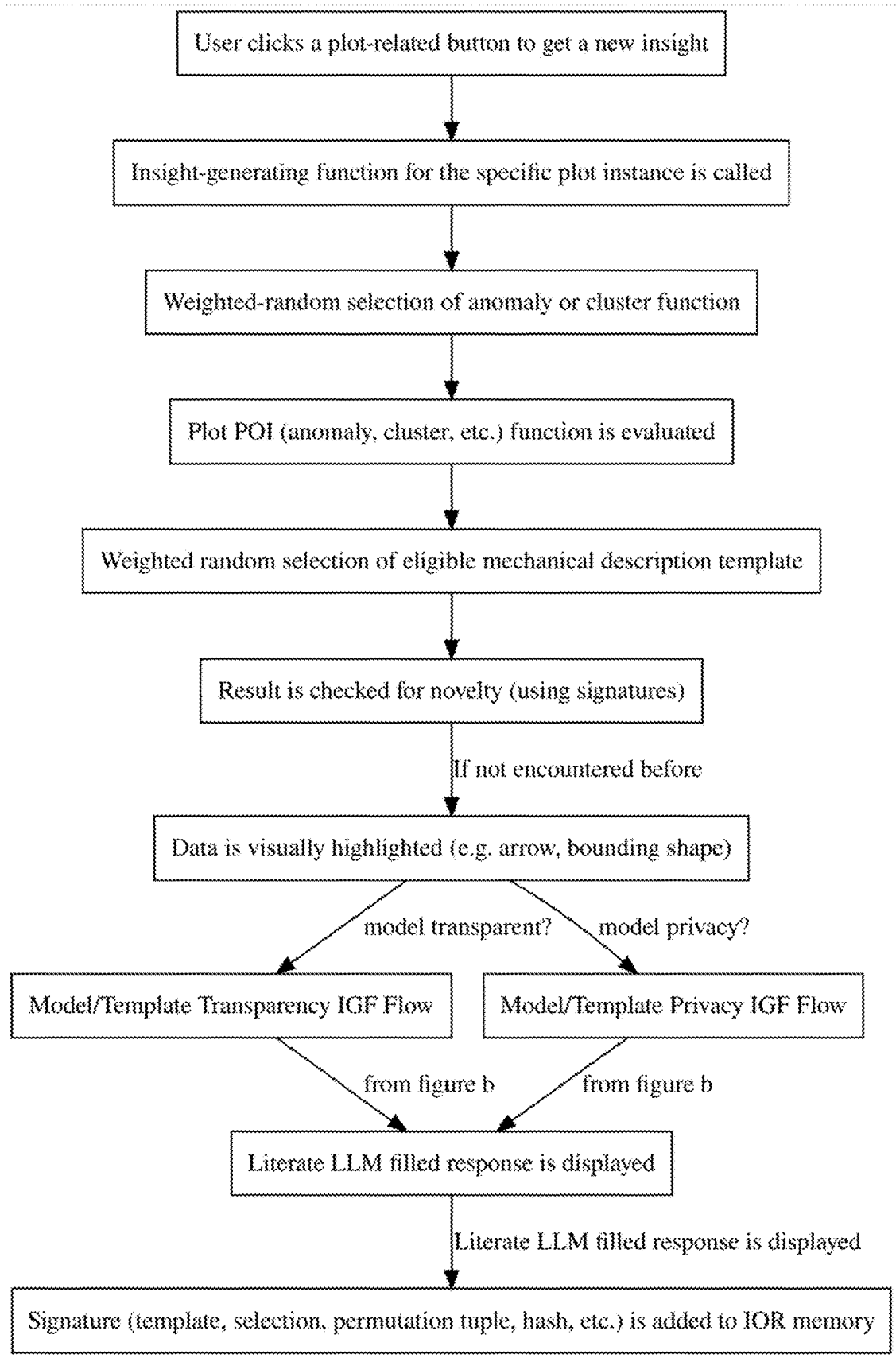
FIG. 52A is a flowchart of higher-level insight-generating function user interaction workflow in accordance with one embodiment, emphasizing the selection of eligible IGFs for a plot class, weighted random trial selection of anomaly or cluster functions for plot POI discovery, weighted-random selection of a template, optional novelty checking and plot POI highlighting or visualization along with branching template privacy preserving or template privacy exposing interaction flows.
Figure 52B:
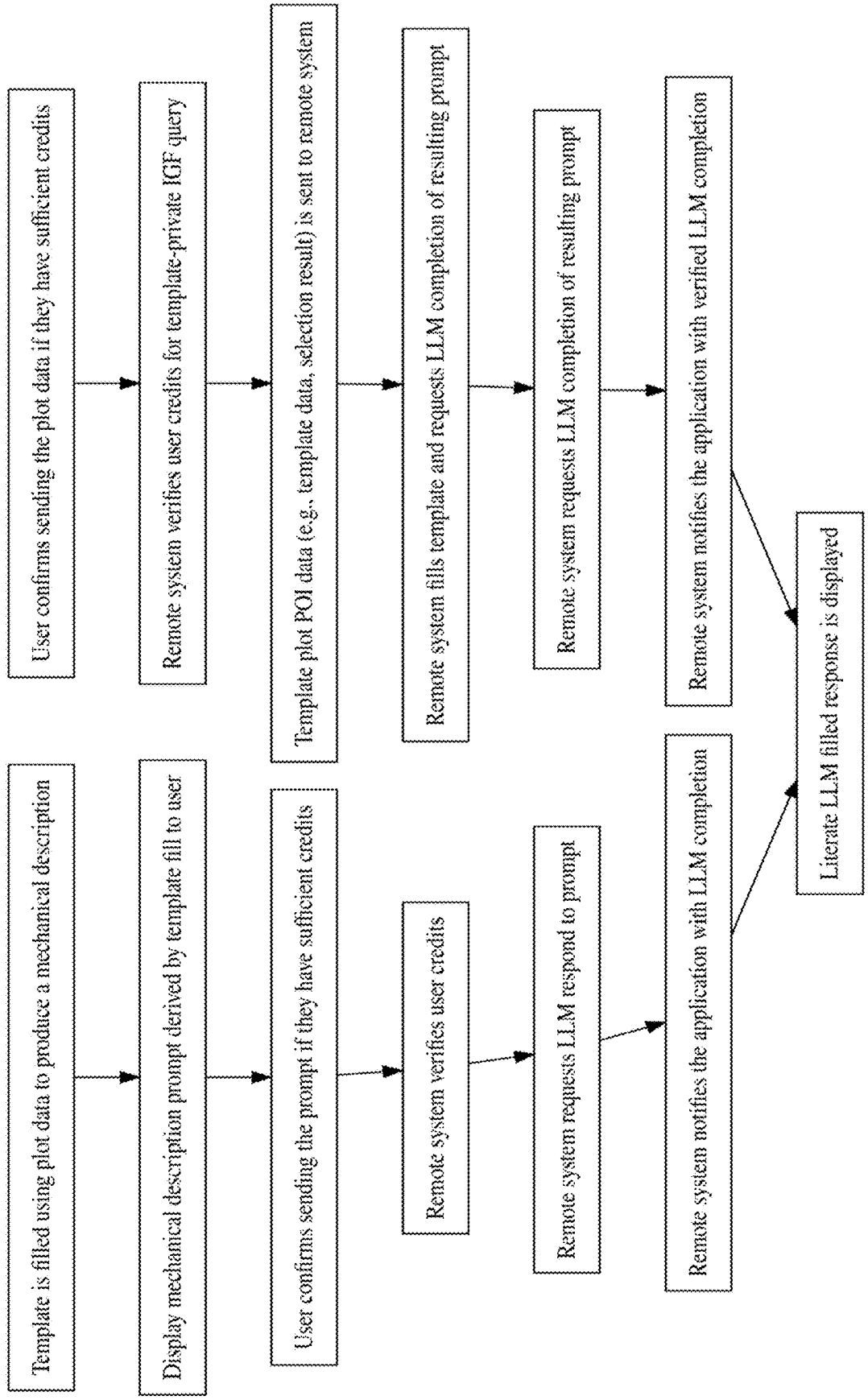
FIG. 52B is a flowchart of lower-level insight-generating function user interaction fulfillment logic workflow in accordance with one embodiment, emphasizing the separate paths in detail of template-private and template-exposed IGF user interactions and the fulfillment of the template completion and LLM-mediated template evaluation for explication using a remote system that accounts for user-initiated credit actions.

FIG. 52 provides a flowchart that offers a high-level view of the insight-generating function user interaction workflow.

Figure 53A:
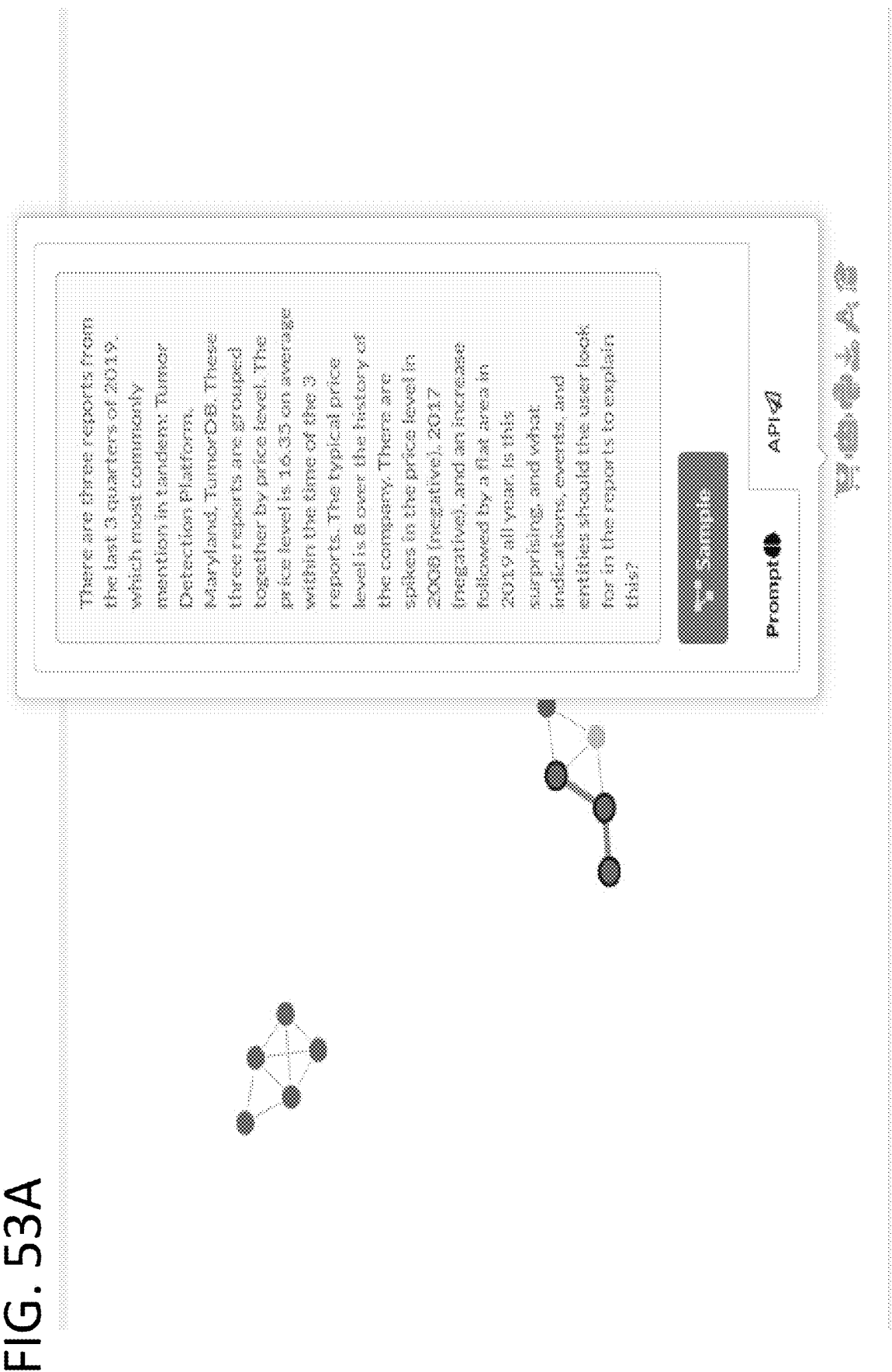
FIG. 53A illustrates an insight-generating function generated LLM-compatible prompt summoned by use of the plot-contextual menu, in a prompt-revelatory (as opposed to prompt-secret) system configuration in accordance with one embodiment.

In accordance with one embodiment, FIG. 53A shows a view of an insight-generating function generated LLM-compatible prompt summoned by use of the plot-contextual menu, in a prompt-revelatory (as opposed to prompt-secret) system configuration. The user may click, e.g. the Sample button to sample different insights by the means of the application of different templates and different anomaly and/or clustering functions underlying the rule system or template system constructing the literate but mechanically-generated prompt. The user, when satisfied with the prompt, can click on the API send tab to attempt to send the prompt to the LLM for evaluation and response. The result of the insight-generating function's invoked cluster-detection function is shown as a highlighted subgraph discovered through the process of randomly sampling collider-type graph motifs from the graph at large.

In accordance with one embodiment, FIG. 53B provides a view of the insight-generating function's LLM response in the user interface, where the LLM has integrated data from the earlier-sampled and generated prompt, along with potentially information retrieved from the local properties of the node (e.g. the named entities list from an L1Summary in the dashboard) or the nonlocal properties of the node as related to local properties of the node (e.g. artifact text) to produce a subjectively thoughtful and analytical response to the prompt. Shown in this UI control is an API credit limit type indicator for the number of credit entitlements left for the user after the submission of the prompt and the receipt of the response (of course, the system can be promotionally configured so that prompts are free).

Each of the three cardinal, force-directed graph types (i.e. those at the level of the entity map representing entities as nodes, those at the level of the dashboard representing artifacts as nodes, those at the level of the artifact viewer representing constituents such as sentences as nodes) can give rise to graph instances conditioned on the actual inputs and also the settings of parameters including the balance and laxity set by the user or determined by the optimizer with its perceptual objective function in accordance with various embodiments, and the choice of performance (non-semantic) or semantic distances used to compute the node distance or dissimilarity matrix.

The graph structure induced through these settings and in response to the latent structure underlying each unit of analysis (entities, artifacts, constituents) within the application, in accordance with one embodiment, is potentially a rich source of structured data for deep learning systems with the purpose of projecting, classifying, or approximately regressing e.g. the performance fate of the entities (as with, in an equities analysis embodiment, categorizing Strongly Confident, Weakly Confident Against, Ambivalent, etc. about the survival of a firm in six months or the growth of the firm as Exceeding Expectations, Not Meeting Expectations, Meeting Expectations, Experiencing Severe Contraction, etc.) or the character of the entities (e.g. such as innovation posture: Strongly Innovative, Not Strongly Innovative, Stagnant, Net Technology Licenser) or of the entity universe of analysis in general (as by categorizing the economy at large as Recessionary or Expansionary in view of stock exchange activity) or of the specific import of the artifact (such as by categorizing the report as a Pivotal Quarter or a Stagnant Quarter, or a Fundraising Focused report vs. a Profit Harvesting vs. a Long Term Innovation Disclosure report) with accuracy and precision that could be expected, for some performance or semantic classifications to exceed that easily achievable through language and performance data representations (e.g. semantic channel identification counts, token presence, word or sentence or document embeddings, or price time series) alone.

In accordance with one embodiment, in a backend inference mode emphasizing retaining the economic advantage potentially conferred by model privacy, the browser can cause to be submitted a graph or a representation used to reconstruct a graph that may be produced through interactive use of any of the three tiers of the application and run the graph representation through a machine learning scheme upon a model pool consisting of any mixture of geometric deep learning models, including, but not limited to: Graph Convolutional Networks; Graph Attentional Networks; Graph Isomorphism Networks; or related variants of the same with differing aggregation, node and link embedding, and node and link forward and backward artificial neural dynamics such as ChebNet, Message Passing Neural Networks, or GraphSAGE as considered appropriate for accuracy and computing time and space requirements, or a sequence of networks across historical time or interpolated settings of graph parameters of Balance, Laxity, and distance through a temporally-aware paradigm such as a Graph Sequence Neural Network. The same general interaction pattern for inference may be used for any derivable generalizations of graphs (such as multigraphs, hypergraphs, and graphs in combination with their simplices or facelike elements as in the topological complexes associated with TNNs, Topological Neural Networks).

Figure 54:
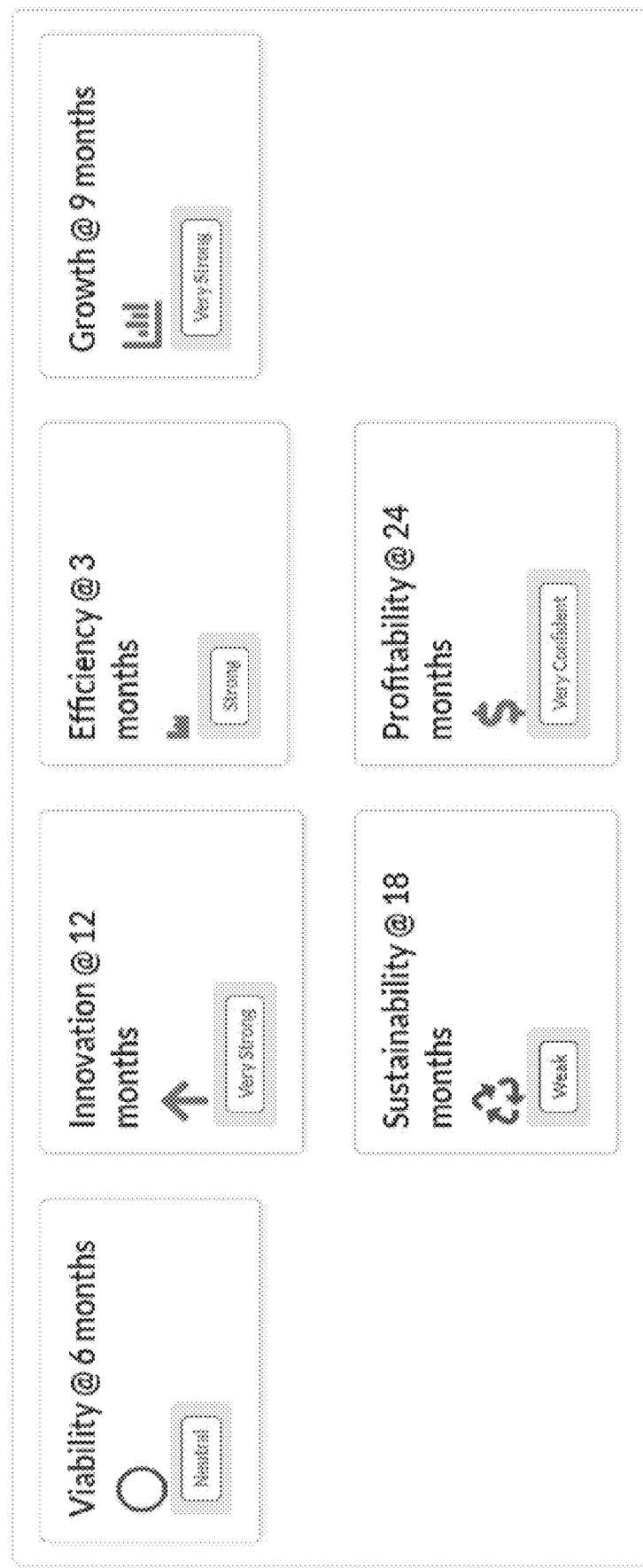
FIG. 54 illustrates graph deep learning or graph deep sequence learning based coarse classifications as they might appear on the dashboard tier of the application for a company in an embodiment related to equities analysis.

FIG. 54 provides a view of the graph deep learning or graph deep sequence learning based coarse classifications as they might appear on the dashboard tier of the application for a company in an equities analysis embodiment. The classifications take as input, e.g. server-side periodically computed graphs optimized with the perceptual objective, extemporaneous graphs induced by the user, or sequences of these kinds of graphs and output a coarse classification like Very Weak, Weak, Neutral, Strong, Very Strong, with graph deep learning networks including those such as Graph Convolutional Networks contributing to performing the inference. Extemporaneous graphs may, in situations not suggesting model privacy, be inferenced client-side; graphs may otherwise be inferenced in the system backend.

In accordance with various embodiments, one or more of these networks can be combined to perform standard tasks of node-level, graph-level (or subgraph-level), or link-level prediction with computational genericity but to specific tolerances and with specific neural weights fine-tuned upon the domain (e.g. corporate universe data) or the task (e.g. firm survival at 6 months). These predictions can be returned interactively via an HTTP polling or event source bidirectional server-client mechanism for long-running events, or else periodically or in response to a document or performance data processing event the system may precompute this information using computationally similar or identical graph induction code as may be used in the interactive user-facing system. As a compromise on tasks where model privacy is not deemed to be economically advantageous, and network size on disk does not translate to excessive data egress costs from the cloud system, the neural network weights and structural definitions can be delivered to the browser, and in conjunction with a standard browser-based runtime for inferencing neural networks (such as ONNX or Tensorflow.js), provide selected client-side predictions.

In accordance with various embodiments, regardless of the economic configuration appropriate to the data and the operational or economic environment per-prediction-task (server-side, client-initiated; server-side, server-initiated; pure client side), categorical predictions can be prominently displayed at all three tiers of the application, in either a zone of the screen which may be distinct from any of the force-directed graph viewing subpanes or inset or outset from the subpanes, in a visual form, including but not limited to: large color-glyph indicators signaling confidence or lack of confidence; bar charts or histograms showing the distribution of levels of confidence; or mere statements appearing in standard color or in a color similarly appropriate to the level of confidence or the categorical quality or semantic distinction (e.g. Confident in bright green).

Figure 55A:
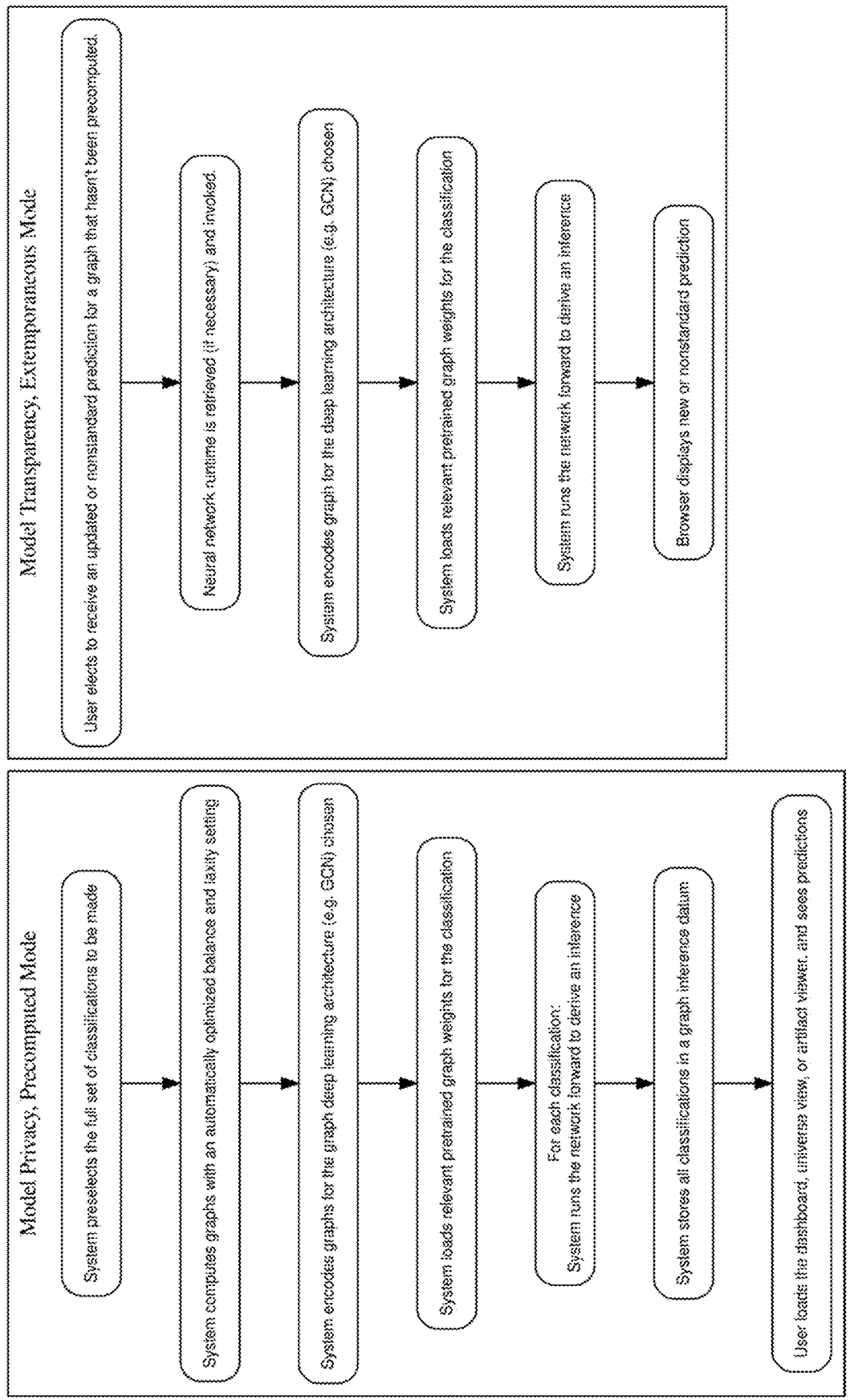
FIG. 55A provides flowcharts illustrating high-level user interaction with the graph deep learning functionality available at one or more levels of the application, under opposing conditions (model privacy, precomputed mode; model transparency, extemporaneous mode) in accordance with one embodiment.

FIG. 55A displays two flowcharts illustrating high-level user interaction with the graph deep learning functionality available at one or more levels of the application, under opposing conditions (model privacy, precomputed mode; model transparency, extemporaneous mode) in accordance with one embodiment.

Figure 55B:
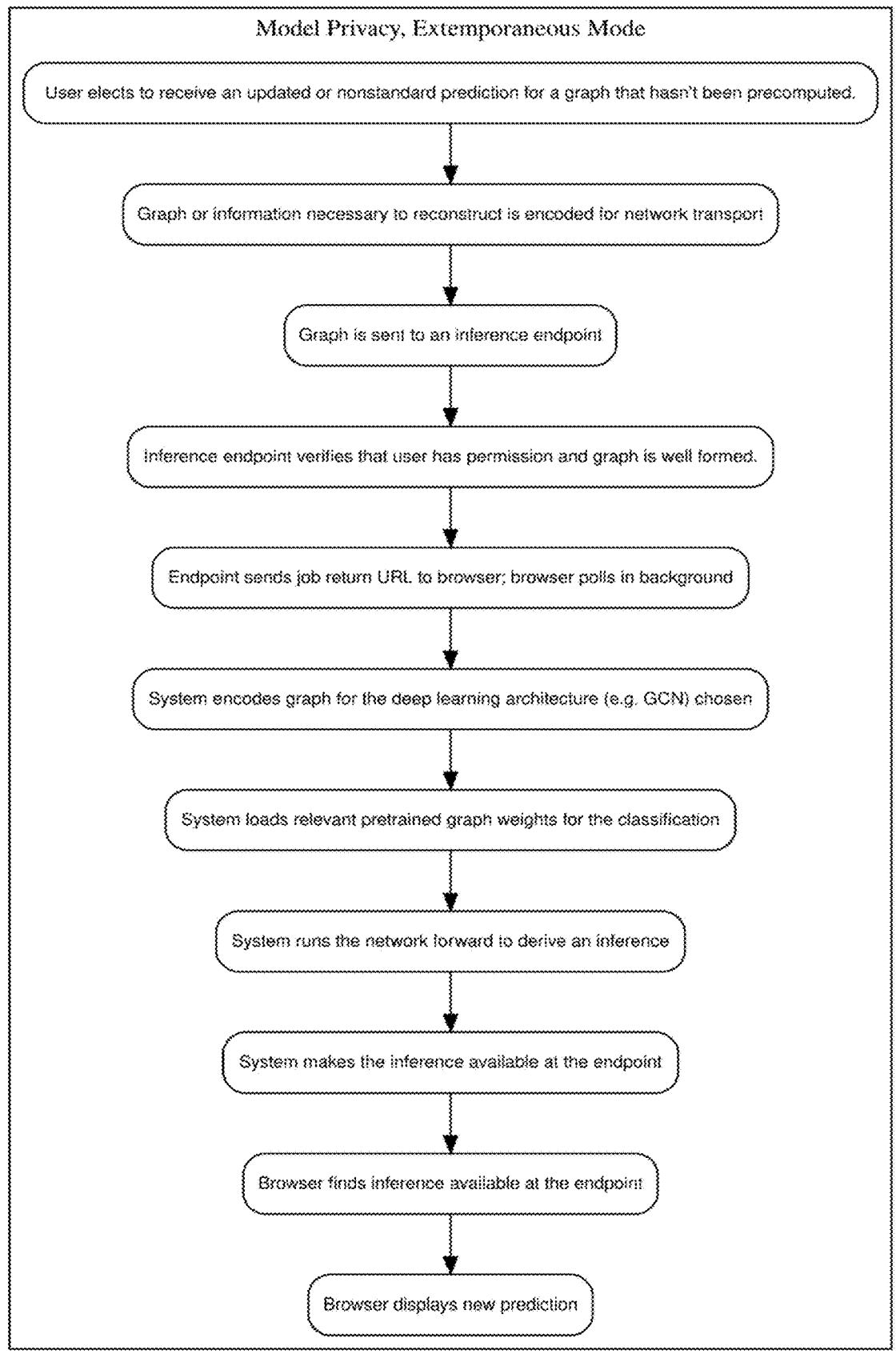
FIG. 55B is a flowchart illustrating high-level user interaction with the graph deep learning functionality available at one or more levels of the application, under a third intermediate condition (model privacy, extemporaneous mode) in accordance with one embodiment.

FIG. 55B provides a flowchart illustrating high-level user interaction with the graph deep learning functionality available at one or more levels of the application, under a third intermediate condition (model privacy, extemporaneous mode) in accordance with one embodiment.

The artifact-level annotator and viewer contains, in accordance with one embodiment, a tool focused on providing high-level textual advisories, where the character and specificity of the advisories may change depending on the textual domain (e.g. equities analysis, journalism, student essay grading, and so on) but the structure of the advisory may be generally fixed. For instance, in an embodiment related to equities analysis, the advisories may take the traditional character of grid or "graphic organizer" listings concerning bullet points or other hierarchical enumerations of advice or points of concern or opportunity, with headings such as Key Opportunities, Optionality, Key Risks, Major Deals, Elements of Concern, Exit Criteria and also flat descriptions of the state of the investment as in a quarterly portfolio description letter produced by institutional investor analysts for internal use or more explicitly by family office or mutual fund advisors.

Typically, these reports are produced by an advisor or analyst very familiar with the key operations and recent dealings of the firm and the investment thesis and the general strategy for the fractional disposition of assets under management in a larger investment portfolio; however in this system, in accordance with one embodiment, the general report and its specific facets may be constructed by calling, either on an ad-hoc client-initiated basis with a server-side hash-keyed cache to prevent duplicate report generations or via server-side precomputation per document artifact, a system-hosted LLM from a model pool or a commodity LLM, and retrieving structured generative productions.

In accordance with one embodiment, the LLM may be prompted with a composite prompt text beginning with: 1) a general task instruction exhortation such as "Please pretend you are a high-flying, professional financial advisor. Following these instructions, produce a report broken down by the headings General Recommendations, Optionality, Key Risks, Major Deals, Elements of Concern"; 2) a series of general definitions attentionally-summoned from a soft knowledge base of definitions indexed into by using a database of semantic vector embeddings of the definitions (i.e. a "vector database"), or of challenge/response pairs such that, e.g. where the words "lease" and California appear in the document, facts about commercial real estate insurance and earthquake coverage may be concatenated into the prompt prepended individually or as a group with an instruction like "Please keep in mind that:"; 3) optionally, a series of current events news items and statements in a headlines database of the same character as the definitions soft knowledge base but conditioned to only retrieve facts temporally reasonably relevant (e.g. within a 6 month to 5 year window) around the date of the textual artifact, as determined using the data lineage metadata; 4) a series of importance ranked (e.g. by named entity count or by event-severity weighted negative tag count or by similarity to the mean of the phrase vectors of the annotation text within a relevant channel) sampled polarity-congruent machine annotations comprising a subset of those available in the document, prepended with a context such as "We know from the present report that:"; and 5) generic guidance about what the different sections represent contextualized to the domain (e.g. equities analysis) and the subdomain (e.g. the synthetic biology industry), e.g. "50% of synthetic biology companies have required at least 1 billion dollars in funding and around 50 PhDs to produce productizable results to reach the IPO stage" or "Institutional investors have been known to unfairly punish technically and financially successful semiconductor design companies, such as AMD, for the business and technical failures of their more influential incumbent competitors in the sector, such as Intel").

A summary "critic" function, realized either through the application of one or more rule systems or a second independent LLM which assures that the headings appear in the generated text to assure form and the bullet points reference discoverable named entities such as correct dollar amounts to mitigate hallucinations, gates whether: 1) this becomes the advice displayed to the end user, 2) the process "backs off" to sample alternative facts from the soft knowledge bases and alternative machine annotations or to sample merely fewer facts or annotations, 3) or whether, after an economically agreeable number of back-off steps the "critic" process determines that the system should declare that no advisory report should be issued to the user at this time.

Figure 56A:
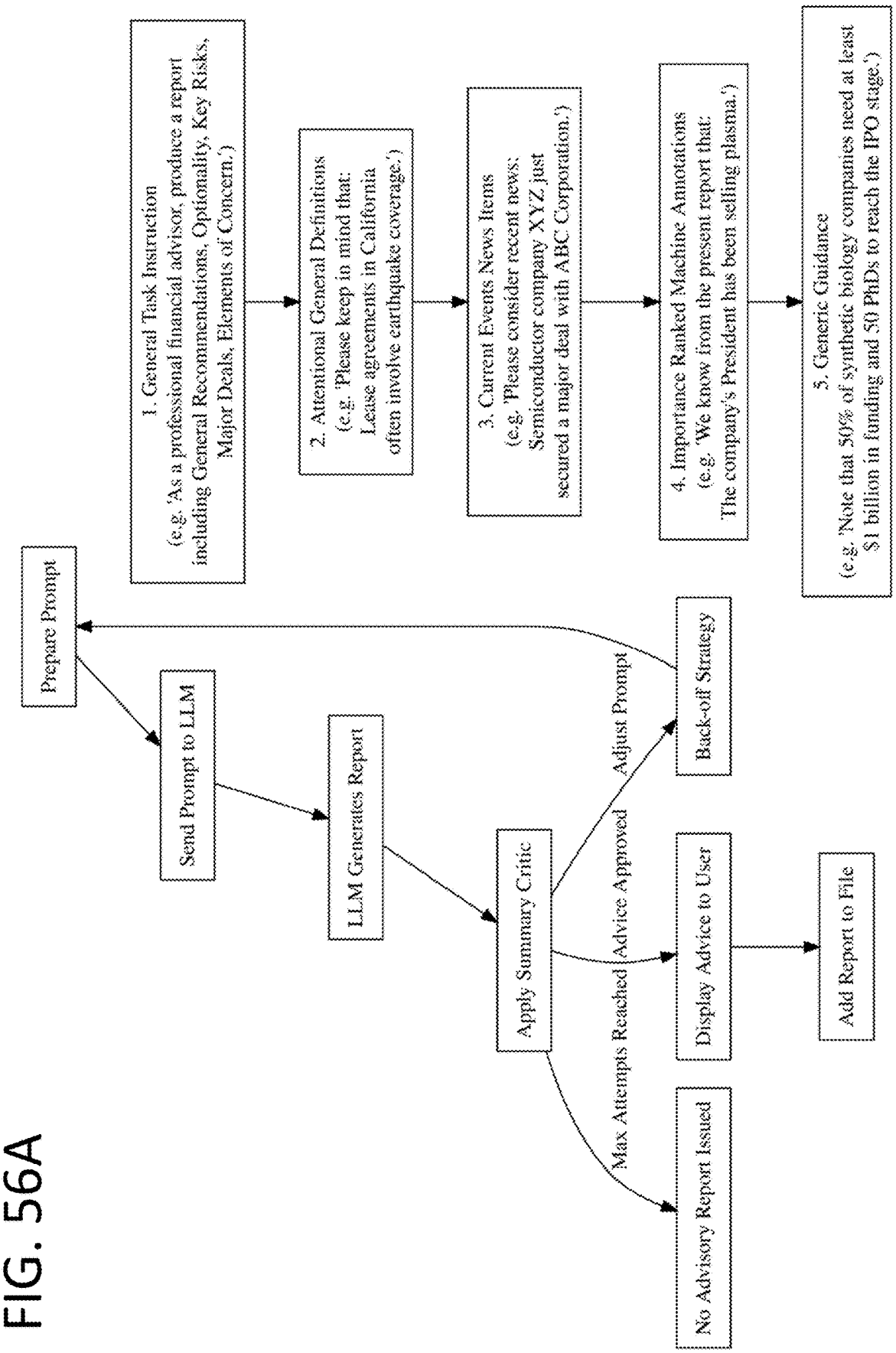
FIG. 56A is a flowchart of typical operation of synthetic advisor report generation, in the mode of precomputed rather than ad-lib user-requested reports in accordance with one embodiment.

FIG. 56A provides a flowchart detailing high-level operation of the synthetic advisor report generation, in the mode of precomputed rather than ad-lib user-requested reports in accordance with one embodiment.

Figure 56B:
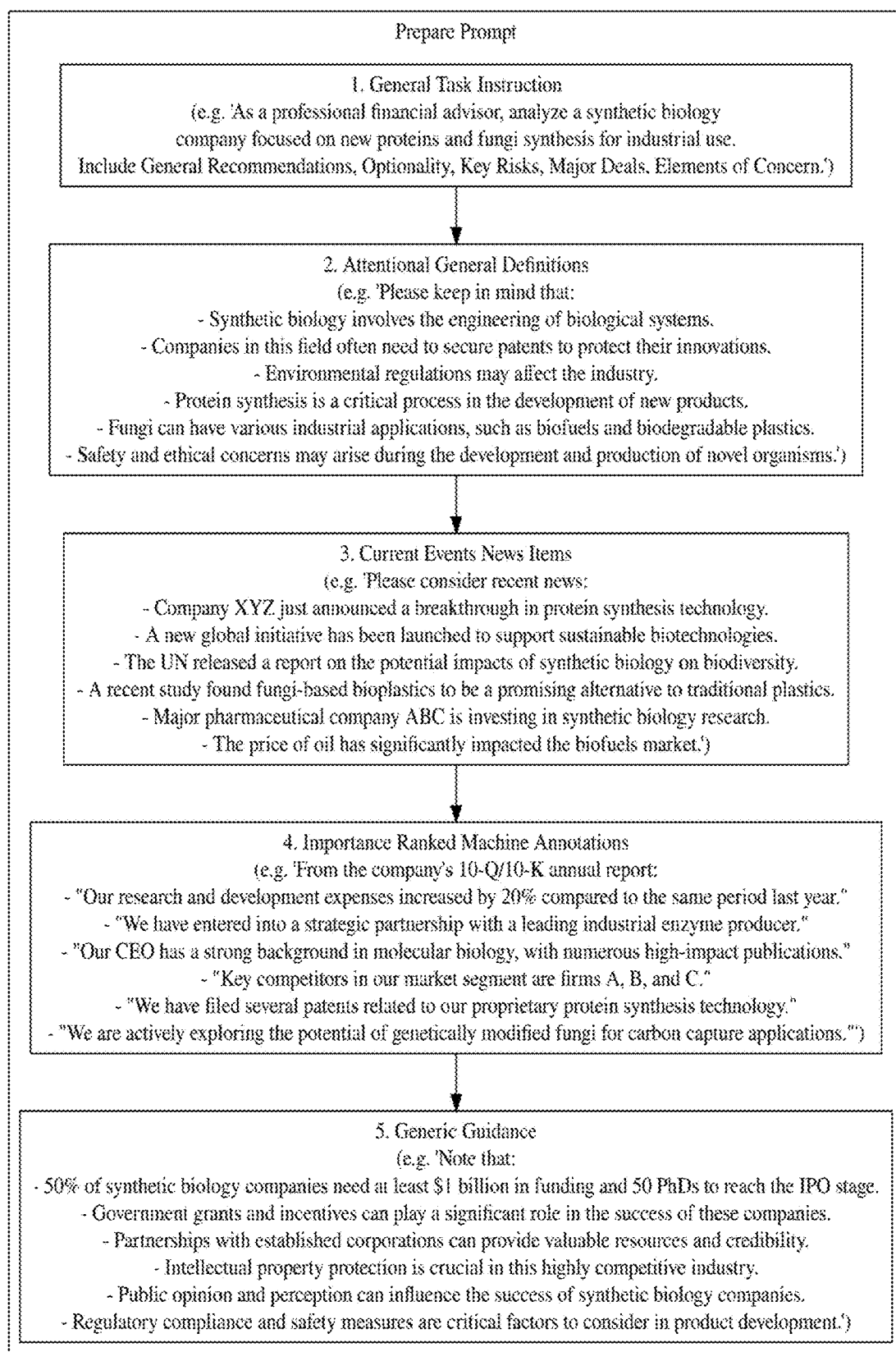
FIG. 56B is a flowchart of advisor prompt construction in accordance with an embodiment related to equities analysis.

FIG. 56B provides a flowchart that exemplifies the process of advisor prompt construction from general task instructions, attentionally-summoned domain-specific general definitions, time-locked event information (e.g. news headlines or current events content available at the time of the artifact's publication), importance-ranked or otherwise prioritized machine annotations from the artifact, and how this may tend to cause guidance to be synthesized, in accordance with one embodiment.

FIG. 56C provides a sample advisor report production using the concatenated generated prompt elements in the prompt construction example. In the interactive system, these sections may be folded into, e.g. accordion UI elements or HTML tables to effect graphical-organizer type formatting, in accordance with one embodiment.

Throughout the three application tiers of the interactive system, there exist a plurality of plots, charts, and visualizations implemented using SVG elements, in accordance with various embodiments. Affixed to the in-memory DOM representation of each relevant SVG element may be metadata accomplishing purposes including but not limited to: a reference to the source datum generating the visualization (such as a dictionary or array data structure of e.g. time series, graph, percentage, 2-dimensional, or scalar field data); dimensional data relevant to the bounds and extent of the SVG element; one or more plot scaling functions used for fitting data to its apportioned bounds on screen or reinterpreting logical coordinates as viewport or screen space coordinates; the internal name of the plot instance; the display name of the plot instance; and one or more educational descriptions of the plot potentially integrating one or more inline MediaWiki-style links to an external knowledge base for the reference convenience of the end user.

In accordance with one embodiment, at a location inset or outset of the plot depending adaptively upon the available space in the SVG element's enclosing containers or distracting potentially overlapping elements within the SVG element's viewport, the system will, for relevant plots possessing this metadata, cause to be displayed a menu with icon-based "buttons" affording one or more plot-contextual actions to the end user, including but not limiting to: a tutorial function which displays the scientific, technical, or domain-specific informational description from the metadata, as via a popup UI element; a graphical markup export function which permits a static or dynamic form of the visualization (as might be embodied in a SVG format or SVG format with accompanying Javascript) to be downloaded by the user; an adaptive data export function which permits the user to download the plot data in, e.g. hierarchical text (e.g. JSON) or tabular (e.g. CSV) or structured binary or application-specific (e.g. MAT files, HDF5, SPSS, Rdata, etc.) formats conditional upon the appropriateness of the data for expression in the format; a smart tooltip function using the insight-generating functions and the LLM integration with anomaly or cluster detection statistical subroutines elsewhere defined in this disclosure; a "plot-contextual data cart" function which permits the current plot and its metadata to be saved in an application-tier spanning inventory for the purposes of subsequent presentation and written report generation; and an interpreter export function which allows the user to insert the data (available in e.g. Javascript) from the main browser portion of the application into a separate (e.g. Python) interpreter instance as a variable with a convenient name, such as a name derived from the internal plot instance class identifier in the metadata, or simply a placeholder name such as "data".

Figure 57A:
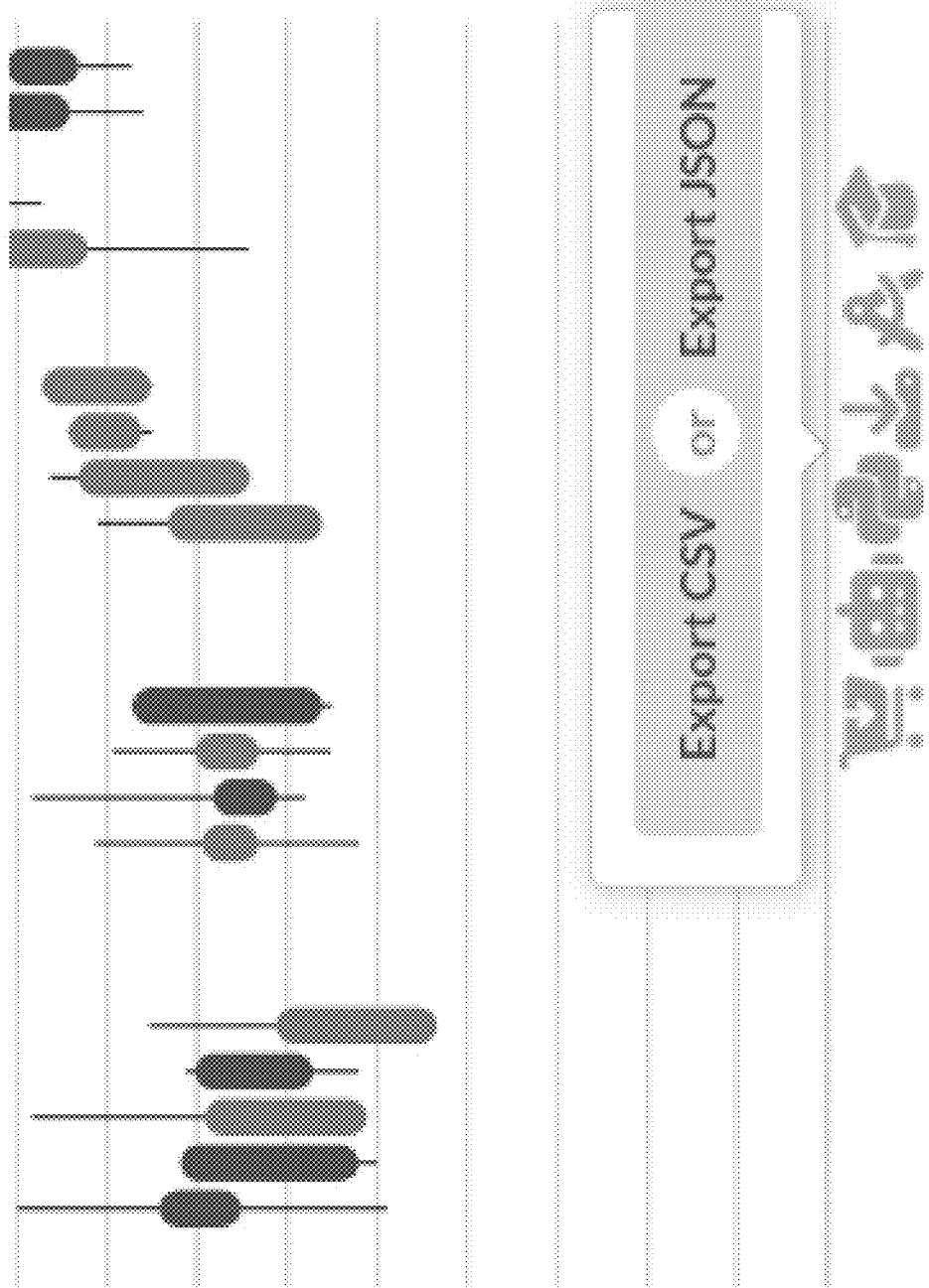
FIG. 57A illustrates a view of an item in the plot-contextual menu, showing the adaptive export functionality in accordance with one embodiment.

FIG. 57A provides a visualization of an item in the plot-contextual menu, exhibiting the adaptive export functionality (e.g. the application detects if the data generating the plot is tabular, and only offers a hierarchical data download if it is not) in accordance with one embodiment.

Figure 57B:
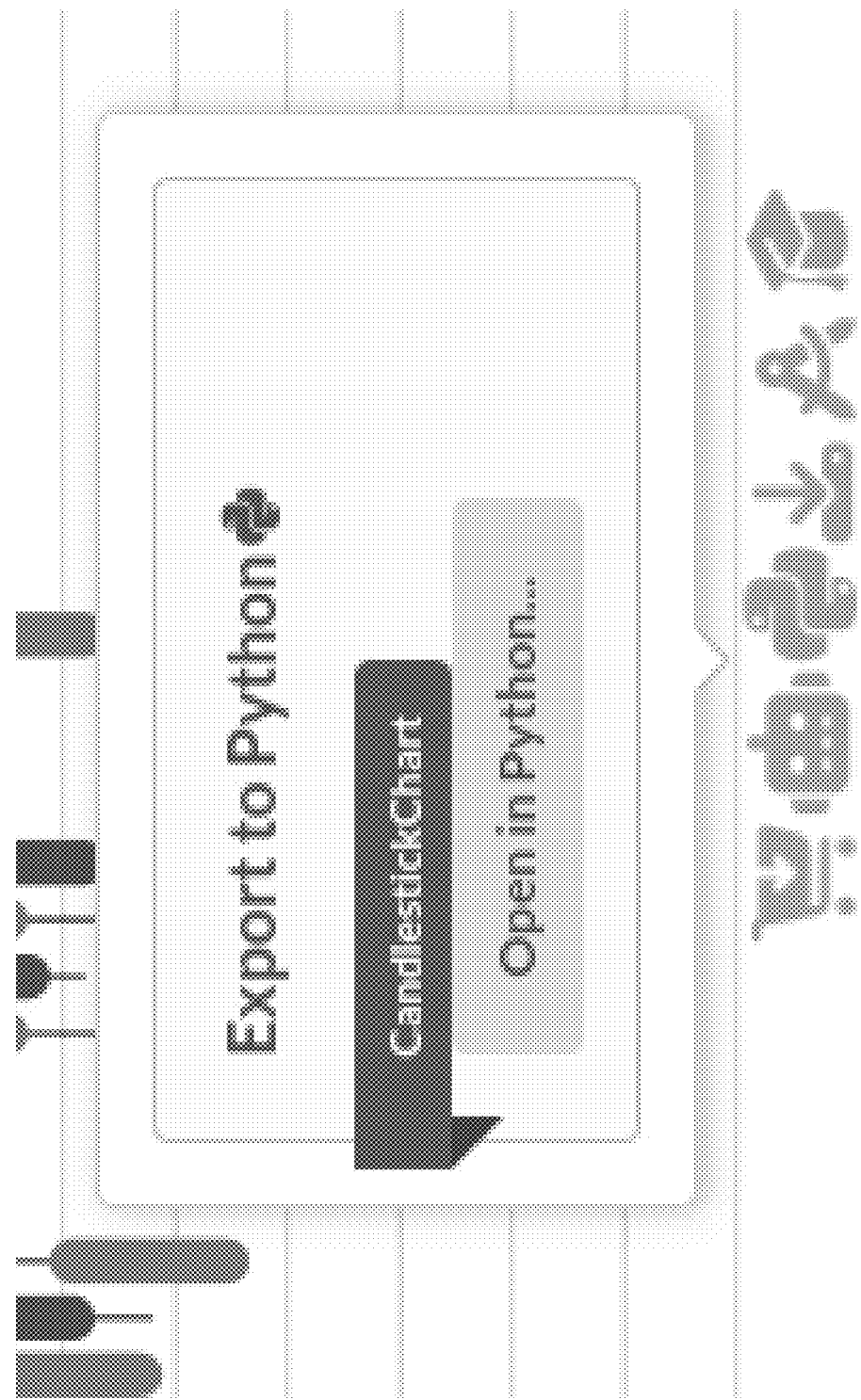
FIG. 57B illustrates a view of an item in the plot-contextual menu, showing the captive interpreter data variable export functionality in accordance with one embodiment.

FIG. 57B provides a visualization of an item in the plot-contextual menu, exhibiting the captive interpreter data variable export functionality (e.g. the application loads and copies the plot's data into a convenient temporary variable so that an analyst can quickly use it in the application-captive interactive interpreter) in accordance with one embodiment.

The captive interpreter in accordance with various embodiments may be implemented, e.g. as a mixture of ordinary web browser code (e.g. as written in Javascript) and WASM object code (e.g. a version of cPython with a WebAssembly compilation target, as with the Pyodide project) and may be improved upon in the current system by the use of additional custom code including, but not limited to: 1) prelude initialization code inserted before the user gets to interact with the interpreter (e.g. used to map in common libraries under aliases); 2) user input checking code which intercepts input to occasionally transform it for the purposes of avoiding errors or adapting generic user code to the execution or software packaging restrictions of the interactive environment; 3) environment output checking code which reconditions interpreter output for display compatible with browser concerns or for the improved understanding of the user; 4) bidirectional data type and data model integration code which permits the user or programs or libraries to more seamlessly transfer data between the browser scripting environment and the captive interpreter scripting environment or to call functions in one environment from the other; 5) library interception and patching code which overrides elements of preexisting code available to the interpreter environment or which could become available to the interpreter environment by means of monkeypatching, shimming, wrapping, injecting, or otherwise patching calls (in a specific example, e.g. for rerouting file I/O calls used by a popular Python plotting library so that when the plot saving and figure initialization calls may be made in a conventional and familiar fashion by the user, the plot data may be written to memory as a virtual file instead of calling to a graphical display library and the file may be encoded in a form that can be accepted as valid markup interpretable by the browser for use in a browser canvas element, either upon a generated page or within a viewing pane or modal dialog UI element upon the same web page); 6) or virtual library code which provides dynamic facilities akin to a module that could be downloaded from a software repository but relying on code which may be injected by the application (e.g. for providing a library object or faux library object with methods that, for instance, export data or call functions in the browser portion of the application, provide convenience functions for dealing with plot metadata or exporting it to more arcane formats not specified in the adaptive export system, or which simplify dealing with requests made and responses returned involving one or more remote web service APIs); and 7) periodic environment health checking code (e.g. for preventing a user from conventionally deleting, overriding, patching, or otherwise modifying designated variables or real or virtual software libraries).

FIG. 58 portrays a view, in accordance with one embodiment, of the captive interactive interpreter which may be made available at the three tiers of the application. The interpreter shows output suggesting the user has clicked the export to interpreter button attached to a temporal flow query visualization and now has the data stored as the temporary variable "data". Autocompletion shows that the (undeletable) virtual library object offering application-specific convenience functions can perform functions like provide a Python list of the internal names of the plots generated so far at that tier of the application and application page load, in a way that might be useful with a different convenience function furnished to get the data and coerce it into a Python-friendly object value. Other libraries have been loaded and patched at runtime to provide extended, application-specific functionality or to repair expected functionality to adapt it to the unconventional medium; there may also be bidirectional communication with the objects available to the browser's own (e.g. Javascript) interpreter.

The captive interpreter system may be integrated with an adaptive, contextual, and causal tutorial system, in accordance with one embodiment, which permits the user to easily perform analyses not specified at greater development cost and visual design disruption in the main application. Tutorials may be embodied in the application as mini-articles resembling blog posts or technical walkthroughs with syntax highlighted code segments which may be partially interactive: code segments in the style of interactive data science notebooks possess attached buttons with functions including but not limited to: copying the code segment to the system or browser clipboard; running the segment in the interactive environment; explaining the segment either by using precomputed text stored with the tutorial data model or calling an external API for deferred language computation (e.g. which calls to an LLM the first time any user requests a line-by-line or snippet-by-snippet explanation of the tutorial code segment).

Tutorial data records, which may be embodied as JSON data files whose contents may be wholly precomputed or partially computed and then filled as requested by remote API calls may include the following data or metadata: the internal name of the tutorial; the display name of the tutorial; keywords concerning the tutorial; a list of plot class names or plot instance class names the tutorial may be suited for; a listing of the application tiers the tutorial may be valid for; the import and export variable names the tutorial code may expect from or produce into the running interactive interpreter environment; the tutorial's markup (e.g. Markdown or HTML source code) or a URL to a remote location or API web service which retrieves the markup to reduce application code size until a user requests a specific tutorial; and other such metadata which may be useful for characterizing the skill level (e.g. Expert) or disciplinary origin (e.g. Quantitative Finance, Signal Processing) of the tutorial or assisting in fuzzy search.

A search box UI element, in accordance with one embodiment, may check one or more manifests of tutorial records either resident in the application code or loaded in a deferred manner from a remote location or API web service using conventional techniques such as approximate string matching, and a quick suggestion set of buttons may display a small number (e.g. 3-5) of "relevant" tutorials where relevancy may be calculated dynamically from user activity stored in browser local storage or retrieved using a web service API linked to the user's user account or unregistered guest activity record by factors including, but not limited to: the number of mouse entry vs. mouse exit events generated per plot type within the browser, or the historical user count of tutorial accesses with similar skill levels and analysis bodies of origin where plots or disciplines with more interactions may tend to produce e.g. a higher weighted average score that can be used as a value function in weighting quick suggestion generation search results.

When the user chooses to run the tutorial snippets, the tutorial system and the interpreter may, in accordance with various embodiments, work in concert to, inter alia: import variables before the snippet runs; detect and resolve program errors in the snippet; refuse to completely run if certain errors are discovered; prevent user input as by use of a loader UI element lockout on the interpreter and tutorial enclosing pane; export produced variables; arrange for the generation of new plot windows within the application or on a separate page; provide interactive templating of certain variables through dynamic generation of forms to receive variable names interactively from the user or variable literal/immediate values, or suggest other analyses which the user should run next according by reconciling listings of successor tutorials with previously run analyses.

In addition to providing the benefit of education to the user, this innovation provides a way to quickly add capabilities to the interactive system that originate subjectively from outside of the system, or which may not be generically appropriate to the analysis domains, such as computing a SARIMAX or Recurrent Neural Network 3-day projection of a future stock price, or computing a Fast Fourier Transform of extremely finely sampled performance data for entities which produce many textual artifacts (e.g. Tweets) in a high-performance computing embodiment of the system.

FIG. 59 provides a view, in accordance with one embodiment, of the contextual (filtered based on tier, and potentially sorted based on main application visualization activity) and causal (the tutorials can conveniently run against variables and data and objects in the interpreter session, but also in the visual portion of the application) tutorial system which provides the user with a library of code snippets they can conveniently run in the interpreter to perform advanced analyses which may be disruptive to the design of the application for novice users, and which allow the rapid and application-decoupled integration of suggested analyses (appropriate to the tier of the application, and tagged to skill level and field) by the system operators in a way which may be much more likely to be familiar to advanced users typically performing local analyses with standard libraries.

Figure 60:
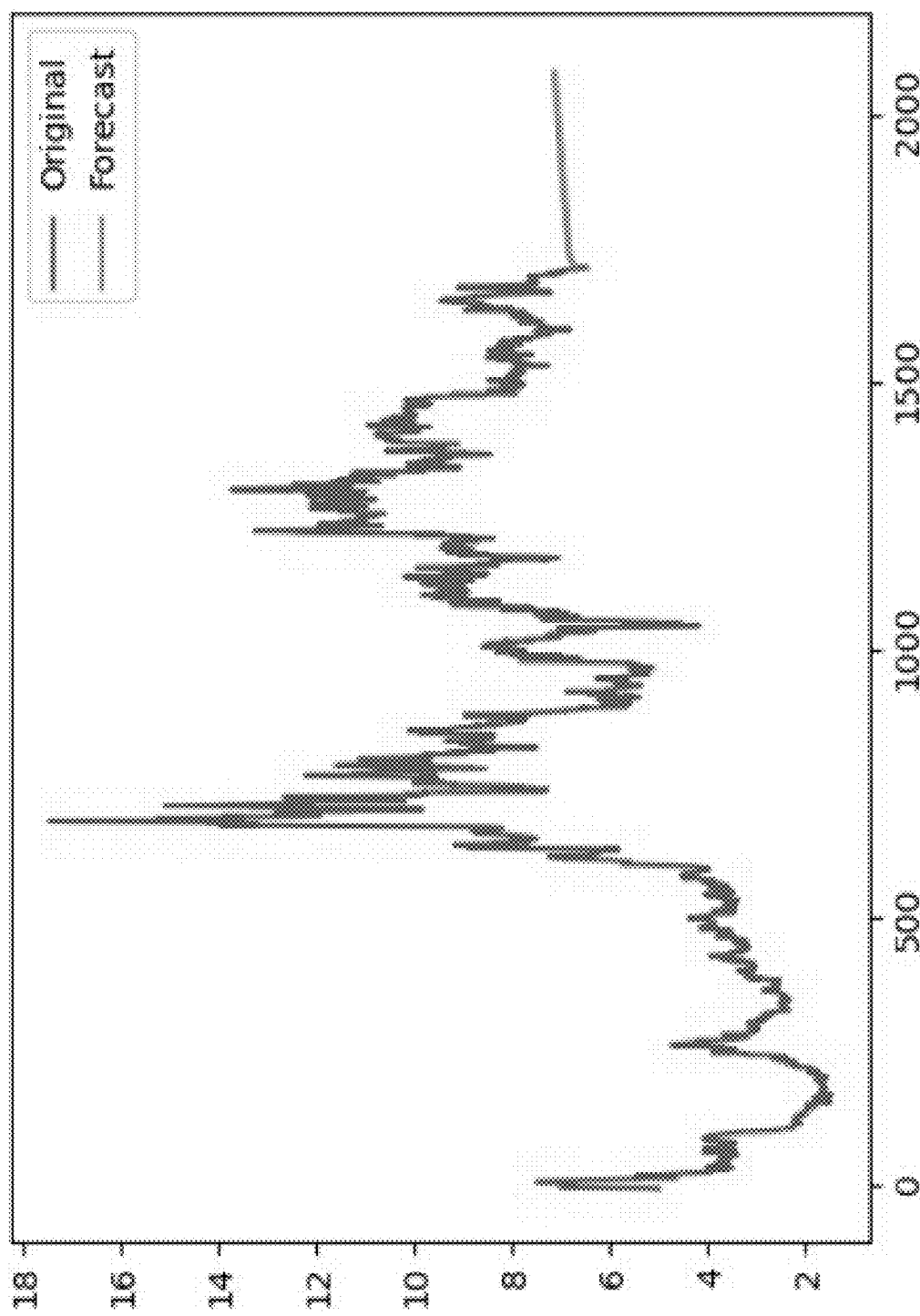
FIG. 60 illustrates an example plot generated by running a sample program to project a stock time series with SARIMAX as plotted via the tutorial system in accordance with an embodiment related to equities analysis.

FIG. 60 exhibits an example plot generated by running, in accordance with one embodiment, a sample program to project a stock time series with SARIMAX as plotted via the tutorial system, at a generally considered inappropriate prediction horizon of a year instead of a more reasonable 3 days. Here, the plot is shown alone to illustrate that the interpreter system can be configured to output standard plotting library graphics to a serialized form that can be injected into markup to display on an HTML canvas, either on a new blank page in a new tab or within a region on a modal plot dialog subwindow.

Figure 61:
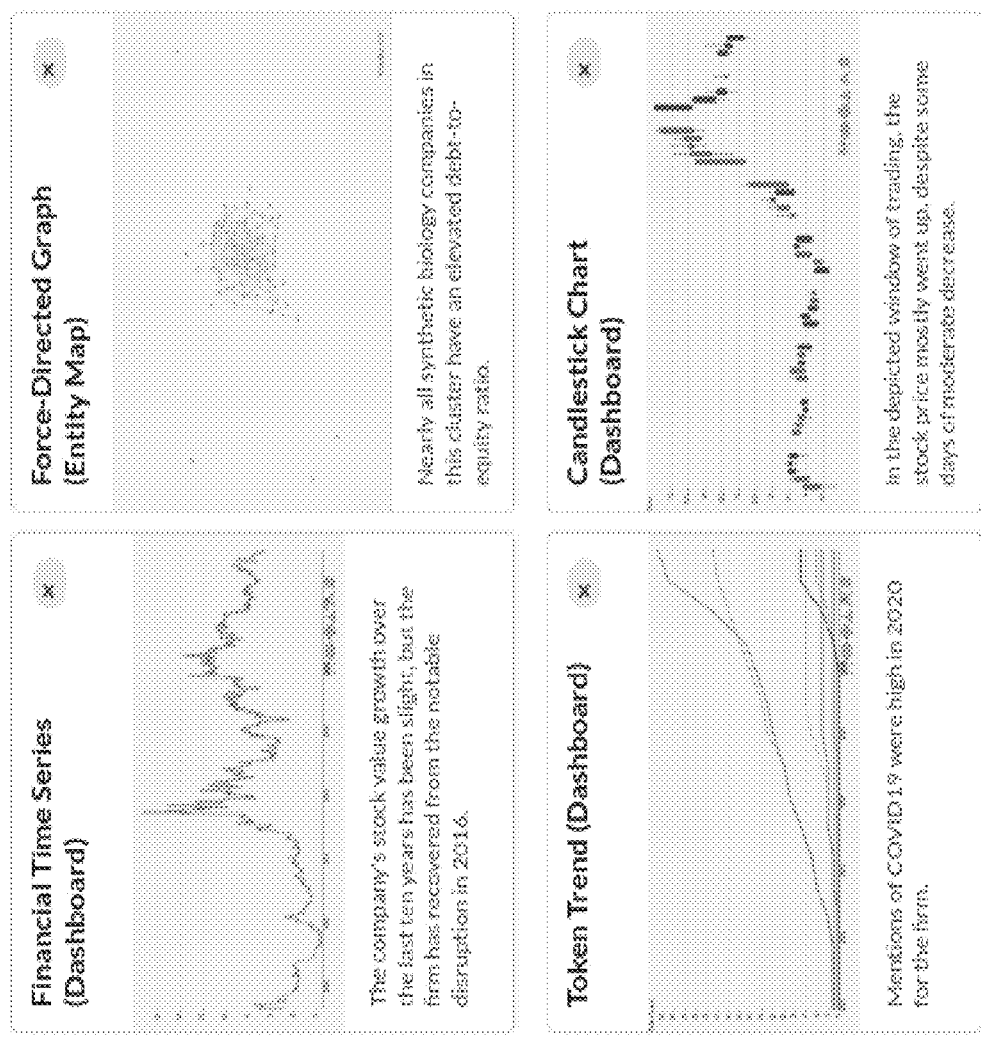
FIG. 61 illustrates a plot-contextual data cart functionality of the system, comprised of a flexible list of data plot cards created by the user using the plot-contextual menu to add the plot to an inventory in accordance with one embodiment.

FIG. 61 provides a view, in accordance with one embodiment, of the plot-contextual data cart functionality of the system, comprised of a flexible list of data plot cards created by the user using the plot-contextual menu to add the plot to an inventory. Plot-related inventory data is primarily designed to be stored in the browser's long-term and capacious IndexedDB API local storage but may be compatible with other backing data storage schemes. Typical data carts are stored on a server and used with a user account to manage and notify a user of the assembly of a large and fragmented dataset for their later download.

The user and plot-centric data cart, however, encodes the plot vector graphics and plot-generating data and metadata and insights gained from the application of insight-generating functions and potentially remote VQA transformer plot description and question answering networks operating on the rasterized form of the vector graphics along with application and access context data as an item. This may allow the user to conveniently visit different entities, universe map instances, and artifacts, and casually collect them at will. Then, acting on the inventory, the user can download these items in an archive, generate a report with an LLM prompt chain procedure, or generate presentation slides or slide source with an LLM prompt chain procedure for quick start analytics and presentation scenarios as might be undertaken by quantitatively and linguistically unsophisticated business analysts. The user can quickly delete a plot from the cart, and thus the backing store. A user may tend to generate more detailed and potentially more insightful report starter files by accumulating evidence through direct manipulation "shopping" for interesting data.

The plot-contextual "data cart" functionality of the system allows users acting in the role of analysts to add plots and their associated data and metadata (e.g. information including, but not limited to: date of analysis, date range of data, tier of application, class of visualization, entity owner or entities represented, linked constituents), as well as, in a lazy or deferred manner, select synthetic data produced via the insight-generating functions or external plot understanding functions (such as those which subject a rasterized version of the plot to a randomized plot-class-contextual battery of Visual Question Answering neural networks) to a virtual inventory system of plots.

Unlike many other data carts (such as those used by government open data departments and maintained server-side so that a user can be notified by email when a mass data request can remove requested datasets from an archival state), the plot SVG and backing data used to create the plot may be preserved in accordance with various embodiments in the item representation in addition to any generating data, and the item representation may be designed for economic considerations to be able to be stored compactly on the server attached to a user's account, or in a typical and preferred mode of operation, in a browser-attached storage area utilizing, e.g., the local storage API or, preferably, the IndexedDB API implemented by many web browsers.

Retaining a rich item representation, in accordance with various embodiments, has the advantage of being able to retain the exact plot that a user saw despite the plot available through the web service naturally tending sometimes to change in the future (e.g. as new stock prices are harvested), and the vector representation of the plot may be ideal for re-rendering analyst graphics in a presentation or written report in a suitable resolution. Furthermore, the plot can be used in coordination with a Visual Question Answering transformer based system such as those based on pix2struct (e.g. the DePlot and MatCha systems which can be specialized to attempt to explain a rasterized plot or to in some cases even "de-render" it to produce a source language program that could have generated the plot, based on pre-training an arrangement of one or more transformer-type neural networks on pairs of, e.g. matplotlib source programs and rendered rasterized plots), a network that attempts to translate images to short structural JSON-like descriptions.

In accordance with various embodiments, a mechanical description produced by an ordinary programming language rule system operating on the plot data and metadata, supplemented by the output of insight-generating functions invoked repeatedly on the plot data and metadata in a non-interactive mode, in conjunction with backend processing which uses the output of one or more of these VQA networks can then be used by an LLM in conjunction with one or more carefully crafted, and potentially domain-specific or plot-class-specific prompts to create analyst report document source or presentation slide source representations the user can request, e.g. on a rate-limited, paywall, or credits-based basis, in source or compiled (e.g., pdf as generated by a document binary generation automation API, such as pdflatex) form. Even without access to these report or presentation starter files, the user can download the data items they have in their cart in the form of an archive file holding the plot metadata, mechanically-synthesized statistical insights, original data, and plot graphics in the state they added them to their cart, and with timestamps that contextualize the generation of the plot.

In accordance with one embodiment, users can manage their cart by using the plot-contextual menu to add an item or view, e.g. as by the instrumentality of a popup modal UI control, their current data cart plot inventory. By a convenient and non-technical visual means such as clicking an X button in the corner of their plot item card listing, the user can delete an item from their inventory, which may remove it from both the inventory menu and the backing storage location (e.g. an array, browser local storage, browser IndexedDB object store).

The plot item card listing may list item-stored information potentially including but not limited to: the relevant entity, artifact, or constituent; the level of the application; the time of adding the plot into the plot inventory; the accumulated descriptions as determined by the evaluation of insight-generating functions or the anomaly or clustering functions the insight-generating functions may tend to call; any accrued descriptions created by the evaluation of remote VQA transformer networks upon the rasterized form of the visualization; and the relevant update timestamp of the visualization's data, which may substantially differ from the time the user is accessing the visualization. Further information (such as entity demographic data, channel-conditional annotations, or named entities residing in text) relating to the unit of analysis (such as entities, artifacts, or constituents) may tend to be incorporated into LLM prompts which attempt to generate presentation or report source, but may not tend to be visually displayed on plot inventory item cards visible to the user.

The prompts underlying report and presentation generation may be improved by the system operator over time, constituting a source of technological advantage that does not change the architecture of the system as described. As with other functionality of the system (i.e. critic LLMs which check the output of other LLMs for form, validity, accuracy, or security risk, e.g. in the synthetic advisor capability described), the backend report generation functions may check, also with specialized tuned LLM prompts, the appropriateness of the suggested report starters, in a way that could also increase the quality of the system through data alone in time.

FIG. 62A displays a contrived and caricatural example, in accordance with one embodiment, of a hypothetical and caricatural "mechanical" description as might be produced by emitting excerpts from the data cart item data in a structured form suited for report generating prompting. The mechanical description references plot images in the view that the archives, report starters, and slide starters can include encoded graphics that may tend to be integrated by the LLM response incorporating graphics inclusion directives into places of its choosing in the qualitative analysis products.

FIG. 62B portrays example results of substituting the untuned, caricatural description generated from a hypothetical plot item cart into untuned presentation generation and report generation prompts (prompts and outputs truncated for printing). More sophisticated prompts and soft-knowledge bases which insert instructions contextually based on mechanical descriptions from the cart will tend to produce higher quality presentations, and form and content critic prompted LLMs can attempt to provide a confidence level that the example markup language output is parsable by the downstream automation system (i.e. in the language of the system) or valid given the configuration of the system (e.g. not using exotic software libraries tending to be unavailable to the report assembling subsystem).

In accordance with various embodiments, wherever the system provides the distance, laxity, and balance configuration paradigm for inducing force-directed graph connectivity, such as in the entity graph at the highest tier of the application, the artifact graph in the intermediate tier, and the constituent graph in the lowest-level tier, it may also make available an alternative means of inducing graph linkage that provides for greater flexibility via the use of a novel link-induction language modeled upon SQL. As opposed to a graph query algebra or language (such as Cypher), a link induction query algebra or language intends to take a revealed set of nodes and focus only upon inducing a new or augmented set of links between the nodes.

In accordance with one embodiment, the link induction query language designed for use with the system can be referred to as aiLEPH (attribute-induced linkage of elements via potentials and heuristics). A program in the language starts with the declaration of the type of graph (i.e. graph, digraph, multigraph, hypergraph) and consists in the main of one or more FUSE statements which specify template variables (e.g. a, and b, in pairs) and add linkage based on a wide variety of predicate subexpressions including, but not limited to: subexpressions which logically compose subexpressions with logical connectives such as AND or OR; subexpressions which perform equality, epsilon-equality, less-than, or greater-than tests upon JSON attributes local to the graph and attached to the node; subexpressions which involve arithmetic on the value of these attributes; subexpressions which implement strict or probabilistic set membership tests; subexpressions which evaluate functions on one or more of the nodes corresponding to simple Boolean logical predicate tests;

subexpressions which evaluate logical or semantic stored procedures on local attributes;

subexpressions which evaluate logical or semantic stored procedures on nonlocal attributes, or documents, or summary records associated with nodes or their attributes.

Stored procedures are those functions, typically defined not in the body of the query language, nor representable in general in the core query language, that perform functions upon expressions and return results analogous to the SQL family of query languages. Semantic stored procedures are a concept germane to the system wherein the stored procedures may be implemented as LLM natural language prompts with instructions to return regularly formatted output data usable in the query language in optional association with, e.g. any amount of ordinary programming language to condition input and output at the call boundaries, as opposed to non-semantic stored procedures with simple function bodies implemented in an ordinary computer programming language. A semantic stored procedure as described in this disclosure may thereby return to the query language, e.g. a fraction which may be an LLM's numerical estimate or a Monte Carlo average of LLM numerical estimates of the subjective similarity of, e.g. entities, artifacts, or constituents along subtle linguistic and performance data lines.

To provide a specific example, in accordance with one embodiment, a semantic stored procedure constructed to take two document artifacts corresponding to nodes in the graph and compare their "use of simile, allusion, and metaphor" may produce for the corresponding two documents describing fairytales with high amounts of these devices an intermediate output similarity fraction, such as 0.70, because of the LLM's subjective judgment that while the use of these devices was elevated, there was a different balance struck in the proportion or subjective style of deployment of these devices in the writing sample. As with an ordinary programming language function, the semantic stored procedures in this system may return error information (e.g. a description of a critical flaw which might suggest terminating query processing or a semantic error code), or commentary information (e.g. a detailed rationale of how it arrived at the judgment number), in addition to simple output return values directly usable by the invoking expression (e.g. 0.55).

In accordance with various embodiments, the semantic stored procedures may be held in a database or library of these procedures within or without the boundaries of the system, and produced by a curator. Or, by using a query language subexpression corresponding to a stored semantic procedure parameterized to be constructed in a deferred manner by allowing the user to insert a natural language description of, e.g. the character of the distance or similarity measurement, the system may cause a semantic stored procedure to be synthesized by the use of iterative or chained prompting with prompt-generating template prompts, or "metaprompts". For instance, the user may specify an expression in their query such as SEMANTIC_USERDEFINED_SIMILARITY_ENGLISH (a,b, 'the use of similarity and metaphor') and the system may apply metaprompts to construct the terminal prompt which returns the judgment.

In accordance with one embodiment, the first metaprompt in a chain explicitly requests an LLM to create a stored procedure of the type described in analogy to SQL but with the specific character described in this disclosure (e.g. specifying that the function should output a number between 0 and 1, that a downstream LLM should pay careful attention to <the use of similarity and metaphor>, etc.). This may tend to produce a completion that results in a suitable and usable template prompt embodying the stored procedure with schematic or frame holes or template sentinels which can be filled by ordinary means of substituting in text which originates from objects or summary file text retrieved by the system (e.g. artifact text corresponding to the two filings referenced temporarily in the evaluation of the query language function as nodes a and b).

However, in accordance with various embodiments, to assure better and more thoughtful output, one or more refining or elaborating LLM invocations may include an exhortation in their prompt, including the candidate stored procedure as an exhibit, to improve the stored procedure, e.g. "Make sure to improve this prompt and allow a rich and thoughtful gradation of outputs by defining "the use of similarity and metaphor" to create a rubric ". The refining metaprompt may tend to produce a more thoughtful, higher quality prompt that uses extensive exposure to language data to produce a richly informed and subjectively thoughtful evaluation. The refining metaprompt may, optionally, also include instructions to append a judgment on the question of whether the prompt may produce the expected output, which performs the function of feedback that could be passed into the prelude of the next iteration of the refining metaprompt until a number (e.g. 3) of refining attempts are exhausted or the refining metaprompt seems to approve (e.g. "Yes" at bottom of metaprompt evaluation output).

Any refining metaprompt control data such as that previously described may be found via regular expressions or similar ordinary heuristic parsing and then the final improved prompt comprising the LLM-compatible section of the stored procedure may then be prepared for evaluation.

In accordance with various embodiments, whether the final evaluation prompt was retrieved from a library by established name (e.g. via calling "SEMANTIC_LIBRARY_SIMILARITY_CAPITALIZATIONSTRATEGY") or generated by metaprompt construction, the holes in the prompt may be filled with relevant text from the loaded node-corresponding text-containing objects. "Relevant" text need not encompass, e.g. a whole document artifact's text. The system may be configured, on a per-stored-procedure or globally-default basis, to subsample from the text by the use of a subsampling function, such as simple truncation, or, e.g., in an embodiment related to equities analysis, the text of the top-K annotation records in each node's document with a Money or Revenue channel identification as sorted by tag count. This may be a required innovation to fit within the context window of text which can be integrated by a specific LLM.

In accordance with various embodiments, a filled task-specific template may be evaluated by an LLM. In accordance with one embodiment, a final, optional call to a further LLM may, e.g. enforce the output format by returning either an extracted expected numerical value or a standard error code if it judges it cannot find the output, which may tend to help the stored procedure recover from an unrequested discursive essay on the similarity's rationale by finding just the requested output. If successful, the evaluation can take place multiple times (e.g. 5) to produce a more-reliable Monte Carlo average of, e.g. the subjective similarity fraction.

In accordance with various embodiments, when the terminal judgment of the evaluation is reached, it along with any logged error or commentary data may be returned to the aiLEPH query processor, which can evaluate remaining subexpression cells. The aiLEPH query processor may be implemented, e.g. with a parser such as a PEG (Parsing Expression Grammar parser) that produces a hierarchical structure of evaluation cells, and code which takes this structure and evaluates the cells from the inside out, in a manner reminiscent of the LISP programming language. Query processing via conventional methods may occur on the user's client browser, and the backend query processing and semantic stored procedure orchestrating system, and intermediate LLMs on the backend may sanitize the query to manage security or economic concerns, as by estimating the financial cost to execute the query by incorporating a subjective evaluation of the complexity of the query exceeding the quality of an estimate as gained by calculating the recursive depth of the query alone (if recursive subqueries are configured to be supported).

In accordance with one embodiment, query estimates may be calculated with reference to, e.g. the cost in dollars of querying an LLM on a token-basis, as in turn estimated by the number of characters in the text of the objects, or more crudely in terms of applying a flat rate to the number of nonlocal objects requested to fulfill the query. The user may be able to issue queries on a rate-limited, paywalled, credits-based or other basis, and could be afforded the opportunity by the query processing server to approve or abort the query by clicking a Yes or No UI button control in their browser in the proximity of an estimate of their remaining credits or the cost of the query as interpreted back into credits.

Furthermore, in accordance with one embodiment, where the system provides this functionality, the system may allow the user to use a preliminary exchange with an LLM on a similar basis to describe the aiLEPH query without writing it directly into the query text box. The user may enter their desire for an aiLEPH query ('make sure they're filed after 2020 and no more than 2 years apart and link them based on allusion and metaphor') and may receive from the server incorporating a aiLEPH-query-generating-metaprompt either an aiLEPH query completed into the query text box (e.g. "MODE Graph; FUSE (a), (b) FORWHICH (a.reportDate-b.reportDate BETWEEN-2 AND 2) AND (a.filing Date >2020) AND (b.filingDate >2020) AND SEMANTIC_USERDEFINED_SIMILARITY_ENGLISH (a,b, 'the use of similarity and metaphor')> #slider1Value") or an error.

In accordance with one embodiment, special values inserted into the query relating to sliders (e.g. #slider1Value as opposed to an immediate or literal primitive, like 0.75) may cause to be generated in the proximity of the force-directed graph slider UI elements reminiscent of the sliders used in the alternate laxity-balance interaction paradigm, but with UI-configurable starting and ending bounds which can be used to adjust free parameters of the query such as the similarity threshold used to contribute to graph link induction in a subexpression.

FIG. 63 displays a view, in accordance with one embodiment, of the alternative user interaction paradigm for link induction to the laxity and balance with "physical" (non-semantic) and semantic distances paradigm, the graph link induction query algebra method, displaying query wish, query source, query parameter slider, and query result viewport. To summarize, this method allows the user to induce graph connectivity for a field of locally available nodes by inputting a program in a SQL-reminiscent language invented for use with the system. The program allows query subexpressions to fuse, e.g. pairs of nodes based on node-local attributes, tests on those attributes, and distances computed on those attributes or on collection items referenced within collections comprising attributes, among other operations. However, the query system also allows performing "semantic stored procedures" which, in an analogy to SQL stored procedures, have more flexible function bodies than the main query language, including in this case, function bodies composed primarily of LLM-evaluated prompts. A query processor on the backend of the system can evaluate the query to determine which subexpressions call semantic stored procedures and arrange for the gathering of node-nonlocal referenced data (such as artifact text) and the evaluation of the prompt on that data or subsampled extracts of that data, e.g. to produce a subjective similarity fraction on a subjective dimension (such as "the use of allusion and metaphor"). Additionally, the system is designed such that other LLMs may, in accordance with various embodiments, be used to refine the semantic stored procedures, test their output, and create query language or new semantic stored procedures from the user's brief text descriptions. Traditional query parsing and planning can proceed outside the calling boundaries of the stored procedure. In accordance with various embodiments, when the result edges may be returned to the user, the system may cause the new edges to be highlighted, or all previous edges to be removed and only the query-returned edges displayed. The user can substitute, in accordance with one embodiment, into the query, e.g. a slider placeholder variable which will generate a slider users can use to set, e.g. threshold values in the query, and potentially rerun the query in whole or in part (e.g. having cached the expensive semantic computations for reuse by the query processor).

In accordance with various embodiments, the backend system may cache the results of the user queries such that they can re-request the queries to be run in response to their slider configurations where the configurations would not trigger expensive recomputation of the semantic stored procedures and return the query results. For graphs, the query processing server may return to the user's browser a representation of the graph or of the links collection alone (e.g. a dictionary data structure in d3.js graph format which has the link source and node and strength and relationship ID) corresponding to the evaluation of the query. The user's browser may then display the induced links, according to the configuration of the system, by means such as rerendering the force-directed graph simulation with only the query imputed links, or by highlighting the links and nodes involved with the imputed links by, e.g. mutating on a temporary basis the SVG stroke and fill properties of the links and nodes.

This advanced capability could afford, e.g., an analyst the opportunity to simultaneously and visually appreciate how corporate filings differ on dimensions not captured by the channels and tags taxonomy otherwise prevailing in the system, or an English composition teacher the opportunity to identify language device or level of descriptiveness trends in a student's papers and writing samples over the school year. While computationally and therefore financially expensive for the system operator, this non-obvious capability offers benefits associated with, and extremely predicated upon, the relational-space emphasizing design of the tiers of the application.

Figure 64A:
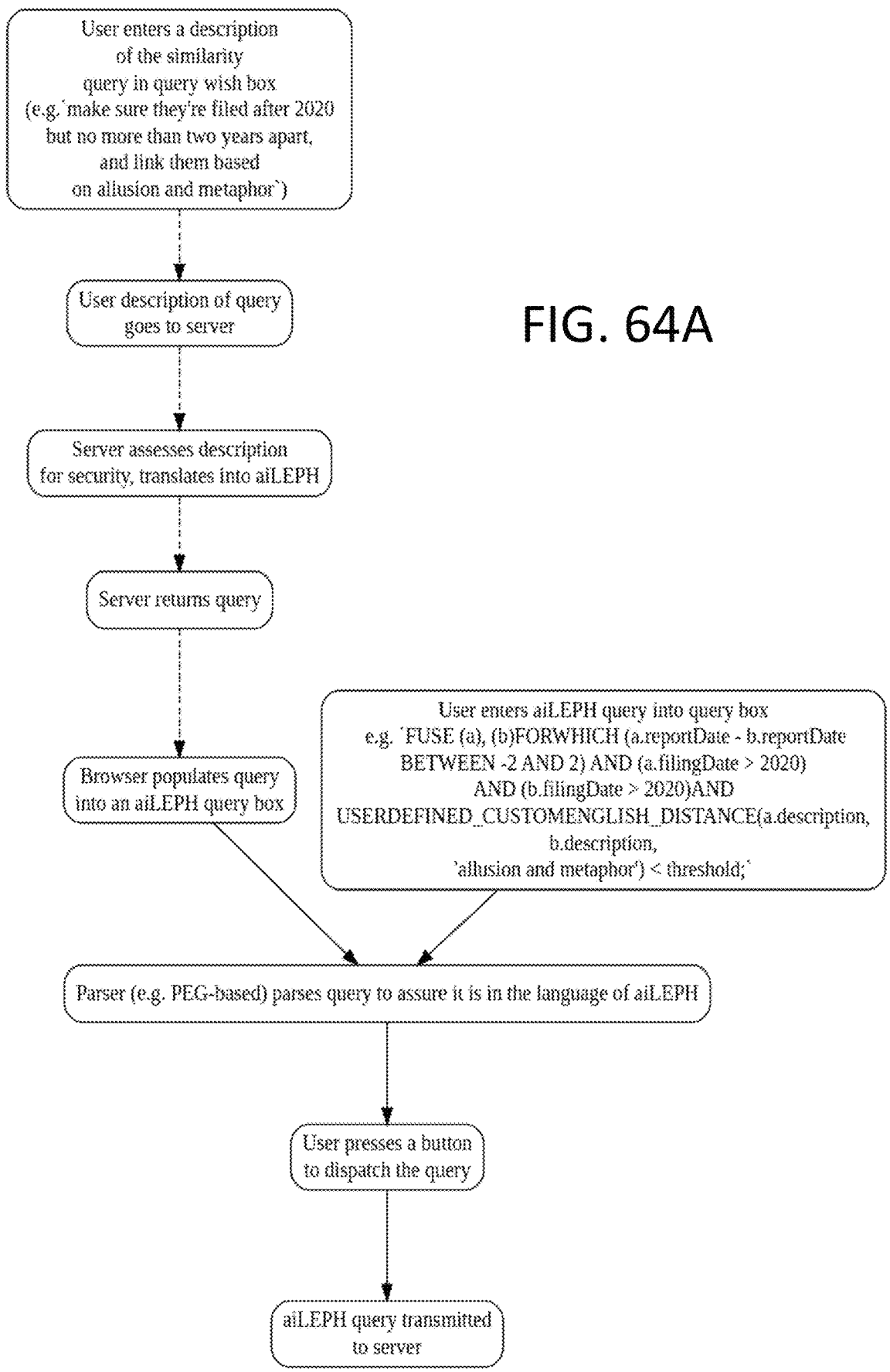
FIG. 64A is a flowchart communicating the conceptual interaction of initiating a query into the system of "semantic stored procedures" (aka "subjective stored procedures") in accordance with one embodiment.

FIG. 64A provides a flowchart that communicates the conceptual interaction of initiating a query into the system of "semantic stored procedures" (aka "subjective stored procedures"), in accordance with one embodiment.

Figure 64B:
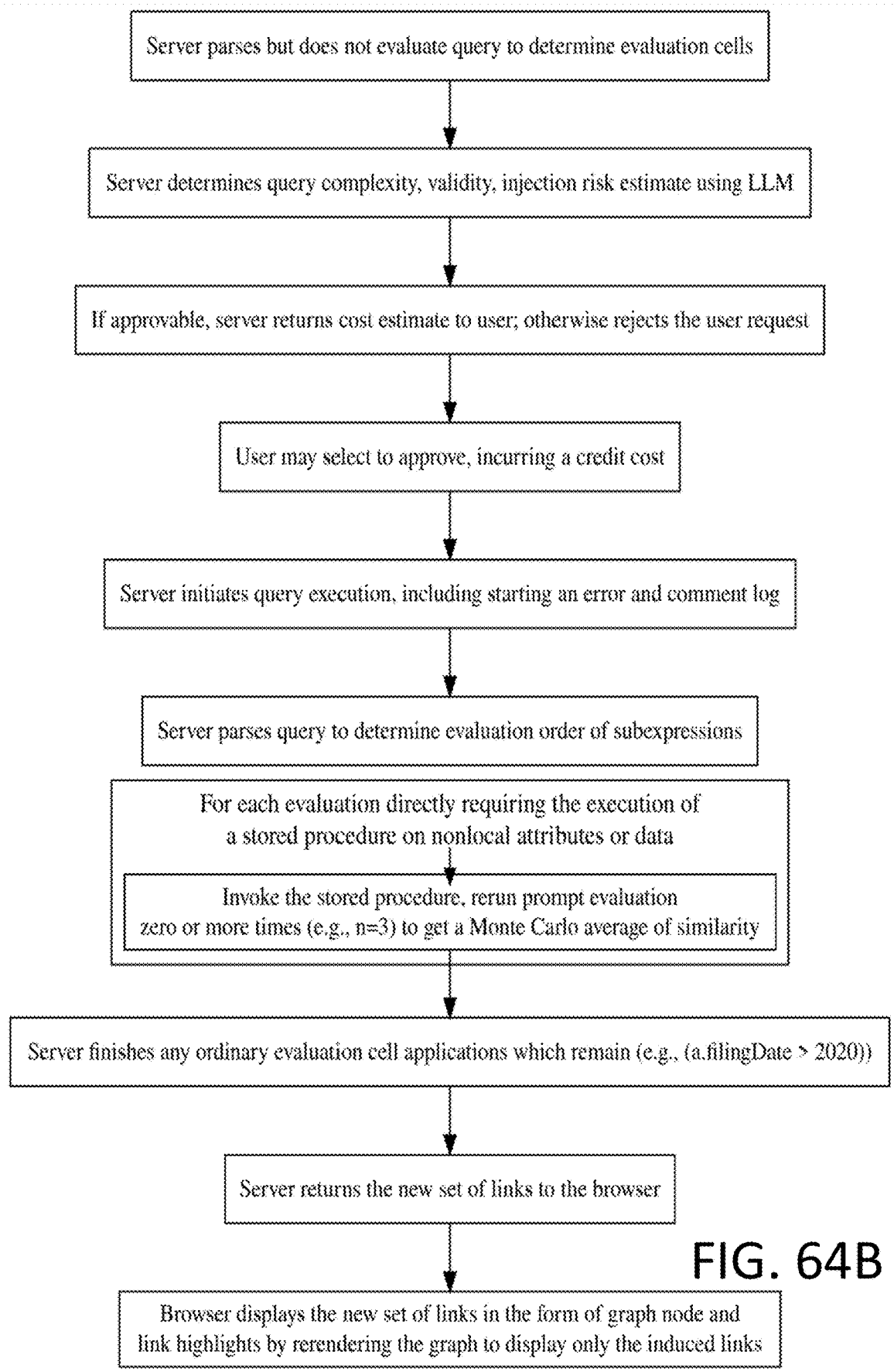
FIG. 64B is a flowchart communicating the conceptual interaction of processing the query, which involves non-natural-language-semantic and "semantic stored procedures" (aka "subjective stored procedures") processing of the evaluation cells via metaprompting, prompt-response, and critic evaluations using an LLM in accordance with one embodiment.

In accordance with one embodiment, FIG. 64B provides a flowchart that communicates the conceptual interaction of processing the query, which involves hybrid non-natural-language (e.g. ordinary query parsing and logical evaluation) and "semantic stored procedures" processing of the evaluation cells via metaprompting, prompt-response, and critic evaluations using an LLM. FIGS. 64A and 64B include in common elements such as how LLMs associated with the system may translate user intentions into query language which references, e.g. user-defined notions of semantic similarity which may be expanded into semantic stored procedures run one or multiple (i.e., to get a stochastic estimate) times to produce a value usable with, e.g. a threshold test in an encapsulating evaluation cell of the query language.

Figure 64C:
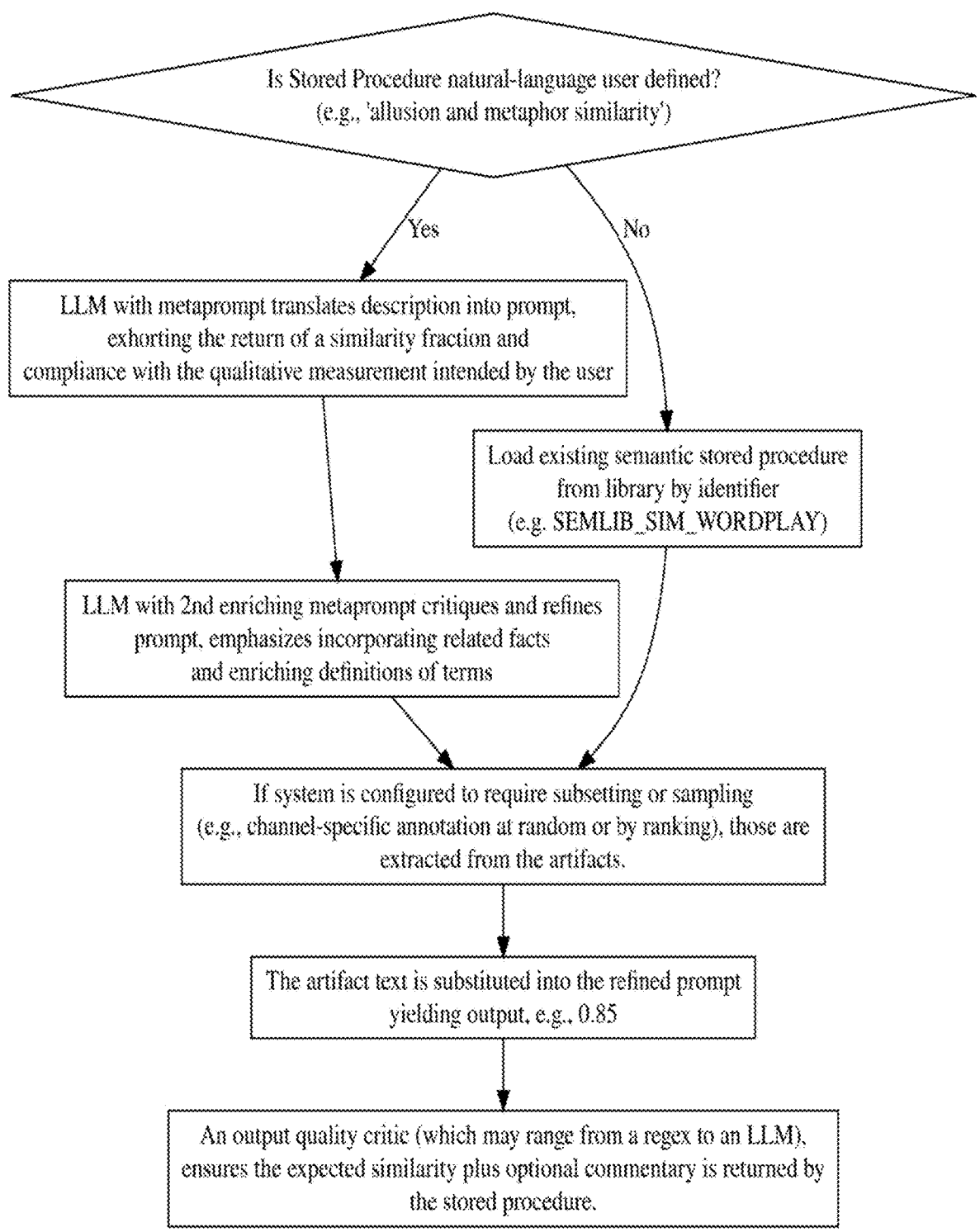
FIG. 64C is a flowchart detailing (left path) the extemporaneous construction of a user-specified semantic stored procedure by the use of "template metaprompting" and (right path) loading an existing prompt from a library (e.g. via an identifier), converging in an output of the refined or loaded prompt that is itself subject to evaluation by an LLM in accordance with one embodiment.

FIG. 64C, in accordance with various embodiments, provides a high-level flowchart detailing (left path) the extemporaneous construction of a user-specified semantic stored procedure by the use of "template metaprompting" (a special case of prompt chaining) (i.e. having a prompt about writing prompts generate a prompt based on the user's short description of the distance or similarity, and having one or more prompts about refining prompts generate a refined version of the prompt with an exhortation to include background supporting world detail encoded into the LLM) and substituting in, e.g. artifact text, and (right path) loading an existing prompt from a library of prompts and substituting in the text. Then, regardless of whether the prompt has been created or existed in the library, the evaluation of the stored procedure may either be transmitted to the ordinary portions of the query processor, or, optionally, checked for quality by a critic LLM supplied with a prompt that judges if the evaluation is coherent in form or character and returns an error code or the query-system-readable representation of the return value.

In summary, the system offers a highly-integrated interactive facility with thoughtful capabilities for performing text analysis on document streams visually and with the necessary assistance of a menagerie of variously-capable neural network based language models. Its multiscale analysis design allows the analyst to drill down from macrophenomena of competition to microphenomena of sentence structure. It allows user extensibility of its analytical functions and provides the potential for data analysis utility by a wide range of users with a wide range of analytical inclinations.

It may be possible to make use of the system in a primarily graphical and exploratory mode (e.g. as a browser), emphasizing direct manipulation and spatial analyses and reading synthetically-generated verbal suggestions. It may be possible at the same time to make use of the system's advanced capabilities for being user-programmed, or for allowing a user to construct highly-specialized queries tied to visualizations and relationships (e.g. as a data analysis or interactive statistical computing environment), in stark contrast to a traditional index-based search engine-driven library system that largely ignores extemporaneous opportunities for inducing potentially revelatory intermediate structure and connections.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 65:
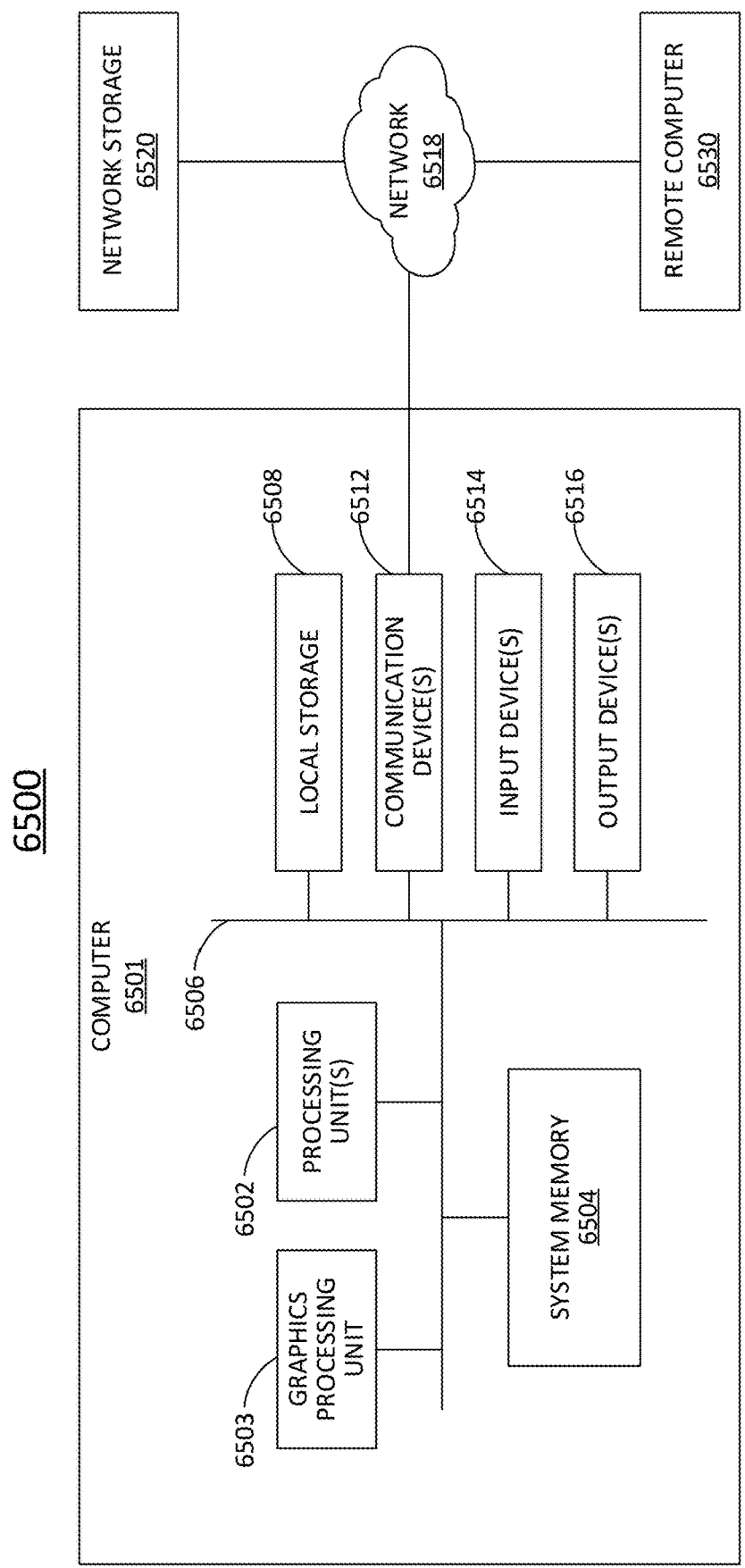
FIG. 65 illustrates a general computer architecture 6500 that can be appropriately configured to implement components disclosed in accordance with various embodiments.

FIG. 65 illustrates a general computer architecture 6500 that can be appropriately configured to implement components disclosed in accordance with various embodiments. The computing architecture 6500 can include various common computing elements, such as a computer 6501, a network 6518, and one or more remote computers 6530. The embodiments disclosed herein, however, are not limited to implementation by the general computing architecture 6500.

Referring to FIG. 65, the computer 6501 can be any of a variety of general purpose computers such as, for example, a server, a desktop computer, a laptop computer, a tablet computer or a mobile computing device. The computer 6501 can include a processing unit 6502, a system memory 6504 and a system bus 6506.

The processing unit 6502 can be or include one or more of any of various commercially available computer processors, which can each include one or more processing cores that can operate independently of each other. Additional co-processing units, such as a graphics processing unit 6503, also can be present in the computer.

The system memory 6504 can include volatile devices, such as dynamic random access memory (DRAM) or other random access memory devices. The system memory 6504 can also or alternatively include non-volatile devices, such as a read-only memory or flash memory.

The computer 6501 can include local non-volatile secondary storage 6508 such as a disk drive, solid state disk, or removable memory card. The local storage 6508 can include one or more removable and/or non-removable storage units. The local storage 6508 can be used to store an operating system that initiates and manages various applications that execute on the computer. The local storage 6508 can also be used to store special purpose software configured to implement the components of the embodiments disclosed herein and that can be executed as one or more applications under the operating system.

The computer 6501 can also include communication device(s) 6512 through which the computer communicates with other devices, such as one or more remote computers 6530, over wired and/or wireless computer networks 6518. Communications device(s) 6512 can include, for example, a network interface for communicating data over a wired computer network. The communication device(s) 6512 can include, for example, one or more radio transmitters for communications over Wi-Fi, Bluetooth, and/or mobile telephone networks.

The computer 6501 can also access network storage 6520 through the computer network 6518. The network storage can include, for example, a network attached storage device located on a local network, or cloud-based storage hosted at one or more remote data centers. The operating system and/or special purpose software can alternatively be stored in the network storage 6520.

The computer 6501 can have various input device(s) 6514 such as a keyboard, mouse, touchscreen, camera, microphone, accelerometer, thermometer, magnetometer, or any other sensor. Output device(s) 6516 such as a display, speakers, printer, or eccentric rotating mass vibration motor can also be included.

The various storage 6508, communication device(s) 6512, output devices 6516 and input devices 6514 can be integrated within a housing of the computer, or can be connected through various input/output interface devices on the computer, in which case the reference numbers 6508, 6512, 6514 and 6516 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Further Embodiments of the Invention

A method is performed by a computer system having at least one processor and a memory. The method includes: for each entity of a plurality of considered entities, accessing a calculated per-entity first-stage summary record of framing analysis data for a plurality of textual artifacts under consideration, wherein the calculated per-entity first-stage summary record lists semantic data for each textual artifact of the plurality of textual artifacts; retrieving summary performance data particular to a subject domain and concerning the considered entities; accessing a second-stage summary record compiled across the plurality of considered entities, wherein the second-stage summary record comprises summary performance and semantic data relevant to each entity of the plurality of considered entities; calculating a network structure of the plurality of considered entities based on a connectivity induction scheme, wherein each entity of the plurality of considered entities is represented by a node in the network structure; rendering the calculated network structure as an interactive graph visualization; and in response to a first user input associated with a first node in the interactive graph visualization, displaying performance or semantic data related to a first entity represented by the first node, wherein the displayed performance or semantic data is based on the second-stage summary record.

The semantic data can include one or more of: framing channel of appeal counts for one or more framing channel sets; named entity concordance data; and event or scenario concordance data. The summary performance data can include time series performance metrics within the subject domain. The connectivity induction scheme can include: a graph link induction query language scheme, or a critical distance between entities scheme that induces edges based on a node attribute distance and an induction threshold.

The connectivity induction scheme can include a critical distance between entities scheme that induces edges based on a node attribute distance and an induction threshold, wherein the critical distance between entities scheme involves the configuration or determination of one or more parameters comprising: two or more distance functions, one or more distance function balance factors, which influence a contribution of each of the one or more distance functions to a blended or composite distance, and the induction threshold.

One or more of the distance function balance factors may be configured through a user interface element to determine a relative balance between a pair of distance functions, wherein the user interface element is selected from a group consisting of: a slider, a dial, a variable-value user-interface element, and a direct numerical entry.

The method can further include, in response to the configuration or determination of the one or more parameters for the critical distance between entities scheme: for each of the two or more distance functions: computing a distance matrix over the plurality of considered entities; blending or interpolating the distance matrices in direct or indirect accordance with the one or more distance function balance factors yielding the blended or composite distance; and calculating network structure by establishing connectivity between pairs of nodes for which the blended or composite distance does not surpass the induction threshold. The induction threshold can be determined based on a user-configured induction laxity factor. The induction laxity factor may be configured via a user interface element selected from a group consisting of: a slider, a dial, a variable-value user-interface element, and a direct numerical entry.

The method can further include, determining one or both of (a) one or more of the distance function balance factors, and (b) the induction threshold, the determining comprising a numerical optimization process involving an objective function evaluated on simulated inductions of graph connectivity, the objective function incorporating one or more criteria selected from a group consisting of: the maximization of bridges in the network structure, the minimization of isolates in the network structure, and the maximization of communities in the network structure. The calculated network structure may be rendered using a physical simulation or force-directed graph drawing method.

The method can further include, in response to a second user input associated with a second node in the interactive graph visualization: accessing summary and non-summary entity performance and semantic time series data for a second entity associated with the second node to determine diachronic information related to the second entity; and displaying the diachronic information, wherein the first and second nodes can be the same node or different nodes, and wherein the first and second entities can be the same entity or different entities.

The diachronic information may include data from one or both of the first-stage summary record corresponding to the second entity and the second-stage summary record.

The method can further include, further in response to the second user input associated with a second node in the interactive graph visualization: rendering a subordinate-level-of-analysis force-directed graph visualization having nodes corresponding to textual artifacts associated with the second entity.

The method can further include, further in response to the second user input associated with a second node in the interactive graph visualization: rendering one or more performance time series visualizations, one or more semantic count or score data visualizations, and a user interface calendar control. The one or more semantic count or score data visualizations may each represent a time series, radar chart, or area chart related to semantic counts.

Each entity of the plurality of considered entities may be selected from a group consisting of: organizations; persons; physical objects; virtual objects; locations; and systems.

Each textual artifact of the plurality of textual artifacts may be selected from a group consisting of: documents, reports, essays, articles, press releases, postings, transcripts, recommendations, opinions, correspondence, legal documents, advertisements, lyrics, periodicals, manuals, monographs, document excerpts, and computer code files.

A computer system can include the at least one processor and the memory, wherein the memory has instructions stored thereon that are executed by the at least one processor and cause the computer system to perform the method.

A non-transitory computer readable medium can have instructions stored thereon, wherein the instructions are executed by the least one processor and cause the at least one processor to perform the method.

Entities and their associated artifacts can include, for example: business entities producing or associated with reports, filings, press releases, or other articles; employers or employment aggregators producing or associated with job descriptions; print or online newspapers or magazines producing articles; bloggers, social media users, or internet forum users producing or associated with posts; broadcasters or podcasters producing or associated with transcripts of commentary; managers, employees, or human resources professionals or subjects of evaluations producing or associated with personnel evaluations; audit or consulting personnel or subjects of studies or audits producing or associated with reports or recommendations; wholesalers or retailers or product marketers producing or associated with product listings or catalogs or promotional communications;

legislative or administrative entities producing or associated with legislation or administrative rules or rulings; courts, judges, or magistrates producing or associated with case law; witnesses, experts, parties to legal action, an amicus curiae, or court entities producing or associated with testimony or oral argument, instruction, or opinion in a legal proceeding; doctors or healthcare providers or patients producing or associated with patient reports or clinical notes; inventors, lawyers, agents, or examiners producing or associated with patents, patent revisions or commentary, or office actions; real estate agents or real estate listing aggregators producing or associated with property listings; environmental and/or site study experts or inspectors producing or associated with reports or impact studies; insurance agents and adjusters producing or associated with explanations and decisions related to claims or coverage; academics or academic journals producing or associated with scientific articles and commentaries; teachers or education professionals or students producing or associated with student writing samples or works or written commentary associated with grading and evaluation; analysts or forecasters producing or associated with reports or recommendations; presenters or debaters producing or associated with transcripts of talks or debates or parliamentary proceedings; public relations or lobbying or special interest groups personnel or their associated clients producing or associated with press releases, media advisories, or defensive or promotional communications; software systems producing or associated with log files; programmers or code reviewers or source control systems or language models or compilers or transpilers producing or associated with computer programs or excerpts of programs or program changes; language models or the subjects they describe producing or associated with synthetic commentaries, written responses, or analyses; multimodal vision and language models or the real or virtual places they describe producing or associated with synthetic descriptions of environments, scenes, or situations.

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In method claims, any reference characters are used for convenience of description only, and do not indicate a particular order for performing a method.

The invention claimed is:

1. A method performed by a computer system having at least one processor and a memory, the method comprising, the computer system:

for each entity of a plurality of considered entities, accessing a calculated per-entity first-stage summary record of framing analysis data for a plurality of textual artifacts under consideration, wherein the calculated per-entity first-stage summary record lists semantic data for each textual artifact of the plurality of textual artifacts;

retrieving summary performance data particular to a subject domain and concerning the considered entities;

accessing a second-stage summary record compiled across the plurality of considered entities, wherein the second-stage summary record comprises summary performance and semantic data relevant to each entity of the plurality of considered entities;

calculating a network structure of the plurality of considered entities based on a connectivity induction scheme, wherein each entity of the plurality of considered entities is represented by a node in the network structure;

rendering the calculated network structure as an interactive graph visualization; and in response to a first user input associated with a first node in the interactive graph visualization, displaying performance or semantic data related to a first entity represented by the first node, wherein the displayed performance or semantic data is based on the second-stage summary record.

2. The method of claim 1, wherein the semantic data comprises one or more of:

framing channel of appeal counts for one or more framing channel sets;

named entity concordance data; and event or scenario concordance data.

3. The method of claim 1, wherein the summary performance data comprises time series performance metrics within the subject domain.

4. The method of claim 1, wherein the connectivity induction scheme comprises:

a graph link induction query language scheme, or a critical distance between entities scheme that induces edges based on a node attribute distance and an induction threshold.

5. The method of claim 1, wherein the connectivity induction scheme comprises a critical distance between entities scheme that induces edges based on a node attribute distance and an induction threshold, wherein the critical distance between entities scheme involves the configuration or determination of one or more parameters comprising:

two or more distance functions, one or more distance function balance factors, which influence a contribution of each of the one or more distance functions to a blended or composite distance, and the induction threshold.

6. The method of claim 5, wherein one or more of the distance function balance factors is configured through a user interface element to determine a relative balance between a pair of distance functions, wherein the user interface element is selected from a group consisting of:

a slider, a dial, a variable-value user-interface element, and a direct numerical entry.

7. The method of claim 5, further comprising, in response to the configuration or determination of the one or more parameters for the critical distance between entities scheme:

for each of the two or more distance functions:

computing a distance matrix over the plurality of considered entities;

blending or interpolating the distance matrices in direct or indirect accordance with the one or more distance function balance factors yielding the blended or composite distance; and calculating network structure by establishing connectivity between pairs of nodes for which the blended or composite distance does not surpass the induction threshold.

8. The method of claim 5, wherein the induction threshold is determined based on a user-configured induction laxity factor.

9. The method of claim 8, wherein the induction laxity factor is configured via a user interface element selected from a group consisting of:
a slider,
a dial,
a variable-value user-interface element, and
a direct numerical entry.

10. The method of claim 5, further comprising, determining one or both of (a) one or more of the distance function balance factors, and (b) the induction threshold, the determining comprising a numerical optimization process involving an objective function evaluated on simulated inductions of graph connectivity, the objective function incorporating one or more criteria selected from a group consisting of:
the maximization of bridges in the network structure,
the minimization of isolates in the network structure, and
the maximization of communities in the network structure.

11. The method of claim 1, wherein the calculated network structure is rendered using a physical simulation or force-directed graph drawing method.

12. The method of claim 1, further comprising, in response to a second user input associated with a second node in the interactive graph visualization:
accessing summary and non-summary entity performance and semantic time series data for a second entity associated with the second node to determine diachronic information related to the second entity; and
displaying the diachronic information,
wherein the first and second nodes can be the same node or different nodes, and wherein the first and second entities can be the same entity or different entities.

13. The method of claim 12, wherein the diachronic information comprises data from one or both of the first-stage summary record corresponding to the second entity and the second-stage summary record.

14. The method of claim 12, further comprising, further in response to the second user input associated with a second node in the interactive graph visualization:
rendering a subordinate-level-of-analysis force-directed graph visualization having nodes corresponding to textual artifacts associated with the second entity.

15. The method of claim 12, further comprising, further in response to the second user input associated with a second node in the interactive graph visualization:
rendering one or more performance time series visualizations, one or more semantic count or score data visualizations, and a user interface calendar control.

16. The method of claim 15, wherein the one or more semantic count or score data visualizations each represent a time series, radar chart, or area chart related to semantic counts.

17. The method of claim 1, wherein each entity of the plurality of considered entities is selected from a group consisting of: organizations, persons, physical objects, virtual objects, locations, and systems.

18. The method of claim 1, wherein each textual artifact of the plurality of textual artifacts is selected from a group consisting of: documents, reports, essays, articles, press releases, postings, transcripts, recommendations, opinions, correspondence, legal documents, advertisements, lyrics, periodicals, manuals, monographs, document excerpts, and computer code files.

19. A computer system comprising the at least one processor and the memory, wherein the memory has instructions stored thereon that are executed by the at least one processor and cause the computer system to perform the method claim 1.

20. A non-transitory computer readable medium having instructions stored thereon, wherein the instructions are executed by the least one processor and cause the at least one processor to perform the method of any of claim 1.

* * * * *